(12) United States Patent
Machikawa et al.

(10) Patent No.: US 12,548,762 B2
(45) Date of Patent: Feb. 10, 2026

(54) POSITIVE ELECTRODE ACTIVE MATERIAL, POSITIVE ELECTRODE, SECONDARY BATTERY, AND METHOD FOR MANUFACTURING POSITIVE ELECTRODE

(71) Applicant: SEMICONDUCTOR ENERGY LABORATORY CO., LTD., Atsugi (JP)

(72) Inventors: Kazuhito Machikawa, Kanagawa (JP); Yohei Momma, Kanagawa (JP); Teruaki Ochiai, Kanagawa (JP); Mayumi Mikami, Kanagawa (JP)

(73) Assignee: Semiconductor Energy Laboratory Co., Ltd., Atsugi (JP)

( * ) Notice: Subject to any disclaimer, the term of this patent is extended or adjusted under 35 U.S.C. 154(b) by 566 days.

(21) Appl. No.: 17/252,530

(22) PCT Filed: Jun. 11, 2019

(86) PCT No.: PCT/IB2019/054839
§ 371 (c)(1),
(2) Date: Dec. 15, 2020

(87) PCT Pub. No.: WO2019/243952
PCT Pub. Date: Dec. 26, 2019

(65) Prior Publication Data
US 2021/0265621 A1  Aug. 26, 2021

(30) Foreign Application Priority Data

Jun. 22, 2018 (JP) .................................. 2018-118810
Oct. 17, 2018 (JP) .................................. 2018-196009

(51) Int. Cl.
*H01M 4/36* (2006.01)
*H01M 4/1391* (2010.01)
(Continued)

(52) U.S. Cl.
CPC ......... *H01M 4/364* (2013.01); *H01M 4/1391* (2013.01); *H01M 4/1397* (2013.01);
(Continued)

(58) Field of Classification Search
CPC .. H01M 4/364; H01M 4/1391; H01M 4/1397; H01M 4/505; H01M 4/525;
(Continued)

(56) References Cited

U.S. PATENT DOCUMENTS

| 4,302,518 A | 11/1981 | Goodenough et al. |
| 4,668,595 A | 5/1987 | Yoshino et al. |

(Continued)

FOREIGN PATENT DOCUMENTS

| CN | 101188295 A | 5/2008 |
| CN | 101964420 A | 2/2011 |

(Continued)

OTHER PUBLICATIONS

Decision to grant a Patent published by JPO for Application No. JP.2020524944 (Year: 2023).*

(Continued)

*Primary Examiner* — Alexander Usyatinsky
(74) *Attorney, Agent, or Firm* — Fish & Richardson P.C.

(57) ABSTRACT

A positive electrode active material, which has a high capacity and excellent charge and discharge cycle performance, for a lithium-ion secondary battery is provided. Alternatively, a positive electrode active material that inhibits a decrease in capacity in charge and discharge cycles when used in a lithium-ion secondary battery is provided. Alternatively, a high-capacity secondary battery is provided. Alternatively, a highly safe or reliable secondary battery is provided. The positive electrode active material contains a first substance including a first crack and a second substance positioned inside the first crack. The first substance contains (Continued)

one or more of cobalt, manganese, and nickel, lithium, oxygen, magnesium, and fluorine. The second substance contains phosphorus and oxygen.

3 Claims, 56 Drawing Sheets

(51) Int. Cl.
*H01M 4/1397* (2010.01)
*H01M 4/505* (2010.01)
*H01M 4/525* (2010.01)
*H01M 4/58* (2010.01)
*H01M 10/0525* (2010.01)
*H01M 4/02* (2006.01)

(52) U.S. Cl.
CPC ........... *H01M 4/505* (2013.01); *H01M 4/525* (2013.01); *H01M 4/5825* (2013.01); *H01M 10/0525* (2013.01); *H01M 2004/028* (2013.01); *H01M 2220/20* (2013.01)

(58) Field of Classification Search
CPC ........... H01M 4/5825; H01M 10/0525; H01M 2004/028; H01M 2220/20
See application file for complete search history.

(56) References Cited

U.S. PATENT DOCUMENTS

| | | | |
|---|---|---|---|
| 5,240,794 A | 8/1993 | Thackeray et al. | |
| 5,443,929 A | 8/1995 | Yamamoto et al. | |
| 5,604,396 A | 2/1997 | Watanabe et al. | |
| 5,705,291 A | 1/1998 | Amatucci et al. | |
| 5,783,333 A | 7/1998 | Mayer | |
| 5,824,278 A | 10/1998 | Yao | |
| 5,834,139 A | 11/1998 | Shodai et al. | |
| 5,871,866 A | 2/1999 | Barker et al. | |
| 5,910,382 A | 6/1999 | Goodenough et al. | |
| 6,085,015 A | 7/2000 | Armand et al. | |
| 6,127,065 A | 10/2000 | Yamamoto et al. | |
| 6,218,050 B1 | 4/2001 | Yoon et al. | |
| 6,277,521 B1 | 8/2001 | Gao et al. | |
| 6,346,348 B1 | 2/2002 | Nakajima et al. | |
| 6,458,487 B1 | 10/2002 | Takeuchi et al. | |
| 6,514,640 B1 | 2/2003 | Armand et al. | |
| 6,582,814 B2 | 6/2003 | Swiler et al. | |
| 6,589,499 B2 | 7/2003 | Gao et al. | |
| 6,680,143 B2 | 1/2004 | Thackeray et al. | |
| 6,737,195 B2 | 5/2004 | Kweon et al. | |
| 6,753,111 B2 | 6/2004 | Kweon et al. | |
| 6,846,592 B2 | 1/2005 | Kweon et al. | |
| 6,878,490 B2 | 4/2005 | Gao et al. | |
| 6,919,144 B2 | 7/2005 | Miyazaki et al. | |
| 6,974,601 B2 | 12/2005 | Kweon et al. | |
| 6,984,469 B2 | 1/2006 | Kweon et al. | |
| 7,018,741 B2 | 3/2006 | Suhara et al. | |
| 7,138,209 B2 | 11/2006 | Kweon et al. | |
| 7,294,435 B2 | 11/2007 | Miyamoto et al. | |
| 7,303,840 B2 | 12/2007 | Thackeray et al. | |
| 7,309,546 B2 | 12/2007 | Kweon et al. | |
| 7,368,071 B2 | 5/2008 | Dahn et al. | |
| 7,393,476 B2 | 7/2008 | Shiozaki et al. | |
| 7,504,180 B2 | 3/2009 | Tatsumi et al. | |
| 7,635,536 B2 | 12/2009 | Johnson et al. | |
| 7,709,148 B2 | 5/2010 | Kawasato et al. | |
| 7,709,151 B2 | 5/2010 | Inoue et al. | |
| 7,736,807 B2 | 6/2010 | Hasegawa et al. | |
| 7,790,308 B2 | 9/2010 | Johnson et al. | |
| 7,892,679 B2 | 2/2011 | Shimizu et al. | |
| 7,927,506 B2 | 4/2011 | Park | |
| 7,935,270 B2 | 5/2011 | Park | |
| 7,998,620 B2 | 8/2011 | Nanno | |
| 8,003,256 B2 | 8/2011 | Ohishi | |
| 8,007,941 B2 | 8/2011 | Kweon et al. | |
| 8,034,486 B2 | 10/2011 | Kweon et al. | |
| 8,080,340 B2 | 12/2011 | Thackeray et al. | |
| RE43,276 E | 3/2012 | Kweon et al. | |
| 8,236,449 B2 | 8/2012 | Nakura | |
| 8,470,477 B2 | 6/2013 | Miwa et al. | |
| 8,476,510 B2 | 7/2013 | Swager et al. | |
| 8,557,440 B2 | 10/2013 | Yu et al. | |
| 8,609,283 B2 | 12/2013 | Morita et al. | |
| 8,685,569 B2 | 4/2014 | Oguni et al. | |
| 8,685,570 B2 | 4/2014 | Miwa et al. | |
| 8,709,654 B2 | 4/2014 | Takeuchi et al. | |
| 8,753,532 B2 | 6/2014 | Levasseur et al. | |
| 8,808,918 B2 | 8/2014 | Jung et al. | |
| 8,808,920 B2 | 8/2014 | Morita et al. | |
| 8,877,377 B2 | 11/2014 | Hosoya | |
| 8,877,381 B2 | 11/2014 | Yasuda et al. | |
| 8,883,351 B2 | 11/2014 | Todoriki et al. | |
| 8,906,547 B2 | 12/2014 | Taniguchi et al. | |
| 8,927,148 B2 | 1/2015 | Kawakami | |
| 8,945,770 B2 | 2/2015 | Koo et al. | |
| 8,945,772 B2 | 2/2015 | Kawakami et al. | |
| 8,951,448 B2 | 2/2015 | Toyama et al. | |
| 9,105,926 B2 | 8/2015 | Fujiki et al. | |
| 9,225,003 B2 | 12/2015 | Yukawa | |
| 9,227,850 B2 | 1/2016 | Ooishi | |
| 9,293,236 B2 | 3/2016 | Kawakami et al. | |
| 9,362,557 B2 | 6/2016 | Watanabe et al. | |
| 9,385,366 B2 | 7/2016 | Yamakaji et al. | |
| 9,391,322 B2 | 7/2016 | Liu et al. | |
| 9,478,796 B2 | 10/2016 | Li et al. | |
| 9,505,631 B2 | 11/2016 | Masukuni et al. | |
| 9,515,313 B2 | 12/2016 | Umeyama et al. | |
| 9,614,225 B2 | 4/2017 | Park | |
| 9,666,326 B2 | 5/2017 | Kawakami et al. | |
| 9,698,420 B2 | 7/2017 | Ishizaki et al. | |
| 9,786,903 B2 | 10/2017 | Ryu et al. | |
| 9,812,709 B2 | 11/2017 | Endoh et al. | |
| 9,871,246 B2 | 1/2018 | Kim et al. | |
| 9,899,664 B2 | 2/2018 | Yamaki et al. | |
| 9,923,244 B2 | 3/2018 | Takanashi et al. | |
| 10,128,495 B2 | 11/2018 | Satow et al. | |
| 10,243,215 B2 | 3/2019 | Shitaba et al. | |
| 10,361,432 B2 | 7/2019 | Takaichi et al. | |
| 10,741,834 B2 | 8/2020 | Zhang et al. | |
| 10,777,815 B2 | 9/2020 | Kanada et al. | |
| 2001/0010807 A1 | 8/2001 | Matsubara | |
| 2002/0102459 A1 | 8/2002 | Hosoya et al. | |
| 2002/0110736 A1 | 8/2002 | Kweon et al. | |
| 2002/0164156 A1 | 11/2002 | Bilbrey | |
| 2002/0195591 A1 | 12/2002 | Ravet et al. | |
| 2003/0104279 A1 | 6/2003 | Miyazaki et al. | |
| 2003/0134186 A1 | 7/2003 | Shizuki | |
| 2004/0142241 A1 | 7/2004 | Nagayama | |
| 2004/0229123 A1 | 11/2004 | Takahashi et al. | |
| 2004/0229124 A1* | 11/2004 | Miyamoto | H01M 4/505 |
| | | | 429/231.95 |
| 2004/0234857 A1 | 11/2004 | Shiozaki et al. | |
| 2005/0019662 A1* | 1/2005 | Suhara | C01G 51/42 |
| | | | 429/231.95 |
| 2006/0051671 A1 | 3/2006 | Thackeray et al. | |
| 2006/0051673 A1 | 3/2006 | Johnson et al. | |
| 2006/0121352 A1 | 6/2006 | Kejha et al. | |
| 2006/0188780 A1 | 8/2006 | Fujii et al. | |
| 2006/0263690 A1 | 11/2006 | Suhara et al. | |
| 2006/0275664 A1 | 12/2006 | Ohzuku et al. | |
| 2006/0286459 A1 | 12/2006 | Zhao et al. | |
| 2007/0026315 A1 | 2/2007 | Lampe-Onnerud et al. | |
| 2007/0099086 A1 | 5/2007 | Kang et al. | |
| 2007/0117014 A1 | 5/2007 | Saito et al. | |
| 2007/0122712 A1 | 5/2007 | Kang et al. | |
| 2007/0148546 A1 | 6/2007 | Shimizu et al. | |
| 2007/0160906 A1 | 7/2007 | Tooyama et al. | |
| 2007/0212609 A1 | 9/2007 | Iwami | |
| 2007/0224506 A1 | 9/2007 | Ooyama et al. | |
| 2008/0118829 A1* | 5/2008 | Nanno | H01M 4/525 |
| | | | 252/182.1 |
| 2008/0131780 A1 | 6/2008 | Kawasato et al. | |
| 2008/0166637 A1 | 7/2008 | Inagaki et al. | |

(56) References Cited

U.S. PATENT DOCUMENTS

| | | |
|---|---|---|
| 2008/0241693 A1 | 10/2008 | Fukuchi et al. |
| 2009/0011335 A1 | 1/2009 | Takeda et al. |
| 2009/0017383 A1 | 1/2009 | Suhara et al. |
| 2009/0087362 A1 | 4/2009 | Sun et al. |
| 2009/0087731 A1 | 4/2009 | Fukui et al. |
| 2009/0104532 A1 | 4/2009 | Hosoya |
| 2009/0123813 A1 | 5/2009 | Chiang et al. |
| 2009/0123842 A1 | 5/2009 | Thackeray et al. |
| 2009/0220862 A1 | 9/2009 | Toyama et al. |
| 2010/0019194 A1 | 1/2010 | Fujiwara et al. |
| 2010/0035147 A1 | 2/2010 | Kotato et al. |
| 2010/0086854 A1 | 4/2010 | Kumar et al. |
| 2010/0129714 A1 | 5/2010 | Toyama. et al. |
| 2010/0129715 A1 | 5/2010 | Saito et al. |
| 2010/0143784 A1 | 6/2010 | Johnson et al. |
| 2010/0143799 A1 | 6/2010 | Park |
| 2010/0159330 A1 | 6/2010 | Sugiura et al. |
| 2010/0178464 A1 | 7/2010 | Choi et al. |
| 2010/0216024 A1 | 8/2010 | Kanno et al. |
| 2010/0233542 A1 | 9/2010 | Endo et al. |
| 2010/0247986 A1 | 9/2010 | Toyama et al. |
| 2010/0248033 A1 | 9/2010 | Kumar et al. |
| 2010/0294985 A1 | 11/2010 | Suhara et al. |
| 2011/0020708 A1 | 1/2011 | Fujiki et al. |
| 2011/0033749 A1 | 2/2011 | Uchida et al. |
| 2011/0059367 A1* | 3/2011 | Morita ................ H01M 4/131 429/231.95 |
| 2011/0076564 A1 | 3/2011 | Yu et al. |
| 2011/0171530 A1* | 7/2011 | Esaki ................ H01M 4/505 252/182.1 |
| 2011/0200879 A1 | 8/2011 | Saito et al. |
| 2011/0229757 A1 | 9/2011 | Kawakami et al. |
| 2011/0256437 A1 | 10/2011 | Katsuki et al. |
| 2011/0269023 A1 | 11/2011 | Kawakami et al. |
| 2011/0297876 A1 | 12/2011 | Masukuni et al. |
| 2011/0300441 A1 | 12/2011 | Kawakami |
| 2012/0034516 A1 | 2/2012 | Koo et al. |
| 2012/0045692 A1 | 2/2012 | Takemura et al. |
| 2012/0064406 A1 | 3/2012 | Sato et al. |
| 2012/0064409 A1 | 3/2012 | Zhamu et al. |
| 2012/0088151 A1 | 4/2012 | Yamazaki et al. |
| 2012/0088156 A1 | 4/2012 | Nomoto et al. |
| 2012/0118149 A1 | 5/2012 | Dabrowski et al. |
| 2012/0244430 A1 | 9/2012 | Yamazaki et al. |
| 2012/0256337 A1 | 10/2012 | Yokoyama et al. |
| 2012/0258358 A1 | 10/2012 | Yura et al. |
| 2012/0258365 A1 | 10/2012 | Yokoyama et al. |
| 2012/0258369 A1 | 10/2012 | Yokoyama et al. |
| 2012/0261622 A1 | 10/2012 | Honma |
| 2012/0295163 A1 | 11/2012 | Yanagita et al. |
| 2012/0308891 A1 | 12/2012 | Todoriki et al. |
| 2012/0315544 A1 | 12/2012 | Yasuda et al. |
| 2012/0328951 A1 | 12/2012 | Hirohashi et al. |
| 2012/0328956 A1 | 12/2012 | Oguni et al. |
| 2012/0330044 A1 | 12/2012 | Hou |
| 2013/0017435 A1 | 1/2013 | Sato et al. |
| 2013/0040193 A1 | 2/2013 | Tsuchida et al. |
| 2013/0045418 A1 | 2/2013 | Oguni et al. |
| 2013/0052534 A1 | 2/2013 | Fujiki et al. |
| 2013/0052547 A1 | 2/2013 | Ogino et al. |
| 2013/0065120 A1 | 3/2013 | Miwa et al. |
| 2013/0078516 A1 | 3/2013 | Taniguchi et al. |
| 2013/0084384 A1 | 4/2013 | Yamakaji |
| 2013/0089786 A1 | 4/2013 | Jeong et al. |
| 2013/0130103 A1 | 5/2013 | Kim et al. |
| 2013/0134051 A1 | 5/2013 | Takahashi et al. |
| 2013/0156683 A1 | 6/2013 | Holzapfel et al. |
| 2013/0156942 A1 | 6/2013 | Yamakaji et al. |
| 2013/0157034 A1 | 6/2013 | Choi et al. |
| 2013/0164619 A1 | 6/2013 | Yamakaji et al. |
| 2013/0177806 A1 | 7/2013 | Caldwell et al. |
| 2013/0183579 A1 | 7/2013 | Kim et al. |
| 2013/0189585 A1 | 7/2013 | Kang et al. |
| 2013/0190449 A1 | 7/2013 | Kinloch et al. |
| 2013/0202953 A1 | 8/2013 | Sharma et al. |
| 2013/0212879 A1 | 8/2013 | Ogino |
| 2013/0230770 A1 | 9/2013 | Oya et al. |
| 2013/0266858 A1 | 10/2013 | Inoue et al. |
| 2013/0266859 A1 | 10/2013 | Todoriki et al. |
| 2013/0313471 A1 | 11/2013 | Endo et al. |
| 2013/0316237 A1 | 11/2013 | Miki |
| 2013/0323596 A1 | 12/2013 | Morita et al. |
| 2013/0337320 A1 | 12/2013 | Yukawa |
| 2014/0004412 A1 | 1/2014 | Ogino |
| 2014/0023920 A1 | 1/2014 | Yamazaki et al. |
| 2014/0079995 A1 | 3/2014 | Wakada |
| 2014/0099554 A1 | 4/2014 | Inoue et al. |
| 2014/0127567 A1 | 5/2014 | Kuriki et al. |
| 2014/0127568 A1* | 5/2014 | Kawakami ............ H01M 4/131 252/502 |
| 2014/0131633 A1 | 5/2014 | Ito et al. |
| 2014/0162132 A1 | 6/2014 | Ishii et al. |
| 2014/0166946 A1 | 6/2014 | Miwa et al. |
| 2014/0184172 A1 | 7/2014 | Momo et al. |
| 2014/0212759 A1 | 7/2014 | Blangero et al. |
| 2014/0234700 A1 | 8/2014 | Moriwaka et al. |
| 2014/0242463 A1 | 8/2014 | Song et al. |
| 2014/0295068 A1 | 10/2014 | Nanba et al. |
| 2014/0332715 A1 | 11/2014 | Kawakami et al. |
| 2014/0370184 A1 | 12/2014 | Takemura et al. |
| 2015/0008364 A1 | 1/2015 | Endo |
| 2015/0014581 A1 | 1/2015 | Kawakami et al. |
| 2015/0014605 A1 | 1/2015 | Kawakami et al. |
| 2015/0064565 A1 | 3/2015 | Todoriki et al. |
| 2015/0093648 A1 | 4/2015 | Son et al. |
| 2015/0099178 A1 | 4/2015 | Kawakami et al. |
| 2015/0099179 A1 | 4/2015 | Ikenuma et al. |
| 2015/0123050 A1 | 5/2015 | Yamazaki et al. |
| 2015/0155556 A1 | 6/2015 | Kawakami et al. |
| 2015/0166348 A1 | 6/2015 | Ikenuma et al. |
| 2015/0262762 A1 | 9/2015 | Ikenuma et al. |
| 2015/0325855 A1 | 11/2015 | Kawakami et al. |
| 2015/0333320 A1 | 11/2015 | Tamaki et al. |
| 2015/0333324 A1 | 11/2015 | Umeyama et al. |
| 2015/0357641 A1 | 12/2015 | Sugie et al. |
| 2015/0380737 A1 | 12/2015 | Kawasato et al. |
| 2016/0006032 A1 | 1/2016 | Paulsen et al. |
| 2016/0013478 A1 | 1/2016 | Satow et al. |
| 2016/0028080 A1 | 1/2016 | Sugiura |
| 2016/0064726 A1 | 3/2016 | Ikenuma et al. |
| 2016/0087315 A1 | 3/2016 | Oyama |
| 2016/0104880 A1 | 4/2016 | Gao et al. |
| 2016/0118646 A1 | 4/2016 | Ikenuma |
| 2016/0118658 A1 | 4/2016 | Kawakami et al. |
| 2016/0156030 A1 | 6/2016 | Sun et al. |
| 2016/0156032 A1 | 6/2016 | Lee et al. |
| 2016/0164089 A1 | 6/2016 | Kawakami et al. |
| 2016/0268601 A1 | 9/2016 | Paulsen et al. |
| 2016/0276658 A1 | 9/2016 | Choi et al. |
| 2016/0276659 A1 | 9/2016 | Choi et al. |
| 2016/0285102 A1 | 9/2016 | Shitaba et al. |
| 2016/0329533 A1 | 11/2016 | Tajima |
| 2016/0336595 A1* | 11/2016 | Choi .................. H01M 10/052 |
| 2016/0349905 A1 | 12/2016 | Momma et al. |
| 2016/0380271 A1 | 12/2016 | Ochiai et al. |
| 2017/0005364 A1 | 1/2017 | Yamazaki et al. |
| 2017/0040594 A1 | 2/2017 | Yamaki et al. |
| 2017/0062819 A1 | 3/2017 | Ikenuma |
| 2017/0069907 A1 | 3/2017 | Zhu et al. |
| 2017/0117589 A1 | 4/2017 | Tajima et al. |
| 2017/0187035 A1 | 6/2017 | Yanagihara et al. |
| 2017/0207444 A1 | 7/2017 | Yanagihara et al. |
| 2017/0256817 A1 | 9/2017 | Kadoma et al. |
| 2017/0309910 A1 | 10/2017 | Jo et al. |
| 2017/0309946 A1* | 10/2017 | Honda ............ H01M 10/0404 |
| 2018/0013130 A1* | 1/2018 | Ochiai ............ H01M 4/13915 |
| 2018/0019462 A1 | 1/2018 | Kadoma et al. |
| 2018/0034045 A1 | 2/2018 | Xia et al. |
| 2018/0040888 A1 | 2/2018 | Park et al. |
| 2018/0040897 A1 | 2/2018 | Park et al. |
| 2018/0076489 A1 | 3/2018 | Mikami et al. |
| 2018/0102536 A1 | 4/2018 | Kawakami et al. |
| 2018/0108944 A1 | 4/2018 | Yamakaji |
| 2018/0145317 A1* | 5/2018 | Momma ................ H01M 4/62 |

(56) References Cited

U.S. PATENT DOCUMENTS

| | | | |
|---|---|---|---|
| 2018/0145368 | A1 | 5/2018 | Ochiai et al. |
| 2018/0190976 | A1 | 7/2018 | Blangero et al. |
| 2018/0254477 | A1 | 9/2018 | Horikawa et al. |
| 2018/0366729 | A1 | 12/2018 | Yanagita et al. |
| 2019/0245199 | A1 | 8/2019 | Zeng et al. |
| 2020/0144601 | A1 | 5/2020 | Takahashi et al. |
| 2020/0152961 | A1 | 5/2020 | Momma et al. |
| 2020/0176770 | A1 | 6/2020 | Takahashi et al. |
| 2020/0220173 | A1 | 7/2020 | Jo et al. |
| 2020/0313177 | A1 | 10/2020 | Momma et al. |
| 2020/0313178 | A1 | 10/2020 | Momma et al. |
| 2020/0313228 | A1 | 10/2020 | Ochiai et al. |
| 2020/0328413 | A1 | 10/2020 | Momma et al. |
| 2020/0358091 | A1 | 11/2020 | Momma et al. |
| 2020/0373567 | A1 | 11/2020 | Momma et al. |
| 2020/0373568 | A1 | 11/2020 | Momma et al. |
| 2020/0373569 | A1 | 11/2020 | Momma et al. |
| 2021/0083281 | A1 | 3/2021 | Mikami et al. |
| 2021/0313571 | A1 | 10/2021 | Momma et al. |
| 2022/0131146 | A1 | 4/2022 | Saito et al. |
| 2022/0199984 | A1 | 6/2022 | Momma et al. |
| 2022/0199989 | A1 | 6/2022 | Momma et al. |
| 2022/0359870 | A1 | 11/2022 | Mikami et al. |
| 2023/0307622 | A1 | 9/2023 | Momma et al. |
| 2023/0327095 | A1 | 10/2023 | Momma et al. |
| 2025/0105282 | A1 | 3/2025 | Liu et al. |

FOREIGN PATENT DOCUMENTS

| | | | |
|---|---|---|---|
| CN | 102024950 | A | 4/2011 |
| CN | 102122714 | A | 7/2011 |
| CN | 105655554 | A | 6/2016 |
| CN | 108075114 | A | 5/2018 |
| CN | 108075144 | A * | 5/2018 |
| CN | 108110225 | A | 6/2018 |
| CN | 113140726 | A | 7/2021 |
| EP | 1317008 | A | 6/2006 |
| JP | 2000-203842 | A | 7/2000 |
| JP | 2001-148244 | A | 5/2001 |
| JP | 2002-216760 | A | 8/2002 |
| JP | 2003-229129 | A | 8/2003 |
| JP | 2006-261132 | A | 9/2006 |
| JP | 2007-018985 | A | 1/2007 |
| JP | 2010-080407 | A | 4/2010 |
| JP | 2011-028976 | A | 2/2011 |
| JP | 2011-082133 | A | 4/2011 |
| JP | 2014-132527 | A | 7/2014 |
| JP | 20141325 | * | 7/2014 |
| JP | 2015-099722 | A | 5/2015 |
| JP | 2015-144108 | A | 8/2015 |
| JP | 2015144108 | * | 8/2015 |
| JP | 2018-088407 | A | 6/2018 |
| KR | 2011-0010568 | A | 2/2011 |
| KR | 2011-0027617 | A | 3/2011 |
| KR | 2018-0058628 | A | 6/2018 |
| WO | WO 2012066926 | * | 8/2015 |

OTHER PUBLICATIONS

Decision of KIPO to grant a Patent (Year: 2025).*
Decision to grant a Patent published by JPO for Application No. JP 2023203859 (Year: 2025).*
International Search Report (Application No. PCT/IB2019/054839) dated Sep. 10, 2019.
Written Opinion (Application No. PCT/IB2019/054839) dated Sep. 10, 2019.
Chen.Z et al., "Staging Phase Transitions in LixCoO2", J. Electrochem. Soc. (Journal of the Electrochemical Society), 2002, vol. 149, No. 12, pp. A1604-A1609.
Okumura. T et al., "Correlation of lithium ion distribution and X-ray absorption near-edge structure in O3- and O2-lithium cobalt oxides from first-principle calculation", Journal of Materials Chemistry, 2012, vol. 22, pp. 17340-17348.
Motohashi.T et al., "Electronic phase diagram of the layered cobalt oxide system LixCoO2 ($0.0 \leq x \leq 1.0$)", Phys. Rev. B (Physical Review. B), Oct. 9, 2009, vol. 80, No. 16, pp. 165114-1-155114-9.
Counts.W et al., "Fluoride Model Systems: II, The Binary Systems CaF2—BeF2, MgF2—BeF2, and LiF—MgF2", J. Am. Ceram. Soc. (Journal of the American Ceramic Society), 1953, vol. 36, No. 1, pp. 12-17.
Shim.J et al., "Characterization of Spinel LixCo2O4-Coated LiCoO2 Prepared with Post-Thermal Treatment as a Cathode Material for Lithium Ion Batteries", Chem. Mater. (Chemistry of Materials), Apr. 10, 2015, vol. 27, No. 9, pp. 3273-3279.
Liu.A et al., "Synthesis of Mg and Mn Doped LiCoO2 and Effects on High Voltage Cycling", J. Electrochem. SOC. (Journal of the Electrochemical Society), Jun. 2, 2017, vol. 164, No. 7, pp. A1655-A1664.
Belsky.A et al., "New developments in the Inorganic Crystal Structure Database (ICSD): Accessibility in support of materials research and design.", ACTA. Cryst.(ACTA Crystallographica Section B), Jun. 1, 2002, vol. B58, No. 3, pp. 364-369.
Sun.Y et al., "High-energy cathode material for long-life and safe lithium batteries", Nature Materials, Mar. 22, 2009, vol. 8, pp. 320-324.
Hong.W et al., "Modification of LiCoO2 by Surface Coating with MgO/TiO2/SiO2 for High-Performance Lithium-Ion Battery", Electrochemical and Solid-State Letters, Dec. 20, 2005, vol. 9, No. 2, pp. A82-A85.
Park.S et al., "Novel Surface Modification Technique to Improve Electrochemical Performance of LiCoO2 at High Voltage", Electrochemical and Solid-State Letters, Apr. 21, 2005, vol. 8, No. 6, pp. A299- A302.
Jo.C et al., "An effective method to reduce residual lithium compounds on Ni-rich Li[Ni0.6Co0.2Mn0.2]O2 active material using a phosphoric acid derived Li3PO4 nanolayer", Nano Research, Dec. 4, 2014, vol. 8, No. 5, pp. 1464-1479, Springer.
Tebbe.J et al., "Mechanisms of LiCoO2 Cathode Degradation by Reaction with HF and Protection by Thin Oxide Coatings", ACS Applied Materials & Interfaces, Oct. 12, 2015, vol. 7, No. 43, pp. 24265-24278.
Bensalah.N et al., "Review on Synthesis, Characterizations, and Electrochemical Properties of Cathode Materials for Lithium Ion Batteries", Journal of Material Science & Engineering, 2016, vol. 5, No. 4, pp. 1000258-1-1000258-21.
Lu.Y et al., "Recent progress on lithium-ion batteries with high electrochemical performance", Science China Chemistry, Feb. 25, 2019, vol. 62, No. 5, pp. 533-548.
Yano.A et al., "LiCoO2 Degradation Behavior in the High-Voltage Phase Transition Region and Improved Reversibility with Surface Coating", J. Electrochem. SOC. (Journal of the Electrochemical Society), 2017, vol. 164, No. 1, pp. A6116-A6122.
Ceder.G et al., "Identification of cathode materials for lithium batteries guided by first-principles calculations", Nature, Apr. 16, 1998, vol. 392, pp. 694-696.
Gopukumar.S et al., "Synthesis and electrochemical performance of tetravalent doped LiCoO2 in lithium rechargeable cells", Solid State Ionics, Mar. 28, 2003, vol. 159, No. 3-4, pp. 223-232, Elsevier.
Min.J et al., "Simple, robust metal fluoride coating on layered Li1.23Ni0.13Co0.14Mn0.56O2 and its effects on enhanced electrochemical properties", Electrochemica ACTA, Jun. 30, 2013, vol. 100, pp. 10-17.
Mladenov.M et al., "Effect of Mg doping and MgO-surface modification on the cycling stability of LiCoO2 electrodes.", Electrochemistry Communications, Aug. 1, 2001, vol. 3, No. 8, pp. 410-416.
Koyama. Y et al., "Co K-edge XANES of LiCoO2 and CoO2 with a variety of structures by supercell density functional calculations with a core hole", Phys. Rev. B (Physical Review. B), Feb. 27, 2012, vol. 85, No. 7, pp. 075129-1-075129-7.
Quinlan.R et al., "XPS Investigation of the Electrolyte Induced Stabilization of LiCoO2 and "AlPO4"-Coated LiCoO2 Composite Electrodes", J. Electrochem. Soc. (Journal of the Electrochemical Society), Dec. 3, 2015, vol. 163, No. 2, pp. A300-A308.

(56) References Cited

OTHER PUBLICATIONS

Xiao.B, "Surface Modifification of Electrode Materials for Lithium-Ion Batteries", Graduate Program in Mechanical and Materials Engineering, 2006, pp. 1-235.

Ohnishi.M et al., "Investigation of the surface degradation of LiCoO2 particles in the cathode materials of Li-ion batteries using FIB-TOF-SIMS", Journal of Surface Analysis, 2013, vol. 20, No. 2, pp. 99-110.

Iwaya.K et al., "Impact of Lithium-Ion Ordering on Surface Electronic States of LixCoO2", Phys. Rev. Lett. (Physical Review Letters), Sep. 20, 2013, vol. 111, No. 12, pp. 126104-1-126104-5.

Zou.M et al., "Synthesis of High-Voltage (4.5 V) Cycling Doped LiCoO2 for Use in Lithium Rechargeable Cells", Chem. Mater. (Chemistry of Materials), Dec. 16, 2003, vol. 15, No. 25, pp. 4699-4702.

Schipper.F et al., "Study of Cathode Materials for Lithium-Ion Batteries: Recent Progress and New Challenges", Inorganics, Apr. 28, 2017, vol. 5, No. 2, pp. 1-29.

Thackeray.M et al., "Li2MnO3-stabilized LiMO2(M = Mn, Ni, Co) electrodes for lithium-ion batteries", J. Mater. Chem. (Journal of Materials Chemistry), 2007, vol. 17, pp. 3112-3125.

Lee.S et al., "Antiferromagnetic ordering in Li2MnO3 single crystals with a two-dimensional honeycomb lattice", Journal of Physics: Condensed Matter, Nov. 14, 2012, vol. 24, No. 45, pp. 456004-1-456004- 9.

Dreyer.D et al., "The Chemistry of Graphene Oxide", Chemical Society Reviews, Nov. 3, 2009, vol. 39, No. 1, pp. 228-240.

Johnson.C et al., "Lithium-manganese oxide electrodes with layered-spinel composite structures xLi2Mn03 • (1-x)Li1+yMn2—yO4($0<x<1, 0 \leqq y \leqq 0.33$) for lithium batteries", Electrochemistry Communications, May 1, 2005, vol. 7, No. 5, pp. 528-536, Elsevier.

Katsuno.H et al., "Growth modes in two-dimensional heteroepitaxy on an elasticsubstrate", J. Cryst. Growth (Journal of Crystal Growth), Feb. 15, 2005, vol. 275, No. 1-2, pp. e283-e288, Elsevier.

McCalla.E et al., "The spinel and cubic rocksalt solid-solutions in the Li—Mn—Ni oxide pseudo-ternary system", Solid State Ionics, May 2, 2013, vol. 242, pp. 1-9, Elsevier.

Mukai.K et al., "Magnetic properties of the chemically delithiated LixMn2O4 with $0.07 \leqq x \leqq 1$", Journal of Solid State Chemistry, May 1, 2011, vol. 184, No. 5, pp. 1096-1104.

Wang.Z et al., "EELS analysis of cation valence states and oxygen vacancies in magnetic oxides", Micron, Oct. 1, 2000, vol. 31, No. 5, pp. 571-580, Elsevier.

Tan.H et al., "Oxidation state and chemical shift investigation in transition metal oxides by EELS", Ultramicroscopy, May 1, 2012, vol. 116, pp. 24-33, Elsevier.

Berbenni.V et al., "Thermogravimetry and X-Ray Diffraction Study of the Thermal Decomposition Processes in LI2CO3—MNCO3 Mixtures", Journal of Analytical and Applied Pyrolysis, 2002, vol. 62, pp. 45-62.

Taguchi.N et al., "Characterization of MgO-coated-LiCoO2 particles by analytical transmission electron microscopy", Journal of Power Sources, 2016, vol. 328, pp. 161-166, Elsevier.

Khedr.A et al., "Synthesis, Structure, and Electrochemistry of Sm-Modified LiMn2O4 Cathode Materials for Lithium-Ion Batteries", J. Electron. Mater.(Journal of Electronic Materials), Apr. 23, 2013, vol. 42, No. 6, pp. 1275-1281.

Joshi.T et al., "Effects of Dissolved Transition Metals on the Electrochemical Performance and SEI Growth in Lithium-Ion Batteries", J. Electrochem. SOC. (Journal of the Electrochemical Society), 2014, vol. 161, No. 12, pp. A1915-A1921.

Gabrisch.H et al., "Hexagonal to Cubic Spinel Transformation in Lithiated Cobalt Oxide TEM Investigation", J. Electrochem. Soc. (Journal of the Electrochemical Society), 2004, vol. 151, No. 6, pp. A891- A897.

Yamamoto.K et al., "Stabilization of the Electronic Structure at the Cathode/Electrolyte Interface via MgO Ultra-thin Layer during Lithium-ions Insertion/Extraction", Electrochemistry, Oct. 5, 2014, vol. 82, No. 10, pp. 891-896.

Yamamoto.K et al., "in situ Total-Reflection Fluorescence X-Ray Absorption Spectroscopic Study on Stability at LiFePO4 / Electrolyte Interface", 224th ECS Meeting Abstract, Oct. 27, 2013, p. 923.

Wang.Z et al., "Electrochemical Evaluation and Structural Characterization of Commercial LiCoO2 Surfaces Modified with MgO for Lithium-Ion Batteries", J. Electrochem. Soc. (Journal of the Electrochemical Society), Mar. 4, 2002, vol. 149, No. 4, pp. A466-A471.

Lee. Y et al., "Phase Transition of Bare and Coated LixCoO2 (x = 0.4 and 0.24) at 300°", J. Electrochem. Soc. (Journal of the Electrochemical Society), Jul. 28, 2005, vol. 152, No. 9, pp. A1824-A1827.

Geder.J et al., "Impact of active material surface area on thermal stability of LiCoO2 cathode", Journal of Power Sources, Jul. 1, 2014, vol. 257, pp. 286-292, Elsevier.

Chung.K et al., "Structural Studies on the Effects of ZrO2 Coating on LiCoO2 during Cycling Using In Situ X-Ray Diffraction Technique", J. Electrochem. Soc. (Journal of the Electrochemical Society), 2006, vol. 153, No. 11, pp. A2152-A2157.

Liu.L et al., "Electrochemical and In Situ Synchrotron XRD Studies on Al2O3-Coated LiCoO2 Cathode Material", J. Electrochem. Soc. (Journal of the Electrochemical Society), 2004, vol. 151, No. 9, pp. A1344-A1351.

Benecke.M et al., "Effect of LiF on Hot-Pressing of MgO", J. Am. Ceram. Soc. (Journal of the American Ceramic Society), Jul. 1, 1967, vol. 50, No. 7, pp. 365-368.

Hart.P et al., "Densification Mechanisms in Hot-Pressing of Magnesia with a Fugitive Liquid", J. Am. Ceram. Soc. (Journal of the American Ceramic Society), Feb. 1, 1970, vol. 53, No. 2, pp. 83-86.

Tukamoto.H et al., "Electronic Conductivity of LiCoO2 and Its Enhancement by Magnesium Doping", J. Electrochem. Soc. (Journal of the Electrochemical Society), Sep. 1, 1997, vol. 144, No. 9, pp. 3164-3168.

Ohzuku. T et al., "Solid-State Redox Reactions of LiCoO2 (R-3m) for 4 Volt Secondary Lithium Cells", J. Electrochem. Soc. (Journal of the Electrochemical Society), Nov. 1, 1994, vol. 141, No. 11, pp. 2972-2977.

Amatucci.G et al., "CoO2, The End Member of the LixCoO2 Solid Solution", J. Electrochem. Soc. (Journal of the Electrochemical Society), Mar. 1, 1996, vol. 143, No. 3, pp. 1114-1123.

Wang.Z et al., "Structural and electrochemical characterizations of surface-modified LiCoO2 cathode materials for Li-ion batteries", Solid State Ionics, Jun. 2, 2002, vol. 148, No. 3-4, pp. 335-342, Elsevier.

Zou.M et al., "Synthesis and Electrochemical Performance of High Voltage Cycling LiM0.05Co0.95O2 as Cathode Material for Lithium Rechargeable Cells", Electrochemical and Solid-State Letters, 2004, vol. 7, No. 7, pp. A176-A179.

Wang.Z et al., "Improving the cycling stability of LiCoO2 at 4.5 V through co-modification by Mg doping and zirconium oxyfluoride coating", Ceramics Internationa, 2015, vol. 41, No. 1, pp. 469-474.

Cho. Y et al., "High Performance LiCoO2 Cathode Materials at 60° for Lithium Secondary Batteries Prepared by the Facile Nanoscale Dry-Coating Method", J. Electrochem. Soc. (Journal of the Electrochemical Society), 2010, vol. 157, No. 5, pp. A617-A624.

Wang.Z et al., "Mg doping and zirconium oxyfluoride coating co-modification to enhance the high-voltage performance of LiCoO2 for lithium ion battery", Journal of Alloys and Compounds, Feb. 5, 2015, vol. 621, pp. 212-219.

Kweon.H et al., "Effects of metal oxide coatings on the thermal stability and electrical performance of LiCoCO2 in a Li-ion cell", Journal of Power Sources, Feb. 16, 2004, vol. 126, pp. 156-162, Elsevier.

Shim.J et al., "Effects of MgO Coating on the Structural and Electrochemical Characteristics of LiCoO2 as Cathode Materials for Lithium Ion Battery", Chem. Mater. (Chemistry of Materials), Mar. 24, 2014, vol. 26, No. 8, pp. 2537-2543.

Zhao.H et al., "Improvement of electrochemical stability of LiCoO2 cathode by a nano-crystalline coating", Journal of Power Sources, May 20, 2004, vol. 132, pp. 195-200, Elsevier.

Iriyama. Y et al., "Effects of surface modification by MgO on interfacial reactions of lithium cobalt oxide thin film electrode", Journal of Power Sources, Oct. 5, 2004, vol. 137, pp. 111-116, Elsevier.

(56) References Cited

OTHER PUBLICATIONS

Shim.J et al., "Effects of MgO Coating on the Structural and Electrochemical Characteristics of LiCoO2 as Cathode Materials for Lithium Ion Battery", Chem. Mater. (Chemistry of Materials), [e.g. ), Suppor] Supporting Information, Mar. 24, 2014, vol. 26, No. 8, pp. 31-33.

Orikasa.Y et al., "Origin of Surface Coating Effect for MgO on LiCoO2 to Improve the Interfacial Reaction between Electrode and Electrolyte", Adv. Mater.Interfaces (Advanced Materials Interfaces), Aug. 28, 2014, vol. 1, No. 9, pp. 1400195-1-1400195-8.

Shim.J et al., "Synergistic effects of coating and doping for lithium ion battery cathode materials: synthesis and characterization of lithium titanate-coated LiCoO2 with Mg doping", Electrochimica Acta, Dec. 20, 2015, vol. 186, pp. 201-208, Elesevier.

Cho.J et al., "Comparison of Al2O3- and AlPO4-coated LiCoO2 cathode materials for a Li-ion cell", Journal of Power Sources, 2005, vol. 146, pp. 58-64, Elsevier.

Jin. Y et al., "Electrochemical Characterizations of Commercial LiCoO2 Powders with Surface Modified by Li3PO4 Nanoparticles", Electrochemical and Solid-State Letters, Apr. 3, 2006, vol. 9, No. 6, pp. A273-A276.

Alcantara.R et al., "SPES, 6Li MAS NMR, and Ni3+ EPR evidence for the formation of Co2+-containing spinel phases in LiCoO2 cycled electrode materials", Journal of Electroanalytical Chemistry, Aug. 28, 1998, vol. 454, No. 1-2, pp. 173-181.

Shi.S et al., "Enhanced cycling stability of Li[Li 0.2Mn0.54Ni0.13Co0.13]O2 by surface modification of MgO with melting impregnation method", Electrochimica Acta, Nov. 1, 2012, vol. 88, pp. 671-679.

Antaya.M et al., "Preparation and Characterization of LiCoO2 Thin Films by Laser Ablation Deposition", J. Electrochem. Soc. (Journal of the Electrochemical Society), Mar. 1, 1993, vol. 140, No. 3, pp. 575-578.

Eom.J et al., "M3(PO4)2-Nanoparticle-Coated LiCoO2 vs LiCo0.96M0.0402(M = Mg and Zn) on Electrochemical and Storage Characteristics", J. Electrochem. Soc. (Journal of the Electrochemical Society), Jan. 8, 2008, vol. 155, No. 3, pp. A201-A205.

Kim. Y et al., "Suppression of Cobalt Dissolution from the LiCoO2 Cathodes with Various Metal-Oxide Coatings", J. Electrochem. Soc. (Journal of the Electrochemical Society), 2003, vol. 150, No. 12, pp. A1723-A1725.

Fang.T et al., "Effect of calcination temperature on the electrochemical behavior of ZnO-coated LiCoO2 cathode", Surface & Coatings Technology , Apr. 19, 2006, vol. 201, No. 3-4, pp. 1886-1893, Elsevier.

Ding. Y et al., "Preparation of nano-structured LiFePO4/graphene composites by co-precipitation method", Electrochemistry Communications, 2010, vol. 12, No. 1, pp. 10-13, Elsevier.

Xia.H et al., "Phase Transitions and High-Voltage Electrochemical Behavior of LiCoO2 Thin Films Grown by Pulsed Laser Deposition", J. Electrochem. Soc. (Journal of the Electrochemical Society), Feb. 20, 2007, vol. 154, No. 4, pp. A337-A342.

Sun. Y et al., "Role of AlF3 Coating on LiCoO2 Particles during Cycling to Cutoff Voltage above 4.5 V", J. Electrochem. Soc. (Journal of the Electrochemical Society), Oct. 9, 2009, vol. 156, No. 12, pp. A1005-A1010.

Araki.K et al., "Electrochemical properties of LiNi1/3Co1/3Mn1/3O2 cathode material modified by coating with Al2O3 nanoparticles", Journal of Power Sources, Jun. 25, 2014, vol. 269, pp. 236-243.

Kim.H et al., "Capacity fading behavior of Ni-rich layered cathode materials in Li-ion full cells", Journal of Electroanalytical Chemistry, Oct. 18, 2016, vol. 782, pp. 168-173.

Lin.F et al., "Surface reconstruction and chemical evolution of stoichiometric layered cathode materials for lithium-ion batteries", Nature Communications, Mar. 27, 2014, vol. 5, pp. 3529-1-3529-9.

Yano.A et al., "Surface Structure and High-Voltage Charge/Discharge Characteristics of Al-Oxide Coated LiNi1/3Co1/3Mn1/3O2 Cathodes", J. Electrochem. Soc. (Journal of the Electrochemical Society), Jan. 17, 2015, vol. 162, No. 2, pp. A3137-A3144.

Yano.A et al., "Surface Structure and High-Voltage Charging/Discharging Performance of Low-Content Zr-Oxide-Coated LiNi1/3Co1/3Mn1/3O2", J. Electrochem. Soc. (Journal of the Electrochemical Society), Nov. 5, 2015, vol. 163, No. 2, pp. A75-A82.

Antolini.E, "LiCoO2: formation, structure, lithium and oxygen nonstoichiometry, electrochemical behaviour and transport properties", Solid State Ionics, 2004, vol. 170, No. 3-4, pp. 159-171.

Min.K et al., "Intrinsic origin of intra-granular crackling in Ni-rich layered oxide materials", Phys. Chem. Chem. Phys. (Physical Chemistry Chemical Physics), Dec. 14, 2017, vol. 20, No. 14, pp. 9045-9052.

Chinese Office Action (Application No. 201980040634.0) Dated Dec. 29, 2023.

Zhang.J et al., "Trace dpoping of multiple elements enables stable battery cycling of LiCoO2 at 4.6 V", Nature Energy, Jun. 17, 2019, vol. 4, pp. 594-603.

Hirooka.M et al., "Improvement of float charge duralbility for LiCoO2 electrodes under high voltage and storage temperature by suppressing O1-Phase transition", Journal of Pwer Sources, Jul. 1, 2020, vol. 463, pp. 228127-1-228127-8, Elsevier.

Wang.L et al., "A Novel Bifunctional Self-Stabilized Strategy Enabling 4.6 V LiCoO2 with Excellent Long-Term Cyclability and High-Rate Capability", ADV. SCI. (Advanced Science), Apr. 24, 2019, vol. 6, No. 12, pp. 1900355-1-1900355-11.

Qian.J et al., "Electrochemical surface passivation of LiCoO2 particles at ultrahigh voltage and its applications in lithium-based batteries", Nature Communications, Nov. 21, 2018, vol. 9, pp. 4918-1-4918-11.

Yin.R et al. "In Situ XRD Investigation and Thermal Properties of Mg Doped LiCoO2 for Lithium Ion Batteries", J. Electrochem. SOC. (Journal Of The Electrochemical Society), Jan. 3, 2012, vol. 159, No. 3, pp. A253-A258.

Shao-horn.Y et al., "Probing Lithium and Vacancy Ordering in O3 Layered Lix CoO2 (x = 0.5) : An Electron Diffraction Study", J. Electrochemical Society, Feb. 6, 2003, vol. 150, No. 3, pp. A366-A373.

Kalluri.S et al., "Surface Engineering Stratgies of Layered LiCoO2 Cathode Material to Realize High-Energy and High-Voltage Li-Ion Cells", Advanced Energy Materials, Oct. 12, 2016, vol. 7, No. 1, pp. 1601507-1-1601507.21.

\* cited by examiner

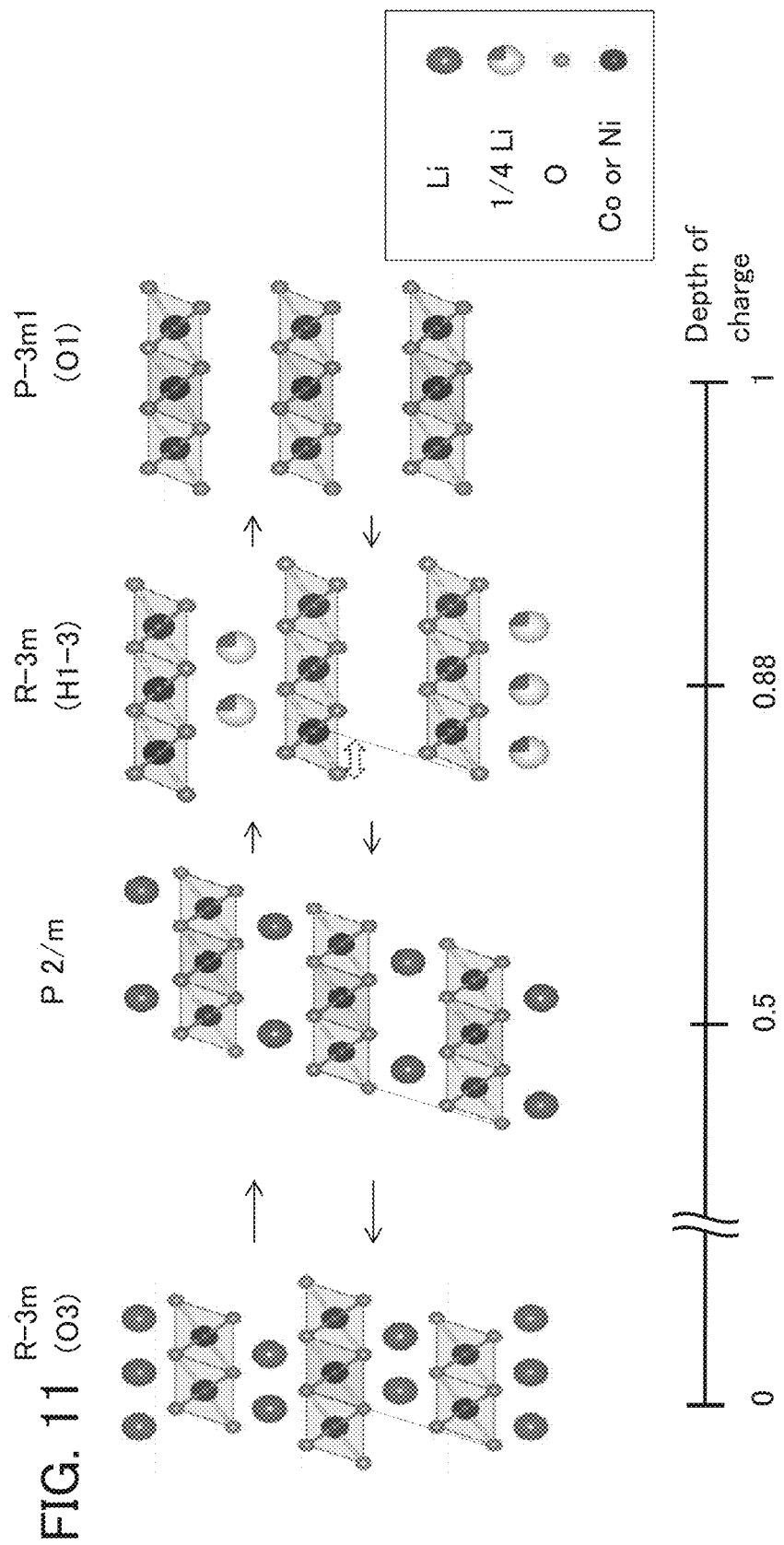

FIG. 22A1
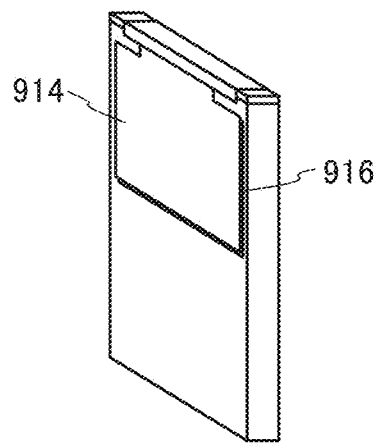
FIG. 22A2
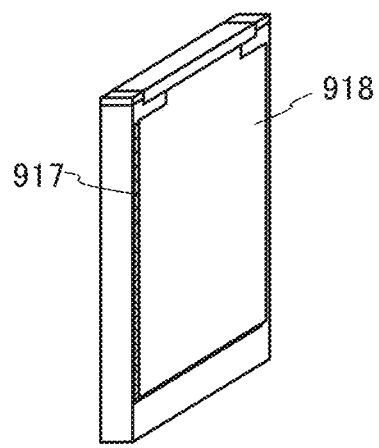
FIG. 22B1
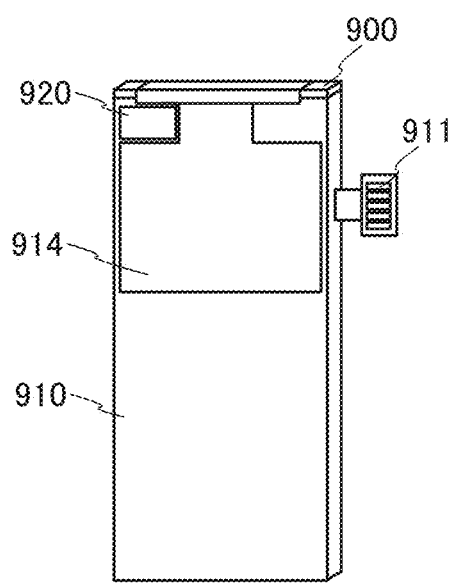
FIG. 22B2
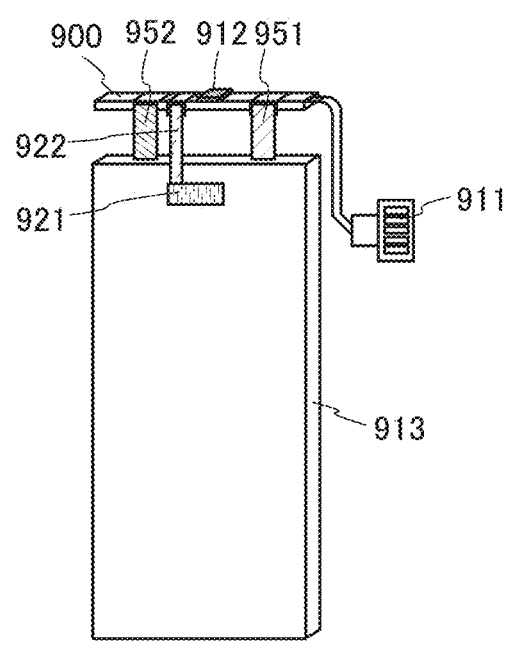

FIG. 30A
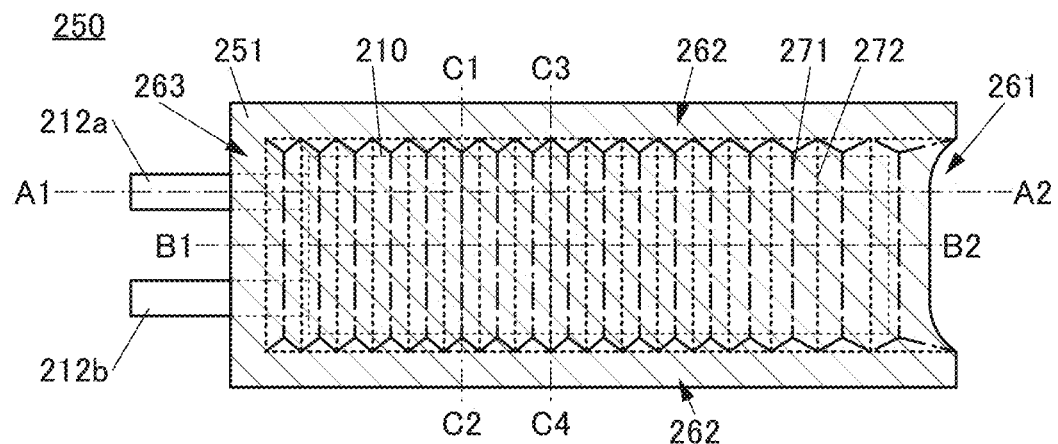
FIG. 30B1
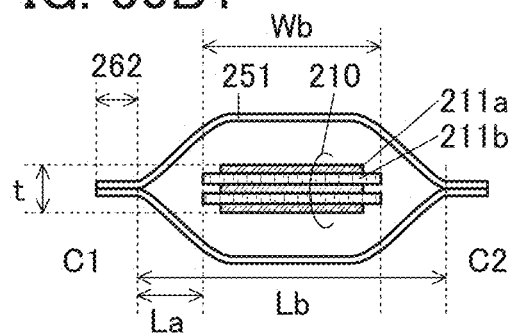
FIG. 30B2
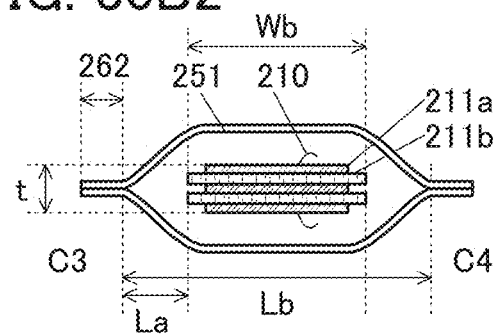
FIG. 30C
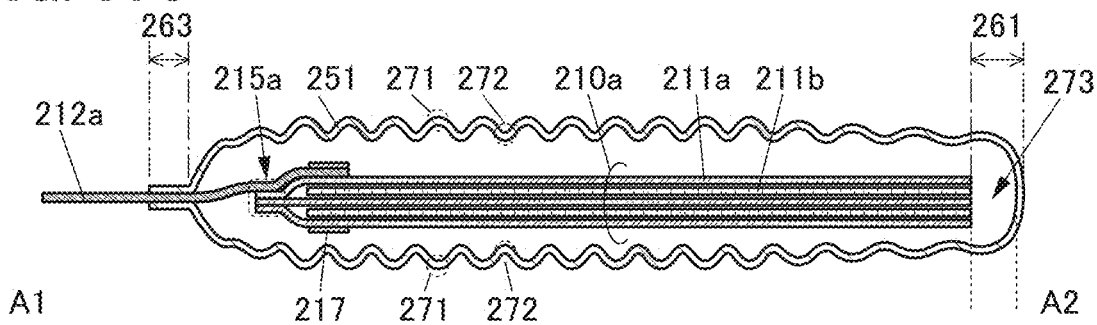
FIG. 30D
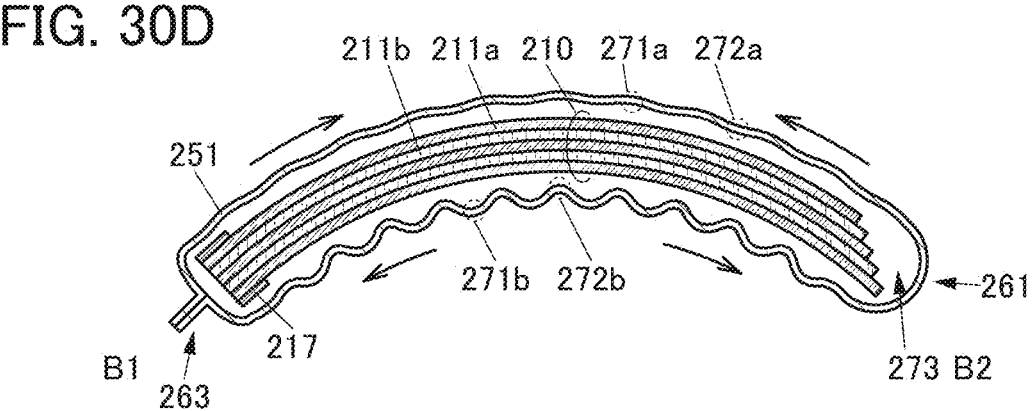

Theoretical values
Li3PO4
(JCPDS 04-006-8566)
① 1 0 -1  d=0.383nm
② 1 -2 0  d=0.397nm
③ 0 -2 1  d=0.358nm
∠①O②  66°
∠①O③  125°
∠②O③  59°
Incident direction  [212]
of electron beam Measured values ① d=3.88nm
② d=3.79nm
③ d=3.46nm
∠①O②  68°
∠①O③ 122°
∠②O③  55°

POSITIVE ELECTRODE ACTIVE MATERIAL, POSITIVE ELECTRODE, SECONDARY BATTERY, AND METHOD FOR MANUFACTURING POSITIVE ELECTRODE

CROSS REFERENCE TO RELATED APPLICATIONS

This application is a U.S. National Phase Application under 35 U.S.C. § 371 of International Application PCT/IB2019/054839, filed on Jun. 11, 2019, which is incorporated by reference and claims the benefit of foreign priority applications filed in Japan on Jun. 22, 2018, as Application No. 2018-118810 and on Oct. 17, 2018, as Application No. 2018-196009.

TECHNICAL FIELD

One embodiment of the present invention relates to an object, a method, or a manufacturing method. Alternatively, the present invention relates to a process, a machine, manufacture, or a composition (a composition of matter). One embodiment of the present invention relates to a semiconductor device, a display device, a light-emitting device, a power storage device, a lighting device, an electronic device, or a manufacturing method thereof. In particular, one embodiment of the present invention relates to a positive electrode active material that can be used for a secondary battery, a secondary battery, and an electronic device including a secondary battery.

Note that in this specification, a power storage device refers to every element and device having a function of storing power. Examples thereof include a storage battery (also referred to as a secondary battery) such as a lithium-ion secondary battery, a lithium-ion capacitor, and an electric double layer capacitor.

In addition, electronic devices in this specification mean all devices including power storage devices, and electro-optical devices including power storage devices, information terminal devices including power storage devices, and the like are all electronic devices.

BACKGROUND ART

In recent years, a variety of power storage devices such as lithium-ion secondary batteries, lithium-ion capacitors, and air batteries have been actively developed. In particular, a demand for lithium-ion secondary batteries with high output and high energy density has rapidly grown with the development of the semiconductor industry, for portable information terminals such as mobile phones, smartphones, tablets, and laptop computers; portable music players; digital cameras; medical equipment; next-generation clean energy vehicles (hybrid electric vehicles (HEV), electric vehicles (EV), plug-in hybrid electric vehicles (PHEV), and the like); and the like. The lithium-ion secondary batteries are essential as rechargeable energy supply sources for today's information society.

The performance required for lithium-ion secondary batteries includes much higher energy density, improved cycle performance, safety under a variety of environments, improved long-term reliability, and the like.

Thus, improvement of a positive electrode active material has been studied to improve the cycle performance and increase the capacity of lithium-ion secondary batteries (Patent Document 1 and Patent Document 2). The active material particles have various forms, and Patent Document 3 discloses a particle including a crack.

REFERENCES

Patent Documents

[Patent Document 1] Japanese Published Patent Application No. 2002-216760
[Patent Document 2] Japanese Published Patent Application No. 2006-261132
[Patent Document 3] Japanese Published Patent Application No. 2007-18985

SUMMARY OF THE INVENTION

Problems to be Solved by the Invention

An object of one embodiment of the present invention is to provide a positive electrode active material that has high capacity and excellent charge and discharge cycle performance for a lithium-ion secondary battery, and a formation method thereof. Alternatively, an object is to provide a formation method of a positive electrode active material with high productivity. Alternatively, an object of one embodiment of the present invention is to provide a positive electrode active material that inhibits a decrease in capacity in charge and discharge cycles when used for a lithium-ion secondary battery. Alternatively, an object of one embodiment of the present invention is to provide a high-capacity secondary battery. Alternatively, an object of one embodiment of the present invention is to provide a secondary battery with excellent charge and discharge characteristics. Alternatively, an object is to provide a positive electrode active material in which dissolution of a transition metal such as cobalt is inhibited even when a state of being charged with high voltage is held for a long time. Alternatively, an object of one embodiment of the present invention is to provide a highly safe or reliable secondary battery.

Alternatively, an object of one embodiment of the present invention is to provide a novel substance, a novel active material particle, a novel power storage device, or a manufacturing method thereof.

Note that the description of these objects does not preclude the existence of other objects. One embodiment of the present invention does not have to achieve all these objects. Note that other objects can be derived from the description of the specification, the drawings, and the claims.

Means for Solving the Problems (1) One embodiment of the present invention is a positive electrode active material containing a first substance including a first crack and a second substance positioned inside the first crack. The first substance contains one or more of cobalt, manganese, and nickel, lithium, oxygen, magnesium, and fluorine. The second substance contains phosphorus and oxygen.

(2) In the above structure (1), it is preferable that the concentration of phosphorus in the second substance be higher than that in the first substance, and the sum of the concentrations of cobalt, manganese, and nickel in the second substance be smaller than that in the first substance.

(3) In the structure (1) or (2), the first substance preferably has a layered rock-salt crystal structure.

(4) In any one of the structures (1) to (3), it is preferable that the first substance be particulate and the concentration of magnesium in a surface portion of the first substance be higher than that in an inner portion thereof.

(5) One embodiment of the present invention is a positive electrode including a current collector and a positive electrode active material layer. The positive electrode active material layer includes a first positive electrode active material and a second positive electrode active material. One or more of the first positive electrode active material and the second positive electrode active material include a first substance including a crack and a second substance positioned inside the crack. The positive electrode contains a third substance positioned between the current collector and the first positive electrode active material. The third substance contains two or more of elements contained in the second substance.

(6) In the structure (5), it is preferable that the first substance contain one or more of cobalt, manganese, and nickel, lithium, oxygen, magnesium, and fluorine and the second substance contain phosphorus and oxygen.

(7) Alternatively, one embodiment of the present invention is a secondary battery including the positive electrode described in any of the above structures.

(8) Alternatively, one embodiment of the present invention is a method for manufacturing a positive electrode, including the first step of mixing a first material containing one or more of cobalt, manganese, and nickel, a second material containing magnesium, and a third material containing fluorine to form a first mixture; the second step of heating the first mixture; the third step of mixing the first mixture heated in the second step and a fourth material containing phosphorus to form a second mixture; and the fourth step of heating the second mixture. The first material has a layered rock-salt crystal structure. The fourth material contains a phosphate compound.

(9) In the structure (8), the number of phosphorus atoms contained in the fourth material is Mp, the sum of the numbers of cobalt atoms, manganese atoms, and nickel atoms contained in the first material is Mm, and Mp is preferably greater than or equal to 0.01 times and less than or equal to 0.12 times Mm.

Effect of the Invention

According to one embodiment of the present invention, a positive electrode active material that has high capacity and excellent charge and discharge cycle performance for a lithium-ion secondary battery, and a formation method thereof can be provided. In addition, a formation method of a positive electrode active material with high productivity can be provided. In addition, a positive electrode active material that inhibits a decrease in capacity in charge and discharge cycles when used in a lithium-ion secondary battery can be provided. In addition, a high-capacity secondary battery can be provided. In addition, a secondary battery with excellent charge and discharge characteristics can be provided. In addition, a positive electrode active material in which dissolution of a transition metal such as cobalt is inhibited even when a state of being charged with high voltage is held for a long time can be provided. In addition, a highly safe or reliable secondary battery can be provided. In addition, a novel material, a novel active material particle, a novel power storage device, or a manufacturing method thereof can be provided.

BRIEF DESCRIPTION OF THE DRAWINGS

FIG. 11 is a diagram illustrating the depth of charge and crystal structures of a positive electrode active material of one embodiment of the present invention.

FIG. 22(A-1) illustrates an example of a secondary battery. FIG. 22(A-2) illustrates an example of a secondary battery. FIG. 22(B-1) illustrates an example of a secondary battery. FIG. 22(B-2) illustrates an example of a secondary battery.

FIG. 30(A) illustrates a bendable secondary battery. FIG. 30(B1) illustrates a bendable secondary battery. FIG. 30(B2) illustrates a bendable secondary battery. FIG. 30(C) illustrates a bendable secondary battery. FIG. 30(D) illustrates a bendable secondary battery.

MODE FOR CARRYING OUT THE INVENTION

Figure 1A:
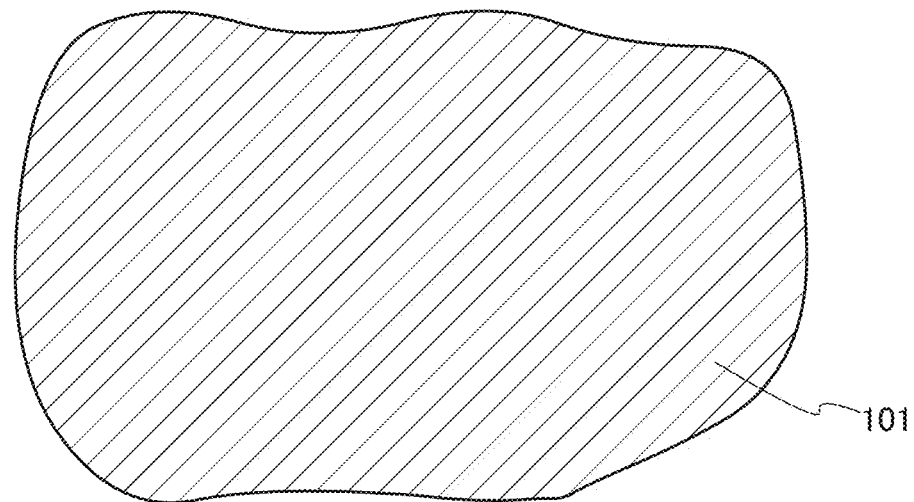
FIG. 1(A) illustrates an example of a positive electrode active material of one embodiment of the present invention.

Hereinafter, embodiments of the present invention will be described in detail using the drawings. Note that the present invention is not limited to the description below, and it is easily understood by those skilled in the art that modes and details thereof can be modified in various ways. In addition, the present invention should not be construed as being limited to the description in the following embodiments.

In addition, in this specification and the like, crystal planes and orientations are indicated by the Miller indices. In the crystallography, a bar is placed over a number in the expression of crystal planes and orientations; however, in this specification and the like, crystal planes and orientations are in some cases expressed by placing – (a minus sign) before a number instead of placing a bar over the number because of patent expression limitations. Furthermore, an individual direction that shows an orientation in a crystal is denoted by "[ ]", a set direction that shows all of the equivalent orientations is denoted by "< >", an individual plane that shows a crystal plane is denoted by "( )", and a set plane having equivalent symmetry is denoted by "{ }".

In this specification and the like, segregation refers to a phenomenon in which in a solid made of a plurality of elements (e.g., A, B, and C), a certain element (e.g., B) is spatially non-uniformly distributed.

In this specification and the like, a surface portion of a particle of an active material or the like refers to a region from a surface to a depth of approximately 10 nm. A plane generated by a crack may also be referred to as a surface. In addition, a region which is located at a deeper portion than the surface portion is referred to as an inner portion.

In this specification and the like, a layered rock-salt crystal structure of a composite oxide containing lithium and a transition metal refers to a crystal structure which has rock-salt ion arrangement where cations and anions are alternately arranged and in which lithium can be two-dimensionally diffused owing to a formation of two-dimensional plane by regular arrangement of the transition metal and lithium. Note that a defect such as a cation or anion vacancy may exist. Moreover, strictly speaking, a lattice of a rock-salt crystal is distorted in the layered rock-salt crystal structure in some cases.

In addition, in this specification and the like, a rock-salt crystal structure refers to a structure in which cations and anions are alternately arranged. Note that a cation or anion vacancy may exist.

In addition, in this specification and the like, a pseudo-spinel crystal structure of a composite oxide containing lithium and a transition metal refers to a space group R-3m, which is not a spinel crystal structure but a crystal structure in which an ion of cobalt, magnesium, or the like is coordinated to six oxygen atoms, and the cation arrangement has symmetry similar to that of the spinel crystal structure. Note that in the pseudo-spinel crystal structure, an ion of a light element such as lithium is coordinated to four oxygen atoms in some cases. Also in that case, the ion arrangement has symmetry similar to that of the spinel crystal structure.

The pseudo-spinel crystal structure can also be regarded as a crystal structure that contains Li between layers at random but is similar to a $CdCl_2$-type crystal structure. The crystal structure similar to the $CdCl_2$-type crystal structure is close to a crystal structure of lithium nickel oxide when charged up to a depth of charge of 0.94 ($Li_{0.06}NiO_2$); however, pure lithium cobalt oxide or a layered rock-salt positive electrode active material containing a large amount of cobalt is known not to have this crystal structure generally.

In the layered rock-salt crystal and the rock-salt crystal, the anion arrangement is a cubic close-packed structure (a face-centered cubic lattice structure). It is assumed that the anion arrangement is a cubic close-packed structure also in the pseudo-spinel crystal. When these are in contact with each other, there is a crystal plane at which orientations of cubic close-packed structures composed of anions are aligned. Note that the space groups of the layered rock-salt crystal and the pseudo-spinel crystal are R-3m, which is different from the space groups of the rock-salt crystal, Fm-3m (the space group of a general rock-salt crystal) and Fd-3m (the space group of a rock-salt crystal having the simplest symmetry); thus, the Miller indices of the crystal plane satisfying the above conditions in the layered rock-salt crystal and the pseudo-spinel crystal are different from that in the rock-salt crystal. In this specification, a state where the orientations of the cubic close-packed structures composed of anions in the layered rock-salt crystal, the pseudo-spinel crystal, and the rock-salt crystal are aligned is sometimes referred to as a state where crystal orientations are substantially aligned.

Whether the crystal orientations in two regions are substantially aligned can be judged from a TEM (transmission electron microscope) image, a STEM (scanning transmission electron microscope) image, a HAADF-STEM (high-angle annular dark-field scanning transmission electron microscope) image, an ABF-STEM (annular bright-field scanning transmission electron microscope) image, and the like. X-ray diffraction (XRD), electron diffraction, neutron diffraction, and the like can also be used for judging. In the TEM image and the like, alignment of cations and anions can be observed as repetition of bright lines and dark lines. When the orientations of cubic close-packed structures in the layered rock-salt crystal and the rock-salt crystal are aligned, a state where an angle made by the repetition of bright lines and dark lines in the crystals is less than or equal to 5°, further preferably less than or equal to 2.5° can be observed. Note that in the TEM image and the like, a light element such as oxygen or fluorine cannot be clearly observed in some cases; however, in such a case, alignment of orientations can be judged by arrangement of metal elements.

In addition, in this specification and the like, theoretical capacity of a positive electrode active material refers to the amount of electricity obtained when all lithium that can be inserted and extracted and is contained in the positive electrode active material is extracted. For example, the theoretical capacity of $LiCoO_2$ is 274 mAh/g, the theoretical capacity of $LiNiO_2$ is 274 mAh/g, and the theoretical capacity of $LiMn_2O_4$ is 148 mAh/g.

In addition, in this specification and the like, depth of charge obtained when all lithium that can be inserted and extracted is inserted is 0, and depth of charge obtained when all lithium that can be inserted and extracted and is contained in a positive electrode active material is extracted is 1.

In addition, in this specification and the like, charging refers to transfer of lithium ions from a positive electrode to a negative electrode in a battery and transfer of electrons from the negative electrode to the positive electrode in an external circuit. For a positive electrode active material, extraction of lithium ions is called charging. Moreover, a positive electrode active material with a depth of charge of greater than or equal to 0.74 and less than or equal to 0.9, more specifically, a depth of charge of greater than or equal to 0.8 and less than or equal to 0.83 is referred to as a high-voltage charged positive electrode active material. Thus, for example, $LiCoO_2$ charged to 219.2 mAh/g is a high-voltage charged positive electrode active material. In addition, $LiCoO_2$ that is subjected to constant current charging in an environment at 25° C. and a charging voltage of higher than or equal to 4.525 V and lower than or equal to 4.65 V (in the case of a lithium counter electrode), and then subjected to constant voltage charging until the current value becomes 0.01 C or ⅕ to 1/100 of the current value at the time of the constant current charging is also referred to as a high-voltage charged positive electrode active material.

Similarly, discharging refers to transfer of lithium ions from a negative electrode to a positive electrode in a battery and transfer of electrons from the positive electrode to the negative electrode in an external circuit. For a positive electrode active material, insertion of lithium ions is called discharging. Furthermore, a positive electrode active material with a depth of charge of less than or equal to 0.06 or a positive electrode active material from which more than or equal to 90% of the charge capacity is discharged from a state where the positive electrode active material is charged with high voltage is referred to as a sufficiently discharged positive electrode active material. For example, $LiCoO_2$ with a charge capacity of 219.2 mAh/g is in a state of being charged with high voltage, and a positive electrode active material from which more than or equal to 197.3 mAh/g, which is 90% of the charge capacity, is discharged is a sufficiently discharged positive electrode active material. In addition, $LiCoO_2$ that is subjected to constant current discharging in an environment at 25° C. until the battery voltage becomes lower than or equal to 3 V (in the case of a lithium counter electrode) is also referred to as a sufficiently discharged positive electrode active material.

In addition, in this specification and the like, an unbalanced phase change refers to a phenomenon that causes a nonlinear change in physical quantity. For example, an unbalanced phase change might occur before and after peaks in a dQ/dV curve obtained by differentiating capacitance (Q) with voltage (V) (dQ/dV), which can largely change the crystal structure.

Embodiment 1

In this embodiment, a positive electrode active material and a positive electrode of embodiments of the present invention are described. The positive electrode active material of one embodiment of the present invention can be used for a positive electrode of a secondary battery. The positive electrode of one embodiment of the present invention can be used for a secondary battery.

[Positive Electrode Active Material]

FIG. 1(A), FIG. 1(B), FIG. 2(A), and FIG. 2(B) each illustrate a cross section of a positive electrode active material 100.

The positive electrode active material 100 illustrated in FIG. 1(A) includes a first substance 101.

The first substance is a particle, for example. In the case where the first substance is a particle, the particle diameter is preferably greater than or equal to 1 nm and less than or equal to 100 μm. The particle diameter can be sometimes calculated from scattering of a laser beam, for example. Alternatively, the particle diameter may be calculated as a diameter of a circle converted on the basis of the cross-sectional area obtained through cross-sectional observation of the particle.

Figure 1B:
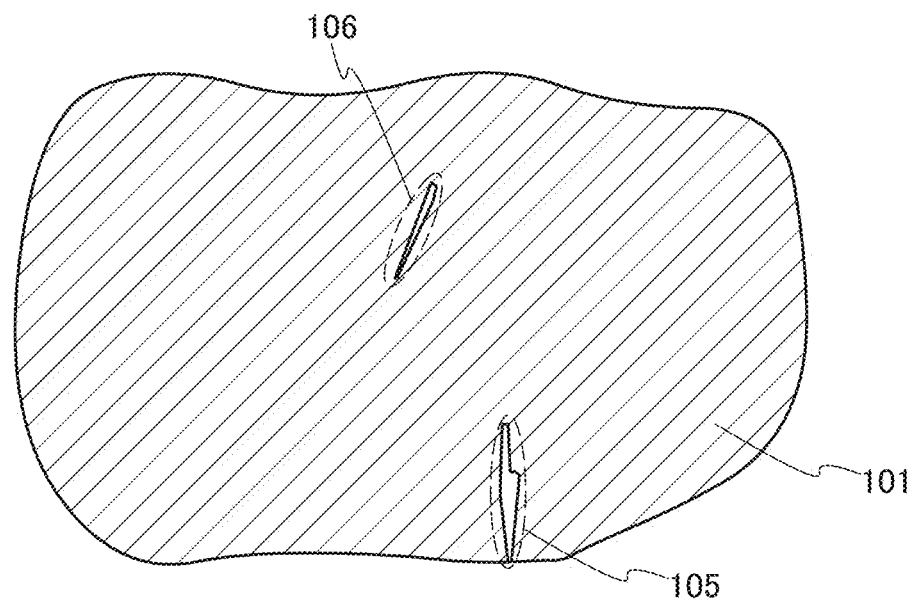
FIG. 1(B) illustrates an example of a positive electrode active material of one embodiment of the present invention.

The positive electrode active material 100 illustrated in FIG. 1(B) includes the first substance 101. The first substance 101 includes a crack 105. The crack 105 is expressed as a crack region in some cases. The crack is expressed as, for example, a split, a crevice, or a cleft in some cases. In some cases, the crack is observed as a slit-like region when a cross section of a substance is observed, for example. The crack may refer to a slit-like region and a region in the vicinity thereof when a cross section of a substance is observed, for example.

In the case where a cross section of a substance is observed, for example, the substance is cut so that a cutting surface is exposed, and the cutting surface is observed.

The positive electrode active material 100 may include a crack 106 as illustrated in FIG. 1(B). In FIG. 1(B), the crack 106 is positioned in an inner portion of the first substance 101 or in an inner portion of the positive electrode active material 100. Meanwhile, the crack 105 is partly in contact with the surface of the first substance 101 or the surface of the positive electrode active material 100.

Figure 2A:
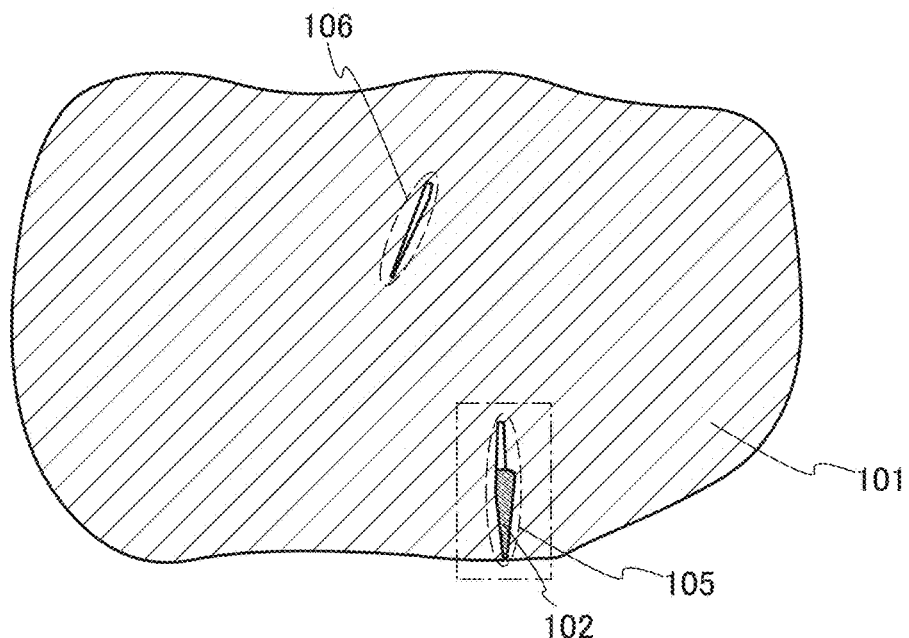
FIG. 2(A) illustrates an example of a positive electrode active material of one embodiment of the present invention.
Figure 2B:
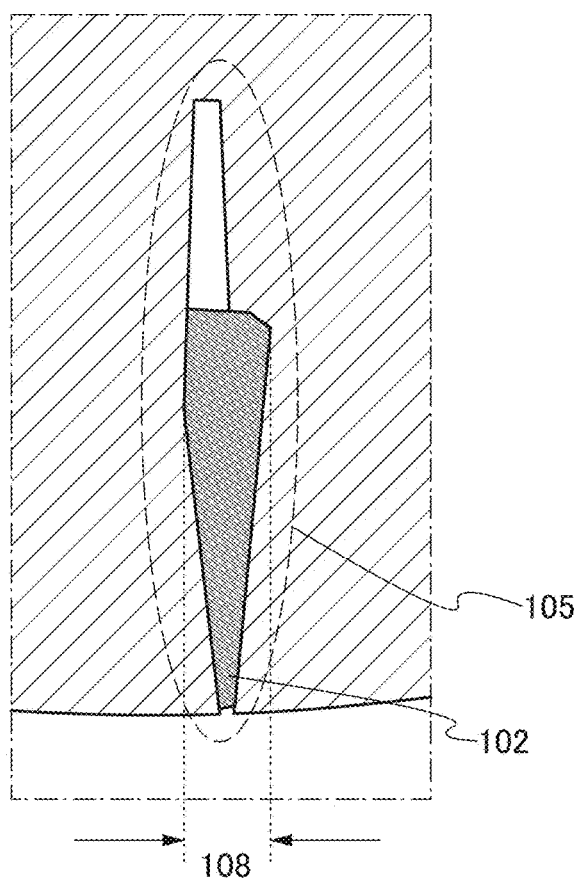
FIG. 2(B) illustrates an example of a positive electrode active material of one embodiment of the present invention.

The positive electrode active material 100 illustrated in FIG. 2(A) includes a second substance 102 inside the crack 105 in addition to FIG. 1(B). FIG. 2(B) is an enlarged view of a region surrounded by a dashed-dotted line in FIG. 2(A).

The second substance 102 is positioned inside a crack, for example. Alternatively, the second substance 102 is surrounded by a crack, for example. Alternatively, the second substance 102 is surrounded by an inner surface of a crack, for example. Alternatively, the second substance 102 is sandwiched between a first inner surface and a second inner surface of a crack, for example. In this case, the first inner surface and the second inner surface may form one continuous surface. Alternatively, the second substance 102 is positioned in a gap of a crack, for example. Alternatively, the second substance 102 is positioned in a crack region, for example.

The first substance 101 includes the crack 105, whereby, in some cases, stress generated in expansion and contraction of the first substance 101 accompanying charging and discharging of a secondary battery can be reduced, and enlargement, breaking, or the like of the crack of the first substance 101 can be inhibited. Thus, a decrease in performance due to charging and discharging of a secondary battery, for example, a decrease in capacity, can be inhibited in some cases.

A width 108 of the crack 105 is preferably smaller than or equal to 2 μm, further preferably larger than or equal to 20 nm and smaller than or equal to 2 μm. When the width 108 of the crack 105 is larger than 2 μm, for example, it might be difficult to inhibit the development of the crack. The width of the crack may be measured with the use of a cross-sectional view of the first substance 101.

The second substance 102 preferably includes a region in contact with the crack 105. A surface area of the active material increases when the first substance 101 includes the crack 105, whereby the area reacting with an electrolyte solution in charging and discharging increases. An increase in the reaction area might cause an increase in irreversible capacity, for example. The second substance 102 is preferably in contact with the crack 105 because a contact area between the first substance 101 and an electrolyte solution is decreased and thus the reaction with the electrolyte solution can be inhibited in some cases.

The second substance 102 preferably includes a region in contact with an inner surface of the crack 105. The second substance 102 preferably has a high adhesion property to the inner surface. When the second substance 102 includes a region in contact with the inner surface of the crack 105, the crack 105 is inhibited from further developing in some cases. The development of the crack 105 is inhibited, whereby an increase in the reaction area with the electrolyte solution can be inhibited.

In the case where the first substance 101 has a crystal structure represented by the space group R-3m and in the case where the first substance 101 has a layered rock-salt crystal structure, the crack 105 is generated in a plane substantially perpendicular to the c-axis in some cases. Alternatively, a plane substantially perpendicular to the c-axis is exposed by formation of the crack 105 in some cases.

Figure 9:
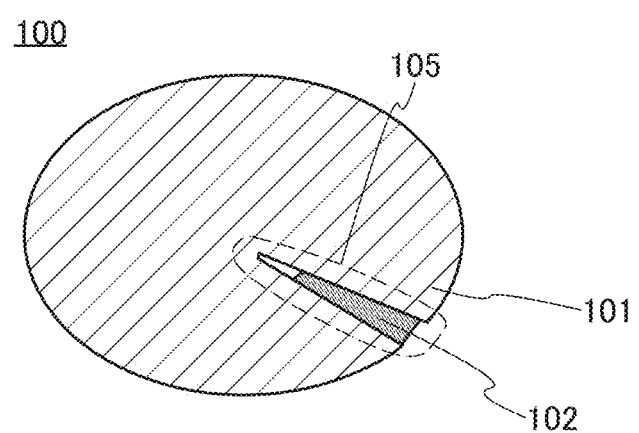
FIG. 9 illustrates an example of a positive electrode active material of one embodiment of the present invention.

FIG. 9 is an example of a cross-sectional view of the positive electrode active material 100 of one embodiment of the present invention. The positive electrode active material 100 includes the particulate first substance 101, and the first substance 101 includes the crack 105. The crack 105 includes the second substance 102 therein.

Figure 10A:
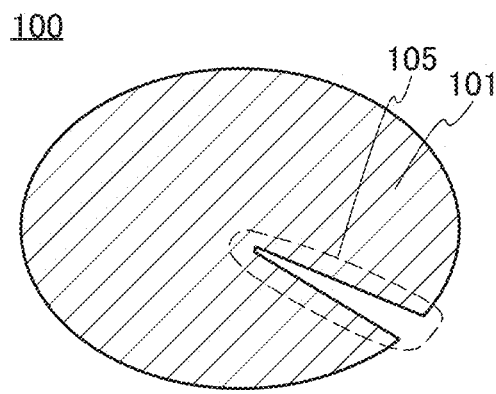
FIG. 10(A) illustrates an example of a positive electrode active material of one embodiment of the present invention.
Figure 10B:
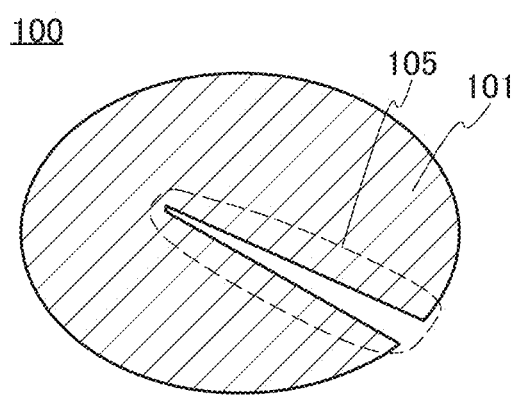
FIG. 10(B) illustrates an example of a positive electrode active material of one embodiment of the present invention.

As a comparative example, FIG. 10(A) illustrates an example of the positive electrode active material 100 not including the second substance 102. The case is considered where at least charging, discharging, or charging and discharging is performed when the positive electrode active material 100 is used for a secondary battery. In such a case, the crack 105 develops in accordance with the operation, for example, the crack 105 becomes deeper in some cases, which is illustrated in FIG. 10(B). As the crack develops, a surface that has not been exposed is exposed, and a reaction is caused by the contact of the surface and an electrolyte solution in some cases. Such a reaction might increase irreversible capacity of the secondary battery. Alternatively, the capacity might be reduced.

Figure 10C:
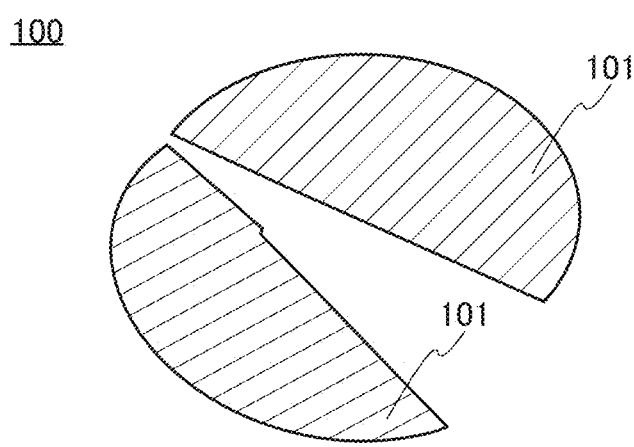
FIG. 10(C) illustrates an example of a positive electrode active material of one embodiment of the present invention.

When the crack 105 develops, the first substance 101 breaks into two or more particles as illustrated in FIG. 10(C), for example. When the particulate first substance 101 breaks, a surface that has not been exposed is exposed. In addition, when the first substance 101 breaks, a positive electrode active material layer might collapse in a positive electrode including the positive electrode active material 100.

The development of the crack 105 remarkably decreases the capacity in accordance with charge and discharge cycles of the secondary battery in some cases. Alternatively, a short circuit between a positive electrode and a negative electrode might be caused.

As illustrated in FIG. 2(B), the second substance 102 is not necessarily filled in a deeper region of the crack 105. When the crack 105 includes a region which is filled with the second substance 102 and a deeper region which is not filled with the second substance 102, stress generated in the positive electrode active material 100 in a press step in the electrode fabrication process, in charging and discharging of a secondary battery, or the like might be reduced, for example.

The first substance preferably contains one or more of cobalt, manganese, nickel, and aluminum. As the first substance, a composite oxide with a layered rock-salt crystal structure or a spinel crystal structure can be used, for example. Alternatively, a polyanionic positive electrode material can be used as the positive electrode active material, for example. Examples of the polyanionic positive electrode material include a material with an olivine crystal structure and a material with a NASICON structure. Alternatively, a positive electrode material containing sulfur can be used as the positive electrode active material, for example.

As the material with the layered rock-salt crystal structure, for example, a composite oxide represented by $LiMeO_2$ can be used. The element Me is preferably one or more elements selected from Co and Ni. $LiCoO_2$ is preferable because it has high capacity, stability in the air, and thermal stability to a certain extent, for example. As the element Me, one or more elements selected from Al and Mn may be included in addition to one or more elements selected from Co and Ni.

As the material with a spinel crystal structure, for example, a composite oxide represented by $LiMe_2O_4$ can be used. It is preferable to contain Mn as the element Me. For example, $LiMn_2O_4$ can be used. It is preferable to contain Ni in addition to Mn as the element Me because the discharge voltage and the energy density of the secondary battery are improved in some cases. It is preferable to add a small amount of lithium nickel oxide ($LiNiO_2$ or $LiNi_{1-x}Me_xO_2$ (Me=Co, Al, or the like)) to a lithium-containing material with a spinel crystal structure which contains manganese, such as $LiMn_2O_4$, because the characteristics of the secondary battery can be improved.

As the polyanionic positive electrode material, for example, a composite oxide containing oxygen, an element X, a metal Ae, and a metal Me can be used. The metal Me is one or more of Fe, Mn, Co, Ni, Ti, V, and Nb, the metal Ae is one or more of Li, Na, and Mg, and the element X is one or more of S, P, Mo, W, As, and Si.

As the material with the olivine crystal structure, for example, a composite material (general formula $LiMePO_4$ (Me is one or more of Fe(II), Mn(II), Co(II), and Ni(II))) can be used.

Alternatively, a composite material such as general formula $Li_{(2-j)}MeSiO_4$ (Me is one or more of Fe(II), Mn(II), Co(II), and Ni(II); $0 \leq j \leq 2$) can be used.

Still alternatively, a NASICON compound represented by general formula $Ae_xM_2(XO_4)_3$ (Ae=Li, Na, or Mg, Me=Fe, Mn, Ti, V, or Nb, X=S, P, Mo, W, As, or Si) can be used. Examples of the NASICON compound include $Fe_2(MnO_4)_3$, $Fe_2(SO_4)_3$, and $Li_3Fe_2(PO_4)_3$. Further alternatively, a compound represented by general formula $Li_2MePO_4F$, $Li_2MeP_2O_7$, or $LisMeO_4$ (Me=Fe or Mn) can be used as the positive electrode active material.

Further alternatively, a polyanionic positive electrode material containing V can be used. Typical examples are α-$LiVOPO_4$, β-$LiVOPO_4$, α1-$LiVOPO_4$, $LiVPO_4F$, $LiVPO_4O$, $LiVP_2O_7$, $LiVOSO_4$, $Li_2VOSiO_4$, and $LiVMoO_6$.

A material with a layered structure is preferable because high capacity can be obtained in some cases, for example. On the other hand, a crack might be generated easily in the material with the layered structure, for example, a material with the layered rock-salt crystal structure.

The second substance 102 is a compound containing an element A, and phosphorus can be used as the element A. The second substance 102 is preferably a compound having a bond between the element A and oxygen.

The second substance 102 preferably contains an element D. The element D is one or more elements selected from lithium, sodium, potassium, magnesium, zinc, cobalt, iron, manganese, nickel, aluminum, and fluorine. The second substance 102 may contain nitrogen. The second substance 102 may have a bond between nitrogen and hydrogen.

As the second substance, for example, a phosphate compound can be used. As the phosphate compound, a phosphate compound containing the element D can be used. A phosphate compound containing hydrogen in addition to the element D can be used. An ammonium phosphate, or an ammonium salt containing the element D can also be used as the phosphate compound.

Examples of the phosphate compound include lithium phosphate, sodium phosphate, potassium phosphate, magnesium phosphate, zinc phosphate, aluminum phosphate, ammonium phosphate, lithium dihydrogen phosphate, ammonium dihydrogen phosphate, magnesium hydrogen phosphate, and lithium cobalt phosphate. As the first substance, lithium phosphate or magnesium phosphate is particularly preferably used.

Here, the number of atoms of the element Me contained in the first substance is $M_M$, the number of atoms of the element A contained in the second substance is $M_A$. In the first substance 101, for example, $M_A$ is preferably greater than or equal to 0.01 times and less than or equal to 0.12 times $M_M$, further preferably greater than or equal to 0.02 times and less than or equal to 0.08 times $M_M$. Here, in the case where the element Me and the element A each represent a plurality of elements, the sum of the numbers of atoms of the plurality of elements is used as each of $M_M$ and $M_A$.

For example, in the material with the layered rock-salt crystal structure, phosphorus is probably less likely to be substituted for a transition metal contained in the material. It is preferable to use the material with the layered rock-salt crystal structure as the first substance and a compound containing phosphorus as the second substance because a change in the crystal structure of the first substance (e.g., lithium cobalt oxide) due to substitution of phosphorus probably hardly occurs.

The concentrations of elements contained in the first substance 101 and the second substance 102 can be evaluated by energy dispersive X-ray spectrometry (EDX), electron energy-loss spectroscopy (EELS), or the like, for example.

The concentration of the element A in the second substance 102 is preferably higher than the concentration of the element A in the first substance 101. The concentration of the element Me in the second substance 102 is preferably lower than the concentration of the element Me in the first substance 101.

In the case where the first substance 101 contains a halogen element in its surface, the melting point of the second substance 102 might be decreased. In some cases, the second substance 102 and halogen might react with each other to give a reaction product. The reaction product has a lower melting point than the second substance 102 in some cases.

A mixture of lithium phosphate and lithium fluoride has a lower melting point than lithium phosphate alone in some cases. Accordingly, in the case where lithium phosphate exists together with halogen such as fluorine, for example, the melting point is probably decreased.

In a formation process of the positive electrode active material of one embodiment of the present invention, the first substance 101 contains fluorine in its surface in some cases. The first substance 101 contains lithium fluoride used in the formation process in some cases.

When the melting point of the second substance 102 is lowered, the second substance 102 has an increased fluidity and thus easily enters the inside of the crack 105 in some cases.

[Positive Electrode]

Figure 3:
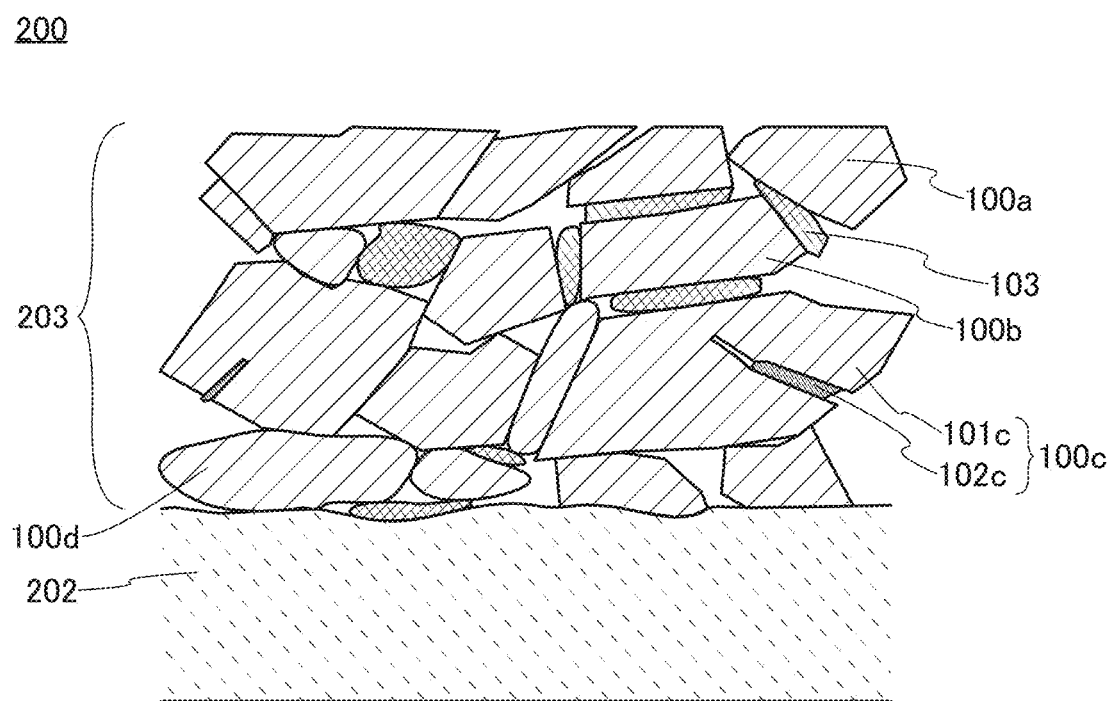
FIG. 3 illustrates an example of a positive electrode of one embodiment of the present invention.

FIG. 3 illustrates a cross section of a positive electrode 200. The positive electrode 200 includes a positive electrode active material layer 203. The positive electrode 200 preferably includes a current collector 202. The positive electrode active material layer 203 is positioned over the current collector 202. The positive electrode active material layer 203 preferably includes a region in contact with the current collector 202.

The positive electrode active material layer 203 contains the plurality of positive electrode active materials 100. The positive electrode active material layer may contain, in addition to the positive electrode active material, other materials such as a coating film of the active material surface, a conductive additive, and a binder.

In FIG. 3, as some examples of the plurality of positive electrode active materials 100 contained in the positive electrode active material layer 203, a positive electrode active material 100a, a positive electrode active material 100b, a positive electrode active material 100c, and a positive electrode active material 100d are shown.

The positive electrode active material layer 203 contains a third substance 103. The third substance 103 has a particulate form, for example. The third substance 103 preferably contains the same material as the second substance 102, for example. The third substance 103 preferably contains two or more elements common to the second substance 102, for example.

The positive electrode active material 100c in the positive electrode 200 illustrated in FIG. 3 contains a first substance 101c and a second substance 102c. The first substance 101 and the second substance 102 can be referred to for the first substance 101c and the second substance 102c, respectively.

In the positive electrode 200 illustrated in FIG. 3, the third substance 103 is positioned between the positive electrode active material 100a and the positive electrode active material 100b. The third substance 103 has an adhesion property to the positive electrode active material 100a and the positive electrode active material 100b, whereby the electrical conductivity of the positive electrode active material layer 203 is increased in some cases. Moreover, a reduction in an adhesion property of components in the positive electrode active material layer 203 due to charging and discharging can be inhibited in some cases.

In the positive electrode 200 illustrated in FIG. 3, the third substances 103 are positioned to surround the positive electrode active material 100b, whereby the adhesion between the positive electrode active material 100b and surrounding active materials is increased through the third substances 103 in some cases.

In the positive electrode 200 illustrated in FIG. 3, the third substance 103 is positioned between the positive electrode active material 100d and the current collector 202, whereby the adhesion between the positive electrode active material 100d and the current collector 202 is increased through the third substance 103 in some cases.

For example, in the case where phosphorus is contained in the second substance 102 and the third substance 103, hydrogen fluoride generated by decomposition of an electrolyte solution might react with the second substance 102 or the third substance 103, which might result in lowering the concentration of hydrogen fluoride in the electrolyte solution. In the case where the electrolyte solution contains $LiPF_6$, hydrogen fluoride is generated by hydrolysis in some cases. In some cases, hydrogen fluoride is generated by the reaction of PVDF used as a component of the positive electrode and an alkali. The concentration of hydrogen fluoride in the charge solution is lowered, so that corrosion and a film separation of a current collector can be inhibited in some cases. Furthermore, a decrease in adhesion property due to gelation or insolubility of PVDF can be inhibited in some cases.

Note that a conductive additive and a binder are not illustrated in FIG. 3. For example, the conductive additive and the binder are each positioned in a region between the positive electrode active material 100 and the third substance 103, in a region among the plurality of positive electrode active materials 100, in a region between the positive electrode active material 100 and the current collector 202, or the like.

Note that lithium phosphate has a conductivity for a carrier ion such as lithium in some cases. In the case where the positive electrode active material 100 contains lithium phosphate, there is an advantage in that charging and discharging of the secondary battery are not easily inhibited.

As the conductive additive, a carbon material, a metal material, a conductive ceramic material, or the like can be used. Alternatively, a fibrous material may be used as the conductive additive. The content of the conductive additive to the total amount of the active material layer is preferably greater than or equal to 1 wt % and less than or equal to 10 wt %, further preferably greater than or equal to 1 wt % and less than or equal to 5 wt %.

A network for electric conduction can be formed in the active material layer by the conductive additive. The conductive additive can maintain an electric conduction path between positive electrode active materials. The addition of the conductive additive to the active material layer can achieve an active material layer with high electric conductivity.

For example, natural graphite, artificial graphite such as mesocarbon microbeads, carbon fiber, or the like can be used as the conductive additive. For example, carbon fiber such as mesophase pitch-based carbon fiber or isotropic pitch-based carbon fiber can be used as the carbon fiber. Alternatively, carbon nanofiber, carbon nanotube, or the like can be used as the carbon fiber. Carbon nanotube can be manufactured by, for example, a vapor deposition method or the like. Alternatively, a carbon material such as carbon black (acetylene black (AB) or the like), graphite (black lead) particles, graphene, or fullerene can be used as the conductive additive. Alternatively, for example, metal powder and metal fiber of copper, nickel, aluminum, silver, gold, or the like, a conductive ceramic material, and the like can be used.

Alternatively, a graphene compound may be used as the conductive additive.

A graphene compound has excellent electrical characteristics of high conductivity and excellent physical properties of high flexibility and high mechanical strength in some cases. Furthermore, the graphene compound has a planar shape. The graphene compound enables low-resistance surface contact. Furthermore, the graphene compound has extremely high conductivity even with a small thickness in some cases and thus allows a conductive path to be formed in an active material layer efficiently even with a small amount. Thus, the graphene compound is preferably used as the conductive additive, in which case the area where the active material and the conductive additive are in contact can be increased. The graphene compound that is the conductive additive is preferably formed using a spray dry apparatus as a coating film to cover the entire surface of the active material. In addition, the graphene compound is preferable because electrical resistance can be reduced in some cases. Here, it is particularly preferable to use, for example, graphene, multi graphene, or RGO as the graphene compound. Here, RGO refers to a compound obtained by reducing graphene oxide (GO), for example.

In the case where an active material with a small particle diameter of 1 μm or less, for example, is used, the specific surface area of the active material is large and thus more conductive paths for connecting active materials with each other are needed. Thus, the amount of the conductive additive tends to increase and the carried amount of the active material tends to decrease relatively. When the carried amount of the active material decreases, the capacity of the secondary battery decreases. In such a case, the use of the graphene compound as the conductive additive is particularly preferable because the graphene compound can efficiently form a conductive path even with a small amount and thus the carried amount of the active material does not decrease.

A cross-sectional structure example of the positive electrode active material layer 203 in which the graphene compound is used as the conductive additive is described below as an example.

Figure 8:
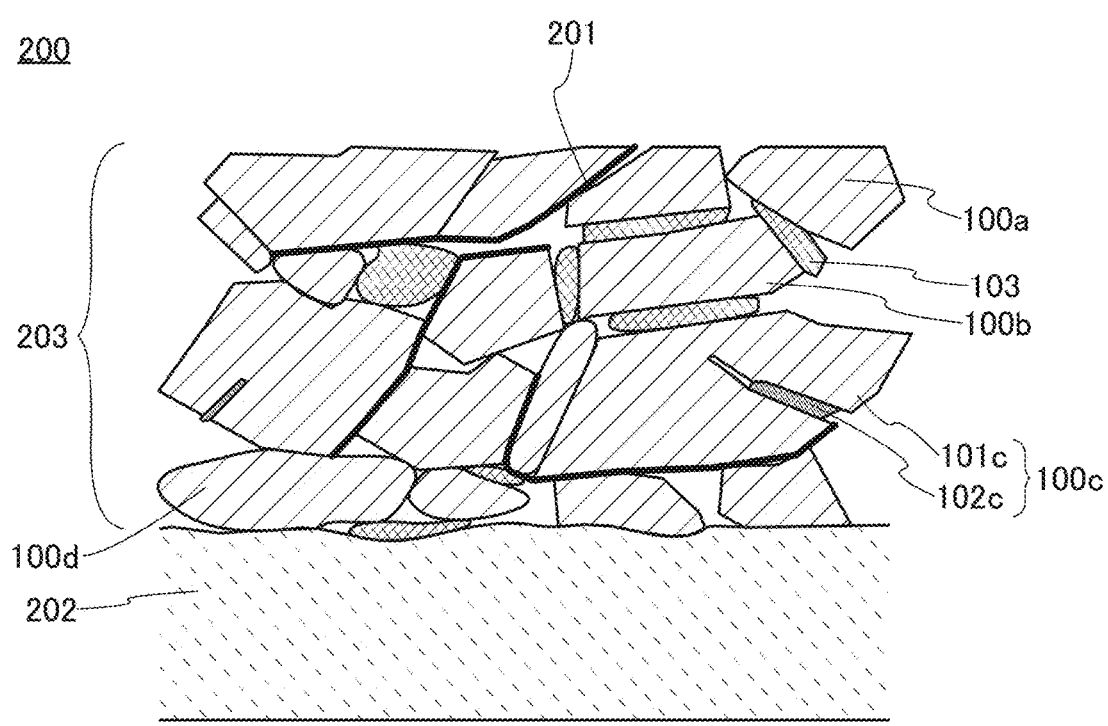
FIG. 8 illustrates an example of a positive electrode of one embodiment of the present invention.

FIG. 8 is a longitudinal cross-sectional view of the positive electrode active material layer 203. The positive electrode active material layer 203 includes the plurality of positive electrode active materials 100 (for example, the positive electrode active material 100a, the positive electrode active material 100b, the positive electrode active material 100c, the positive electrode active material 100d, and the like in FIG. 8), a graphene compound 201 as the conductive additive, and a binder (not illustrated). Here, graphene or multi graphene is used as the graphene compound 201, for example. The graphene compound 201 here preferably has a sheet-like shape. In addition, the graphene compound 201 may have a sheet-like shape of a plurality of multi graphene or (and) a plurality of graphene that partly overlap with each other.

In the longitudinal cross section of the positive electrode active material layer 203, the sheet-like graphene compounds 201 are substantially uniformly dispersed in the positive electrode active material layer 203. The graphene compounds 201 are schematically shown by thick lines in FIG. 8 but are actually thin films with a thickness corresponding to the thickness of a single layer or a multi-layer of carbon molecules. The plurality of graphene compounds 201 are formed to cover part of the plurality of particulate positive electrode active materials 100 or to adhere to surfaces of the plurality of particulate positive electrode active material 100, so that they make surface contact with each other.

Here, the plurality of graphene compounds are bonded to each other to form a net-like graphene compound sheet (hereinafter, referred to as a graphene compound net or a graphene net). When the graphene net covers the active material, the graphene net can also function as a binder for bonding active materials to each other. The amount of the binder can thus be reduced, or the binder does not have to be used. This can improve the proportion of the active material in the electrode volume or electrode weight. That is, the capacity of the secondary battery can be increased.

Here, it is preferable to perform reduction after a layer to be the positive electrode active material layer 203 is formed by using graphene oxide as the graphene compound 201 and mixing the graphene oxide with an active material. When graphene oxide with extremely high dispersibility in a polar solvent is used for the formation of the graphene compounds 201, the graphene compounds 201 can be substantially uniformly dispersed in the positive electrode active material layer 203. The solvent is removed by volatilization from a dispersion medium that contains uniformly dispersed graphene oxide, and the graphene oxide is reduced; hence, the graphene compounds 201 remaining in the positive electrode active material layer 203 partly overlap with each other and are dispersed such that surface contact is made between the graphene compounds 201, thereby forming a three-dimensional conduction path. Note that graphene oxide may be reduced either by heat treatment or with the use of a reducing agent, for example.

Unlike a conductive additive in the form of particles, such as acetylene black, which makes point contact with an active material, the graphene compound 201 is capable of making low-resistance surface contact; accordingly, the electrical conduction between the particulate positive electrode active material 100 and the graphene compound 201 can be improved with a smaller amount of the graphene compound 201 than that of a normal conductive additive. This increases the proportion of the positive electrode active material 100 in the positive electrode active material layer 203. Accordingly, the discharge capacity of the secondary battery can be increased.

In addition, it is also possible to form, using a spray dry apparatus, the graphene compound that is a conductive additive as a coating film to cover the entire surface of the active material and to further form a conductive path between the active materials with the graphene compound in advance.

A rubber material such as styrene-butadiene rubber (SBR), styrene-isoprene-styrene rubber, acrylonitrile-butadiene rubber, butadiene rubber, or ethylene-propylene-diene copolymer is preferably used for the binder, for example. Alternatively, fluororubber can be used for the binder.

For the binder, for example, water-soluble polymers are preferably used. As the water-soluble polymers, for example, a polysaccharide can be used. As the polysaccharide, for example, a cellulose derivative such as carboxymethyl cellulose (CMC), methyl cellulose, ethyl cellulose, hydroxypropyl cellulose, diacetyl cellulose, and regenerated cellulose or starch can be used. It is further preferred that such water-soluble polymers be used in combination with any of the above rubber materials.

Alternatively, a material such as polystyrene, poly(methyl acrylate), poly(methyl methacrylate) (PMMA), sodium polyacrylate, polyvinyl alcohol (PVA), polyethylene oxide (PEO), polypropylene oxide, polyimide, polyvinyl chloride, polytetrafluoroethylene, polyethylene, polypropylene, polyisobutylene, polyethylene terephthalate, nylon, polyvinylidene fluoride (PVDF), polyacrylonitrile (PAN), ethylene-propylene-diene polymer, polyvinyl acetate, or nitrocellulose is preferably used for the binder.

A plurality of above materials may be used in combination for the binder.

For example, a material having a significant viscosity modifying effect and another material may be used in combination. For example, a rubber material or the like has high adhesion or high elasticity but might have difficulty in viscosity modification when mixed in a solvent. In such a case, the rubber material or the like is preferably mixed with a material having an especially significant viscosity modifying effect, for example. As the material having a significant viscosity modifying effect, for example, a water-soluble polymer may be used. An example of a water-soluble polymer having a significant viscosity modifying effect is the above-mentioned polysaccharide; for example, a cellulose derivative such as carboxymethyl cellulose (CMC), methyl cellulose, ethyl cellulose, hydroxypropyl cellulose, diacetyl cellulose, or regenerated cellulose, or starch can be used.

Note that a cellulose derivative such as carboxymethyl cellulose obtains a higher solubility when converted into a salt such as a sodium salt or an ammonium salt of carboxymethyl cellulose, and accordingly, easily exerts an effect as a viscosity modifier. The high solubility can also increase the dispersibility of an active material and other components in the formation of a slurry for an electrode. In this specification, cellulose and a cellulose derivative used as a binder of an electrode include salts thereof.

The water-soluble polymers stabilize viscosity by being dissolved in water and allow stable dispersion of the active material and another material combined as a binder, such as styrene-butadiene rubber, in an aqueous solution. Furthermore, a water-soluble polymer is expected to be easily and stably adsorbed to an active material surface because it has a functional group. Many cellulose derivatives such as carboxymethyl cellulose have functional groups such as a hydroxyl group and a carboxyl group. Because of functional groups, polymers are expected to interact with each other and cover a large area of an active material surface.

In the case where the binder covering or being in contact with the active material surface forms a film, the film is expected to serve as a passivation film to inhibit the decomposition of the electrolyte solution. Here, the passivation film refers to a film without electric conductivity or a film with extremely low electric conductivity, and can inhibit the decomposition of an electrolyte solution at a battery reaction potential in the case where the passivation film is formed on the active material surface, for example. It is further desirable that the passivation film can conduct lithium ions while inhibiting electric conduction.

A material that has high conductivity, such as a metal like stainless steel, gold, platinum, aluminum, titanium, or the like; or an alloy thereof can be used for the positive electrode current collector. It is preferable that a material used for the positive electrode current collector not dissolve at the potential of the positive electrode. It is also possible to use an aluminum alloy to which an element that improves heat resistance, such as silicon, titanium, neodymium, scandium, or molybdenum, is added. Alternatively, the positive electrode current collector may be formed using a metal element that forms a silicide by reacting with silicon. Examples of the metal element that forms a silicide by reacting with silicon include zirconium, titanium, hafnium, vanadium, niobium, tantalum, chromium, molybdenum, tungsten, cobalt, and nickel. The current collector can have any of various shapes including a foil-like shape, a plate-like shape (sheet-like shape), a net-like shape, a punching-metal shape, and an expanded-metal shape as appropriate. The current collector preferably has a thickness of greater than or equal to 5 μm and less than or equal to 30 μm.

[Formation Method 1 of Positive Electrode Active Material]

Figure 4:
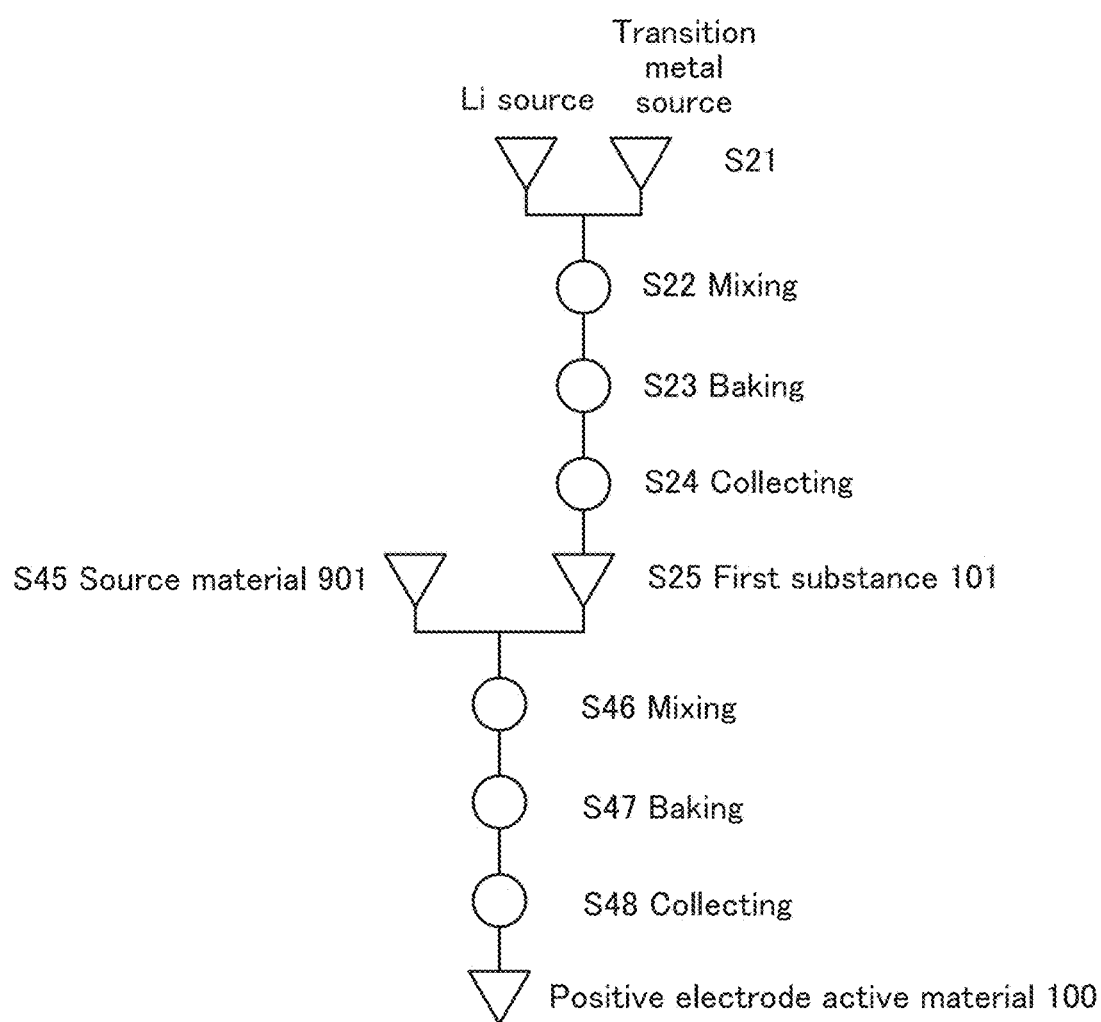
FIG. 4 illustrates an example of a formation method of a positive electrode active material of one embodiment of the present invention.
Figure 5:
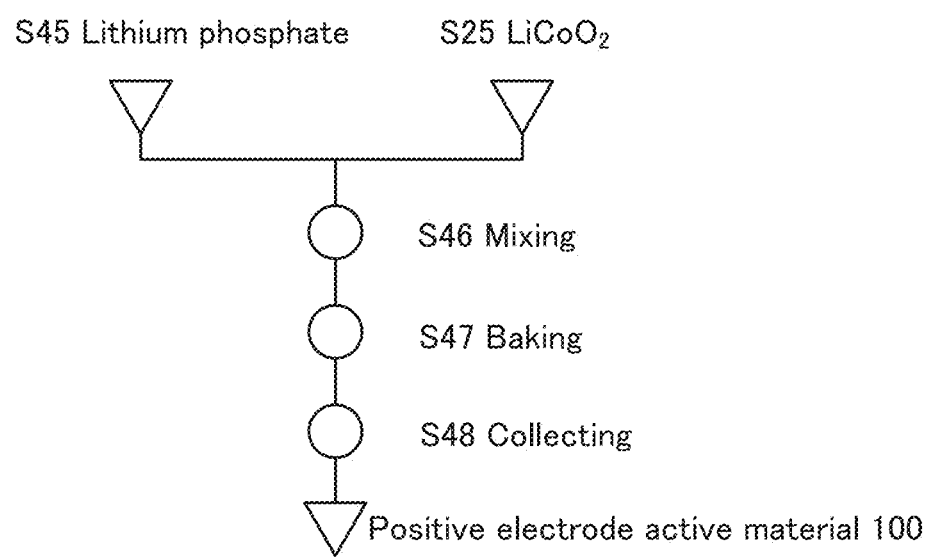
FIG. 5 illustrates an example of a formation method of a positive electrode active material of one embodiment of the present invention.

First, an example of a formation method of the positive electrode active material 100, which is one embodiment of the present invention, is described using FIG. 4. In addition, FIG. 5 shows another more specific example of the formation method.

First, the first substance is prepared. As an example, the case is described below where a composite oxide containing lithium, a transition metal, and oxygen is used as the first substance.

<Step S21>

First, as shown in Step S21 in FIG. 4, a lithium source and a transition metal source are prepared as the materials of the composite oxide containing lithium, the transition metal, and oxygen.

As the lithium source, for example, lithium carbonate, lithium fluoride, or the like can be used.

As the transition metal, at least one of cobalt, manganese, and nickel can be used.

In the case where the layered rock-salt crystal structure is used for the first substance, the ratio of materials is the mixture ratio of cobalt, manganese, and nickel at which the first substance can have the layered rock-salt crystal structure. In addition, aluminum may be added to the transition metals as long as the first substance can have the layered rock-salt crystal structure.

As the transition metal source, an oxide or a hydroxide of the transition metal, or the like can be used. As a cobalt source, for example, cobalt oxide, cobalt hydroxide, or the like can be used. As a manganese source, manganese oxide, manganese hydroxide, or the like can be used. As a nickel source, nickel oxide, nickel hydroxide, or the like can be used. As an aluminum source, aluminum oxide, aluminum hydroxide, or the like can be used.

<Step S22>

Next, the lithium source and the transition metal source are mixed (Step S22 in FIG. 4). The mixing can be performed by a dry process or a wet process. For example, a ball mill, a bead mill, or the like can be used for the mixing. When the ball mill is used, a zirconia ball is preferably used as media, for example.

<Step S23>

Next, the materials mixed in the above are heated. This step is sometimes referred to as baking or first heating to distinguish this step from a heating step performed later. The heating is preferably performed at higher than or equal to 800° C. and lower than 1100° C., further preferably at higher than or equal to 900° C. and lower than or equal to 1000° C., still further preferably at approximately 950° C. Excessively low temperature might result in insufficient decomposition and melting of the starting materials. By contrast, excessively high temperature might cause a defect due to excessive reduction of the transition metal, evaporation of lithium, or the like. For example, a defect in which cobalt has a valence of two might be caused.

The heating time is preferably longer than or equal to 2 hours and shorter than or equal to 20 hours. Baking is preferably performed in an atmosphere with little water, such as dry air (e.g., a dew point is lower than or equal to −50° C., further preferably lower than or equal to 100° C.). For example, it is preferable that the heating be performed at 1000° C. for 10 hours, the temperature rise be 200° C./h, and the flow rate of a dry atmosphere be 10 L/min. After that, the heated materials can be cooled to room temperature. The temperature decreasing time from the specified temperature to room temperature is preferably longer than or equal to 10 hours and shorter than or equal to 50 hours, for example.

Note that the cooling to room temperature in Step S23 is not essential. As long as later Step S24, Step S25, and Step S31 to Step S34 are performed without problems, it is possible to perform cooling to a temperature higher than room temperature.

<Step S24, Step S25>

The materials baked in the above are collected (Step S24 in FIG. 4), whereby the composite oxide containing lithium, the transition metal, and oxygen is obtained as the first substance 101 (Step S25 in FIG. 4). Specifically, lithium cobalt oxide, lithium manganese oxide, lithium nickel oxide, lithium cobalt oxide in which manganese is substituted for part of cobalt, or lithium nickel-manganese-cobalt oxide is obtained.

Alternatively, a composite oxide containing lithium, a transition metal, and oxygen that is synthesized in advance may be used as Step S25 (see FIG. 5). In this case, Step S21 to Step S24 can be skipped.

In the case where the composite oxide containing lithium, the transition metal, and oxygen that is synthesized in advance is used, a composite oxide with few impurities is preferably used. In this specification and the like, lithium, cobalt, nickel, manganese, aluminum, and oxygen are main components of the composite oxide containing lithium, the transition metal, and oxygen and the positive electrode active material, and elements other than the main components are regarded as impurities. For example, when analyzed by a glow discharge mass spectroscopy method, the total impurity element concentration is preferably less than or equal to 10,000 ppm wt, further preferably less than or equal to 5000 ppm wt. In particular, the total impurity concentration of transition metals such as titanium and arsenic is preferably less than or equal to 3000 ppm wt, further preferably less than or equal to 1500 ppm wt.

For example, as lithium cobalt oxide synthesized in advance, a lithium cobalt oxide particle (product name: CELLSEED C-10N) manufactured by NIPPON CHEMICAL INDUSTRIAL CO., LTD. can be used. This lithium cobalt oxide has an average particle diameter (D50) of approximately 12 μm, and, in impurity analysis by a glow discharge mass spectroscopy method (GD-MS), a magnesium concentration and a fluorine concentration of less than or equal to 50 ppm wt, a calcium concentration, an aluminum concentration, and a silicon concentration of less than or equal to 100 ppm wt, a nickel concentration of less than or equal to 150 ppm wt, a sulfur concentration of less than or equal to 500 ppm wt, an arsenic concentration of less than or equal to 1100 ppm wt, and concentrations of elements other than lithium, cobalt, and oxygen of less than or equal to 150 ppm wt.

Alternatively, a lithium cobalt oxide particle (product name: CELLSEED C-5H) manufactured by NIPPON CHEMICAL INDUSTRIAL CO., LTD. can be used. This lithium cobalt oxide has an average particle diameter (D50) of approximately 6.5 μm, and concentrations of elements other than lithium, cobalt, and oxygen that are approximately equal to or less than those of C-TON in impurity analysis by GD-MS.

In this embodiment, cobalt is used as the transition metal, and the lithium cobalt oxide particle (CELLSEED C-TON manufactured by NIPPON CHEMICAL INDUSTRIAL CO., LTD.) is used (see FIG. 5).

The composite oxide containing lithium, the transition metal, and oxygen in Step S25 preferably has the layered rock-salt crystal structure with few defects and distortions. Therefore, the composite oxide preferably includes few impurities. In the case where the composite oxide containing lithium, the transition metal, and oxygen includes a lot of impurities, the crystal structure is highly likely to have a lot of defects or distortions.

Here, the first substance 101 includes a crack in some cases. The crack is generated in any of Step S21 to Step S25 or in a plurality of steps. For example, the crack is generated in the baking step of Step S23. The number of generated cracks might vary depending on conditions such as the baking temperature, the rate of increasing or decreasing temperature in baking, and the like. Furthermore, the crack might be generated in the steps of mixing, grinding, and the like, for example.

In the positive electrode active material of one embodiment of the present invention, the crack generated in the formation process of the positive electrode active material and the formation process of the positive electrode is focused on.

Through Step S45 to Step S48 described below, as the second substance 102, a compound containing the element A can be inserted in the crack included in the first substance 101. In some cases, the second substance 102 is attached to the surface of the first substance 101, or a coating film containing the second substance 102 is formed on the surface of the first substance 101.

Moreover, after Step S45 to Step S48 described below are performed, the compound including the element A is not inserted in the crack included in the first substance 101 and exists as a particle in some cases. That is, the positive electrode active material 100 includes a particle of the compound containing the element A. In such a case, the particle does not enter the inside of the crack and is positioned between the plurality of first substances 101 or between the first substance 101 and the current collector in some cases. The particle is observed as the third substance 103 in the positive electrode in some cases.

<Step S45>

Next, the compound containing the element A is prepared as a source material 901 (Step S45 in FIG. 4). The source material 901 is a substance that is a source material of the second substance 102 and the third substance 103.

The source material 901 may be ground in Step S45. For example, a ball mill, a bead mill, or the like can be used for the grinding. The powder obtained after the grinding may be classified using a sieve.

The source material 901 is the compound containing the element A, and phosphorus can be used as the element A. The second substance is preferably a compound having a bond between the element A and oxygen.

As the second substance, for example, a phosphate compound can be used. As the phosphate compound, a phosphate compound containing the element D can be used. The element D is one or more elements selected from lithium, sodium, potassium, magnesium, zinc, cobalt, iron, manganese, and aluminum. A phosphate compound containing hydrogen in addition to the element D can be used. An ammonium phosphate, or an ammonium salt containing the element D can also be used as the phosphate compound.

Examples of the phosphate compound include lithium phosphate, sodium phosphate, potassium phosphate, magnesium phosphate, zinc phosphate, aluminum phosphate, ammonium phosphate, lithium dihydrogen phosphate, magnesium hydrogen phosphate, and lithium cobalt phosphate. As the first substance, lithium phosphate or magnesium phosphate is particularly preferably used.

In this embodiment, lithium phosphate is used as the source material 901 (Step S45 in FIG. 5).

<Step S46>

Next, the source material 901 obtained in Step S45 and the first substance 101 obtained in Step S25 are mixed (Step S46 in FIG. 4). It is preferable to mix the source material 901 at 0.01 mol to 0.1. mol inclusive, further preferably at 0.02 mol to 0.08 mol inclusive with respect to 1 mol of the first substance 101 obtained in Step S25. For example, a ball mill, a bead mill, or the like can be used for the mixing. The powder obtained after the mixing may be classified using a sieve.

<Step S47>

Next, the materials mixed in the above are heated (Step S47 in FIG. 4). In the formation of the positive electrode active material, this step is not necessarily performed in some cases. In the case of performing heating, the heating is preferably performed at higher than or equal to 300° C. and lower than 1200° C., further preferably at higher than or equal to 550° C. and lower than or equal to 950° C., still further preferably at approximately 750° C. Excessively low temperature might result in insufficient decomposition and melting of the starting materials. By contrast, excessively high temperature might cause a defect due to excessive reduction of the transition metal, evaporation of lithium, or the like.

By the heating, a reaction product of the first substance 101 and the source material 901 is generated in some cases.

The heating time is preferably longer than or equal to 2 hours and shorter than or equal to 60 hours. Baking is preferably performed in an atmosphere with little water, such as dry air (e.g., a dew point is lower than or equal to −50° C., further preferably lower than or equal to 100° C.). For example, it is preferable that the heating be performed at 1000° C. for 10 hours, the temperature rise be 200° C./h, and the flow rate of a dry atmosphere be 10 L/min. After that, the heated materials can be cooled to room temperature. The temperature decreasing time from the specified temperature to room temperature is preferably longer than or equal to 10 hours and shorter than or equal to 50 hours, for example.

Note that the cooling to room temperature in Step S47 is not essential. As long as later Step S48 is performed without problems, it is possible to perform cooling to a temperature higher than room temperature.

<Step S48>

The materials baked in the above are collected (Step S48 in FIG. 4), whereby the positive electrode active material 100 is obtained.

[Formation Method 2 of Positive Electrode Active Material]

Figure 6:
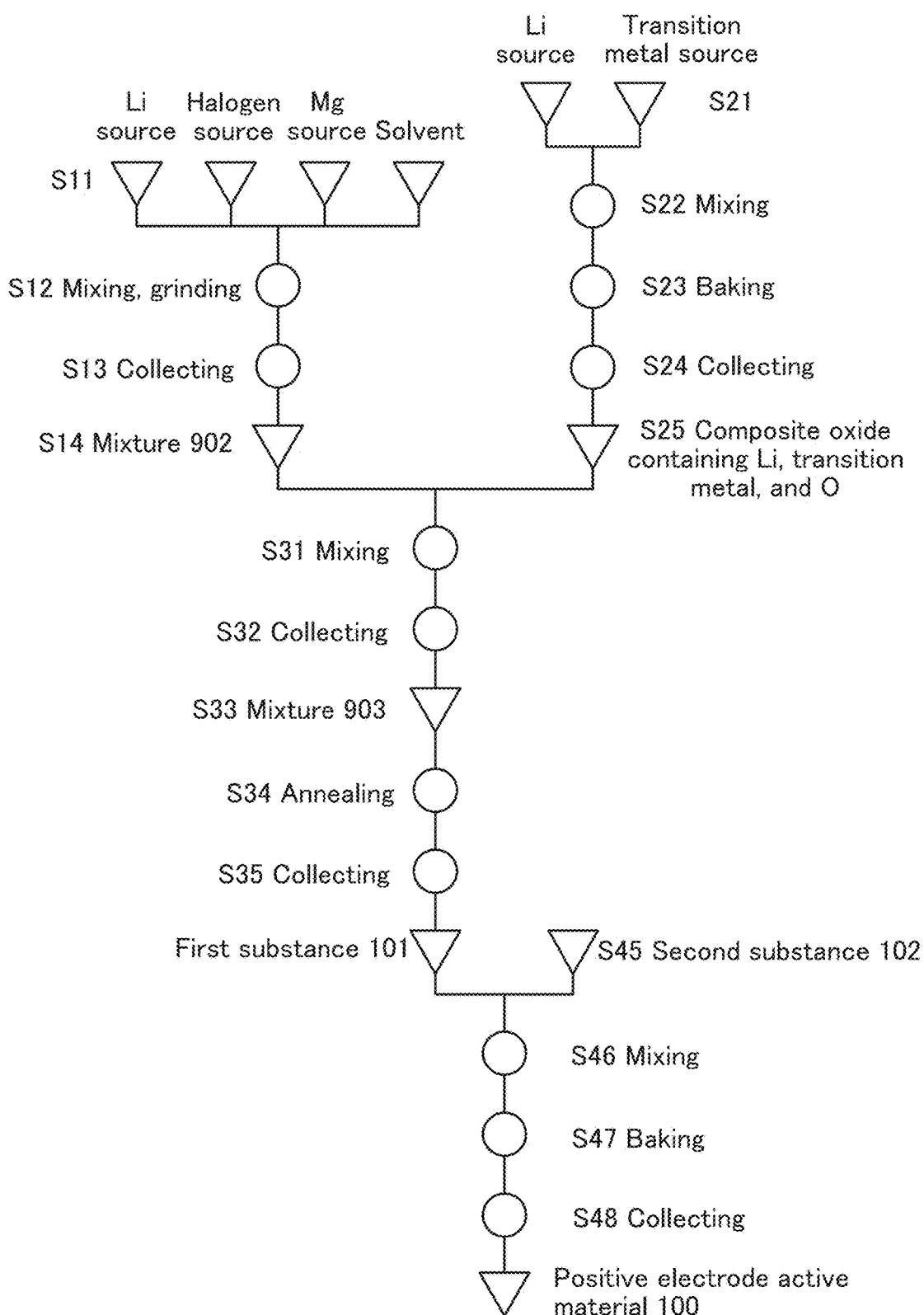
FIG. 6 illustrates an example of a formation method of a positive electrode active material of one embodiment of the present invention.
Figure 7:
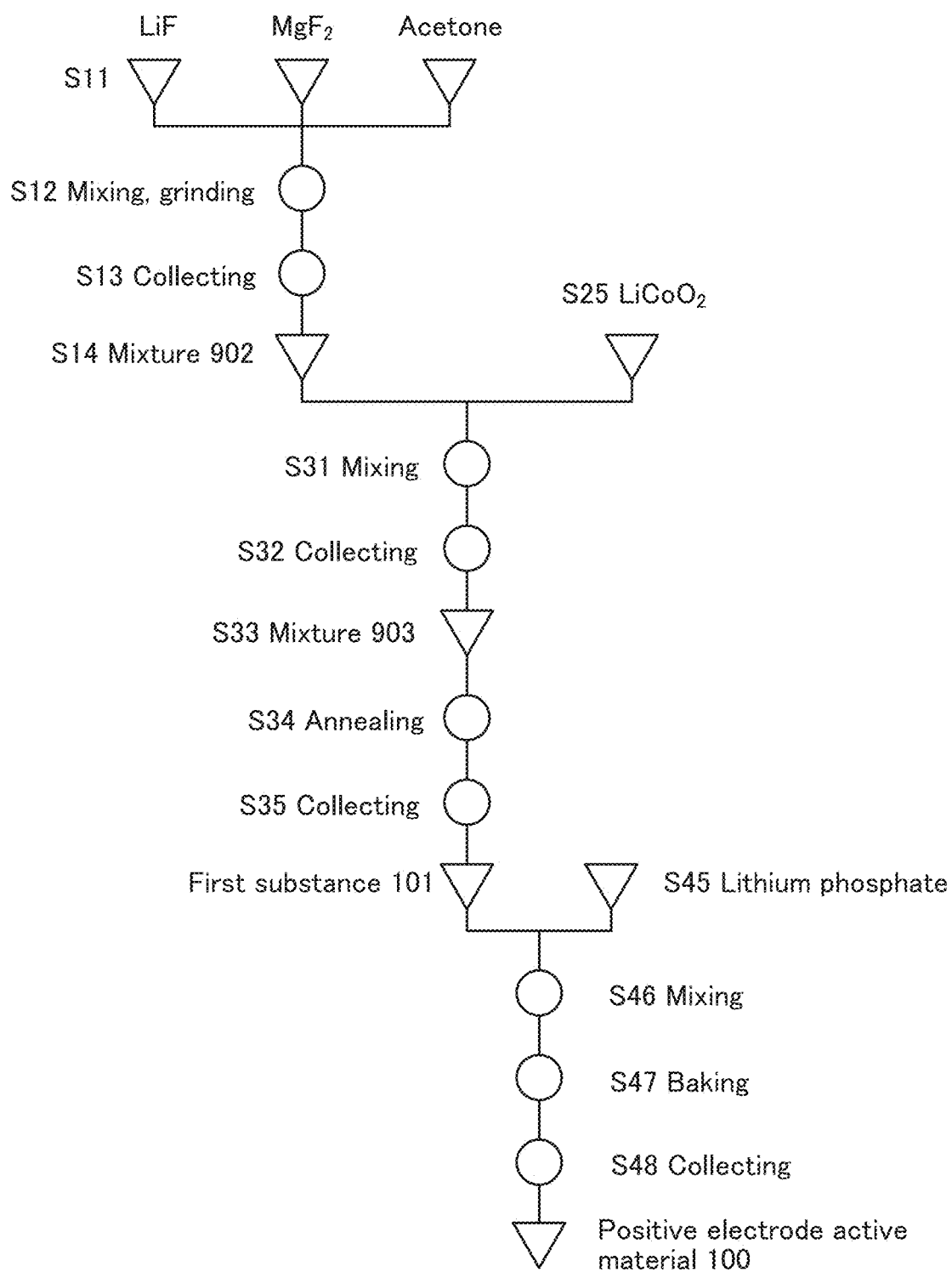
FIG. 7 illustrates an example of a formation method of a positive electrode active material of one embodiment of the present invention.

Next, another example of a formation method of the positive electrode active material 100, which is one embodiment of the present invention, is described using FIG. 6. In addition, FIG. 7 shows another more specific example of the formation method.

<Step S11>

As shown in Step S11 in FIG. 6, a halogen source such as a fluorine source or a chlorine source and a magnesium source are prepared as materials of a mixture 902. In addition, a lithium source is preferably prepared as well.

As the fluorine source, for example, lithium fluoride, magnesium fluoride, or the like can be used. Among them, lithium fluoride, which has a relatively low melting point of 848° C., is preferable because it is easily melted in an annealing step described later. As the chlorine source, for example, lithium chloride, magnesium chloride, or the like can be used. As the magnesium source, for example, magnesium fluoride, magnesium oxide, magnesium hydroxide, magnesium carbonate, or the like can be used. As the lithium source, for example, lithium fluoride or lithium carbonate can be used. That is, lithium fluoride can be used as both the lithium source and the fluorine source. In addition, magnesium fluoride can be used as both the fluorine source and the magnesium source.

In this embodiment, lithium fluoride LiF is prepared as the fluorine source and the lithium source, and magnesium fluoride $MgF_2$ is prepared as the fluorine source and the magnesium source (Step S11 in FIG. 7). When lithium fluoride LiF and magnesium fluoride $MgF_2$ are mixed at approximately LiF:$MgF_2$=65:35 (molar ratio), the effect of reducing the melting point becomes the highest (Non-Patent Document 4). On the other hand, when the amount of lithium fluoride increases, cycle performance might deteriorate because of a too large amount of lithium. Therefore, the molar ratio of lithium fluoride LiF to magnesium fluoride $MgF_2$ is preferably LiF:$MgF_2$=x:1 ($0 \leq x \leq 1.9$), further preferably LiF:$MgF_2$=x:1 ($0.1 \leq x \leq 0.5$), still further preferably LiF:$MgF_2$=x:1 (x=the vicinity of 0.33). Note that in this specification and the like, the vicinity means a value greater than 0.9 times and smaller than 1.1 times a certain value.

In addition, in the case where the following mixing and grinding steps are performed by a wet process, a solvent is prepared. As the solvent, ketone such as acetone; alcohol such as ethanol or isopropanol; ether; dioxane; acetonitrile; N-methyl-2-pyrrolidone (NMP); or the like can be used. An aprotic solvent that hardly reacts with lithium is further preferably used. In this embodiment, acetone is used (see Step S11 in FIG. 7).

<Step S12>

Next, the materials of the mixture 902 are mixed and ground (Step S12 in FIG. 6 and FIG. 7). Although the mixing can be performed by a dry process or a wet process, the wet process is preferable because the materials can be ground to a smaller size. For example, a ball mill, a bead mill, or the like can be used for the mixing. When the ball mill is used, a zirconia ball is preferably used as media, for example. The mixing step and the grinding step are preferably performed sufficiently to pulverize the mixture 902.

<Step S13, Step S14>

The materials mixed and ground in the above are collected (Step S13 in FIG. 6 and FIG. 7), whereby the mixture 902 is obtained (Step S14 in FIG. 6 and FIG. 7).

The mixture 902 preferably has an average particle diameter (D50: also referred to as a median diameter) of greater than or equal to 600 nm and less than or equal to 20 μm, further preferably greater than or equal to 1 μm and less than or equal to 10 μm, for example. When mixed with the composite oxide containing lithium, the transition metal, and oxygen in a later step, the mixture 902 pulverized to such a small size is easily attached to the surface of the composite oxide particle uniformly. The mixture 902 is preferably attached to the surface of the composite oxide particle uniformly because both halogen and magnesium are easily distributed to the surface portion of the composite oxide particle after heating. When there is a region containing neither halogen nor magnesium in the surface portion, a pseudo-spinel crystal structure, which is described later, might be less likely to be obtained, in the charged state.

<Step S21 to Step S25>

Next, the composite oxide containing lithium, the transition metal, and oxygen is obtained through Step S21 to Step S25. The description of FIG. 4 and FIG. 5 may be referred to for Step S21 to Step S25.

<Step S31>

Next, the mixture 902 and the composite oxide containing lithium, the transition metal, and oxygen are mixed (Step S31 in FIG. 6 and FIG. 7). The atomic ratio of the transition metal TM in the composite oxide containing lithium, the transition metal, and oxygen to magnesium $Mg_{Mix1}$ contained in the mixture 902 Mix1 is preferably TM:$Mg_{Mix1}$=1:y (0.0005≤y≤0.03), further preferably TM:$Mg_{Mix1}$=1:y (0.001≤y≤0.01), still further preferably approximately TM:$Mg_{Mix1}$=1:0.005.

The condition of the mixing in Step S31 is preferably milder than that of the mixing in Step S12 not to damage the particles of the composite oxide. For example, a condition with a lower rotation frequency or shorter time than the mixing in Step S12 is preferable. In addition, it can be said that the dry process has a milder condition than the wet process. For example, a ball mill, a bead mill, or the like can be used for the mixing. When the ball mill is used, a zirconia ball is preferably used as media, for example.

<Step S32, Step S33>

The materials mixed in the above are collected (Step S32 in FIG. 6 and FIG. 7), whereby a mixture 903 is obtained (Step S33 in FIG. 6 and FIG. 7).

Note that this embodiment describes a method for adding the mixture of lithium fluoride and magnesium fluoride to lithium cobalt oxide with few impurities; however, one embodiment of the present invention is not limited thereto. A mixture obtained through baking after addition of a magnesium source and a fluorine source to the starting material of lithium cobalt oxide may be used instead of the mixture 903 in Step S33. In that case, there is no need to separate Step S11 to Step S14 and Step S21 to Step S25, which is simple and productive.

Alternatively, lithium cobalt oxide to which magnesium and fluorine are added in advance may be used. When lithium cobalt oxide to which magnesium and fluorine are added is used, the process can be simpler because the steps up to Step S32 can be omitted.

In addition, a magnesium source and a fluorine source may be further added to the lithium cobalt oxide to which magnesium and fluorine are added in advance.

<Step S34>

Next, the mixture 903 is heated. This step is referred to as annealing or second heating to distinguish this step from the heating step performed before.

The annealing is preferably performed at an appropriate temperature for an appropriate time. The appropriate temperature and time depend on the conditions such as the particle size and the composition of the composite oxide containing lithium, the transition metal, and oxygen in Step S25. In the case where the particle size is small, the annealing is preferably performed at a lower temperature or for a shorter time than the case where the particle size is large, in some cases.

When the average particle diameter (D50) of the particles in Step S25 is approximately 12 μm, the annealing temperature is preferably higher than or equal to 600° C. and lower than or equal to 950° C., for example. The annealing time is preferably longer than or equal to three hours, further preferably longer than or equal to 10 hours, still further preferably longer than or equal to 60 hours, for example.

On the other hand, when the average particle diameter (D50) of the particles in Step S25 is approximately 5 μm, the annealing temperature is preferably higher than or equal to 600° C. and lower than or equal to 950° C., for example. The annealing time is preferably longer than or equal to one hour and shorter than or equal to 10 hours, further preferably approximately two hours, for example.

The temperature decreasing time after the annealing is, for example, preferably longer than or equal to 10 hours and shorter than or equal to 50 hours.

It is considered that when the mixture 903 is annealed, a material having a low melting point (e.g., lithium fluoride, which has a melting point of 848° C.) in the mixture 902 is melted first and distributed to the surface portion of the composite oxide particle. Next, the existence of the melted material decreases the melting points of other materials, presumably resulting in melting of the other materials. For example, magnesium fluoride (having a melting point of 1263° C.) is presumably melted and distributed to the surface portion of the composite oxide particle.

Then, the elements that are contained in the mixture 902 and are distributed to the surface portion probably form a solid solution in the composite oxide containing lithium, the transition metal, and oxygen.

The elements contained in the mixture 902 diffuse faster in the surface portion of the composite oxide particle and the vicinity of the grain boundary than in the inner portion. Therefore, the concentrations of magnesium and halogen in the surface portion and the vicinity of the grain boundary are higher than those of magnesium and halogen in the inner portion. As described later, the higher the magnesium concentration in the surface portion and the vicinity of the grain boundary is, the more effectively the change in the crystal structure can be inhibited.

<Step S35>

The materials annealed in the above are collected, so that the first substance 101 is obtained.

<Step S45>

Next, the compound containing the element A is prepared as the source material 901 (Step S45 in FIG. 6 and FIG. 7). The description of FIG. 4 and FIG. 5 can be referred to for Step S45.

<Step S46>

Next, the source material 901 obtained in Step S45 and the first substance 101 obtained in Step S35 are mixed (Step S46 in FIG. 4). It is preferable to mix the source material 901 at 0.01 mol to 0.1. mol inclusive, further preferably at 0.02 mol to 0.08 mol inclusive with respect to 1 mol of the first substance 101 obtained in Step S25. For example, a ball mill, a bead mill, or the like can be used for the mixing. The powder obtained after the mixing may be classified using a sieve.

<Step S47 and Step S48>

Next, the positive electrode active material 100 is obtained through Step S47 and Step S48. The description of FIG. 4 and FIG. 5 can be referred to for Step S47 and Step S48.

The positive electrode active material 100 is formed using the formation method illustrated in FIG. 6 and FIG. 7, whereby the positive electrode active material 100 with the pseudo-spinel crystal structure when the depth of charge is approximately 0.88 that is the sufficiently charged state can be obtained in some cases. The pseudo-spinel crystal structure is described in detail in the following embodiment.

[Fabrication Method of Positive Electrode]

As an example, a method for fabricating a positive electrode such that a slurry is formed and coating of the slurry is performed will be described.

A solvent used for formation of the slurry is preferably a polar solvent. For example, water, methanol, ethanol, acetone, tetrahydrofuran (THF), dimethylformamide (DMF), N-methylpyrrolidone (NMP), dimethyl sulfoxide (DMSO), or a mixed solution of two or more of the above can be used.

First, a positive electrode active material, a conductive additive, and a binder are mixed to form a mixture J. Next, the solvent is added to the mixture J and mixing is performed, so that a mixture K is formed. Here, in forming the mixture K, kneading (mixing with a high viscosity) may be performed.

In the mixing and kneading steps in each step, a mixer may be used, for example.

Then, the viscosity of the mixture K is measured. After that, a solvent is added as needed to adjust the viscosity. Through the above steps, slurry for coating a positive electrode active material layer is obtained.

Next, a method for forming a positive electrode active material layer over a current collector with the use of the formed slurry will be described.

First, the slurry is applied to a current collector. Before the application of the slurry, surface treatment may be performed on the current collector. Examples of such surface treatment are corona discharge treatment, plasma treatment, undercoat treatment, and the like. Here, the "undercoat" refers to a film formed over a current collector before application of slurry onto the current collector for the purpose of reducing the interface resistance between a positive electrode active material layer and the current collector or increasing the adhesion between the positive electrode active material layer and the current collector. Note that the undercoat is not necessarily formed in a film shape, and may be formed in an island shape. In addition, the undercoat may serve as an active material to have capacity. For the undercoat, a carbon material can be used, for example. Examples of the carbon material include graphite, carbon black such as acetylene black and ketjen black (registered trademark), and a carbon nanotube.

For the application of the slurry, a slot die method, a gravure method, a blade method, or a combination of any of them can be used, for example. Furthermore, a continuous coater or the like may be used for the application.

Then, the solvent of the slurry is volatilized to form the positive electrode active material layer 203.

The step of volatilizing the solvent of the slurry is preferably performed at a temperature in the range from 50° C. to 200° C. inclusive, further preferably from 60° C. to 150° C. inclusive.

The thickness of the positive electrode active material layer 203 formed in the above-described manner is preferably greater than or equal to 5 μm and less than or equal to 300 μm, further preferably greater than or equal to 10 μm and less than or equal to 150 μm, for example.

The positive electrode active material layers 203 may be formed on both surfaces of the current collector, or the positive electrode active material layer 203 may be formed on only one surface of the current collector. Alternatively, both surfaces may partly have a region in which the positive electrode active material layer 203 is formed.

After the volatilization of the solvent from the positive electrode active material layer 203, pressing is preferably performed by a compression method such as a roll press method or a flat plate press method. In performing pressing, heat may be applied.

By performing pressing of the positive electrode, the capacity per volume of the secondary battery can be improved. For example, in the case where the first substance contains lithium cobalt oxide, the density of the positive electrode active material layer is preferably higher than or equal to 2.0 g/cc and lower than or equal to 5.0 g/cc, further preferably higher than or equal to 3.5 g/cc and lower than or equal to 4.5 g/cc.

The pressure in the pressing is higher than or equal to 100 kN/m and lower than or equal to 3000 kN/m, preferably higher than or equal to 500 kN/m and lower than or equal to 2500 kN/m.

By performing the pressing of the positive electrode, a crack is generated in the first substance 101 in some cases. In addition, the adhesion between the first substance 101 and the third substance 103 is improved in some cases. Moreover, the load on the first substance 101 due to the pressing can be reduced.

Here, the second substance 102 and the third substance 103 each preferably have lower hardness than the first substance 101. With low hardness, the third substance 103 easily enters between the plurality of first substances 101 in the pressing in some cases, for example.

In contrast, by the pressing of the positive electrode, a very large crack might be generated in the active material. With the use of the active material and the active material layer of embodiments of the present invention, a very large crack can be inhibited from being generated in the active material in some cases.

This embodiment can be implemented in appropriate combination with any of the other embodiments.

Embodiment 2

In this embodiment, a structure of a positive electrode active material of one embodiment of the present invention, and the like are described.

Figure 12:
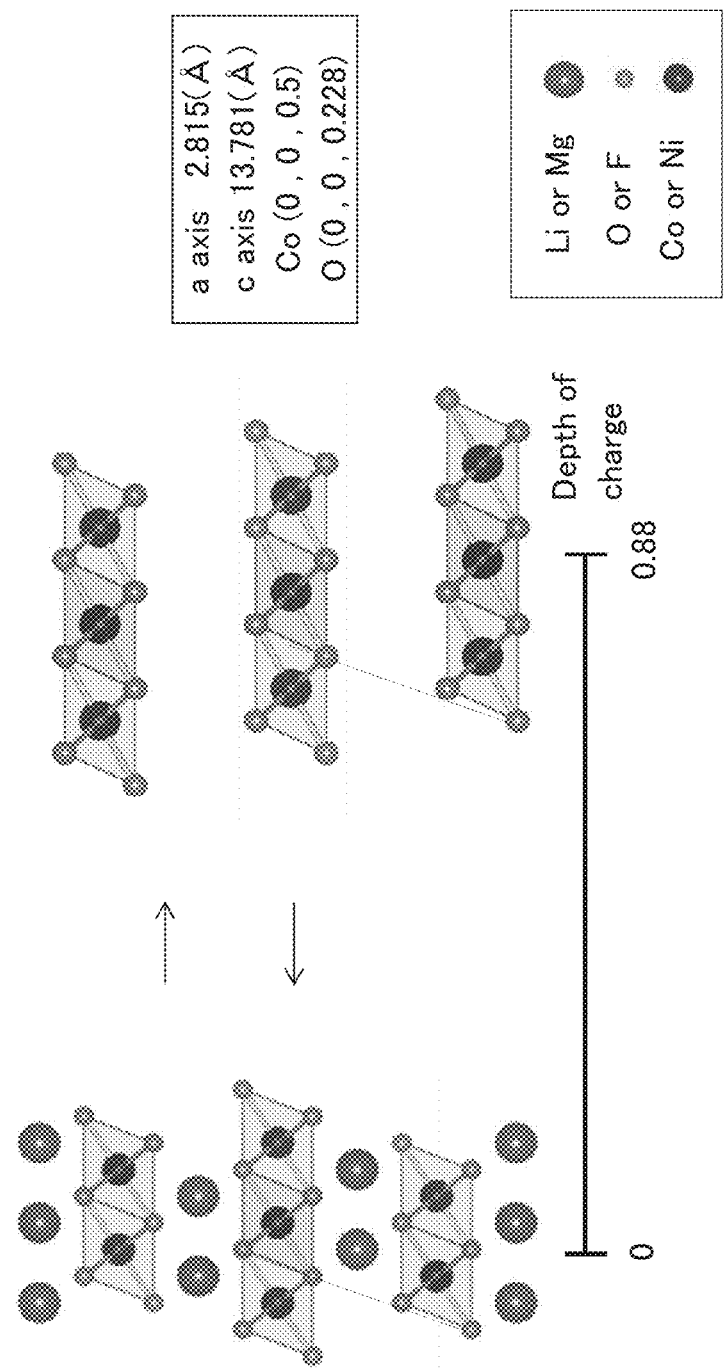
FIG. 12 is a diagram illustrating the depth of charge and crystal structures of a positive electrode active material.

The positive electrode active material that can be formed by the method in Embodiment 1 is described with reference to FIG. 11 and FIG. 12. In FIG. 11 and FIG. 12, the case where cobalt is used as a transition metal contained in the positive electrode active material is described.

[Positive Electrode Active Material 1]

The crystal structure of lithium cobalt oxide $LiCoO_2$, which is one kind of positive electrode active material, changes depending on the depth of charge. FIG. 12 illustrates typical crystal structures of lithium cobalt oxide.

As illustrated in FIG. 12, lithium cobalt oxide with a depth of charge of 0 (in the discharged state) includes a region having the crystal structure of the space group R-3m, and includes three $CoO_2$ layers in a unit cell. Thus, this crystal structure is referred to as an O3-type crystal structure in some cases. Note that the $CoO_2$ layer has a structure in which octahedral geometry with oxygen atoms hexacoordinated to cobalt continues on a plane in the edge-sharing state.

Furthermore, when the depth of charge is 1, $LiCoO_2$ has the crystal structure of the space group P-3 ml, and one $CoO_2$ layer exists in a unit cell. Thus, this crystal structure is referred to as an O1-type crystal structure in some cases.

Moreover, lithium cobalt oxide when the depth of charge is approximately 0.88 has the crystal structure of the space group R-3m. This structure can also be regarded as a structure in which $CoO_2$ structures such as P-3 ml(O1) and LiCoO$_2$ structures such as R-3m(O3) are alternately stacked. Thus, this crystal structure is referred to as an H1-3 type crystal structure in some cases. Note that the number of cobalt atoms per unit cell in the actual H1-3 type crystal structure is twice as large as that of cobalt atoms per unit cell in other structures. However, in this specification including FIG. 12, the c-axis of the H1-3 type crystal structure is half that of the unit cell for easy comparison with the other structures.

When high-voltage charging with a depth of charge of approximately 0.88 or more and discharging are repeated, the crystal structure of lithium cobalt oxide repeatedly changes between the H1-3 type crystal structure and the R-3m(O3) structure in the discharged state (i.e., an unbalanced phase change).

However, there is a large deviation in the position of the CoO$_2$ layer between these two crystal structures. As indicated by dotted lines and arrows in FIG. 12, the CoO$_2$ layer in the H1-3 type crystal structure largely shifts from that in the R-3m(O3) structure. Such a dynamic structural change might adversely affect the stability of the crystal structure.

A difference in volume is also large. A difference in volume in comparison with the same number of cobalt atoms between the H1-3 type crystal structure and the O3-type crystal structure in the discharged state is 3.5% or more.

In addition, a structure in which CoO$_2$ layers are arranged in a successive manner, as in P-3 m1(O1), included in the H1-3 type crystal structure is highly likely to be unstable.

Thus, the repeated high-voltage charging and discharging break the crystal structure of lithium cobalt oxide in some cases.

[Positive Electrode Active Material 2]
<Inner Portion>

FIG. 11 illustrates other examples of the crystal structures of the positive electrode active material before and after charging and discharging.

The crystal structure with a depth of charge of 0 (in the discharged state) in FIG. 12 belongs to R-3m(O3) as in FIG. 12. By contrast, the positive electrode active material in FIG. 11 has a crystal with a structure different from that in FIG. 12 when it is sufficiently charged and has a depth of charge of approximately 0.88. The crystal structure of the space group R-3m is referred to as a pseudo-spinel crystal structure in this specification and the like. Note that although the indication of lithium is omitted in the diagram of the pseudo-spinel crystal structure shown in FIG. 11 for explaining the symmetry of cobalt atoms and the symmetry of oxygen atoms, lithium practically exists between CoO$_2$ layers at approximately 12 atomic % with respect to cobalt. In addition, in both the O3-type crystal structure and the pseudo-spinel crystal structure, magnesium preferably exists between the CoO$_2$ layers, i.e., in lithium sites, at a slight concentration. In addition, it is preferable that halogen such as fluorine randomly exist in oxygen sites at a slight concentration.

In the positive electrode active material 100, a change in the crystal structure when high-voltage charging is performed and a large amount of lithium is extracted is inhibited. As indicated by dotted lines in FIG. 11, for example, there is a very little deviation in the CoO$_2$ layers between the crystal structures.

In addition, in the positive electrode active material 100, a difference in the volume per unit cell between the O3-type crystal structure with a depth of charge of 0 and the pseudo-spinel crystal structure with a depth of charge of 0.88 is less than or equal to 2.5%, more specifically, less than or equal to 2.2%.

Thus, the crystal structure is unlikely to be broken by repeated high-voltage charging and discharging.

Note that in the unit cell of the pseudo-spinel crystal structure, coordinates of cobalt and oxygen can be represented by Co (0, 0, 0.5) and O (0, 0, x) within the range of 0.20≤x≤0.25.

Magnesium randomly existing between the CoO$_2$ layers, i.e., in the lithium sites, at a slight concentration has an effect of inhibiting a deviation of the CoO$_2$ layers. Thus, when magnesium exists between the CoO$_2$ layers, the pseudo-spinel crystal structure is likely to be formed. Therefore, magnesium is preferably distributed over a particle of the positive electrode active material 100. In addition, to distribute magnesium over the particle, heat treatment is preferably performed in a formation process of the positive electrode active material 100.

However, cation mixing occurs when the heat treatment temperature is excessively high, so that magnesium is highly likely to enter the cobalt sites. Magnesium in the cobalt sites loses the effect of maintaining the R-3m structure. Furthermore, when the heat treatment temperature is excessively high, adverse effects such as reduction of cobalt to have a valence of two and transpiration of lithium are concerned.

In view of the above, a halogen compound such as a fluorine compound is preferably added to lithium cobalt oxide before the heat treatment for distributing magnesium over the particle. The addition of the halogen compound decreases the melting point of lithium cobalt oxide. The decrease in the melting point makes it easier to distribute magnesium over the particle at a temperature at which the cation mixing is unlikely to occur. Furthermore, the fluorine compound probably increases corrosion resistance to hydrofluoric acid generated by decomposition of an electrolyte solution.

Note that although the case where the positive electrode active material 100 is a composite oxide containing lithium, cobalt, and oxygen is described so far, nickel may be contained in addition to cobalt. In that case, the proportion of nickel atoms (Ni) in the sum of cobalt atoms and nickel atoms (Co+Ni) (Ni/(Co+Ni)) is preferably less than 0.1, further preferably less than or equal to 0.075.

When a high-voltage charged state is held for a long time, the transition metal dissolves in the electrolyte solution from the positive electrode active material, and the crystal structure might be broken. However, when nickel is contained at the above proportion, dissolution of the transition metal from the positive electrode active material 100 can be inhibited in some cases.

The addition of nickel decreases charging and discharging voltages, and thus, charging and discharging can be executed at a lower voltage in the case of the same capacity. As a result, dissolution of the transition metal and decomposition of the electrolyte solution might be inhibited. Here, the charging and discharging voltages are, for example, voltages within the range from a depth of charge of 0 to a predetermined depth of charge.

<Surface Portion>

Magnesium is preferably distributed over the particle of the positive electrode active material 100, and further preferably, the magnesium concentration in the surface portion of the particle is higher than the average in the particle. In other words, the magnesium concentration in the surface portion of the particle that is measured by XPS or the like is preferably higher than the average magnesium concentration in the particle measured by ICP-MS or the like. The entire surface of the particle is a kind of crystal defects and lithium is extracted from the surface during charging; thus, the lithium concentration in the surface of the particle tends to be lower than that in the inner portion of the particle. Therefore, the surface of the particle tends to be unstable and its crystal structure is likely to be broken. The higher the magnesium concentration in the surface portion is, the more effectively the change in the crystal structure can be inhibited. In addition, a high magnesium concentration in the surface portion probably increases the corrosion resistance to hydrofluoric acid generated by the decomposition of the electrolyte solution.

In addition, the concentration of halogen such as fluorine in the surface portion of the positive electrode active material 100 is preferably higher than the average concentration of halogen such as fluorine in the particle. When halogen exists in the surface portion that is a region in contact with the electrolyte solution, the corrosion resistance to hydrofluoric acid can be effectively increased.

In this manner, the surface portion of the positive electrode active material 100 preferably has higher concentrations of magnesium and fluorine than those in the inner portion and a composition different from that in the inner portion. In addition, the composition preferably has a crystal structure stable at normal temperature. Thus, the surface portion may have a crystal structure different from that of the inner portion. For example, at least part of the surface portion of the positive electrode active material 100 may have a rock-salt crystal structure. Furthermore, in the case where the surface portion and the inner portion have different crystal structures, the orientations of crystals in the surface portion and the inner portion are preferably substantially aligned.

Note that in the surface portion where only MgO is contained or MgO and CoO(II) form a solid solution, it is difficult to insert and extract lithium. Thus, the surface portion should contain at least cobalt, and further contain lithium in the discharged state to have a path through which lithium is inserted and extracted. In addition, the cobalt concentration is preferably higher than the magnesium concentration.

<Grain Boundary>

A slight amount of magnesium or halogen contained in the positive electrode active material 100 may randomly exist in the inner portion, but part of the element is further preferably segregated at a grain boundary.

In other words, the magnesium concentration in the crystal grain boundary and its vicinity of the positive electrode active material 100 is preferably higher than that in the other regions in the inner portion. In addition, the halogen concentration in the crystal grain boundary and its vicinity is also preferably higher than that in the other regions in the inner portion.

Like the particle surface, the crystal grain boundary is also a plane defect. Thus, the crystal grain boundary tends to be unstable and its crystal structure easily starts to change. Therefore, the higher the magnesium concentration in the crystal grain boundary and its vicinity is, the more effectively the change in the crystal structure can be inhibited.

Furthermore, even when cracks are generated along the crystal grain boundary of the particle of the positive electrode active material 100, high concentrations of magnesium and halogen in the crystal grain boundary and its vicinity increase the concentrations of magnesium and halogen in the vicinity of a surface generated by the cracks. Thus, the positive electrode active material after the cracks are generated can also have increased corrosion resistance to hydrofluoric acid.

Note that in this specification and the like, the vicinity of the crystal grain boundary refers to a region of approximately 10 nm from the grain boundary.

<Particle Diameter>

A too large particle diameter of the positive electrode active material 100 causes problems such as difficulty in lithium diffusion and too much surface roughness of an active material layer in coating a current collector. By contrast, a too small particle diameter also causes problems such as difficulty in supporting the active material layer in coating the current collector and overreaction with an electrolyte solution. Therefore, D50 is preferably greater than or equal to 1 μm and less than or equal to 100 μm, further preferably greater than or equal to 2 μm and less than or equal to 40 μm, still further preferably greater than or equal to 5 μm and less than or equal to 30 μm.

[Analysis Method]

Whether or not a positive electrode active material is the positive electrode active material having the pseudo-spinel crystal structure when charged with high voltage can be determined by analyzing a high-voltage charged positive electrode using XRD, electron diffraction, neutron diffraction, electron spin resonance (ESR), nuclear magnetic resonance (NMR), or the like. The XRD is particularly preferable because the symmetry of a transition metal such as cobalt contained in the positive electrode active material can be analyzed with high resolution, the degrees of crystallinity and the crystal orientations can be compared, the distortion of lattice periodicity and the crystallite size can be analyzed, and a positive electrode obtained by disassembling a secondary battery can be measured without any change with sufficient accuracy, for example.

A positive electrode active material having the pseudo-spinel crystal structure when charged with high voltage has a feature in a small change in the crystal structure between a high-voltage charged state and a discharged state as described above. A material where 50 wt % or more of the crystal structure largely changes between the high-voltage charged state and the discharged state is not preferable because the material cannot withstand the high-voltage charging and discharging. In addition, it should be noted that an objective crystal structure is not obtained in some cases only by addition of impurity elements. For example, although the positive electrode active material that is lithium cobalt oxide containing magnesium and fluorine is a commonality, the positive electrode active material has 60 wt % or more of the pseudo-spinel crystal structure in some cases, and has 50 wt % or more of the H1-3 type crystal structure in other cases, when charged with high voltage. Furthermore, at a predetermined voltage, the positive electrode active material has almost 100 wt % of the pseudo-spinel crystal structure, and with an increase in the predetermined voltage, the H1-3 type crystal structure is generated in some cases. Thus, to determine whether or not a positive electrode active material has the pseudo-spinel crystal structure when charged with high voltage, crystal structure analysis by XRD or the like is required.

Note that a positive electrode active material in the high-voltage charged state or the discharged state sometimes causes a change in the crystal structure when exposed to air. For example, the pseudo-spinel crystal structure changes into the H1-3 type crystal structure in some cases. Thus, all samples are preferably handled in an inert atmosphere such as an argon atmosphere.

<Charging Method>

High-voltage charging for determining whether or not a composite oxide is the positive electrode active material having the pseudo-spinel crystal structure when charged with high voltage can be performed on a coin cell (CR2032 type with a diameter of 20 mm and a height of 3.2 mm) with a lithium counter electrode, for example.

More specifically, a positive electrode current collector made of aluminum foil that is coated with slurry in which a positive electrode active material, a conductive additive, and a binder are mixed can be used as a positive electrode.

A lithium metal can be used for the counter electrode. Note that when a material other than the lithium metal is used for the counter electrode, the potential of a secondary battery differs from the potential of the positive electrode. Unless otherwise specified, voltages and potentials in this specification and the like refer to the potentials of a positive electrode.

As an electrolyte contained in an electrolyte solution, 1 mol/L lithium hexafluorophosphate ($LiPF_6$) can be used. As the electrolyte solution, a solution in which ethylene carbonate (EC) and diethyl carbonate (DEC) at EC:DEC=3:7 (volume ratio) and vinylene carbonate (VC) at 2 wt % are mixed can be used.

As a separator, 25-μm-thick polypropylene can be used.

A positive electrode can and a negative electrode can that are formed using stainless steel (SUS) can be used.

The coin cell manufactured under the above conditions is charged with constant current at 4.6 V and 0.5 C and then charged with constant voltage until the current value reaches 0.01 C. Note that here, 1 C is set to 137 mA/g. The temperature is set to 25° C. After the charging is performed in this manner, the coin cell is disassembled in a glove box with an argon atmosphere and the positive electrode is taken out, whereby the high-voltage charged positive electrode active material can be obtained. In order to inhibit reaction with components in the external world, the positive electrode active material is preferably hermetically sealed in an argon atmosphere in performing various analyses later. For example, XRD can be performed on the positive electrode active material enclosed in an airtight container with an argon atmosphere.

<XRD>

Figure 13:
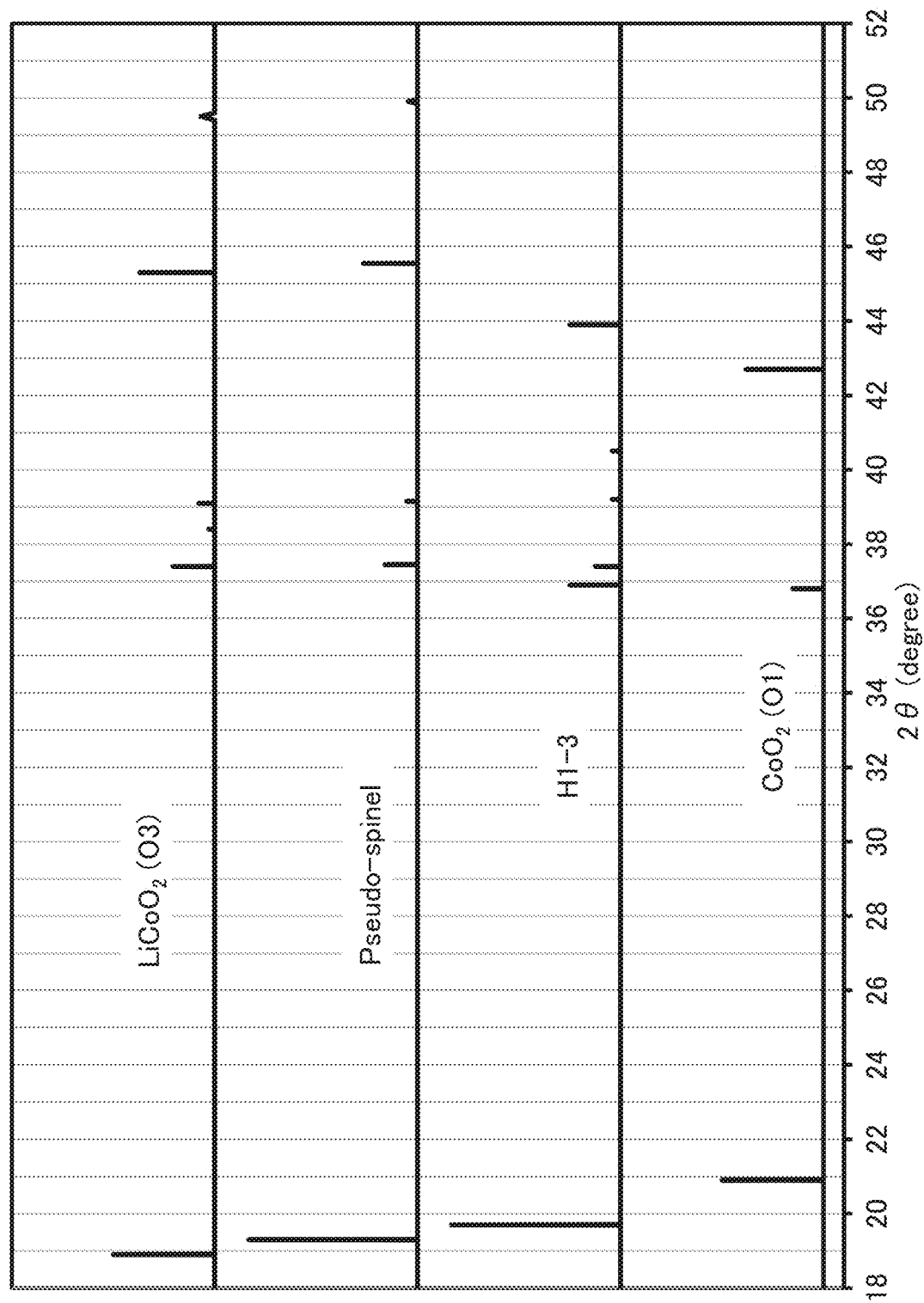
FIG. 13 shows XRD patterns calculated from crystal structures.

FIG. 13 shows ideal powder XRD patterns with the CuKα1 line that are calculated from models of the pseudo-spinel crystal structure and the H1-3 type crystal structure. In addition, for comparison, FIG. 13 also shows ideal XRD patterns calculated from the crystal structures of $LiCoO_2$ (O3) with a depth of charge of 0 and $CoO_2$(O1) with a depth of charge of 1. Note that the patterns of $LiCoO_2$(O3) and $CoO_2$(O1) are made from crystal structure data obtained from ICSD (Inorganic Crystal Structure Database) (See Non-Patent Document 5) using Reflex Powder Diffraction, which is a module of Materials Studio (BIOVIA). The range of 2θ is from 15° to 75°, Step size is 0.01, the wavelength λ1 is 1.540562×10$^{10}$ μm, λ2 is not set, and Monochromator is a single monochromator. The pattern of the H1-3 type crystal structure is made from the crystal structure data disclosed in Non-Patent Document 3 in a similar manner. The pattern of the pseudo-spinel crystal structure is estimated from the XRD pattern of the positive electrode active material of one embodiment of the present invention, the crystal structure is fitted with TOPAS ver. 3 (crystal structure analysis software manufactured by Bruker Corporation), and XRD patterns are made in a manner similar to those of other structures.

As shown in FIG. 13, the pseudo-spinel crystal structure has diffraction peaks at 2θ of 19.30±0.20° (greater than or equal to 19.10° and less than or equal to 19.50°) and 2θ of 45.55±0.10° (greater than or equal to 45.450 and less than or equal to 45.65°). More specifically, sharp diffraction peaks appear at 2θ of 19.30±0.100 (greater than or equal to 19.200 and less than or equal to 19.40°) and 2θ of 45.55±0.05° (greater than or equal to 45.500 and less than or equal to 45.60°). However, in the H1-3 type crystal structure and $CoO_2$(P-3 m1, O1), peaks at these positions do not appear. Thus, the peaks at 2θ of 19.30±0.20° and 2θ of 45.55±0.100 in the high-voltage charged state can be the features of the positive electrode active material 100 of one embodiment of the present invention.

It can also be said that the positions where the XRD diffraction peaks appear are close in the crystal structure with a depth of charge of 0 and the crystal structure in the high-voltage charged state. More specifically, a difference in the positions of two or more, further preferably three or more of the main diffraction peaks between both of the crystal structures is 2θ of less than or equal to 0.7, further preferably 2θ of less than or equal to 0.5.

Note that in the positive electrode active material having the pseudo-spinel crystal structure when charged with high voltage, all particles do not necessarily have the pseudo-spinel crystal structure. The particles may have another crystal structure, or some of the particles may be amorphous. Note that when the XRD patterns are analyzed by the Rietveld analysis, the pseudo-spinel crystal structure preferably accounts for more than or equal to 50 wt %, further preferably more than or equal to 60 wt %, still further preferably more than or equal to 66 wt %. The positive electrode active material in which the pseudo-spinel crystal structure accounts for more than or equal to 50 wt %, further preferably more than or equal to 60 wt %, still further preferably more than or equal to 66 wt % can have sufficiently good cycle performance.

Furthermore, even after 100 or more cycles of charging and discharging, the pseudo-spinel crystal structure preferably accounts for more than or equal to 35 wt %, further preferably more than or equal to 40 wt %, still further preferably more than or equal to 43 wt % when the Rietveld analysis is performed.

In addition, the crystallite size of the pseudo-spinel structure included in the positive electrode active material particle does not decrease to less than approximately one-tenth that of $LiCoO_2$(O3) in the discharged state. Thus, a clear peak of the pseudo-spinel crystal structure can be observed after the high-voltage charging even under the same XRD measurement conditions as those of a positive electrode before the charging and discharging. By contrast, simple $LiCoO_2$ has a small crystallite size and a broad small peak even when it can have a structure part of which is similar to the pseudo-spinel crystal structure. The crystallite size can be calculated from the half width of the XRD peak.

In addition, the layered rock-salt crystal structure included in the positive electrode active material particle in the discharged state, which can be estimated from the XRD patterns, preferably has a small lattice constant of the c-axis. The lattice constant of the c-axis increases when a foreign element is substituted at the lithium site or cobalt enters an oxygen-tetracoordinated site (A site), for example. For this reason, the positive electrode active material with excellent cycle performance probably can be manufactured by forming a composite oxide having a layered rock-salt crystal structure with few defects such as foreign element substitutions and $Co_3O_4$ having the spinel crystal structure and then mixing a magnesium source and a fluorine source with the composite oxide and inserting magnesium into the lithium site.

The lattice constant of the c-axis in the crystal structure of the positive electrode active material in the discharged state before annealing is preferably less than or equal to $14.060\times10^{-10}$ m, further preferably less than or equal to $14.055\times10^{-10}$ m, still further preferably less than or equal to $14.051\times10^{-10}$ m. The lattice constant of the c-axis after annealing is preferably less than or equal to $14.060\times10^{-10}$ m.

In order to set the lattice constant of the c-axis within the above range, the amount of impurities is preferably as small as possible. In particular, the amount of addition of transition metals other than cobalt, manganese, and nickel is preferably as small as possible; specifically, preferably less than or equal to 3000 ppm wt, further preferably less than or equal to 1500 ppm wt. In addition, cation mixing between lithium and cobalt, manganese, and nickel is preferably less likely to occur.

Note that features that are apparent from the XRD pattern are features of the inner structure of the positive electrode active material. In a positive electrode active material with an average particle diameter (D50) of approximately 1 μm to 100 μm, the volume of a surface portion is negligible compared with that of an inner portion; therefore, even when the surface portion of the positive electrode active material 100 has a crystal structure different from that of the inner portion, the crystal structure of the surface portion is highly unlikely to appear in the XRD pattern.

<ESR>

Figure 14A:
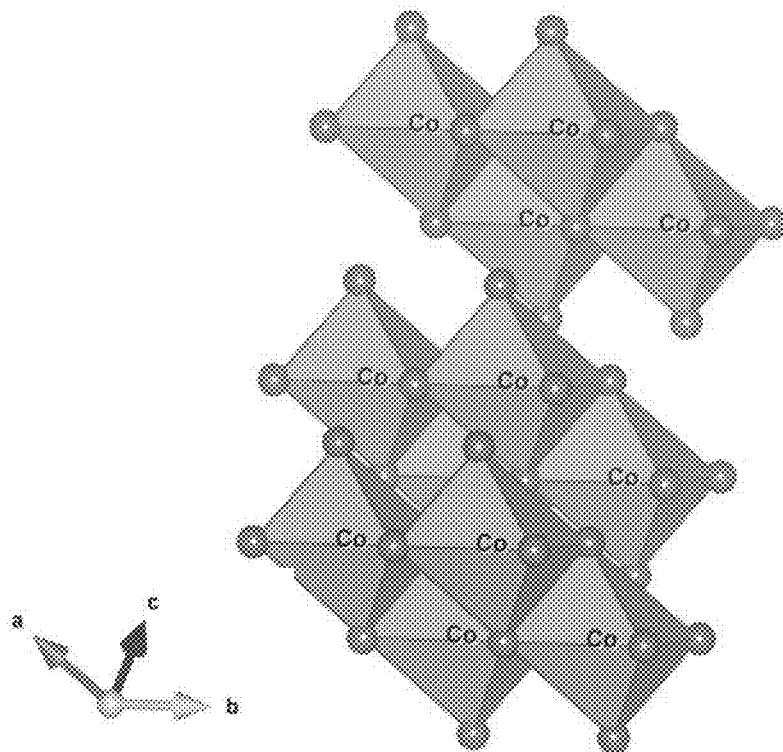
FIG. 14(A) is a diagram illustrating a crystal structure of a positive electrode active material of one embodiment of the present invention.
Figure 14B:
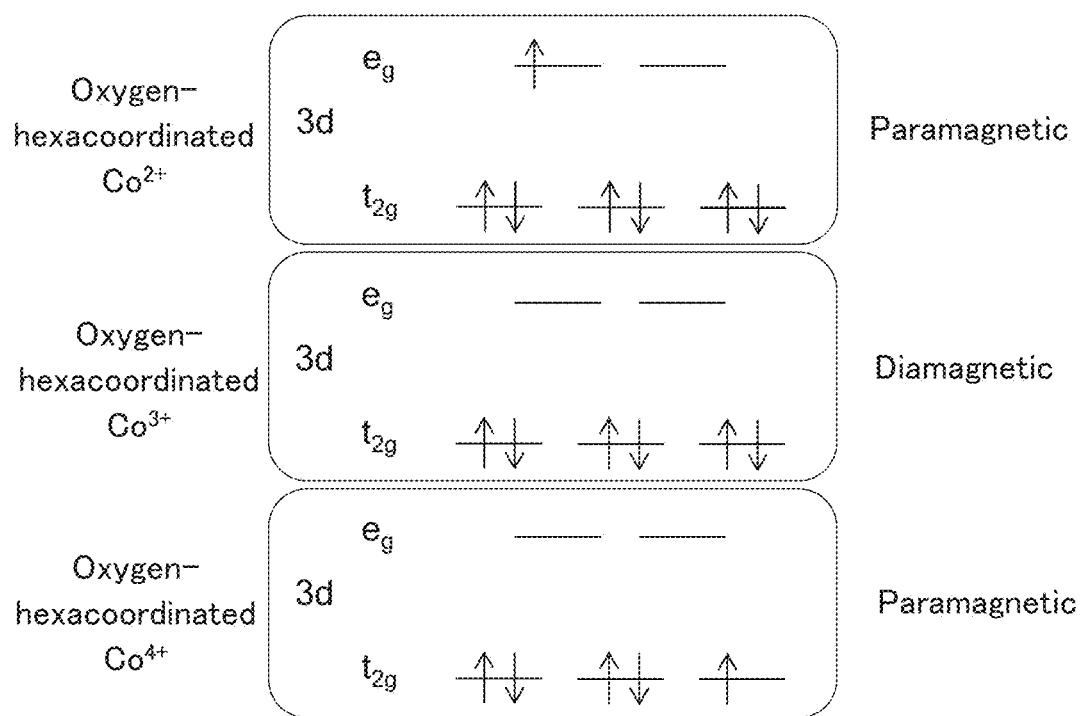
FIG. 14(B) shows the magnetism of a positive electrode active material of one embodiment of the present invention.
Figure 15A:
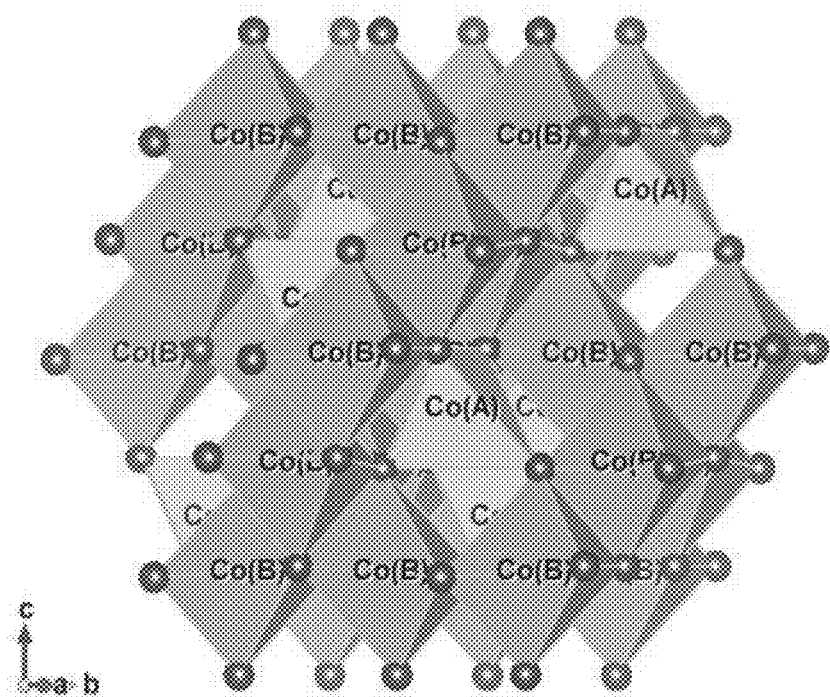
FIG. 15(A) is a diagram illustrating a crystal structure of a positive electrode active material.

Here, the case in which the difference between the pseudo-spinel crystal structure and another crystal structure is determined using ESR is described using FIG. 14 and FIG. 15. In the pseudo-spinel crystal structure, cobalt exists in the oxygen-hexacoordinated site, as illustrated in FIG. 11 and FIG. 14(A). In oxygen-hexacoordinated cobalt, a 3d orbital is divided into an $e_g$ orbital and a $t_{2g}$ orbital as shown in FIG. 14(B), and the energy of the $t_{2g}$ orbital located aside from the direction in which oxygen exists is low. Part of cobalt that exists in the oxygen-hexacoordinated site is cobalt of diamagnetic $Co^{3+}$ in which the entire $t_{2g}$ orbital is filled. However, another part of cobalt that exists in the oxygen-hexacoordinated site may be cobalt of paramagnetic $Co^{2+}$ or $Co^{4+}$. Although both $Co^{2+}$ and $Co^{4+}$ have one unpaired electron and thus cannot be distinguished by ESR, paramagnetic cobalt may have either valence depending on the valences of surrounding elements.

It is reported that in the case where a positive electrode active material does not have the pseudo-spinel crystal structure when charged with high voltage, the positive electrode active material can have the spinel crystal structure not containing lithium in its surface portion in the charged state. In that case, the positive electrode active material contains $Co_3O_4$ having the spinel crystal structure illustrated in FIG. 15(A).

When the spinel is represented by a general formula $A[B_2]O_4$, the element A is oxygen-tetracoordinated and the element B is oxygen-hexacoordinated. Thus, in this specification and the like, the oxygen-tetracoordinated site is referred to as an A site, and the oxygen-hexacoordinated site is referred to as a B site in some cases.

Figure 15B:
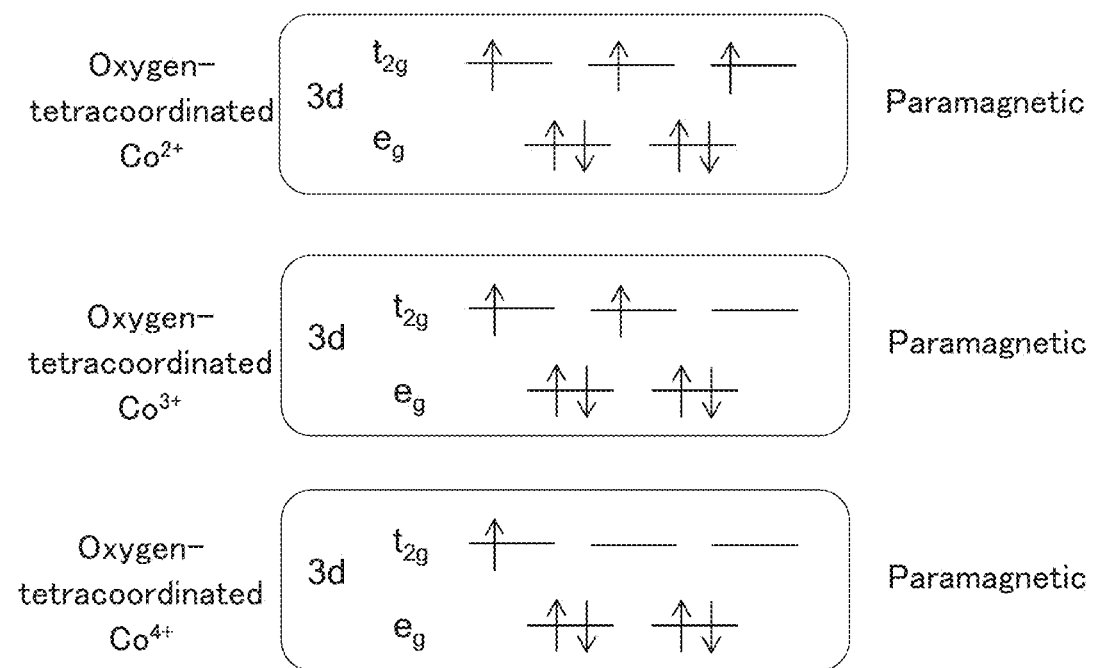
FIG. 15(B) shows the magnetism of a positive electrode active material of one embodiment of the present invention.

In $Co_3O_4$ having the spinel crystal structure, cobalt exists not only in the oxygen-hexacoordinated B site but also in the oxygen-tetracoordinated A site. In oxygen-tetracoordinated cobalt, between the divided $e_g$ orbital and $t_{2g}$ orbital, the $e_g$ orbital has lower energy as shown in FIG. 15(B). Thus, each of oxygen-tetracoordinated $Co^{2+}$, $Co^{3+}$, and $Co^{4+}$ includes an unpaired electron and therefore is paramagnetic. Accordingly, when the particles that sufficiently contain $Co_3O_4$ having the spinel crystal structure are analyzed by ESR or the like, peaks attributed to paramagnetic cobalt, oxygen-tetracoordinated $Co^{2+}$, $Co^{3+}$, or $Co^{4+}$ should be detected.

However, in the positive electrode active material having the pseudo-spinel crystal structure when charged with high voltage, peaks attributed to oxygen-tetracoordinated paramagnetic cobalt are too few to be observed. Thus, unlike the spinel crystal structure, the pseudo-spinel crystal structure in this specification and the like does not contain an enough amount of oxygen-tetracoordinated cobalt to be detected by ESR. Therefore, the peaks that are attributed to spinel-type $Co_3O_4$ and can be detected by ESR or the like in the positive electrode active material having the pseudo-spinel crystal structure when charged with high voltage are small or too few to be observed, in some cases. Spinel-type $Co_3O_4$ does not contribute to the charge and discharge reaction; thus, the amount of spinel-type $Co_3O_4$ is preferably as small as possible.

<XPS>

A region from the surface to a depth of approximately 2 to 8 nm (normally, approximately 5 nm) can be analyzed by X-ray photoelectron spectroscopy (XPS); thus, the concentration of each element in approximately half of the surface portion can be quantitatively analyzed. In addition, the bonding states of the elements can be analyzed by narrow scanning analysis. Note that the quantitative accuracy of XPS is approximately ±1 atomic % in many cases. The lower detection limit depends on the element but is approximately 1 atomic %.

When the positive electrode active material having the pseudo-spinel crystal structure when charged with high voltage is analyzed by XPS and the cobalt concentration is set to 1, the relative value of the magnesium concentration is preferably greater than or equal to 0.4 and less than or equal to 1.5, further preferably greater than or equal to 0.45 and less than 1.00. Furthermore, the relative value of the concentration of halogen such as fluorine is preferably greater than or equal to 0.05 and less than or equal to 1.5, further preferably greater than or equal to 0.3 and less than or equal to 1.00.

In addition, when the positive electrode active material having the pseudo-spinel crystal structure when charged with high voltage is analyzed by XPS, a peak indicating the bonding energy of fluorine with another element is preferably higher than or equal to 682 eV and lower than 685 eV, further preferably approximately 684.3 eV. This value is different from both of the bonding energy of lithium fluoride, which is 685 eV, and the bonding energy of magnesium fluoride, which is 686 eV. That is, when the positive electrode active material having the pseudo-spinel crystal structure when charged with high voltage contains fluorine, bonding other than bonding of lithium fluoride and magnesium fluoride is preferable.

Furthermore, when the positive electrode active material having the pseudo-spinel crystal structure when charged with high voltage is analyzed by XPS, a peak indicating the bonding energy of magnesium with another element is preferably higher than or equal to 1302 eV and lower than 1304 eV, further preferably approximately 1303 eV. This value is different from the bonding energy of magnesium fluoride, which is 1305 eV, and is close to the bonding energy of magnesium oxide. That is, when the positive electrode active material having the pseudo-spinel crystal structure when charged with high voltage contains magnesium, it is preferable that the bonding is other than that of magnesium fluorine.

<EDX>

In the EDX measurement, to measure a region while scanning the region and evaluate two-dimensionally is referred to as EDX surface analysis in some cases. In addition, to extract data of a linear region from EDX surface analysis and evaluate the atomic concentration distribution in a positive electrode active material particle is referred to as line analysis in some cases.

The concentrations of magnesium and fluorine in the inner portion, the surface portion, and the vicinity of the crystal grain boundary can be quantitatively analyzed by the EDX surface analysis (e.g., element mapping). In addition, peaks of the concentrations of magnesium and fluorine can be analyzed by the EDX line analysis.

When the positive electrode active material having the pseudo-spinel crystal structure when charged with high voltage is analyzed by the EDX line analysis, a peak of the magnesium concentration in the surface portion preferably exists in a region from the surface of the positive electrode active material having the pseudo-spinel crystal structure when charged with high voltage to a depth of 3 nm toward the center, further preferably to a depth of 1 nm, still further preferably to a depth of 0.5 nm.

It is preferable that the distribution of fluorine contained in the positive electrode active material having the pseudo-spinel crystal structure when charged with high voltage overlap with the distribution of magnesium. Thus, when the EDX line analysis is performed, a peak of the fluorine concentration in the surface portion preferably exists in a region from the surface of the positive electrode active material 100 to a depth of 3 nm toward the center, further preferably to a depth of 1 nm, still further preferably to a depth of 0.5 nm.

When the line analysis or the surface analysis is performed on the positive electrode active material having the pseudo-spinel crystal structure when charged with high voltage, the atomic ratio of magnesium to cobalt (Mg/Co) in the vicinity of the crystal grain boundary is preferably greater than or equal to 0.020 and less than or equal to 0.50. It is further preferably greater than or equal to 0.025 and less than or equal to 0.30. It is still further preferably greater than or equal to 0.030 and less than or equal to 0.20.

<dQ/dVvsV Curve>

Moreover, when the positive electrode active material having the pseudo-spinel crystal structure when charged with high voltage is discharged at a low rate of, for example, 0.2 C or less after high-voltage charging, a characteristic change in voltage appears just before the end of discharging, in some cases. This change can be clearly observed by the fact that at least one peak appears within the range of 3.5 V to 3.9 V in dQ/dVvsV curve calculated from a discharge curve.

This embodiment can be implemented in appropriate combination with any of the other embodiments.

Embodiment 3

In this embodiment, a negative electrode, an electrolyte solution, a separator, and an exterior body which can be used for a secondary battery are described. Charging and discharging methods of a secondary battery are described.

[Negative Electrode]

The negative electrode includes a negative electrode active material layer and a negative electrode current collector. In addition, the negative electrode active material layer may contain a conductive additive and a binder.

<Negative Electrode Active Material>

As the negative electrode active material, for example, an alloy-based material, a carbon-based material, or the like can be used.

For the negative electrode active material, an element that enables charge-discharge reaction by alloying reaction and dealloying reaction with lithium can be used. For example, a material containing at least one of silicon, tin, gallium, aluminum, germanium, lead, antimony, bismuth, silver, zinc, cadmium, indium, and the like can be used. Such elements have higher capacity than carbon. In particular, silicon has a high theoretical capacity of 4200 mAh/g. For this reason, silicon is preferably used as the negative electrode active material. Alternatively, a compound containing the element may be used. Examples of the compound include SiO, $Mg_2Si$, $Mg_2Ge$, SnO, $SnO_2$, $Mg_2Sn$, $SnS_2$, $V_2Sn_3$, $FeSn_2$, $CoSn_2$, $Ni_3Sn_2$, $Cu_6Sn_5$, $Ag_3Sn$, $Ag_3Sb$, $Ni_2MnSb$, $CeSb_3$, $LaSn_3$, $La_3Co_2Sn_7$, $CoSb_3$, InSb, SbSn, and the like. Here, the element that enables charge-discharge reaction by alloying reaction and dealloying reaction with lithium, the compound containing the element, or the like is referred to as an alloy-based material in some cases.

In this specification and the like, SiO refers to, for example, silicon monoxide. Alternatively, SiO can be expressed as $SiO_x$. Here, x preferably has an approximate value of 1. For example, x is preferably more than or equal to 0.2 and less than or equal to 1.5, further preferably more than or equal to 0.3 and less than or equal to 1.2.

As the carbon-based material, graphite, graphitizing carbon (soft carbon), non-graphitizing carbon (hard carbon), carbon nanotube, graphene, carbon black, or the like may be used.

Examples of graphite include artificial graphite, natural graphite, and the like. Examples of artificial graphite include mesocarbon microbeads (MCMB), coke-based artificial graphite, pitch-based artificial graphite, and the like. Here, as artificial graphite, spherical graphite having a spherical shape can be used. For example, MCMB is preferable because it has a spherical shape in some cases. Moreover, MCMB is preferable in some cases because it can relatively easily have a smaller surface area. Examples of natural graphite include flake graphite, spherical natural graphite, and the like.

Graphite has a low potential substantially equal to that of a lithium metal (higher than or equal to 0.05 V and lower than or equal to 0.3 V vs. Li/Li$^+$) when lithium ions are intercalated into graphite (while a lithium-graphite intercalation compound is formed). For this reason, a lithium-ion secondary battery can exhibit a high operating voltage. In addition, graphite is preferable because of its advantages such as a relatively high capacity per unit volume, relatively small volume expansion, low cost, and higher safety than that of a lithium metal.

Alternatively, for the negative electrode active material, an oxide such as titanium dioxide ($TiO_2$), lithium titanium oxide ($Li_4Ti_5O_{12}$), a lithium-graphite intercalation compound ($Li_xC_6$), niobium pentoxide ($Nb_2O_5$), tungsten oxide ($WO_2$), or molybdenum oxide ($MoO_2$) can be used.

Alternatively, for the negative electrode active material, $Li_{3-x}M_xN$ (M=Co, Ni, or Cu) with a $Li_3N$ structure, which is a nitride of lithium and a transition metal, can be used. For example, $Li_{2.6}Co_{0.4}N_3$ is preferable because of its high charge and discharge capacity (900 mAh/g and 1890 mAh/cm$^3$).

A nitride of lithium and a transition metal is preferably used, in which case lithium ions are contained in the negative electrode active material and thus the negative electrode active material can be combined with a material of a positive electrode active material which does not contain lithium ions, such as $V_2O_5$ or $Cr_3O_8$. Note that even in the case of using a material containing lithium ions for the positive electrode active material, the nitride of lithium and the transition metal can be used for the negative electrode active material by extracting the lithium ions contained in the positive electrode active material in advance.

In addition, a material which causes conversion reaction can also be used for the negative electrode active material. For example, a transition metal oxide which does not form an alloy with lithium, such as cobalt oxide (CoO), nickel oxide (NiO), or iron oxide (FeO), may be used for the negative electrode active material. Other examples of the material which causes conversion reaction include oxides such as $Fe_2O_3$, CuO, $Cu_2O$, $RuO_2$, and $Cr_2O_3$, sulfides such as $CoS_{0.89}$, NiS, and CuS, nitrides such as $Zn_3N_2$, $Cu_3N$, and $Ge_3N_4$, phosphides such as $NiP_2$, $FeP_2$, and $CoP_3$, and fluorides such as $FeF_3$ and $BiF_3$.

For the conductive additive and the binder that can be included in the negative electrode active material layer, materials similar to those of the conductive additive and the binder that can be included in the positive electrode active material layer can be used.

For the negative electrode current collector, a material similar to that of the positive electrode current collector can be used. Note that a material which is not alloyed with carrier ions such as lithium is preferably used for the negative electrode current collector.

[Electrolyte Solution]

The electrolyte solution contains a solvent and an electrolyte. As the solvent of the electrolyte solution, an aprotic organic solvent is preferable. For example, one kind of ethylene carbonate (EC), propylene carbonate (PC), butylene carbonate, chloroethylene carbonate, vinylene carbonate, γ-butyrolactone, γ-valerolactone, dimethyl carbonate (DMC), diethyl carbonate (DEC), ethyl methyl carbonate (EMC), methyl formate, methyl acetate, ethyl acetate, methyl propionate, ethyl propionate, propyl propionate, methyl butyrate, 1,3-dioxane, 1,4-dioxane, dimethoxyethane (DME), dimethyl sulfoxide, diethyl ether, methyl diglyme, acetonitrile, benzonitrile, tetrahydrofuran, sulfolane, sultone, and the like can be used, or two or more kinds of these solvents can be used in a given combination at a given ratio.

Alternatively, the use of one or more ionic liquids (room temperature molten salts) that are less likely to burn and less likely to volatize as the solvent of the electrolyte solution can prevent a secondary battery from exploding, catching fire, and the like even when the secondary battery causes internal short-circuit or internal temperature increases owing to overcharging or the like. An ionic liquid is composed of a cation and an anion, and contains an organic cation and an anion. Examples of the organic cation used for the electrolyte solution include aliphatic onium cations such as a quaternary ammonium cation, a tertiary sulfonium cation, and a quaternary phosphonium cation, and aromatic cations such as an imidazolium cation and a pyridinium cation. In addition, examples of the anion used for the electrolyte solution include a monovalent amide-based anion, a monovalent methide-based anion, a fluorosulfonate anion, a perfluoroalkylsulfonate anion, a tetrafluoroborate anion, a perfluoroalkylborate anion, a hexafluorophosphate anion, a perfluoroalkylphosphate anion, and the like.

In addition, as the electrolyte dissolved in the above solvent, one kind of lithium salts such as $LiPF_6$, $LiClO_4$, $LiAsF_6$, $LiBF_4$, $LiAlCl_4$, LiSCN, LiBr, LiI, $Li_2SO_4$, $Li_2B_{10}Cl_{10}$, $Li_2B_{12}Cl_{12}$, $LiCF_3SO_3$, $LiC_4F_9SO_3$, $LiC(CF_3SO_2)_3$, $LiC(C_2F_5SO_2)_3$, $LiN(CF_3SO_2)_2$, $LiN(C_4F_9SO_2)(CF_3SO_2)$, and $LiN(C_2F_5SO_2)_2$ can be used, or two or more kinds of these lithium salts can be used in a given combination at a given ratio.

As the electrolyte solution used for the secondary battery, a highly-purified electrolyte solution where the content of dust particles and elements other than the constituent elements of the electrolyte solution (hereinafter, also simply referred to as "impurities") is low is preferably used. Specifically, the weight ratio of impurities to the electrolyte solution is less than or equal to 1%, preferably less than or equal to 0.1%, further preferably less than or equal to 0.01%.

Furthermore, an additive such as vinylene carbonate, propane sultone (PS), tert-butylbenzene (TBB), fluoroethylene carbonate (FEC), lithium bis(oxalate)borate (LiBOB), or a dinitrile compound such as succinonitrile, adiponitrile, fluorobenzene, cyclohexylbenzene, or biphenyl may be added to the electrolyte solution. The concentration of a material to be added in the whole solvent may be, for example, higher than or equal to 0.1 wt % and lower than or equal to 5 wt %.

Alternatively, a polymer gel electrolyte obtained by swelling a polymer with an electrolyte solution may be used.

By using a polymer gel electrolyte, safety against liquid leakage and the like is improved. Furthermore, a secondary battery can be made thinner and more lightweight.

As a polymer that undergoes gelation, a silicone gel, an acrylic gel, an acrylonitrile gel, a polyethylene oxide-based gel, a polypropylene oxide-based gel, a fluorine-based polymer gel, or the like can be used.

As the polymer, for example, a polymer having a polyalkylene oxide structure, such as polyethylene oxide (PEO); PVDF; polyacrylonitrile; and the like; a copolymer containing them; or the like can be used. For example, PVDF-HFP, which is a copolymer of PVDF and hexafluoropropylene (HFP) can be used. In addition, the formed polymer may have a porous shape.

Instead of the electrolyte solution, a solid electrolyte including an inorganic material such as a sulfide-based inorganic material or an oxide-based inorganic material, or a solid electrolyte including a high-molecular material of a PEO (polyethylene oxide)-based material or the like can alternatively be used. When a solid electrolyte is used, provision of a separator and a spacer is unnecessary. Furthermore, the battery can be entirely solidified; therefore, there is no possibility of liquid leakage and the safety is dramatically improved.

[Separator]

In addition, the secondary battery preferably includes a separator. As the separator, for example, it is possible to use a separator formed using paper; nonwoven fabric; glass fiber; ceramics; or synthetic fiber or the like using nylon (polyamide), vinylon (polyvinyl alcohol-based fiber), polyester, acrylic, polyolefin, or polyurethane. The separator is preferably processed to have an envelope-like shape to wrap either one of the positive electrode and the negative electrode.

The separator may have a multilayer structure. For example, an organic material film of polypropylene, polyethylene, or the like can be coated with a ceramic-based material, a fluorine-based material, a polyamide-based material, mixture thereof, or the like. As the ceramic-based material, for example, aluminum oxide particles, silicon oxide particles, or the like can be used. As the fluorine-based material, for example, PVDF, polytetrafluoroethylene, or the like can be used. As the polyamide-based material, for example, nylon, aramid (meta-based aramid or para-based aramid), or the like can be used.

When the separator is coated with the ceramic-based material, deterioration of the separator in high-voltage charging and discharging can be inhibited and thus the reliability of the secondary battery can be improved because oxidation resistance is improved. In addition, when the separator is coated with the fluorine-based material, the separator is easily brought into close contact with an electrode, resulting in improvement in output characteristics. When the separator is coated with the polyamide-based material, in particular, aramid, the safety of the secondary battery is improved because heat resistance is improved.

For example, both surfaces of a polypropylene film may be coated with a mixed material of aluminum oxide and aramid. Alternatively, a surface of the polypropylene film that is in contact with the positive electrode may be coated with the mixed material of aluminum oxide and aramid, and a surface of the polypropylene film that is in contact with the negative electrode may be coated with the fluorine-based material.

With the use of a separator having a multilayer structure, the capacity per volume of the secondary battery can be increased because the safety of the secondary battery can be maintained even when the total thickness of the separator is small.

[Exterior Body]

For an exterior body included in the secondary battery, a metal material such as aluminum or a resin material can be used, for example. Alternatively, a film-like exterior body can also be used. As the film, for example, a film having a three-layer structure in which a highly flexible metal thin film of aluminum, stainless steel, copper, nickel, or the like is provided over a film formed of a material such as polyethylene, polypropylene, polycarbonate, ionomer, or polyamide, and an insulating synthetic resin film of a polyamide-based resin, a polyester-based resin, or the like is provided over the metal thin film as the outer surface of the exterior body can be used.

[Charging and Discharging Methods]

The secondary battery can be charged and discharged in the following manner, for example.

<Cc Charging>

Figure 16A:
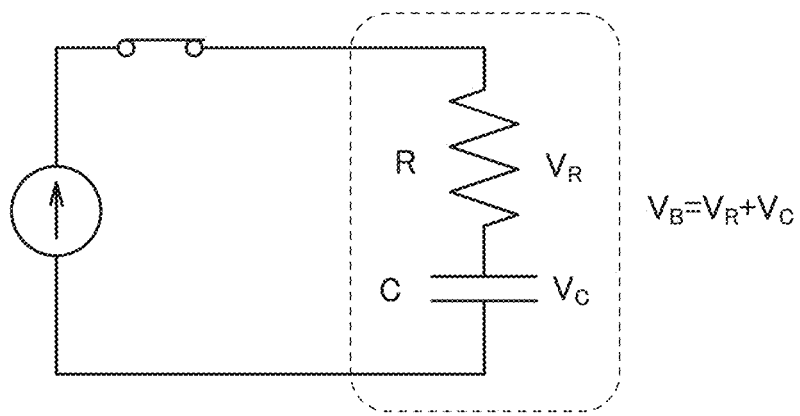
FIG. 16(A) illustrates a charging method of a secondary battery.

First, CC charging is described as one of the charging methods. The CC charging is a charging method in which a constant current is made to flow to a secondary battery in the whole charging period and charging is stopped when the voltage reaches a predetermined voltage. The secondary battery is assumed to be an equivalent circuit with internal resistance R and secondary battery capacitance C, as illustrated in FIG. 16(A). In that case, secondary battery voltage $V_B$ is the sum of voltage $V_R$ applied to the internal resistance R and voltage $V_C$ applied to the secondary battery capacitance C.

While the CC charging is performed, a switch is turned on as illustrated in FIG. 16(A), so that a constant current I flows to the secondary battery. During the period, the current I is constant; thus, according to the Ohm's law of $V_R=R\times I$, the voltage $V_R$ applied to the internal resistance R is also constant. By contrast, the voltage $V_C$ applied to the secondary battery capacitance C increases over time. Accordingly, the secondary battery voltage $V_B$ increases over time.

Then, when the secondary battery voltage $V_B$ reaches a predetermined voltage, e.g., 4.3 V, the charging is stopped.

Figure 16B:
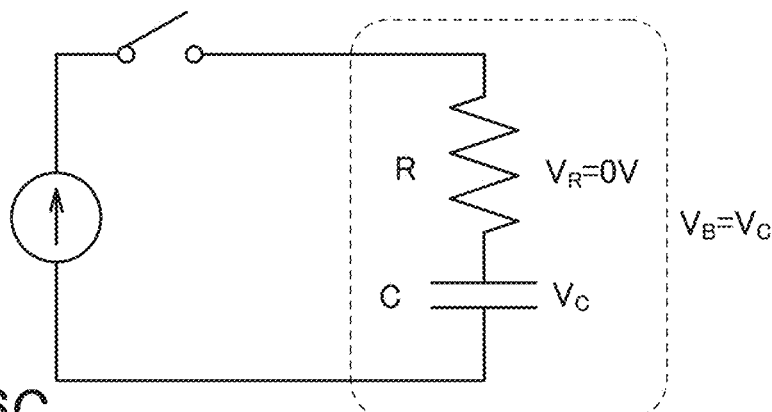
FIG. 16(B) illustrates a charging method of a secondary battery.

When the CC charging is stopped, the switch is turned off as illustrated in FIG. 16(B), and the current I=0. Thus, the voltage $V_R$ applied to the internal resistance R becomes 0 V. Consequently, the secondary battery voltage $V_B$ decreases.

Figure 16C:
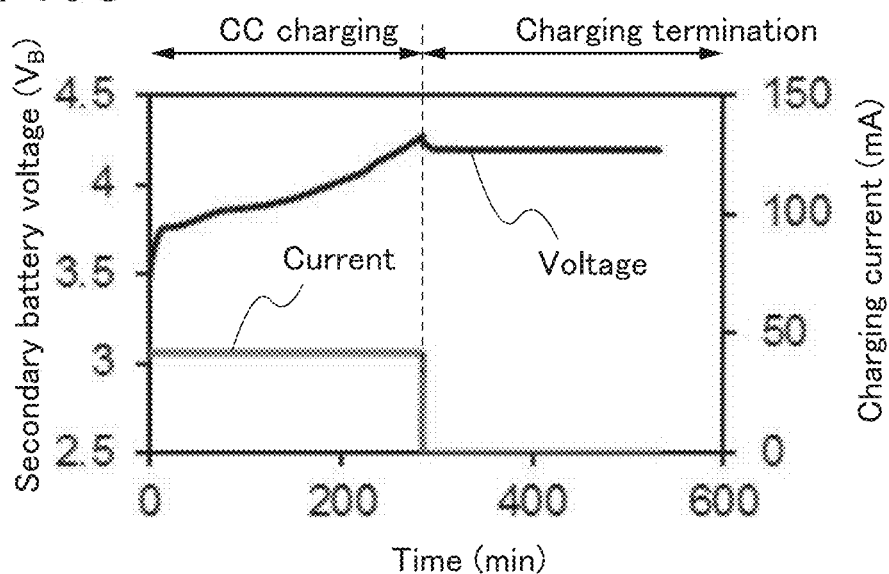
FIG. 16(C) shows a charge curve of a secondary battery.

FIG. 16(C) shows examples of the secondary battery voltage $V_B$ and charging current while the CC charging is performed and after the CC charging is stopped. FIG. 16(C) shows that after the CC charging is stopped, the secondary battery voltage $V_B$ that increases while the CC charging is performed slightly decreases.

<CCCV Charging>

Next, CCCV charging, which is a charging method different from the above method, is described. The CCCV charging is a charging method in which CC charging is first performed until the voltage reaches a predetermined voltage and then CV (constant voltage) charging is performed until current to flow becomes small, specifically, reaches a termination current value.

Figure 17A:
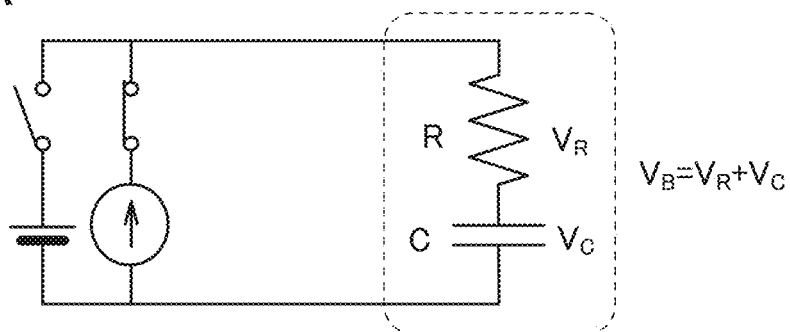
FIG. 17(A) illustrates a charging method of a secondary battery.

While the CC charging is performed, a switch of a constant current power source is turned on and a switch of a constant voltage power source is turned off as illustrated in FIG. 17(A), so that the constant current I flows to the secondary battery. During the period, the current I is constant; thus, according to the Ohm's law of $V_R=R\times I$, the voltage $V_R$ applied to the internal resistance R is also constant. By contrast, the voltage $V_C$ applied to the secondary battery capacitance C increases over time. Accordingly, the secondary battery voltage $V_B$ increases over time.

Figure 17B:
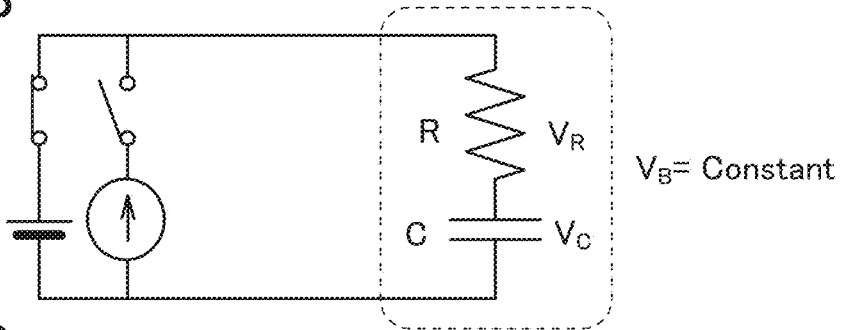
FIG. 17(B) illustrates a charging method of a secondary battery.

Then, when the secondary battery voltage $V_B$ reaches a predetermined voltage, e.g., 4.3 V, the CC charging is switched to the CV charging. While the CV charging is performed, the switch of the constant voltage power source is turned on and the switch of the constant current power source is turned off as illustrated in FIG. 17(B); thus, the secondary battery voltage $V_B$ becomes constant. By contrast, the voltage $V_C$ applied to the secondary battery capacitance C increases over time. Since $V_B=V_R+V_C$, the voltage $V_R$ applied to the internal resistance R decreases over time. As the voltage $V_R$ applied to the internal resistance R decreases, the current I flowing to the secondary battery also decreases according to the Ohm's law of $V_R=R\times I$.

Figure 17C:
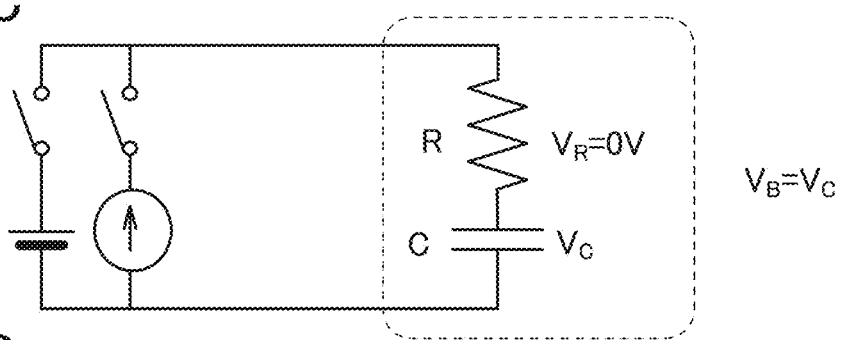
FIG. 17(C) illustrates a charging method of a secondary battery.

Then, when the current I flowing to the secondary battery reaches a predetermined current, e.g., approximately 0.01 C, charging is stopped. When the CCCV charging is stopped, all the switches are turned off as illustrated in FIG. 17(C), so that the current I becomes 0. Thus, the voltage $V_R$ applied to the internal resistance R becomes 0 V. However, the voltage $V_R$ applied to the internal resistance R becomes sufficiently small due to the CV charging; thus, even when the voltage drop of the internal resistance R disappears, the secondary battery voltage $V_B$ hardly decreases.

Figure 17D:
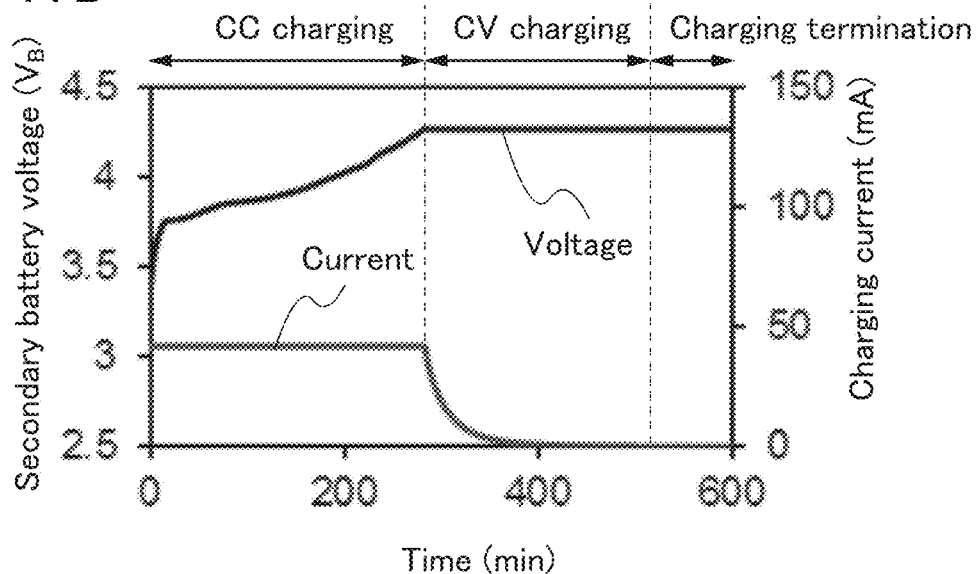
FIG. 17(D) shows a charge curve of the secondary battery.

FIG. 17(D) shows examples of the secondary battery voltage $V_B$ and charging current while the CCCV charging is performed and after the CCCV charging is stopped. FIG. 17(D) shows a state where even after the CCCV charging is stopped, the secondary battery voltage $V_B$ hardly decreases.

<CC Discharging>

Next, CC discharging, which is one of the discharging methods, is described. The CC discharging is a discharging method in which a constant current is made to flow from the secondary battery in the whole discharging period, and discharging is stopped when the secondary battery voltage $V_B$ reaches a predetermined voltage, e.g., 2.5 V.

Figure 18:
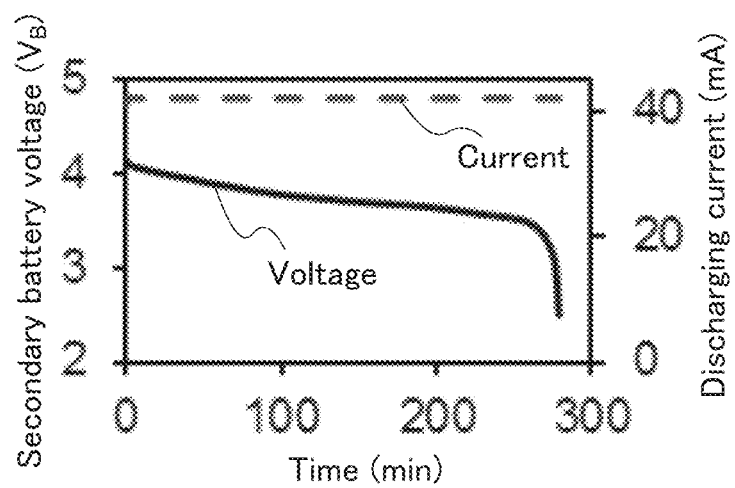
FIG. 18 shows a discharge curve of a secondary battery.

FIG. 18 shows examples of the secondary battery voltage $V_B$ and discharging current while the CC discharging is performed. FIG. 18 shows a state where as discharging proceeds, the secondary battery voltage $V_B$ decreases.

Next, a discharge rate and a charge rate are described. The discharge rate refers to the relative ratio of current in discharging to battery capacity and is expressed in a unit C. A current corresponding to 1 C in a battery with a rated capacity X (Ah) is X (A). The case where discharging is performed at a current of 2X (A) is rephrased as to perform discharging at 2 C. The case where discharging is performed at a current of X/5 (A) is rephrased as to perform discharging at 0.2 C. In addition, similarly, as for the charge rate, the case where charging is performed at a current of 2X (A) is rephrased as to perform charging at 2 C, and the case where charging is performed at a current of X/5 (A) is rephrased as to perform charging at 0.2 C.

Embodiment 4

In this embodiment, examples of the shape of a secondary battery containing the positive electrode active material 100 described in the above embodiment are described. For the materials used for the secondary battery described in this embodiment, it is possible to refer to the description of the above embodiment.

[Coin-Type Secondary Battery]

Figure 19A:
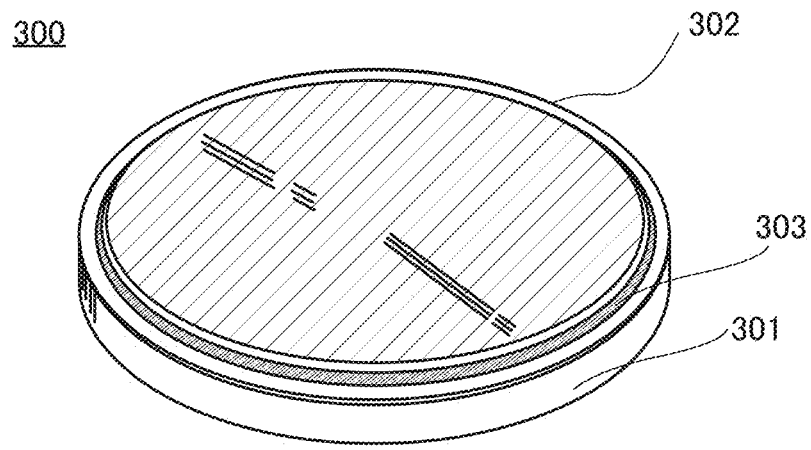
FIG. 19(A) illustrates a coin-type secondary battery.
Figure 19B:
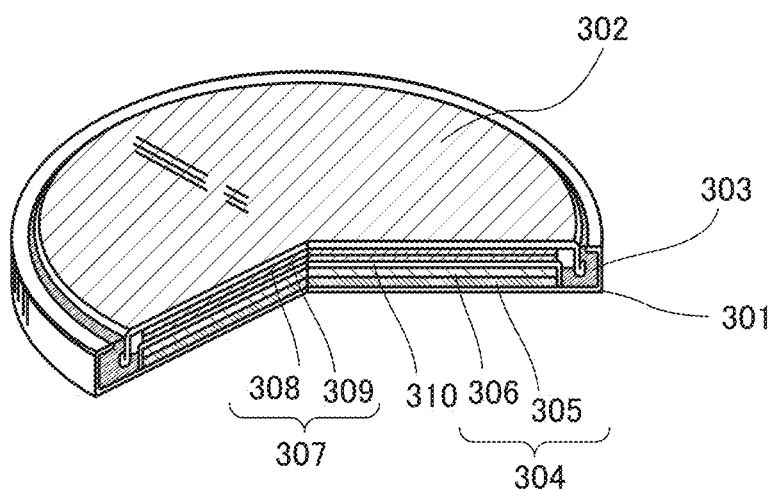
FIG. 19(B) illustrates a coin-type secondary battery.

First, an example of a coin-type secondary battery is described. FIG. 19(A) is an external view of a coin-type (single-layer flat type) secondary battery, and FIG. 19(B) is a cross-sectional view thereof.

In a coin-type secondary battery 300, a positive electrode can 301 doubling as a positive electrode terminal and a negative electrode can 302 doubling as a negative electrode terminal are insulated and sealed by a gasket 303 formed of polypropylene or the like. A positive electrode 304 is formed of a positive electrode current collector 305 and a positive electrode active material layer 306 provided to be in contact with the positive electrode current collector 305. In addition, a negative electrode 307 is formed of a negative electrode current collector 308 and a negative electrode active material layer 309 provided to be in contact with the negative electrode current collector 308.

Note that an active material layer may be formed over only one surface of each of the positive electrode 304 and the negative electrode 307 used for the coin-type secondary battery 300.

For the positive electrode can 301 and the negative electrode can 302, a metal having corrosion resistance to an electrolyte solution, such as nickel, aluminum, or titanium, an alloy of such a metal, or an alloy of such a metal and another metal (e.g., stainless steel or the like) can be used. Alternatively, the positive electrode can 301 and the negative electrode can 302 are preferably covered with nickel, aluminum, or the like in order to prevent corrosion due to the electrolyte solution. The positive electrode can 301 and the negative electrode can 302 are electrically connected to the positive electrode 304 and the negative electrode 307, respectively.

The negative electrode 307, the positive electrode 304, and a separator 310 are immersed in the electrolyte; as illustrated in FIG. 19(B), the positive electrode 304, the separator 310, the negative electrode 307, and the negative electrode can 302 are stacked in this order with the positive electrode can 301 positioned at the bottom; and the positive electrode can 301 and the negative electrode can 302 are subjected to pressure bonding through the gasket 303 to manufacture the coin-type secondary battery 300.

With the use of the positive electrode active material described in the above embodiment for the positive electrode 304, the coin-type secondary battery 300 with high capacity and excellent cycle performance can be obtained.

Here, a current flow in charging a secondary battery will be described using FIG. 19(C). When a secondary battery using lithium is regarded as one closed circuit, movement of lithium ions and the current flow are in the same direction. Note that in the secondary battery using lithium, an anode and a cathode interchange in charging and discharging, and oxidation reaction and reduction reaction interchange; hence, an electrode with a high reaction potential is called a positive electrode and an electrode with a low reaction potential is called a negative electrode. For this reason, in this specification, the positive electrode is referred to as a "positive electrode" or a "+ electrode (plus electrode)" and the negative electrode is referred to as a "negative electrode" or a "− electrode (minus electrode)" in any of the case where charging is performed, the case where discharging is performed, the case where a reverse pulse current is made to flow, and the case where charging current is made to flow. The use of terms an anode and a cathode related to oxidation reaction and reduction reaction might cause confusion because the anode and the cathode interchange in charging and in discharging. Thus, the terms the anode and the cathode are not used in this specification. If the term the anode or the cathode is used, it should be clearly mentioned that the anode or the cathode is which of the one in charging or in discharging and corresponds to which of the positive electrode (plus electrode) or the negative electrode (minus electrode)

Figure 19C:
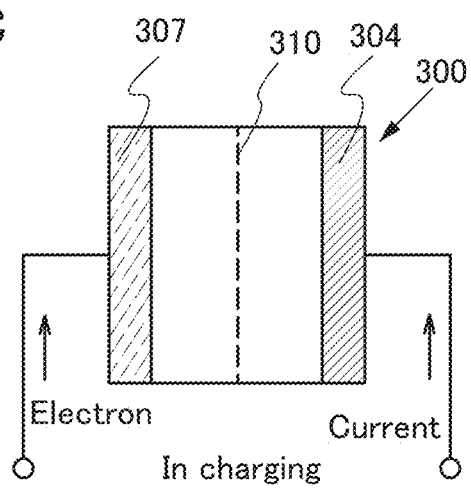
FIG. 19(C) is a diagram for explaining charging.

A charger is connected to two terminals shown in FIG. 19(C) to charge the secondary battery 300. As the charging of the secondary battery 300 proceeds, a potential difference between electrodes increases.

[Cylindrical Secondary Battery]

Figure 20A:
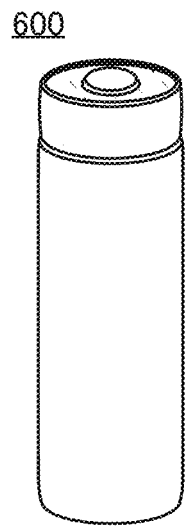
FIG. 20(A) illustrates a cylindrical secondary battery.
Figure 20B:
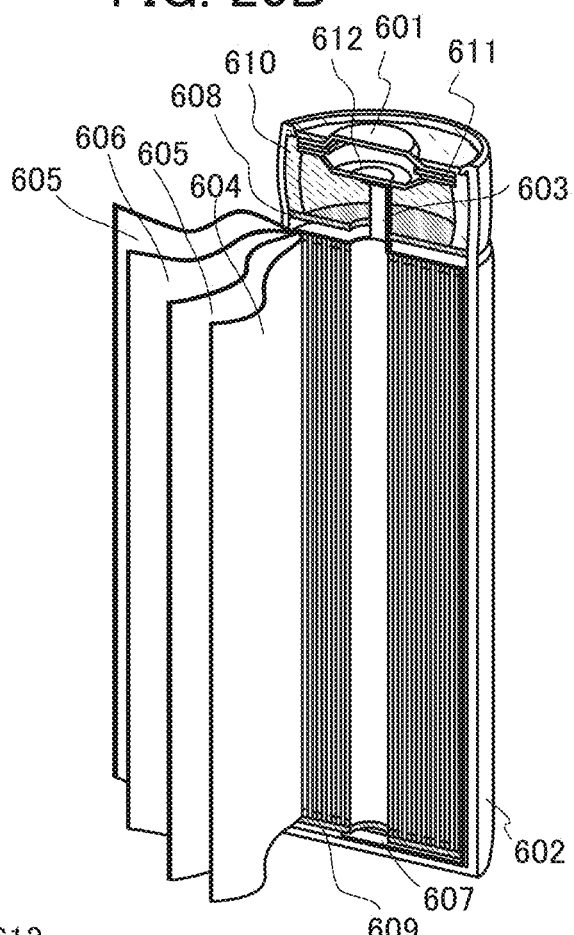
FIG. 20(B) illustrates a plurality of cylindrical secondary batteries.

Next, an example of a cylindrical secondary battery is described with reference to FIG. 20. FIG. 20(A) is an external view of a cylindrical secondary battery 600. FIG. 20(B) is a diagram schematically illustrating a cross section of the cylindrical secondary battery 600. As illustrated in FIG. 20(B), the cylindrical secondary battery 600 includes a positive electrode cap (battery lid) 601 on a top surface and a battery can (outer can) 602 on a side surface and a bottom surface. The positive electrode cap and the battery can (outer can) 602 are insulated by a gasket (insulating gasket) 610.

Inside the battery can 602 having a hollow cylindrical shape, a battery element in which a belt-like positive electrode 604 and a belt-like negative electrode 606 are wound with a separator 605 located therebetween is provided. Although not illustrated, the battery element is wound centering around a center pin. One end of the battery can 602 is closed and the other end thereof is opened. For the battery can 602, a metal having corrosion resistance to an electrolyte solution, such as nickel, aluminum, or titanium, an alloy of such a metal, or an alloy of such a metal and another metal (e.g., stainless steel or the like) can be used. Alternatively, the battery can 602 is preferably covered with nickel, aluminum, or the like in order to prevent corrosion due to the electrolyte solution. Inside the battery can 602, the battery element in which the positive electrode, the negative electrode, and the separator are wound is sandwiched between a pair of insulating plates 608 and 609 that face each other. Furthermore, a nonaqueous electrolyte solution (not illustrated) is injected inside the battery can 602 provided with the battery element. As the nonaqueous electrolyte solution, a nonaqueous electrolyte solution that is similar to that of the coin-type secondary battery can be used.

Since the positive electrode and the negative electrode that are used for a cylindrical storage battery are wound, active materials are preferably formed on both surfaces of the current collector. A positive electrode terminal (positive electrode current collector lead) 603 is connected to the positive electrode 604, and a negative electrode terminal (negative electrode current collector lead) 607 is connected to the negative electrode 606. For both the positive electrode terminal 603 and the negative electrode terminal 607, a metal material such as aluminum can be used. The positive electrode terminal 603 and the negative electrode terminal 607 are resistance-welded to a safety valve mechanism 612 and the bottom of the battery can 602, respectively. The safety valve mechanism 612 is electrically connected to the positive electrode cap 601 through a PTC element (Positive Temperature Coefficient) 611. The safety valve mechanism 612 cuts off electrical connection between the positive electrode cap 601 and the positive electrode 604 when the internal pressure of the battery exceeds a predetermined threshold value. In addition, the PTC element 611 is a thermally sensitive resistor whose resistance increases as temperature rises, and limits the amount of current by increasing the resistance to prevent abnormal heat generation. Barium titanate ($BaTiO_3$)-based semiconductor ceramic or the like can be used for the PTC element.

Figure 20C:
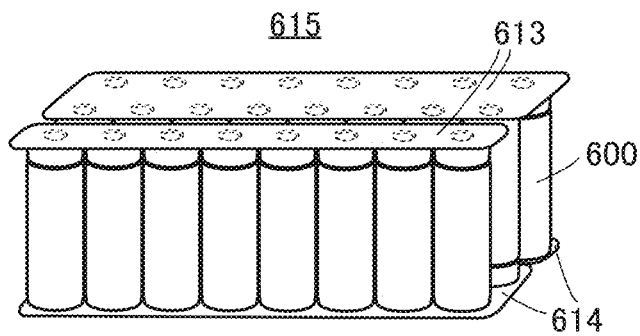
FIG. 20(C) illustrates a plurality of cylindrical secondary batteries.

Alternatively, as illustrated in FIG. 20(C), a plurality of secondary batteries 600 may be sandwiched between a conductive plate 613 and a conductive plate 614 to construct a module 615. The plurality of secondary batteries 600 may be connected in parallel, connected in series, or further connected in series after being connected in parallel. By constructing the module 615 including the plurality of secondary batteries 600, large power can be extracted.

Figure 20D:
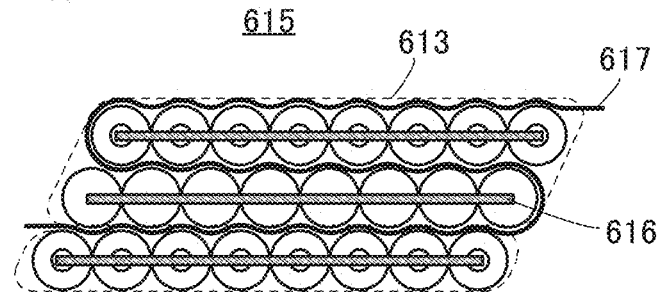
FIG. 20(D) illustrates a plurality of cylindrical secondary batteries.

FIG. 20(D) is a top view of the module 615. The conductive plate 613 is shown by a dotted line for clarity of the drawing. As illustrated in FIG. 20(D), the module 615 may include a conducting wiring 616 that electrically connects the plurality of secondary batteries 600. It is possible to provide the conductive plate over the conducting wiring 616 to overlap. In addition, a temperature control device 617 may be included between the plurality of secondary batteries 600. The secondary batteries 600 can be cooled with the temperature control device 617 when overheated, whereas the secondary batteries 600 can be heated with the temperature control device 617 when cooled too much. Thus, the performance of the module 615 is less likely to be influenced by the outside temperature. A heating medium included in the temperature control device 617 preferably has an insulating property and incombustibility.

With the use of the positive electrode active material described in the above embodiment for the positive electrode 604, the cylindrical secondary battery 600 with high capacity and excellent cycle performance can be obtained.

[Structure Examples of Secondary Batteries]

Other structure examples of secondary batteries are described using FIG. 21 to FIG. 25.

Figure 21A:
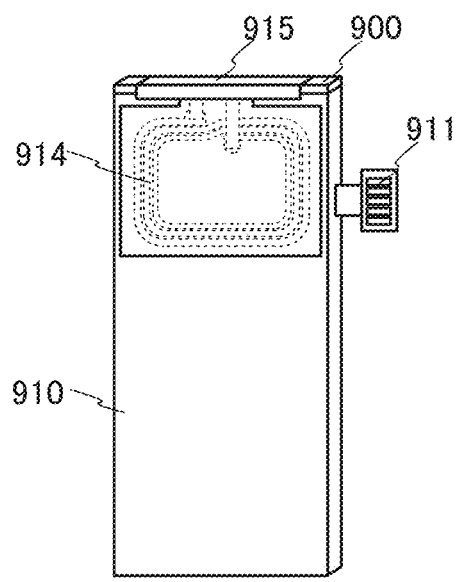
FIG. 21(A) illustrates an example of a secondary battery.
Figure 21B:
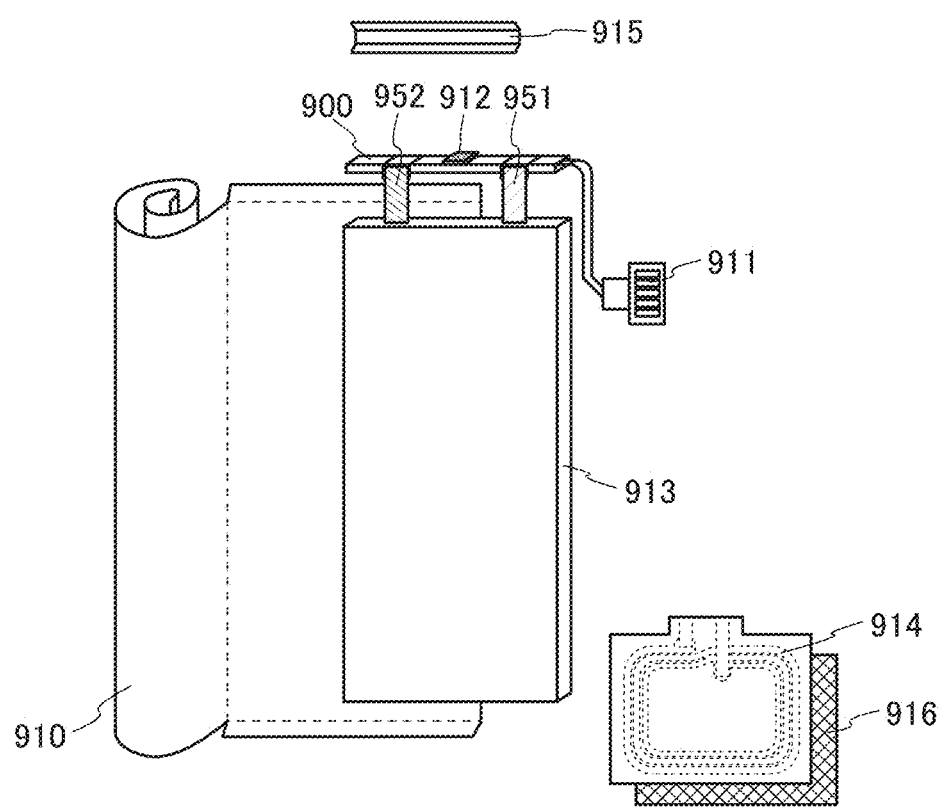
FIG. 21(B) illustrates an example of a secondary battery.

FIG. 21(A) and FIG. 21(B) are external views of a battery pack. The battery pack includes a circuit board 900 and a secondary battery 913. In addition, a label 910 is attached to the secondary battery 913. Moreover, as illustrated in FIG. 21(B), the secondary battery 913 includes a terminal 951 and a terminal 952.

The circuit board 900 is fixed by a sealant 915. The circuit board 900 includes a circuit 912. A terminal 911 is connected to the terminal 951, the terminal 952, an antenna 914, and the circuit 912 through the circuit board 900. Note that a plurality of terminals 911 may be provided so that each of the plurality of terminals 911 serves as a control signal input terminal, a power supply terminal, or the like.

The circuit 912 may be provided on the rear surface of the circuit board 900. Note that the shape of the antenna 914 is not limited to a coil shape and may be a linear shape or a plate shape. Furthermore, an antenna such as a planar antenna, an aperture antenna, a traveling-wave antenna, an EH antenna, a magnetic-field antenna, or a dielectric antenna may be used.

Alternatively, the antenna 914 may be a flat-plate conductor. The flat-plate conductor can serve as one of the conductors for electric field coupling. That is, the antenna 914 can serve as one of two conductors of a capacitor. Thus, power can be transmitted and received not only by an electromagnetic field or a magnetic field but also by an electric field.

The battery pack includes a layer 916 between the antenna 914 and the secondary battery 913. The layer 916 has a function of blocking an electromagnetic field by the secondary battery 913, for example. As the layer 916, for example, a magnetic body can be used.

Note that the structure of the secondary battery is not limited to that in FIG. 21.

For example, as shown in FIG. 22(A-1) and FIG. 22(A-2), an antenna may be provided for each of a pair of opposite surfaces of the secondary battery 913 shown in FIG. 21(A) and FIG. 21(B). FIG. 22(A-1) is an external view illustrating one of the pair of surfaces, and FIG. 22(A-2) is an external view illustrating the other of the pair of surfaces. Note that, for the same portions as those in the secondary battery shown in FIG. 21(A) and FIG. 21(B), it is possible to refer to the description of the secondary battery shown in FIG. 21(A) and FIG. 21(B) as appropriate.

As illustrated in FIG. 22(A-1), the antenna 914 is provided on one of the opposite surfaces of the secondary battery 913 with the layer 916 located therebetween, and as illustrated in FIG. 22(A-2), an antenna 918 is provided on the other of the opposite surfaces of the secondary battery 913 with a layer 917 located therebetween. The layer 917 has a function of blocking an electromagnetic field by the secondary battery 913, for example. As the layer 917, for example, a magnetic body can be used.

With the above structure, both of the antenna 914 and the antenna 918 can be increased in size. The antenna 918 has a function of communicating data with an external device, for example. An antenna with a shape that can be applied to the antenna 914, for example, can be applied to the antenna 918. As a system for communication using the antenna 918 between the secondary battery and another device, a response method that can be used between the secondary battery and another device, such as NFC (near field communication), can be employed.

Alternatively, as illustrated in FIG. 22(B-1), the secondary battery 913 shown in FIG. 21(A) and FIG. 21(B) may be provided with a display device 920. The display device 920 is electrically connected to the terminal 911. Note that the label 910 is not necessarily provided in a portion where the display device 920 is provided. Note that for the same portions as those in the secondary battery shown in FIG. 21(A) and FIG. 21(B), it is possible to refer to the description of the secondary battery shown in FIG. 21(A) and FIG. 21(B) as appropriate.

The display device 920 may display, for example, an image showing whether or not charging is being carried out, an image showing the amount of stored power, or the like. As the display device 920, electronic paper, a liquid crystal display device, an electroluminescence (also referred to as EL) display device, or the like can be used, for example. For example, the use of electronic paper can reduce power consumption of the display device 920.

Alternatively, as illustrated in FIG. 22(B-2), the secondary battery 913 shown in FIG. 21(A) and FIG. 21(B) may be provided with a sensor 921. The sensor 921 is electrically connected to the terminal 911 via a terminal 922. For the same portions as those in the secondary battery shown in FIG. 21(A) and FIG. 21(B), it is possible to refer to the description of the secondary battery shown in FIG. 21(A) and FIG. 21(B) as appropriate.

The sensor 921 has a function of measuring, for example, displacement, position, speed, acceleration, angular velocity, rotational frequency, distance, light, liquid, magnetism, temperature, chemical substance, sound, time, hardness, electric field, current, voltage, power, radiation, flow rate, humidity, gradient, vibration, odor, or infrared rays. With provision of the sensor 921, for example, data on an environment where the secondary battery is placed (e.g., temperature or the like) can be detected and stored in a memory inside the circuit 912.

Figure 23A:
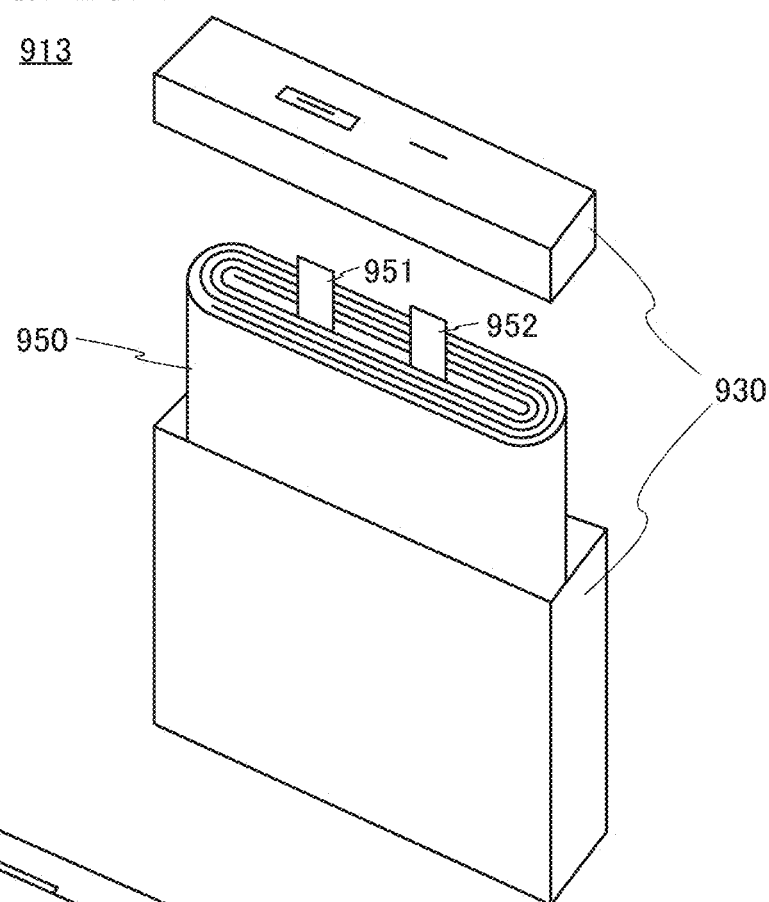
FIG. 23(A) illustrates an example of a secondary battery.
Figure 23B:
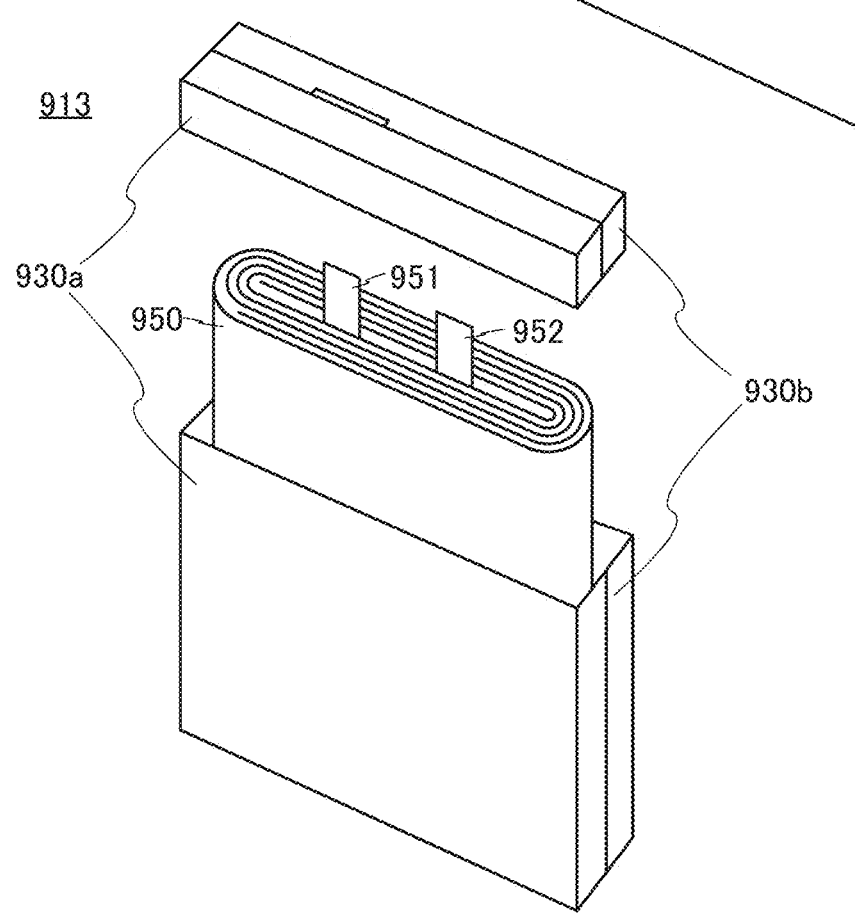
FIG. 23(B) illustrates an example of a secondary battery.
Figure 24:
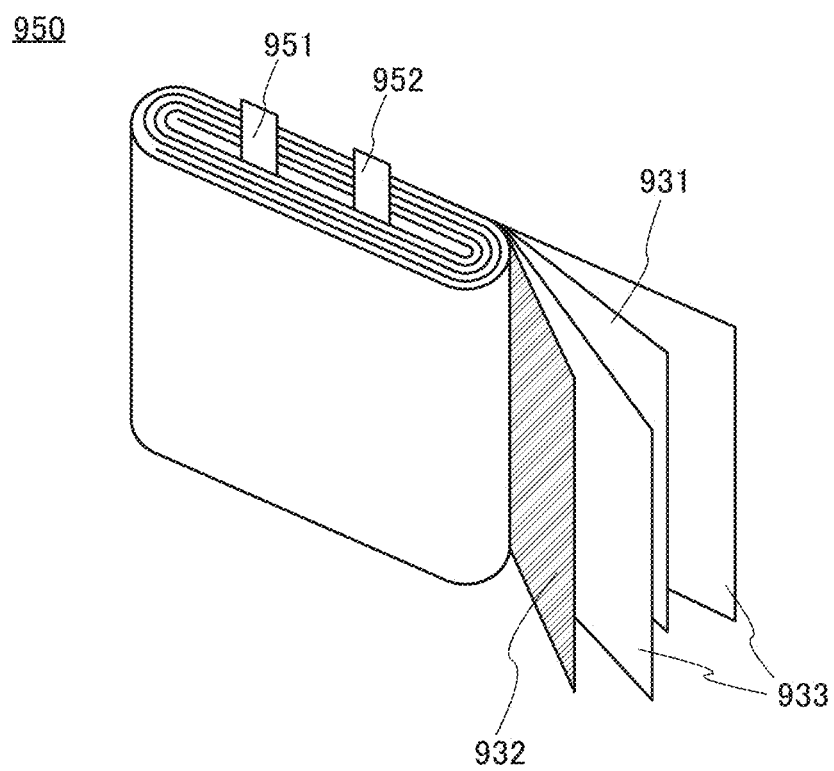
FIG. 24 illustrates an example of a secondary battery.

Furthermore, structure examples of the secondary battery 913 are described using FIG. 23 and FIG. 24.

The secondary battery 913 illustrated in FIG. 23(A) includes a wound body 950 provided with the terminal 951 and the terminal 952 inside a housing 930. The wound body 950 is immersed in an electrolyte solution inside the housing 930. The terminal 952 is in contact with the housing 930. The use of an insulator or the like prevents contact between the terminal 951 and the housing 930. Note that in FIG. 23(A), the housing 930 that has been divided is illustrated for convenience; however, in reality, the wound body 950 is covered with the housing 930, and the terminal 951 and the terminal 952 extend to the outside of the housing 930. For the housing 930, a metal material (e.g., aluminum or the like) or a resin material can be used.

Note that as illustrated in FIG. 23(B), the housing 930 illustrated in FIG. 23(A) may be formed using a plurality of materials. For example, in the secondary battery 913 illustrated in FIG. 23(B), a housing 930a and a housing 930b are attached to each other, and the wound body 950 is provided in a region surrounded by the housing 930a and the housing 930b.

For the housing 930a, an insulating material such as an organic resin can be used. In particular, when a material such as an organic resin is used for the side on which an antenna is formed, blocking of an electric field by the secondary battery 913 can be inhibited. Note that in the case where blocking of an electric field by the housing 930a is small, an antenna such as the antenna 914 or an antenna 915 may be provided inside the housing 930a. For the housing 930b, a metal material can be used, for example.

In addition, FIG. 24 illustrates the structure of the wound body 950. The wound body 950 includes a negative electrode 931, a positive electrode 932, and separators 933. The wound body 950 is a wound body where the negative electrode 931 is stacked to overlap with the positive electrode 932 with the separator 933 sandwiched therebetween and the sheet of the stack is wound. Note that a plurality of stacks of the negative electrode 931, the positive electrode 932, and the separator 933 may be superimposed.

The negative electrode 931 is connected to the terminal 911 illustrated in FIG. 21 via one of the terminal 951 and the terminal 952. The positive electrode 932 is connected to the terminal 911 illustrated in FIG. 21 via the other of the terminal 951 and the terminal 952.

With the use of the positive electrode active material described in the above embodiment for the positive electrode 932, the secondary battery 913 with high capacity and excellent cycle performance can be obtained.

[Laminated Secondary Battery]

Next, examples of a laminated secondary battery are described with reference to FIG. 25 to FIG. 31. With a structure where the laminated secondary battery has flexibility and is incorporated in an electronic device at least part of which has a flexible portion, the secondary battery can also be bent in accordance with the deformation of the electronic device.

Figure 25A:
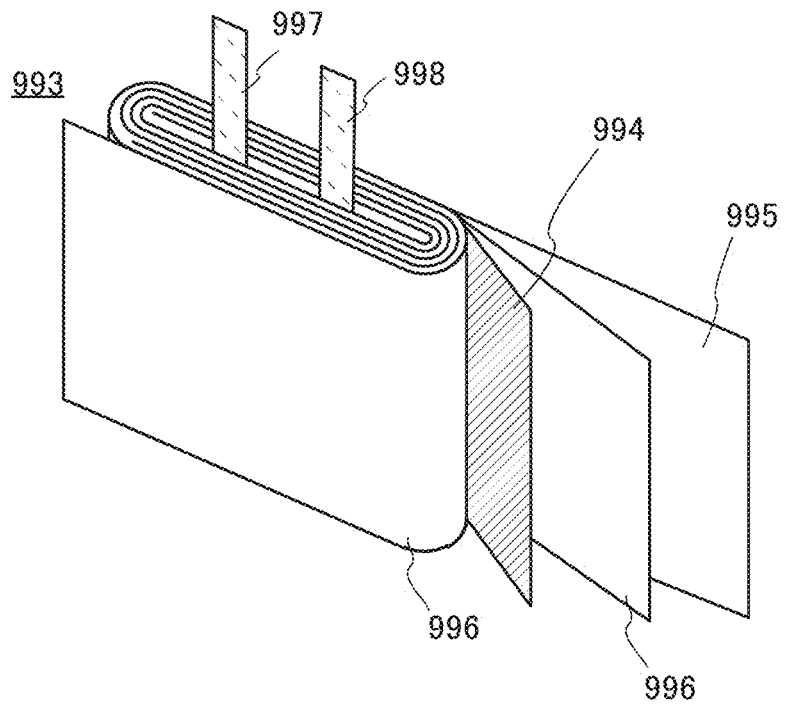
FIG. 25(A) illustrates a laminated secondary battery.

A laminated secondary battery 980 is described using FIG. 25. The laminated secondary battery 980 includes a wound body 993 illustrated in FIG. 25(A). The wound body 993 includes a negative electrode 994, a positive electrode 995, and separators 996. Like the wound body 950 illustrated in FIG. 24, the wound body 993 is a wound body where the negative electrode 994 is stacked to overlap with the positive electrode 995 with the separator 996 sandwiched therebetween and the sheet of the stack is wound.

Note that the number of stacked layers including the negative electrode 994, the positive electrode 995, and the separator 996 may be designed as appropriate depending on required capacity and element volume. The negative electrode 994 is connected to a negative electrode current collector (not illustrated) via one of a lead electrode 997 and a lead electrode 998. The positive electrode 995 is connected to a positive electrode current collector (not illustrated) via the other of the lead electrode 997 and the lead electrode 998.

Figure 25B:
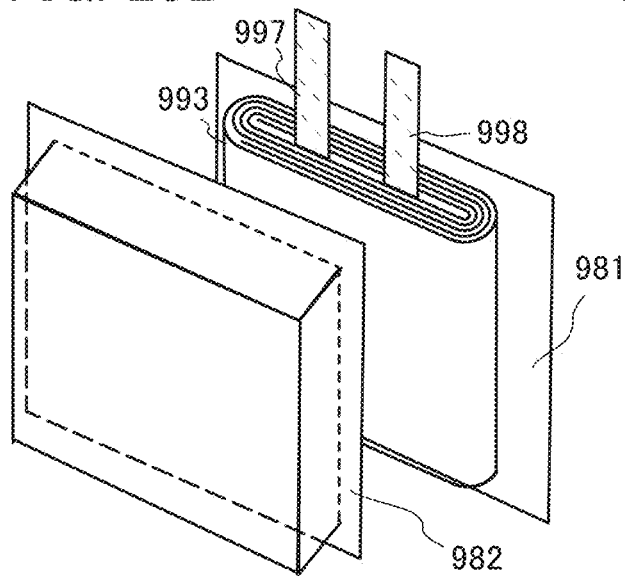
FIG. 25(B) illustrates a laminated secondary battery.
Figure 25C:
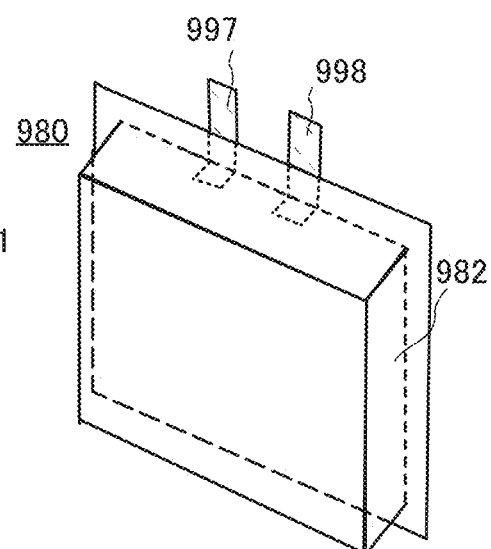
FIG. 25(C) illustrates a laminated secondary battery.

As illustrated in FIG. 25(B), the wound body 993 is packed in a space formed through attachment of a film 981 that serves as an exterior body and a film 982 having a depressed portion by thermocompression bonding or the like, whereby the secondary battery 980 can be manufactured, as illustrated in FIG. 25(C). The wound body 993 includes the lead electrode 997 and the lead electrode 998, and is immersed in an electrolyte solution inside the film 981 and the film 982 having a depressed portion.

For the film 981 and the film 982 having a depressed portion, a metal material such as aluminum or a resin material can be used, for example. With the use of a resin material as the material of the film 981 and the film 982 having a depressed portion, the film 981 and the film 982 having a depressed portion can be deformed when external force is applied; thus, a flexible storage battery can be manufactured.

In addition, although FIG. 25(B) and FIG. 25(C) illustrate an example of using two films, a space may be formed by bending one film and the wound body 993 may be packed in the space.

With the use of the positive electrode active material described in the above embodiment for the positive electrode 995, the secondary battery 980 with high capacity and excellent cycle performance can be obtained.

In addition, FIG. 25 illustrates an example in which the secondary battery 980 includes a wound body in a space formed by films serving as exterior bodies; however, as illustrated in FIG. 26, for example, a secondary battery may include a plurality of strip-shaped positive electrodes, separators, and negative electrodes in a space formed by films serving as exterior bodies.

Figure 26A:
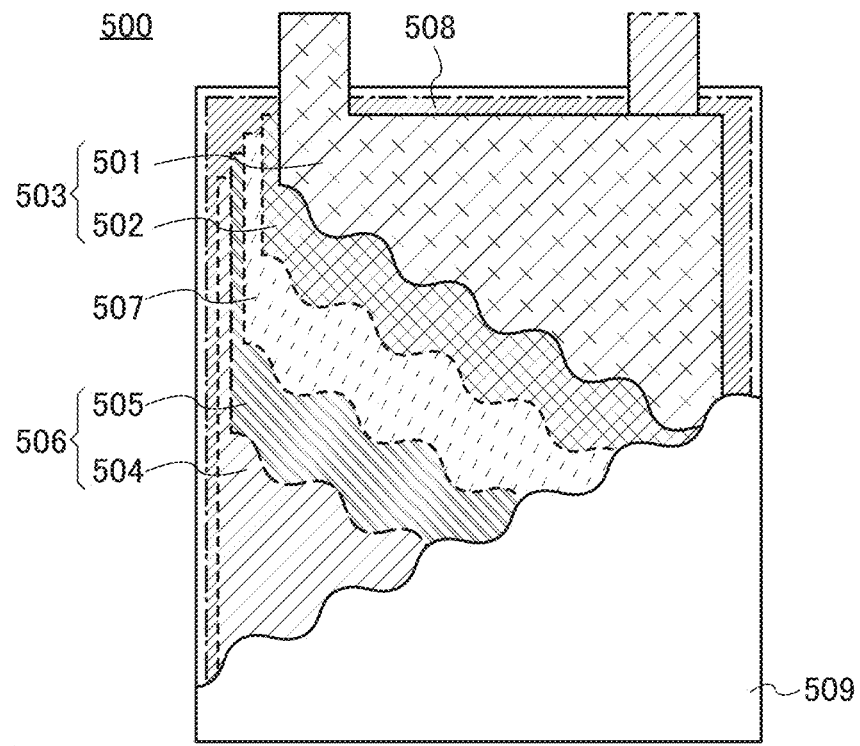
FIG. 26(A) illustrates a laminated secondary battery.

A laminated secondary battery 500 illustrated in FIG. 26(A) includes a positive electrode 503 including a positive electrode current collector 501 and a positive electrode active material layer 502; a negative electrode 506 including a negative electrode current collector 504 and a negative electrode active material layer 505; a separator 507; an electrolyte solution 508; and an exterior body 509. The separator 507 is placed between the positive electrode 503 and the negative electrode 506 provided in the exterior body 509. In addition, the exterior body 509 is filled with the electrolyte solution 508. The electrolyte solution described in Embodiment 2 can be used as the electrolyte solution 508.

In the laminated secondary battery 500 illustrated in FIG. 26(A), the positive electrode current collector 501 and the negative electrode current collector 504 also serve as terminals that make electrical contact with the outside. For this reason, parts of the positive electrode current collector 501 and the negative electrode current collector 504 may be arranged to be exposed from the exterior body 509 to the outside. Alternatively, without exposing the positive electrode current collector 501 and the negative electrode current collector 504 from the exterior body 509 to the outside, a lead electrode may be used, and the lead electrode and the positive electrode current collector 501 or the negative electrode current collector 504 may be bonded by ultrasonic welding so that the lead electrode is exposed to the outside.

In the laminated secondary battery 500, for the exterior body 509, for example, a laminate film having a three-layer structure where a highly flexible metal thin film of aluminum, stainless steel, copper, nickel, or the like is provided over a film formed of a material such as polyethylene, polypropylene, polycarbonate, ionomer, or polyamide, and an insulating synthetic resin film of a polyamide-based resin, a polyester-based resin, or the like is further provided as the outer surface of the exterior body over the metal thin film can be used.

Figure 26B:
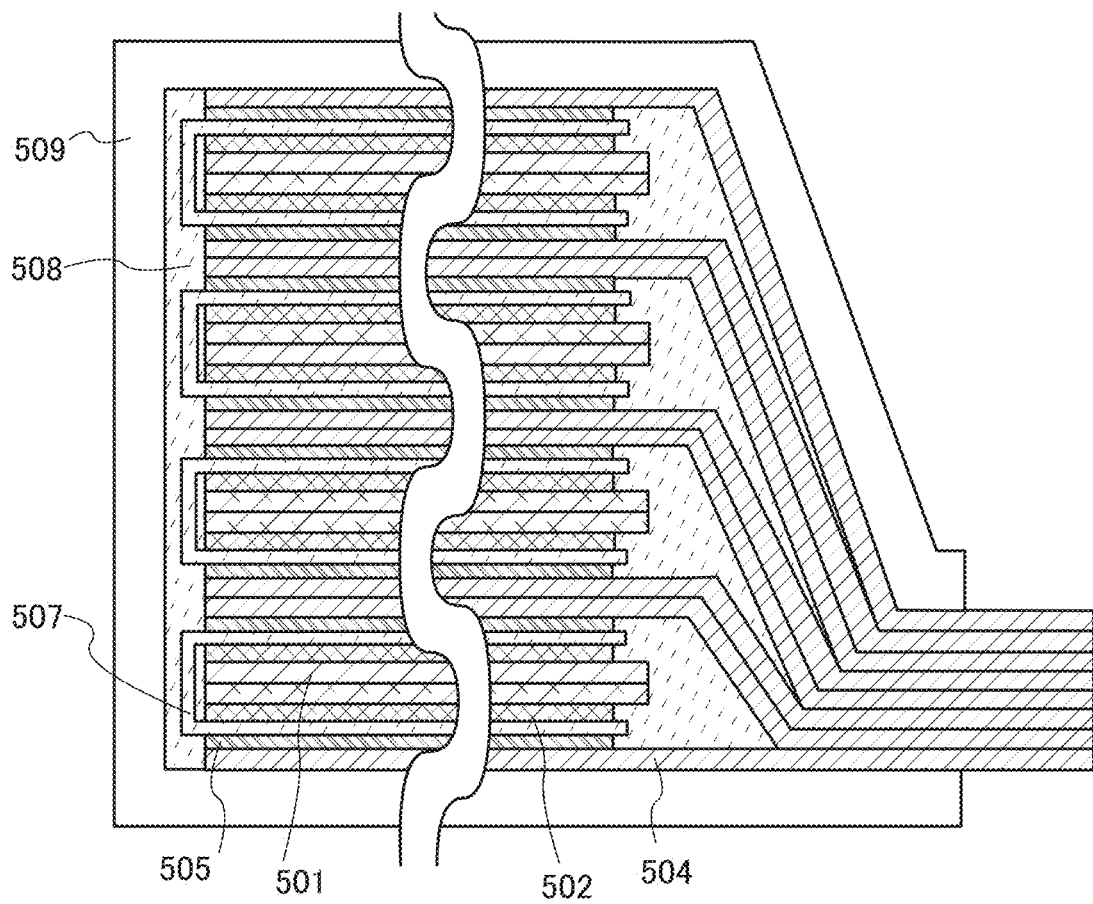
FIG. 26(B) illustrates a laminated secondary battery.

Furthermore, FIG. 26(B) illustrates an example of a cross-sectional structure of the laminated secondary battery 500. Although FIG. 26(A) illustrates an example in which the laminated secondary battery 500 is composed of two current collectors for simplicity, the laminated secondary battery 500 is actually composed of a plurality of electrode layers, as illustrated in FIG. 26(B).

In FIG. 26(B), the number of electrode layers is set to 16, for example. Note that the secondary battery 500 has flexibility even though the number of electrode layers is set to 16. FIG. 26(B) illustrates a structure including total 16 layers of eight layers of negative electrode current collectors 504 and eight layers of positive electrode current collectors 501. Note that FIG. 26(B) illustrates a cross section of the extraction portion of the negative electrode, and the eight layers of the negative electrode current collectors 504 are bonded by ultrasonic welding. It is needless to say that the number of electrode layers is not limited to 16, and may be either more than 16 or less than 16. In the case where the number of electrode layers is large, the secondary battery can have higher capacity. Moreover, in the case where the number of electrode layers is small, the secondary battery can have smaller thickness and high flexibility.

Figure 27:
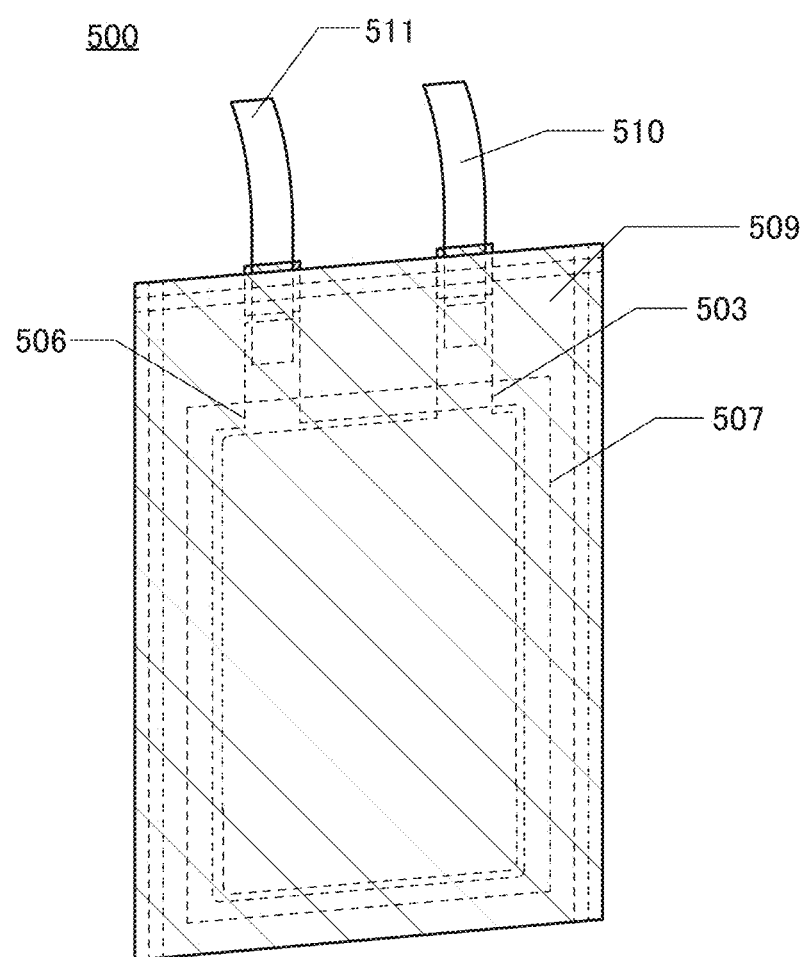
FIG. 27 is an external view of a secondary battery.
Figure 28:
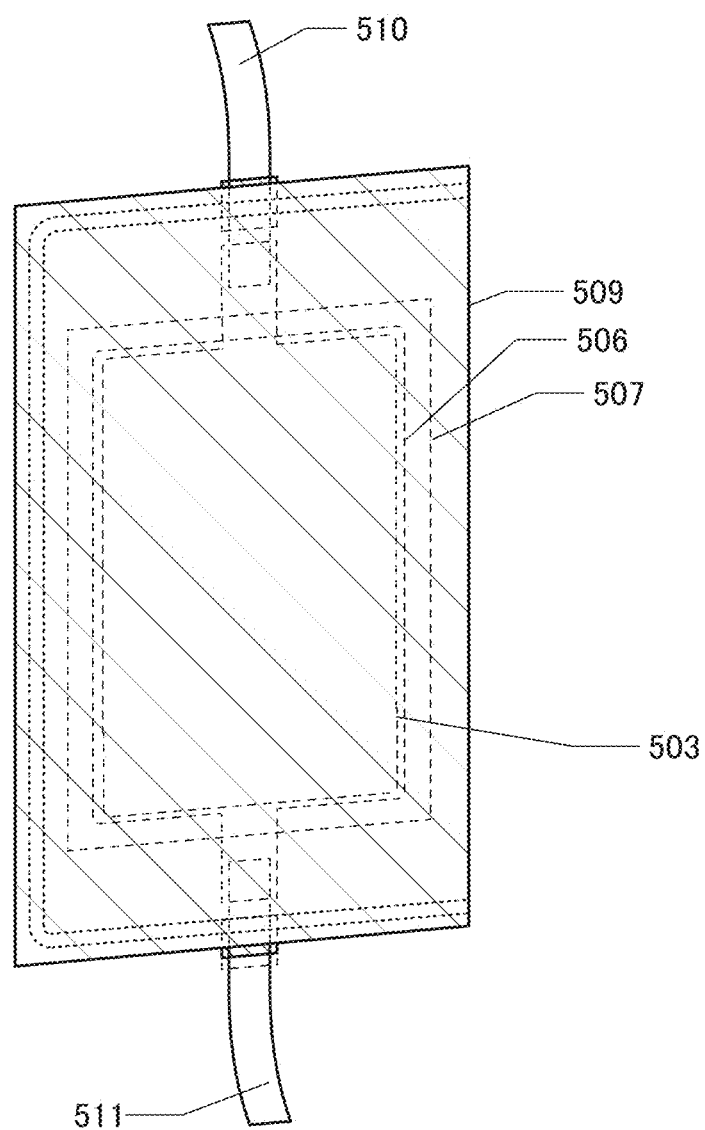
FIG. 28 is an external view of a secondary battery.

Here, FIG. 27 and FIG. 28 illustrate examples of the external view of the laminated secondary battery 500. In FIG. 27 and FIG. 28, the positive electrode 503, the negative electrode 506, the separator 507, the exterior body 509, a positive electrode lead electrode 510, and a negative electrode lead electrode 511 are included.

Figure 29A:
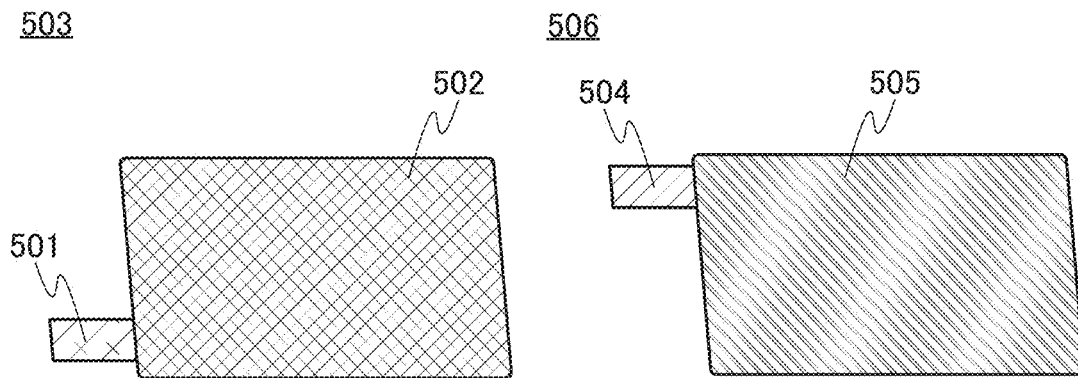
FIG. 29(A) illustrates a manufacturing method of a secondary battery.

FIG. 29(A) illustrates external views of the positive electrode 503 and the negative electrode 506. The positive electrode 503 includes the positive electrode current collector 501, and the positive electrode active material layer 502 is formed on a surface of the positive electrode current collector 501. The positive electrode 503 also includes a region where the positive electrode current collector 501 is partly exposed (hereinafter, such a region is referred to as a tab region). The negative electrode 506 includes the negative electrode current collector 504, and the negative electrode active material layer 505 is formed on a surface of the negative electrode current collector 504. The negative electrode 506 also includes a region where the negative electrode current collector 504 is partly exposed, that is, a tab region. The areas and shapes of the tab regions included in the positive electrode and the negative electrode are not limited to the examples illustrated in FIG. 29(A).

[Manufacturing Method of Laminated Secondary Battery]

Figure 29B:
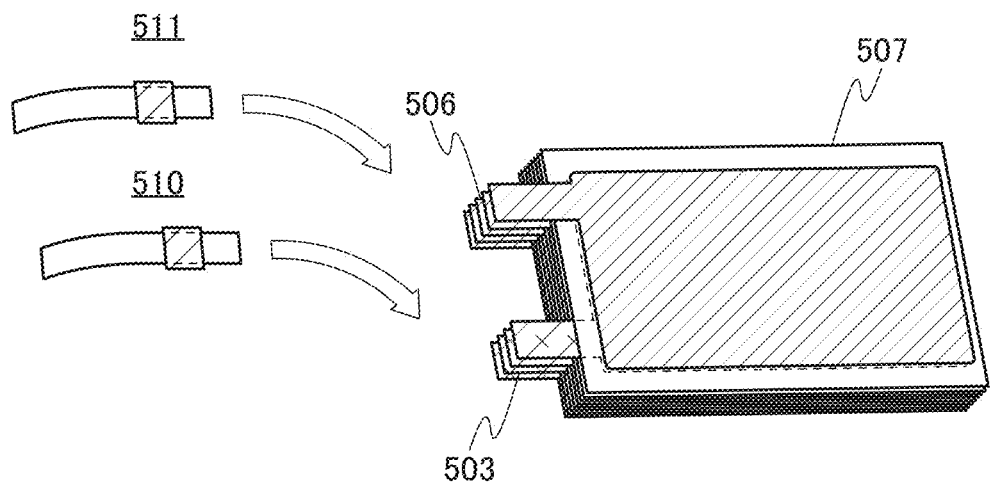
FIG. 29(B) illustrates a manufacturing method of a secondary battery.
Figure 29C:
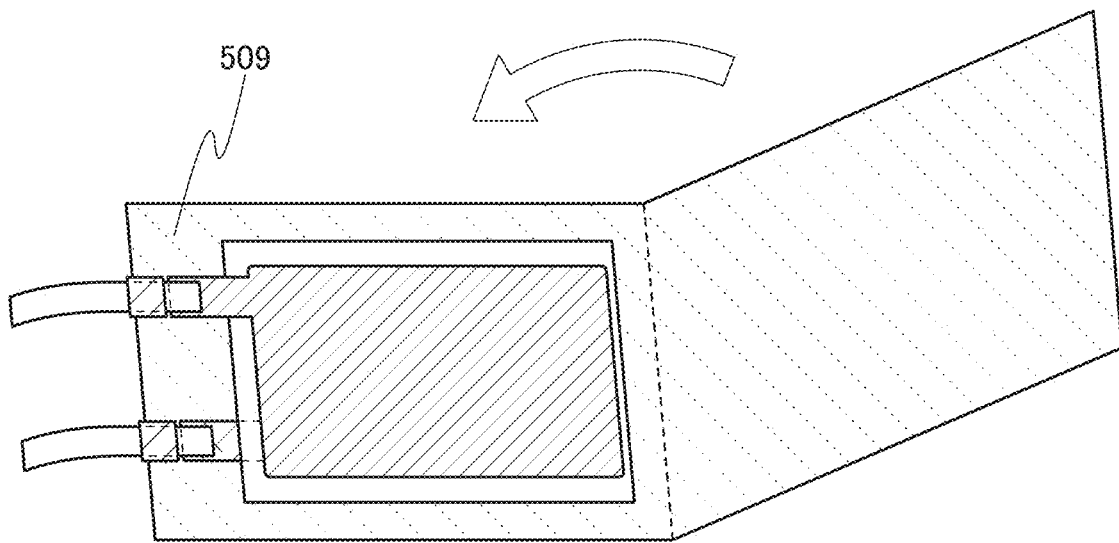
FIG. 29(C) illustrates a manufacturing method of a secondary battery.

Here, an example of a manufacturing method of the laminated secondary battery whose external view is illustrated in FIG. 27 is described using FIGS. 29(B) and 29(C).

First, the negative electrode 506, the separator 507, and the positive electrode 503 are stacked. FIG. 29(B) illustrates the negative electrode 506, the separator 507, and the positive electrode 503 that are stacked. An example of using five sets of negative electrodes and four sets of positive electrodes is described here. Next, the tab regions of the positive electrodes 503 are bonded to each other, and the positive electrode lead electrode 510 is bonded to the tab region of the positive electrode on the outermost surface. Ultrasonic welding or the like may be used for the bonding, for example. In a similar manner, the tab regions of the negative electrodes 506 are bonded to each other, and the negative electrode lead electrode 511 is bonded to the tab region of the negative electrode on the outermost surface.

Next, the negative electrode 506, the separator 507, and the positive electrode 503 are placed over the exterior body 509.

Next, the exterior body 509 is bent along a portion shown by a dashed line, as illustrated in FIG. 29(C). Then, the outer portions of the exterior body 509 are bonded. Thermocompression or the like may be used for the bonding, for example. At this time, an unbonded region (hereinafter referred to as an inlet) is provided for part (or one side) of the exterior body 509 so that the electrolyte solution 508 can be introduced later.

Next, the electrolyte solution 508 (not illustrated) is introduced into the inside of the exterior body 509 from the inlet provided for the exterior body 509. The electrolyte solution 508 is preferably introduced in a reduced pressure atmosphere or in an inert atmosphere. Lastly, the inlet is bonded. In this manner, the laminated secondary battery 500 can be manufactured.

With the use of the positive electrode active material described in the above embodiment for the positive electrode 503, the secondary battery 500 with high capacity and excellent cycle performance can be obtained.

[Bendable Secondary Battery]

Next, an example of a bendable secondary battery is described with reference to FIG. 30 and FIG. 31.

FIG. 30(A) shows a schematic top view of a bendable secondary battery 250. FIGS. 30(B1), 30(B2), and 30(C) are schematic cross-sectional views along the cutting line C1-C2, the cutting line C3-C4, and the cutting line A1-A2, respectively, in FIG. 30(A). The secondary battery 250 includes an exterior body 251, and a positive electrode 211a and a negative electrode 211b that are held in the inside of the exterior body 251. A lead 212a electrically connected to the positive electrode 211a and a lead 212b electrically connected to the negative electrode 211b are extended to the outside of the exterior body 251. In addition to the positive electrode 211a and the negative electrode 211b, an electrolyte solution (not illustrated) is enclosed in a region surrounded by the exterior body 251.

Figure 31A:
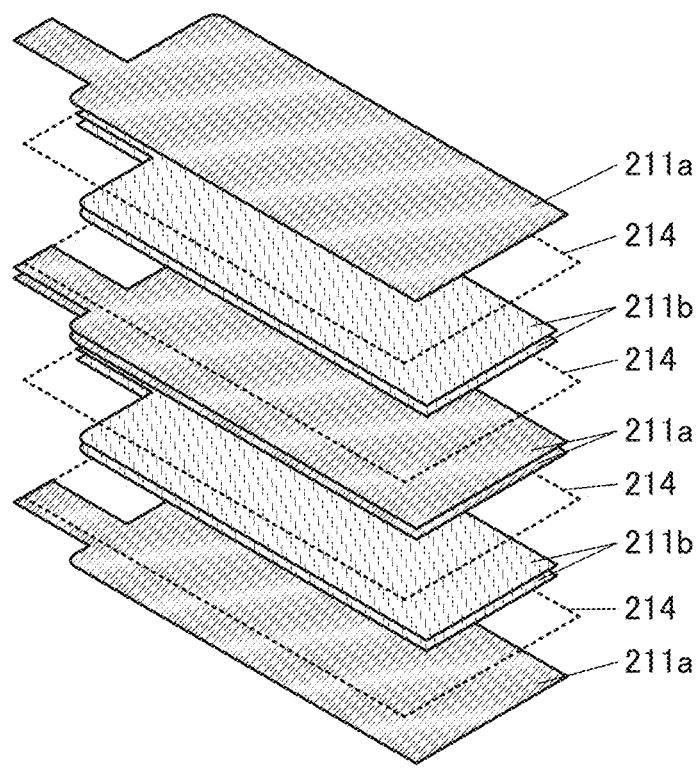
FIG. 31(A) illustrates a bendable secondary battery.
Figure 31B:
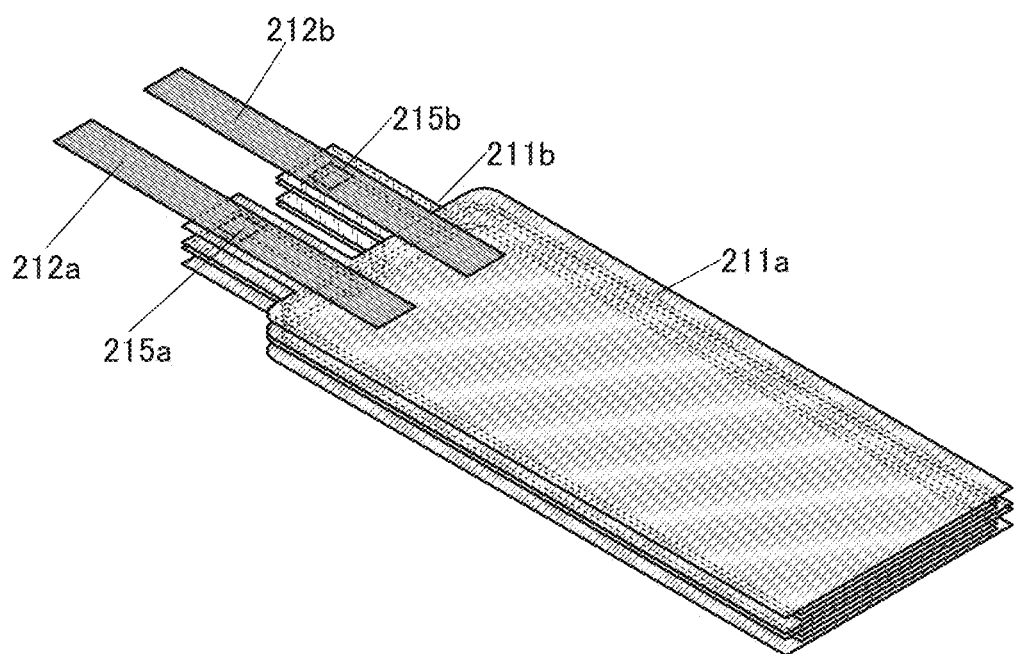
FIG. 31(B) illustrates a bendable secondary battery.

The positive electrode 211a and the negative electrode 211b that are included in the secondary battery 250 are described using FIG. 31. FIG. 31(A) is a perspective view illustrating the stacking order of the positive electrode 211a, the negative electrode 211b, and a separator 214. FIG. 31(B) is a perspective view illustrating the lead 212a and the lead 212b in addition to the positive electrode 211a and the negative electrode 211b.

As illustrated in FIG. 31(A), the secondary battery 250 includes a plurality of strip-shaped positive electrodes 211a, a plurality of strip-shaped negative electrodes 211b, and a plurality of separators 214. The positive electrode 211a and the negative electrode 211b each include a projected tab portion and a portion other than the tab portion. A positive electrode active material layer is formed on a portion of one surface of the positive electrode 211a other than the tab portion, and a negative electrode active material layer is formed on a portion of one surface of the negative electrode 211b other than the tab portion.

The positive electrodes 211a and the negative electrodes 211b are stacked so that surfaces of the positive electrodes 211a where the positive electrode active material layers are not formed are in contact with each other and that surfaces of the negative electrodes 211b where the negative electrode active material are not formed are in contact with each other.

Furthermore, the separator 214 is provided between the surface of the positive electrode 211a on which the positive electrode active material is formed and the surface of the negative electrode 211b on which the negative electrode active material is formed. In FIG. 31, the separator 214 is shown by a dotted line for clarity.

In addition, as illustrated in FIG. 31(B), the plurality of positive electrodes 211a are electrically connected to the lead 212a in a bonding portion 215a. Furthermore, the plurality of negative electrodes 211b are electrically connected to the lead 212b in a bonding portion 215b.

Next, the exterior body 251 is described using FIGS. 30(B1), 30(B2), 30(C), and 30(D).

The exterior body 251 has a film-like shape and is folded in half with the positive electrodes 211a and the negative electrodes 211b between facing portions of the exterior body 251. The exterior body 251 includes a bent portion 261, a pair of seal portions 262, and a seal portion 263. The pair of seal portions 262 is provided with the positive electrodes 211a and the negative electrodes 211b positioned therebetween and thus can also be referred to as side seals. In addition, the seal portion 263 includes portions overlapping with the lead 212a and the lead 212b and can also be referred to as a top seal.

Portions of the exterior body 251 that overlap with the positive electrodes 211a and the negative electrodes 211b preferably have a wave shape in which crest lines 271 and trough lines 272 are alternately arranged. In addition, the seal portions 262 and the seal portion 263 of the exterior body 251 are preferably flat.

FIG. 30(B1) is a cross section cut along a portion overlapping with the crest line 271. FIG. 30(B2) is a cross section cut along a portion overlapping with the trough line 272. FIGS. 30(B1) and 30(B2) both correspond to cross sections of the secondary battery 250, the positive electrodes 211a, and the negative electrodes 211b in the width direction.

Here, the distance between end portions of the positive electrode 211a and the negative electrode 211b in the width direction, that is, the end portions of the positive electrode 211a and the negative electrode 211b, and the seal portion 262, is referred to as a distance La. When the secondary battery 250 changes in shape, for example, is bent, the positive electrode 211a and the negative electrode 211b change in shape such that positions thereof are shifted from each other in the length direction as described later. At the time, if the distance La is too short, the exterior body 251, the positive electrode 211a, and the negative electrode 211b are rubbed hard, so that the exterior body 251 is damaged in some cases. In particular, when a metal film of the exterior body 251 is exposed, the metal film might be corroded by the electrolyte solution. Therefore, the distance La is preferably set as long as possible. On the other hand, if the distance La is too long, the volume of the secondary battery 250 is increased.

In addition, the distance La between the positive electrode 211a and the negative electrode 211b, and the seal portion 262 is preferably increased as the total thickness of the positive electrode 211a and the negative electrode 211b that are stacked is increased.

More specifically, when the total thickness of the positive electrode 211a and the negative electrode 211b that are stacked, and the separator 214 that is not illustrated is set to t, the distance La is 0.8 times or more and 3.0 times or less, preferably 0.9 times or more and 2.5 times or less, further preferably 1.0 times or more and 2.0 times or less as large as the thickness t. When the distance La is in this range, a compact battery that is highly reliable for bending can be achieved.

Furthermore, when the distance between the pair of seal portions 262 is set to a distance Lb, it is preferable that the distance Lb be sufficiently longer than the widths of the positive electrode 211a and the negative electrode 211b (here, a width Wb of the negative electrode 211b). Thus, even if the positive electrode 211a and the negative electrode 211b come into contact with the exterior body 251 when deformation such as repeated bending of the secondary battery 250 is conducted, parts of the positive electrode 211a and the negative electrode 211b can be shifted in the width direction; thus, the positive electrode 211a and the negative electrode 211b can be effectively prevented from being rubbed against the exterior body 251.

For example, the difference between the distance Lb between the pair of seal portions 262 and the width Wb of the negative electrode 211b is 1.6 times or more and 6.0 times or less, preferably 1.8 times or more and 5.0 times or less, further preferably 2.0 times or more and 4.0 times or less as large as the thickness t of the positive electrode 211a and the negative electrode 211b.

In other words, the distance Lb, the width Wb, and the thickness t preferably satisfy the relationship of Formula 1 below.

[Formula 1]

$$\frac{Lb - Wb}{2t} \le a \qquad \text{(Formula 1)}$$

Here, a satisfies 0.8 or more and 3.0 or less, preferably 0.9 or more and 2.5 or less, further preferably 1.0 or more and 2.0 or less.

FIG. 30(C) is a cross section including the lead 212a and corresponds to a cross section of the secondary battery 250, the positive electrode 211a, and the negative electrode 211b in the length direction. As illustrated in FIG. 30(C), in the bent portion 261, a space 273 is preferably included between the end portions of the positive electrode 211a and the negative electrode 211b in the length direction and the exterior body 251.

FIG. 30(D) illustrates a schematic cross-sectional view when the secondary battery 250 is bent. FIG. 30(D) corresponds to a cross section along the cutting line B1-B2 in FIG. 30(A).

When the secondary battery 250 is bent, part of the exterior body 251 positioned on the outer side in bending is stretched and the other part positioned on the inner side in bending is deformed as it shrinks. More specifically, a portion of the exterior body 251 that is positioned on the outer side is deformed such that the wave amplitude becomes smaller and the wave period becomes longer. By contrast, a portion of the exterior body 251 that is positioned on the inner side is deformed such that the wave amplitude becomes larger and the wave period becomes shorter. When the exterior body 251 is deformed in this manner, stress applied to the exterior body 251 in accordance with bending is relieved, so that a material itself of the exterior body 251 does not need to expand and contract. As a result, the secondary battery 250 can be bent with weak force without damage to the exterior body 251.

Furthermore, as illustrated in FIG. 30(D), when the secondary battery 250 is bent, the positive electrode 211a and the negative electrode 211b are shifted relatively to each other. At this time, ends of the stacked plurality of positive electrodes 211a and negative electrodes 211b on the seal portion 263 side are fixed by a fixing member 217. Thus, each of the plurality of positive electrodes 211a and negative electrodes 211b is shifted so that the shift amount becomes larger at a position closer to the bent portion 261. Therefore, stress applied to the positive electrodes 211a and the negative electrodes 211b is relieved, and the positive electrodes 211a and the negative electrodes 211b themselves do not need to expand and contract. Consequently, the secondary battery 250 can be bent without damage to the positive electrodes 211a and the negative electrodes 211b.

Furthermore, the space 273 is included between the positive electrode 211a and the negative electrode 211b, and the exterior body 251, whereby the positive electrode 211a and the negative electrode 211b can be shifted relatively while the positive electrode 211a and the negative electrode 211b located on an inner side in bending do not come in contact with the exterior body 251.

In the secondary battery 250 illustrated in FIG. 30 and FIG. 31, damage to the exterior body, damage to the positive electrode 211a and the negative electrode 211b, and the like are less likely to occur and battery characteristics are less likely to deteriorate even when the secondary battery 250 is repeatedly bent and stretched. With the use of the positive electrode active material described in the above embodiment for the positive electrode 211a included in the secondary battery 250, a battery with better cycle performance can be obtained.

Embodiment 5

In this embodiment, examples of electronic devices each including the secondary battery of one embodiment of the present invention are described.

First, FIG. 32(A) to FIG. 32(G) show examples of electronic devices each including the bendable secondary battery described in part of Embodiment 3. Examples of electronic devices each including the bendable secondary battery include television devices (also referred to as televisions or television receivers), monitors for computers and the like, digital cameras, digital video cameras, digital photo frames, mobile phones (also referred to as cellular phones or mobile phone devices), portable game machines, portable information terminals, audio reproducing devices, large game machines such as pachinko machines, and the like.

In addition, a secondary battery with a flexible shape can also be incorporated along a curved surface of an inside wall or an outside wall of a house or a building or an interior or an exterior of an automobile.

Figure 32A:
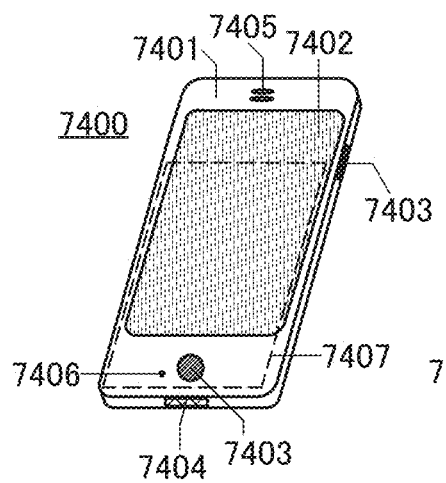
FIG. 32(A) illustrates an example of an electronic device.

FIG. 32(A) illustrates an example of a mobile phone. A mobile phone 7400 includes operation buttons 7403, an external connection port 7404, a speaker 7405, a microphone 7406, and the like in addition to a display portion 7402 incorporated in a housing 7401. Note that the mobile phone 7400 includes a secondary battery 7407. With the use of the secondary battery of one embodiment of the present invention as the secondary battery 7407, a lightweight mobile phone with a long lifetime can be provided.

Figure 32B:
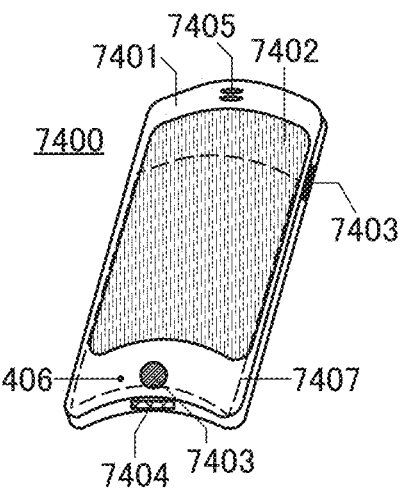
FIG. 32(B) illustrates an example of an electronic device.
Figure 32C:
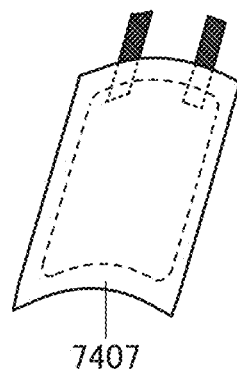
FIG. 32(C) illustrates an example of a secondary battery.

FIG. 32(B) illustrates the mobile phone 7400 in a bent state. When the whole mobile phone 7400 is bent through deformation by external force, the secondary battery 7407 provided therein is also bent. In addition, FIG. 32(C) illustrates the state of the bent secondary battery 7407 at this time. The secondary battery 7407 is a thin storage battery. The secondary battery 7407 is fixed in a state of being bent. Note that the secondary battery 7407 includes a lead electrode electrically connected to a current collector. A structure is employed in which the current collector is, for example, copper foil, and is partly alloyed with gallium to improve adhesion between the current collector and an active material layer in contact with the current collector, and the secondary battery 7407 has high reliability in a state of being bent.

Figure 32D:
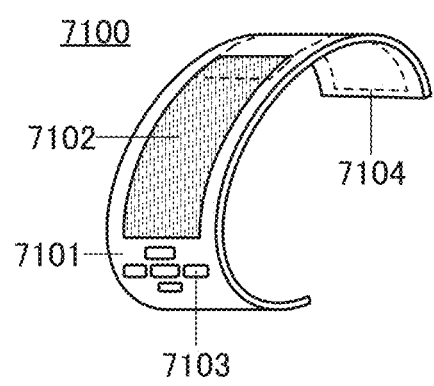
FIG. 32(D) illustrates an example of an electronic device.
Figure 32E:
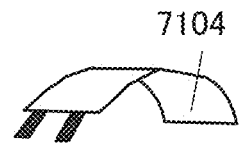
FIG. 32(E) illustrates an example of a secondary battery.

FIG. 32(D) illustrates an example of a bangle-type display device. A portable display device 7100 includes a housing 7101, a display portion 7102, operation buttons 7103, and a secondary battery 7104. In addition, FIG. 32(E) illustrates the state of the bent secondary battery 7104. When the curved secondary battery 7104 is on a user's arm, the housing changes its form and the curvature of a part or the whole of the secondary battery 7104 is changed. Note that a value represented by the radius of a circle that corresponds to the bending condition of a curve at a given point is referred to as the radius of curvature, and the reciprocal of the radius of curvature is referred to as curvature. Specifically, the radius of curvature at part or the whole of the housing or the main surface of the secondary battery 7104 is changed in the range of 40 mm or more to 150 mm or less. When the radius of curvature at the main surface of the secondary battery 7104 is within the range of 40 mm or more to 150 mm or less, reliability can be kept high. With the use of the secondary battery of one embodiment of the present invention as the secondary battery 7104, a lightweight portable display device with a long lifetime can be provided.

Figure 32F:
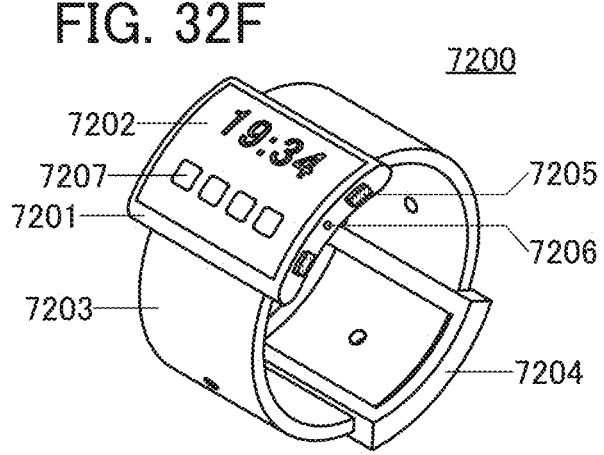
FIG. 32(F) illustrates an example of an electronic device.

FIG. 32(F) illustrates an example of a watch-type portable information terminal. A portable information terminal 7200 includes a housing 7201, a display portion 7202, a band 7203, a buckle 7204, an operation button 7205, an input/output terminal 7206, and the like.

The portable information terminal 7200 is capable of executing a variety of applications such as mobile phone calls, e-mailing, viewing and editing texts, music reproduction, Internet communication, and computer games.

The display surface of the display portion 7202 is provided while being bent, and display can be performed along the bent display surface. In addition, the display portion 7202 includes a touch sensor, and operation can be performed by touching the screen with a finger, a stylus, or the like. For example, by touching an icon 7207 displayed on the display portion 7202, an application can be started.

With the operation button 7205, a variety of functions such as time setting, power on/off operation, wireless communication on/off operation, execution and cancellation of a silent mode, and execution and cancellation of a power saving mode can be performed. For example, the functions of the operation button 7205 can also be set freely by an operating system incorporated in the portable information terminal 7200.

In addition, the portable information terminal 7200 can execute near field communication that is communication standardized. For example, hands-free calling is possible by mutual communication between the portable information terminal 7200 and a headset capable of wireless communication.

Moreover, the portable information terminal 7200 includes the input/output terminal 7206, and data can be directly transmitted to and received from another information terminal via a connector. In addition, charging via the input/output terminal 7206 is also possible. Note that charging operation may be performed by wireless power feeding without using the input/output terminal 7206.

The display portion 7202 of the portable information terminal 7200 includes the secondary battery of one embodiment of the present invention. With the use of the secondary battery of one embodiment of the present invention, a lightweight portable information terminal with a long lifetime can be provided. For example, the secondary battery 7104 illustrated in FIG. 32(E) that is in the state of being bent can be embedded inside the housing 7201. Alternatively, the secondary battery 7104 illustrated in FIG. 32(E) can be embedded inside the band 7203 so that the secondary battery 7104 is in the state of capable of being bent.

The portable information terminal 7200 preferably includes a sensor. As the sensor, for example, a human body sensor such as a fingerprint sensor, a pulse sensor, or a temperature sensor, a touch sensor, a pressure sensor, an acceleration sensor, or the like is preferably mounted.

Figure 32G:
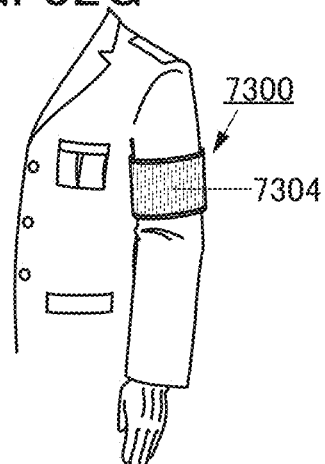
FIG. 32(G) illustrates an example of an electronic device.

FIG. 32(G) illustrates an example of an armband display device. A display device 7300 includes a display portion 7304 and the secondary battery of one embodiment of the present invention. In addition, the display device 7300 can further include a touch sensor in the display portion 7304 and can also serve as a portable information terminal.

The display surface of the display portion 7304 is bent, and display can be performed on the bent display surface. In addition, the display state of the display device 7300 can be changed by, for example, near field communication that is communication standardized, or the like.

In addition, the display device 7300 includes an input/output terminal, and data can be directly transmitted to and received from another information terminal via a connector. In addition, charging via the input/output terminal is also possible. Note that charging operation may be performed by wireless power feeding without using the input/output terminal.

With the use of the secondary battery of one embodiment of the present invention as the secondary battery included in the display device 7300, a lightweight display device with a long lifetime can be provided.

Figure 32H:
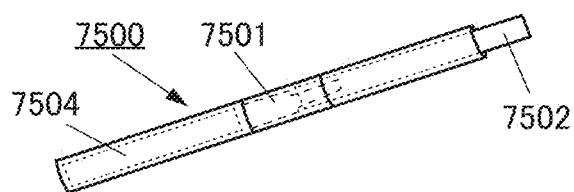
FIG. 32(H) illustrates an example of an electronic device.
Figure 33A:
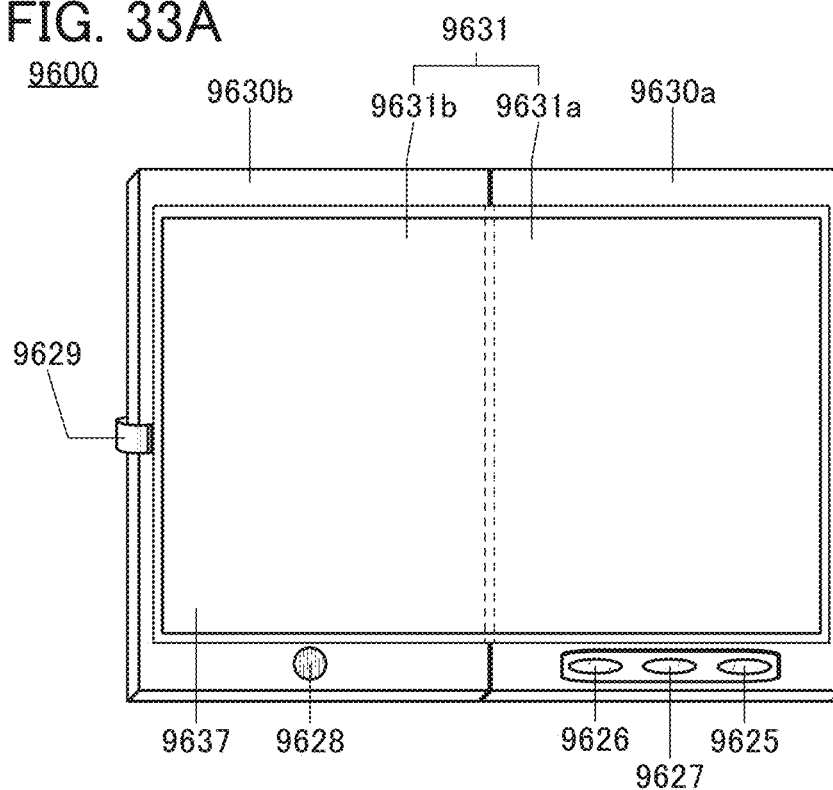
FIG. 33(A) illustrates an example of an electronic device.
Figure 33B:
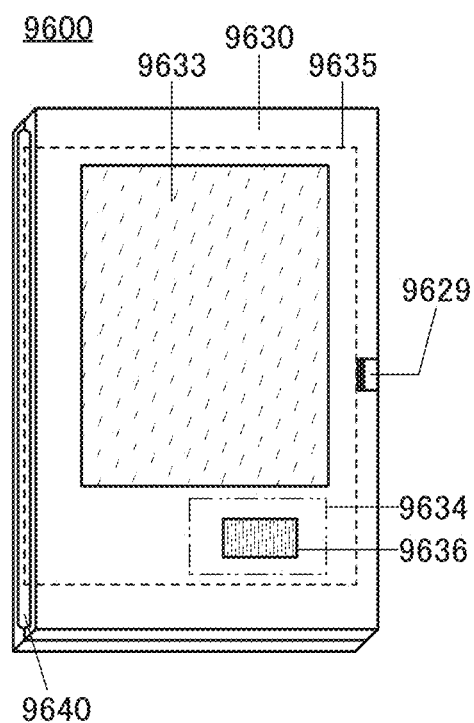
FIG. 33(B) illustrates an example of an electronic device.
Figure 33C:
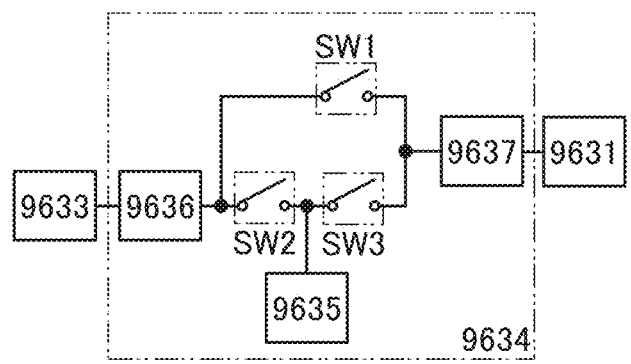
FIG. 33(C) illustrates an example of an electronic device.
Figure 34:
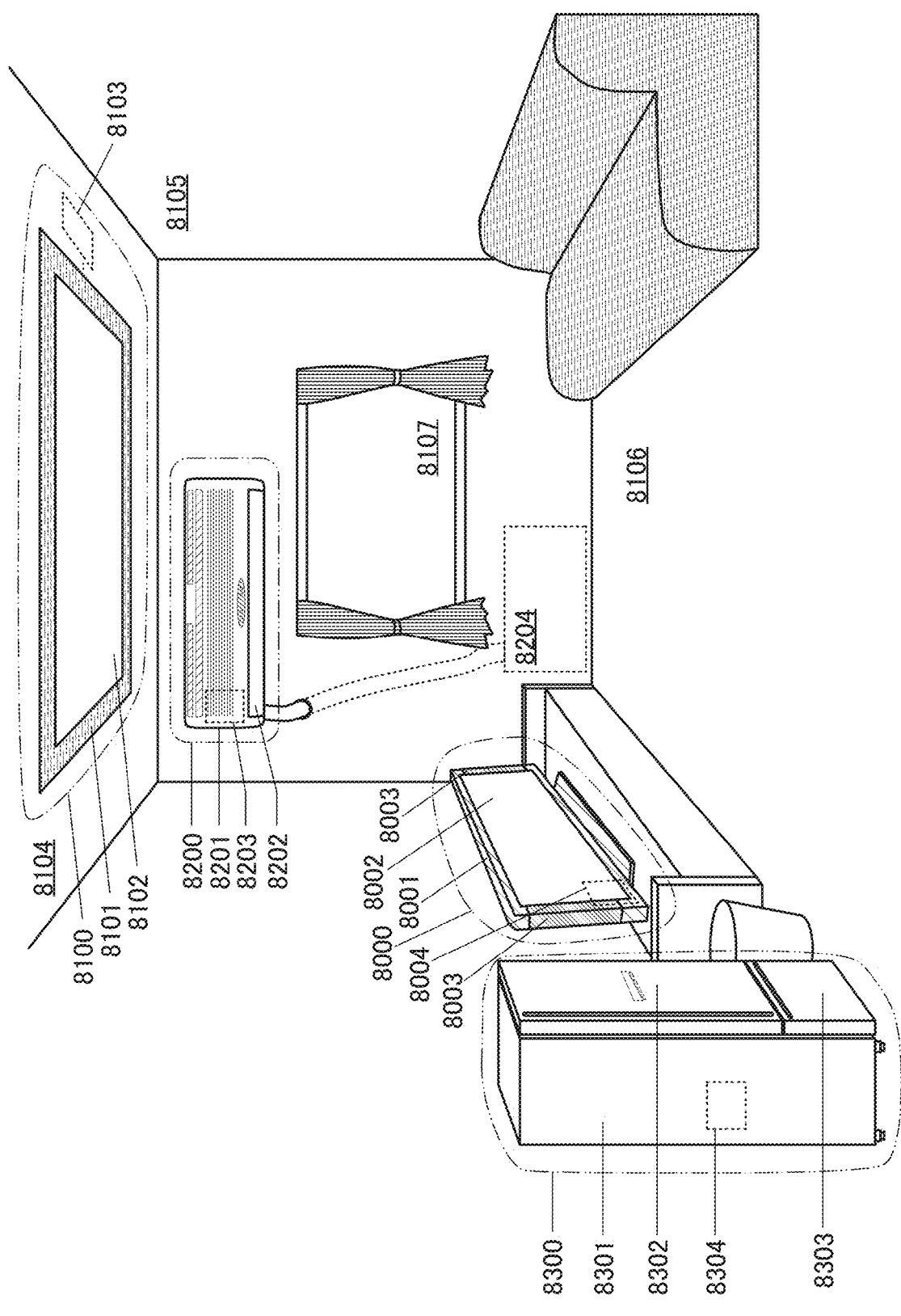
FIG. 34 illustrates examples of electronic devices.

In addition, examples of electronic devices each including the secondary battery with excellent cycle performance described in the above embodiment are described using FIG. 32(H), FIG. 33, and FIG. 34.

With the use of the secondary battery of one embodiment of the present invention as a secondary battery of a daily electronic device, a lightweight product with a long lifetime can be provided. Examples of the daily electronic device include an electric toothbrush, an electric shaver, electric beauty equipment, and the like. As secondary batteries of these products, small and lightweight secondary batteries with stick-like shapes and high capacity are desired in consideration of handling ease for users.

FIG. 32(H) is a perspective view of a device also called a cigarette smoking device (electronic cigarette). In FIG. 32(H), an electronic cigarette 7500 is composed of an atomizer 7501 including a heating element, a secondary battery 7504 that supplies power to the atomizer, and a cartridge 7502 including a liquid supply bottle, a sensor, and the like. To increase safety, a protection circuit that prevents overcharge and overdischarge of the secondary battery 7504 may be electrically connected to the secondary battery 7504. The secondary battery 7504 illustrated in FIG. 32(H) includes an external terminal for connection to a charger. When the electronic cigarette 7500 is held, the secondary battery 7504 is a tip portion; thus, it is desirable that the secondary battery 7504 have a short total length and be lightweight. Since the secondary battery of one embodiment of the present invention has high capacity and excellent cycle performance, the small and lightweight electronic cigarette 7500 that can be used for a long time over a long period can be provided.

FIG. 33(A) and FIG. 33(B) show an example of a double-foldable tablet terminal. A tablet terminal 9600 illustrated in FIG. 33(A) and FIG. 33(B) includes a housing 9630*a*, a housing 9630*b*, a movable portion 9640 that connects the housing 9630*a* to the housing 9630*b*, a display portion 9631 that includes a display portion 9631*a* and a display portion 9631*b*, a switch 9625 to a switch 9627, a fastener 9629, and an operation switch 9628. When a flexible panel is used for the display portion 9631, a tablet terminal with a larger display portion can be provided. FIG. 33(A) shows the tablet terminal 9600 that is opened, and FIG. 33(B) shows the tablet terminal 9600 that is closed.

The tablet terminal 9600 includes a power storage unit 9635 inside the housing 9630*a* and the housing 9630*b*. The power storage unit 9635 is provided across the housing 9630*a* and the housing 9630*b*, passing through the movable portion 9640.

The entire region or part of the region of the display portion 9631 can be a touch panel region, and data can be input by touching an image including an icon, text, an input form, or the like displayed on the region. For example, keyboard buttons may be displayed on the entire surface of the display portion 9631*a* on the housing 9630*a* side, and data such as text or an image may be displayed on the display portion 9631*b* on the housing 9630*b* side.

Alternatively, a keyboard may be displayed on the display portion 9631*b* on the housing 9630*b* side, and data such as text or an image may be displayed on the display portion 9631*a* on the housing 9630*a* side. Alternatively, a button for switching keyboard display on a touch panel may be displayed on the display portion 9631, and the button may be touched with a finger, a stylus, or the like to display a keyboard on the display portion 9631.

In addition, touch input can also be performed concurrently in a touch panel region in the display portion 9631*a* on the housing 9630*a* side and a touch panel region in the display portion 9631*b* on the housing 9630*b* side.

In addition, the switch 9625 to the switch 9627 may function not only as interfaces for operating the tablet terminal 9600 but also as interfaces that can switch various functions. For example, at least one of the switch 9625 to the switch 9627 may function as a switch for switching power on/off of the tablet terminal 9600. For another example, at least one of the switch 9625 to the switch 9627 may have a function of switching display between a portrait mode and a landscape mode or a function of switching display between monochrome display and color display. For another example, at least one of the switch 9625 to the switch 9627 may have a function of adjusting the luminance of the display portion 9631. Alternatively, the luminance of the display portion 9631 can be optimized in accordance with the amount of external light in use of the tablet terminal 9600, which is detected by an optical sensor incorporated in the tablet terminal 9600. Note that another sensing device including a sensor for measuring inclination, such as a gyroscope sensor or an acceleration sensor, may be incorporated in the tablet terminal, in addition to the optical sensor.

In addition, FIG. 33(A) illustrates the example where the display portion 9631a on the housing 9630a side and the display portion 9631b on the housing 9630b side have substantially the same display area; however, there is no particular limitation on the display area of each of the display portion 9631a and the display portion 9631b, and one of the display portions may have a size different from that of the other of the display portions, and one of the display portions may have display quality different from that of the other of the display portions. For example, one may be a display panel that can display higher-definition images than the other.

The tablet terminal 9600 is folded in half in FIG. 33(B). The tablet terminal 9600 includes a housing 9630, a solar cell 9633, and a charge and discharge control circuit 9634 including a DCDC converter 9636. In addition, the power storage unit of one embodiment of the present invention is used as the power storage unit 9635.

Note that as described above, the tablet terminal 9600 can be folded in half, thus, the tablet terminal 9600 can be folded such that the housing 9630a and the housing 9630b overlap with each other when not in use. The display portion 9631 can be protected owing to the folding, which increases the durability of the tablet terminal 9600. Since the power storage unit 9635 including the secondary battery of one embodiment of the present invention has high capacity and excellent cycle performance, the tablet terminal 9600 that can be used for a long time over a long period can be provided.

In addition, the tablet terminal 9600 illustrated in FIG. 33(A) and FIG. 33(B) can also have a function of displaying various kinds of data (a still image, a moving image, a text image, and the like), a function of displaying a calendar, a date, or time on the display portion, a touch-input function of operating or editing data displayed on the display portion by touch input, a function of controlling processing by a variety of software (programs), and the like.

With the solar cell 9633 that is attached onto the surface of the tablet terminal 9600, power can be supplied to a touch panel, a display portion, a video signal processing portion, and the like. Note that it is possible to obtain a structure where the solar cell 9633 can be provided on one surface or both surfaces of the housing 9630 and the power storage unit 9635 is charged efficiently. Note that the use of a lithium-ion battery as the power storage unit 9635 brings an advantage such as a reduction in size.

In addition, the structure and operation of the charge and discharge control circuit 9634 illustrated in FIG. 33(B) will be described using a block diagram in FIG. 33(C). The solar cell 9633, the power storage unit 9635, the DCDC converter 9636, a converter 9637, switches SW1 to SW3, and the display portion 9631 are illustrated in FIG. 33(C). The power storage unit 9635, the DCDC converter 9636, the converter 9637, and the switches SW1 to SW3 are portions that correspond to the charge and discharge control circuit 9634 illustrated in FIG. 33(B).

First, an operation example when power is generated by the solar cell 9633 using external light is described. The voltage of power generated by the solar cell is raised or lowered by the DCDC converter 9636 to be a voltage for charging the power storage unit 9635. Then, when the power from the solar cell 9633 is used for the operation of the display portion 9631, the switch SW1 is turned on and the voltage of the power is raised or lowered by the converter 9637 to be a voltage needed for the display portion 9631. In addition, when display on the display portion 9631 is not performed, a structure where SW1 is turned off and SW2 is turned on to charge the power storage unit 9635 may be used.

Note that the solar cell 9633 is described as an example of a power generation means; however, there is no particular limitation on this example. A structure where the power storage unit 9635 is charged using another power generation means such as a piezoelectric element or a thermoelectric conversion element (Peltier element) may be used. For example, a structure where the power storage unit 9635 is charged with a non-contact power transmission module that transmits and receives power wirelessly (without contact) for charging, or with a combination of another charging means may be used.

FIG. 34 illustrates other examples of electronic devices. In FIG. 34, a display device 8000 is an example of an electronic device using a secondary battery 8004 of one embodiment of the present invention. Specifically, the display device 8000 corresponds to a display device for TV broadcast reception and includes a housing 8001, a display portion 8002, speaker portions 8003, the secondary battery 8004, and the like. The secondary battery 8004 of one embodiment of the present invention is provided inside the housing 8001. The display device 8000 can be supplied with power from a commercial power supply, or the display device 8000 can use power stored in the secondary battery 8004. Thus, the display device 8000 can be utilized with the use of the secondary battery 8004 of one embodiment of the present invention as an uninterruptible power supply even when power cannot be supplied from a commercial power supply due to a power failure or the like.

A semiconductor display device such as a liquid crystal display device, a light-emitting device in which a light-emitting element such as an organic EL element is provided in each pixel, an electrophoresis display device, a DMD (Digital Micromirror Device), a PDP (Plasma Display Panel), or an FED (Field Emission Display) can be used for the display portion 8002.

Note that the display device includes all of information display devices for personal computers, advertisement display, and the like besides information display devices for TV broadcast reception.

In FIG. 34, an installation lighting device 8100 is an example of an electronic device using a secondary battery 8103 of one embodiment of the present invention. Specifically, the lighting device 8100 includes a housing 8101, a light source 8102, the secondary battery 8103, and the like. Although FIG. 34 illustrates the case where the secondary battery 8103 is provided inside a ceiling 8104 on which the housing 8101 and the light source 8102 are installed, the secondary battery 8103 may be provided inside the housing 8101. The lighting device 8100 can be supplied with power from a commercial power supply, or the lighting device 8100 can use power stored in the secondary battery 8103. Thus, the lighting device 8100 can be utilized with the use of the secondary battery 8103 of one embodiment of the present invention as an uninterruptible power supply even when power cannot be supplied from a commercial power supply due to a power failure or the like.

Note that although the installation lighting device 8100 provided in the ceiling 8104 is illustrated in FIG. 34, the secondary battery of one embodiment of the present invention can be used for an installation lighting device provided in, for example, a wall 8105, a floor 8106, a window 8107, or the like other than the ceiling 8104, or can be used in a tabletop lighting device or the like.

In addition, an artificial light source that obtains light artificially by using power can be used as the light source 8102. Specifically, an incandescent lamp, a discharge lamp such as a fluorescent lamp, and light-emitting elements such as an LED and an organic EL element are given as examples of the artificial light source.

In FIG. 34, an air conditioner including an indoor unit 8200 and an outdoor unit 8204 is an example of an electronic device using a secondary battery 8203 of one embodiment of the present invention. Specifically, the indoor unit 8200 includes a housing 8201, an air outlet 8202, the secondary battery 8203, and the like. Although FIG. 34 illustrates the case where the secondary battery 8203 is provided in the indoor unit 8200, the secondary battery 8203 may be provided in the outdoor unit 8204. Alternatively, the secondary batteries 8203 may be provided in both the indoor unit 8200 and the outdoor unit 8204. The air conditioner can be supplied with power from a commercial power supply, or the air conditioner can use power stored in the secondary battery 8203. Particularly in the case where the secondary batteries 8203 are provided in both the indoor unit 8200 and the outdoor unit 8204, the air conditioner can be utilized with the use of the secondary batteries 8203 of one embodiment of the present invention as uninterruptible power supplies even when power cannot be supplied from a commercial power supply due to a power failure or the like.

Note that although the split-type air conditioner composed of the indoor unit and the outdoor unit is illustrated in FIG. 34, the secondary battery of one embodiment of the present invention can also be used in an integrated air conditioner in which one housing has the function of an indoor unit and the function of an outdoor unit.

In FIG. 34, an electric refrigerator-freezer 8300 is an example of an electronic device using a secondary battery 8304 of one embodiment of the present invention. Specifically, the electric refrigerator-freezer 8300 includes a housing 8301, a refrigerator door 8302, a freezer door 8303, the secondary battery 8304, and the like. The secondary battery 8304 is provided inside the housing 8301 in FIG. 34. The electric refrigerator-freezer 8300 can be supplied with power from a commercial power supply, or the electric refrigerator-freezer 8300 can use power stored in the secondary battery 8304. Thus, the electric refrigerator-freezer 8300 can be utilized with the use of the secondary battery 8304 of one embodiment of the present invention as an uninterruptible power supply even when power cannot be supplied from a commercial power supply due to a power failure or the like.

Note that among the electronic devices described above, a high-frequency heating device such as a microwave oven and an electronic device such as an electric rice cooker require high power in a short time. Therefore, the tripping of a breaker of a commercial power supply in use of an electronic device can be prevented by using the secondary battery of one embodiment of the present invention as an auxiliary power supply for supplying power which cannot be supplied enough by the commercial power supply.

In addition, in a time period when electronic devices are not used, particularly in a time period when the proportion of the amount of power that is actually used to the total amount of power that can be supplied from a commercial power supply (such a proportion is referred to as a usage rate of power) is low, power is stored in the secondary battery, whereby the increase in the usage rate of power can be inhibited in a time period other than the above time period. For example, in the case of the electric refrigerator-freezer 8300, power is stored in the secondary battery 8304 in night time when the temperature is low and the refrigerator door 8302 and the freezer door 8303 are not opened and closed. Moreover, in daytime when the temperature is high and the refrigerator door 8302 and the freezer door 8303 are opened and closed, the usage rate of power in daytime can be kept low by using the secondary battery 8304 as an auxiliary power supply.

According to one embodiment of the present invention, the cycle performance of the secondary battery can be made better and reliability can be improved. Furthermore, according to one embodiment of the present invention, a secondary battery with high capacity can be obtained; thus, the secondary battery itself can be made more compact and lightweight owing to the improvement in the characteristics of the secondary battery. Thus, the secondary battery of one embodiment of the present invention is incorporated in the electronic device described in this embodiment, whereby a more lightweight electronic device with a longer lifetime can be obtained. This embodiment can be implemented by being combined with the other embodiments as appropriate.

Embodiment 6

In this embodiment, examples of vehicles each including the secondary battery of one embodiment of the present invention are described.

By incorporating secondary batteries in vehicles, next-generation clean energy automobiles such as hybrid electric vehicles (HEV), electric vehicles (EV), and plug-in hybrid electric vehicles (PHEV) can be achieved.

Figure 35A:
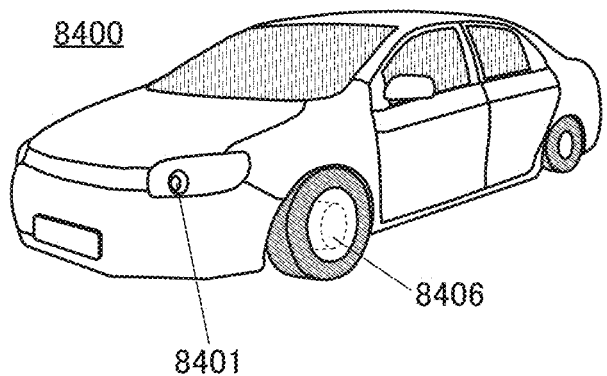
FIG. 35(A) illustrates an example of a vehicle.

FIG. 35 illustrates examples of vehicles each using the secondary battery of one embodiment of the present invention. An automobile 8400 illustrated in FIG. 35(A) is an electric vehicle that runs on the power of an electric motor. Alternatively, the automobile 8400 is a hybrid electric vehicle capable of running on the power of either an electric motor or an engine as appropriate. The use of one embodiment of the present invention can achieve a vehicle with a wide cruising range. In addition, the automobile 8400 includes a secondary battery. As the secondary battery, the modules of the secondary batteries illustrated in FIG. 20(C) and FIG. 20(D) may be arranged to be used in a floor portion in the automobile. Alternatively, a battery pack in which a plurality of secondary batteries illustrated in FIG. 23 are combined may be placed in the floor portion in the automobile. The secondary battery not only drives an electric motor 8406 but also can supply power to a light-emitting device such as a headlight 8401 or a room light (not illustrated).

In addition, the secondary battery can supply power to a display device included in the automobile 8400, such as a speedometer or a tachometer. Furthermore, the secondary battery can supply power to a semiconductor device included in the automobile 8400, such as a navigation system.

Figure 35B:
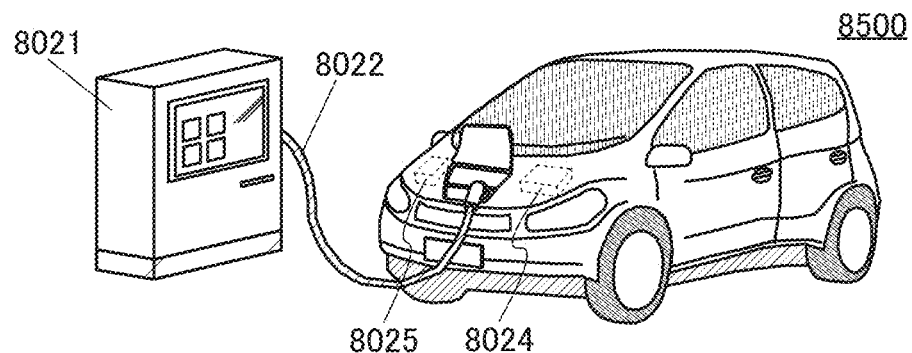
FIG. 35(B) illustrates an example of a vehicle.

An automobile 8500 illustrated in FIG. 35(B) can be charged when a secondary battery included in the automobile 8500 is supplied with power through external charging equipment by a plug-in system, a contactless power feeding system, or the like. FIG. 35(B) illustrates a state where a secondary battery 8024 incorporated in the automobile 8500 is charged from a ground installation type charging device 8021 through a cable 8022. Charging may be performed as appropriate by a given method such as CHAdeMO (registered trademark) or Combined Charging System as a charging method, the standard of a connector, or the like. The charging device 8021 may be a charging station provided in a commerce facility or a power source in a house. For example, with a plug-in technique, the secondary battery 8024 incorporated in the automobile 8500 can be charged by power supply from the outside. Charging can be performed by converting AC power into DC power through a converter such as an ACDC converter.

Furthermore, although not illustrated, a power receiving device can be incorporated in the vehicle, and the vehicle can be charged by being supplied with power from an above-ground power transmitting device in a contactless manner. In the case of this contactless power feeding system, by incorporating a power transmitting device in a road or an exterior wall, charging can also be performed while the vehicle is driven without limitation on the period while the vehicle is stopped. In addition, this contactless power feeding system may be utilized to transmit and receive power between vehicles. Furthermore, a solar cell may be provided in the exterior of the vehicle to charge the secondary battery while the vehicle is stopped or while the vehicle is driven. For supply of power in such a contactless manner, an electromagnetic induction method or a magnetic resonance method can be used.

Figure 35C:
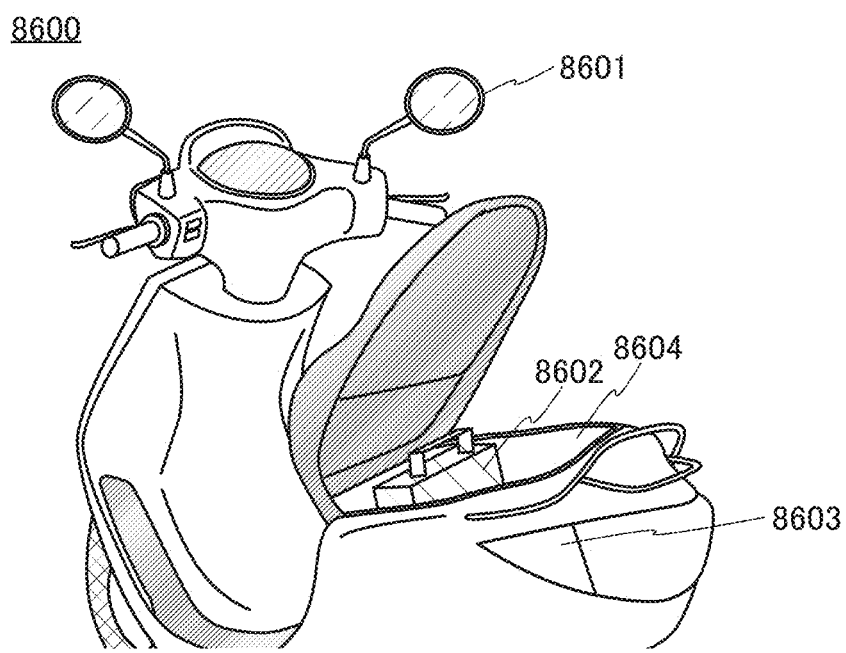
FIG. 35(C) illustrates an example of a vehicle.

In addition, FIG. 35(C) is an example of a motorcycle using the secondary battery of one embodiment of the present invention. A motor scooter 8600 illustrated in FIG. 35(C) includes a secondary battery 8602, side mirrors 8601, and direction indicators 8603. The secondary battery 8602 can supply electricity to the direction indicators 8603.

Furthermore, in the motor scooter 8600 illustrated in FIG. 35(C), the secondary battery 8602 can be stored in an under-seat storage 8604. The secondary battery 8602 can be stored in the under-seat storage 8604 even when the under-seat storage 8604 is small. The secondary battery 8602 is detachable; thus, the secondary battery 8602 may be carried indoors when charged, and may be stored before the motor scooter is driven.

According to one embodiment of the present invention, the cycle performance of the secondary battery can be made better, and the capacity of the secondary battery can be increased. Thus, the secondary battery itself can be made more compact and lightweight. When the secondary battery itself can be made more compact and lightweight, it contributes to a reduction in the weight of a vehicle, and thus can improve the cruising range. Furthermore, the secondary battery incorporated in the vehicle can also be used as a power supply source for devices other than the vehicle. In that case, the use of a commercial power supply can be avoided at peak time of power demand, for example. Avoiding the use of a commercial power supply at peak time of power demand can contribute to energy saving and a reduction in carbon dioxide discharge. Moreover, with excellent cycle performance, the secondary battery can be used over a long period; thus, the use amount of rare metal including cobalt can be reduced.

This embodiment can be implemented by being combined with the other embodiments as appropriate.

Example 1

In this example, a positive electrode of one embodiment of the present invention was fabricated and evaluated.
<Sample 1>

In Sample 1, the steps up to Step S35 of the formation method shown in FIG. 7 were conducted, whereby the first substance 101 was formed.

First, LiF and $MgF_2$ were weighted so that the molar ratio of LiF to $MgF_2$ was LiF:$MgF_2$=1:3, acetone was added as a solvent, and the materials were mixed and ground by a wet process. The mixing and the grinding were performed in a ball mill using a zirconia ball at 150 rpm for one hour. The materials after the treatments were collected to be a first mixture (Step S11 to Step S14).

Next, CELLSEED C-10N manufactured by NIPPON CHEMICAL INDUSTRIAL CO., LTD. was used as lithium cobalt oxide synthesized in advance (Step S25). CELLSEED C-10N is lithium cobalt oxide having a D50 of approximately 12 μm and containing few impurities.

Next, the materials were weighted so that the atomic weight of magnesium contained in the mixture 902 was 0.5 atomic % with respect to the molecular weight of lithium cobalt oxide, and the mixture 902 and lithium cobalt oxide were mixed by a dry process. The mixing was performed in a ball mill using a zirconia ball at 150 rpm for one hour. The materials after the treatments were collected to be the mixture 903 (S31 to Step S33).

Next, the mixture 903 was put in an alumina crucible and annealed at 850° C. using a muffle furnace in an oxygen atmosphere for 60 hours. At the time of annealing, the alumina crucible was covered with a lid. The flow rate of oxygen was 10 L/min. The temperature rise was 200° C./hr, and it took longer than or equal to 10 hours to lower the temperature. The material after the heat treatment was the first substance 101 (Step S34 and Step S35).

Next, lithium phosphate was prepared and ground (Step S45). The grinding was performed in a ball mill using a zirconia ball at 400 rpm for 60 hours. After the grinding, lithium phosphate was made to pass through a sieve with 300 μmϕ.

Next, lithium phosphate subjected to the grinding was mixed to the first substance 101 (Step S46). The amount of mixed lithium phosphate was an amount corresponding to 0.06 mol when the first substance 101 was 1 mol. The mixing was performed in a ball mill using a zirconia ball at 150 rpm for one hour. After the mixing, the mixture was made to pass through a sieve with 300 μmϕ. After that, the obtained mixture was put in an alumina crucible, the alumina crucible was covered with a lid, and annealing was performed at 750° C. for 20 hours in an oxygen atmosphere (Step S47). Then, the mixture was made to pass through a sieve with 53 μmϕ, and powder was collected (Step S48); thus, Sample 1 was obtained.

[Fabrication of Positive Electrode]

Next, a positive electrode was fabricated using Sample 1 formed in the above.

A positive electrode that was fabricated in such a manner that Sample 1 was used as an active material and a current collector was coated with slurry in which the active material, AB, and PVDF were mixed at the active material:AB: PVDF=95:3:2 (weight ratio) was used. As a solvent of the slurry, NMP was used.

After coating the current collector with the slurry, the solvent was volatized, and thus a positive electrode, Electrode 1-1, was obtained. After a pressure of 210 kN/m was applied to Electrode 1-1, a pressure of 1467 kN/m was further applied; thus, Electrode 1-2 was obtained. Electrode 1-1 had a carried amount of approximately 20 mg/cm$^2$ and an electrode density of approximately 2.0 g/cm$^3$. Electrode 1-2 had a carried amount of approximately 20 mg/cm$^2$ and an electrode density of approximately 3.7 g/cm$^3$.

[Cross-Sectional Observation]

Obtained Electrode 1-1 and Electrode 1-2 were polished using a cross section polisher, and their cross sections were exposed to be observed with a scanning electron microscope (SEM).

Figure 36A:
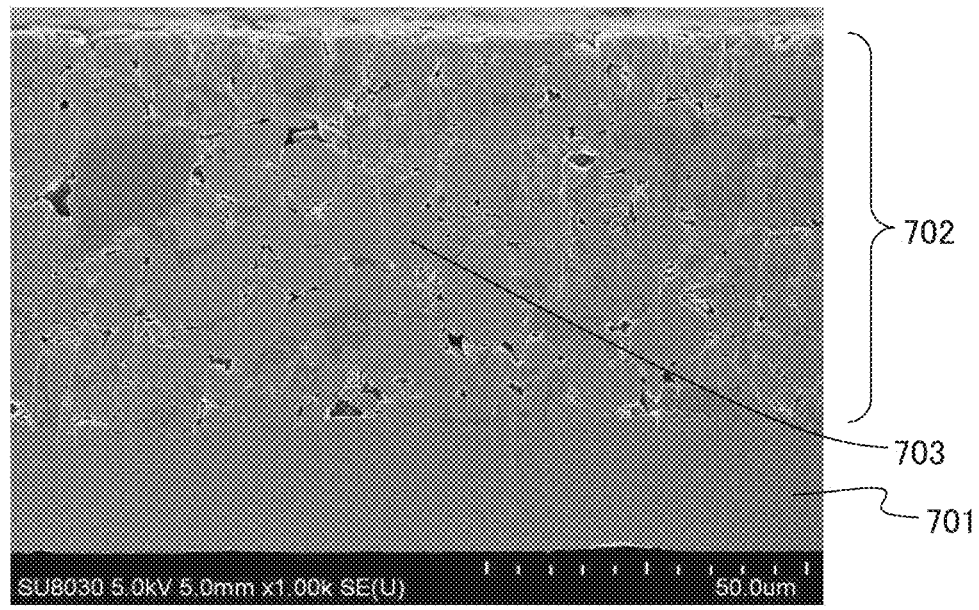
FIG. 36(A) shows a cross-sectional observation result of a positive electrode.
Figure 36B:
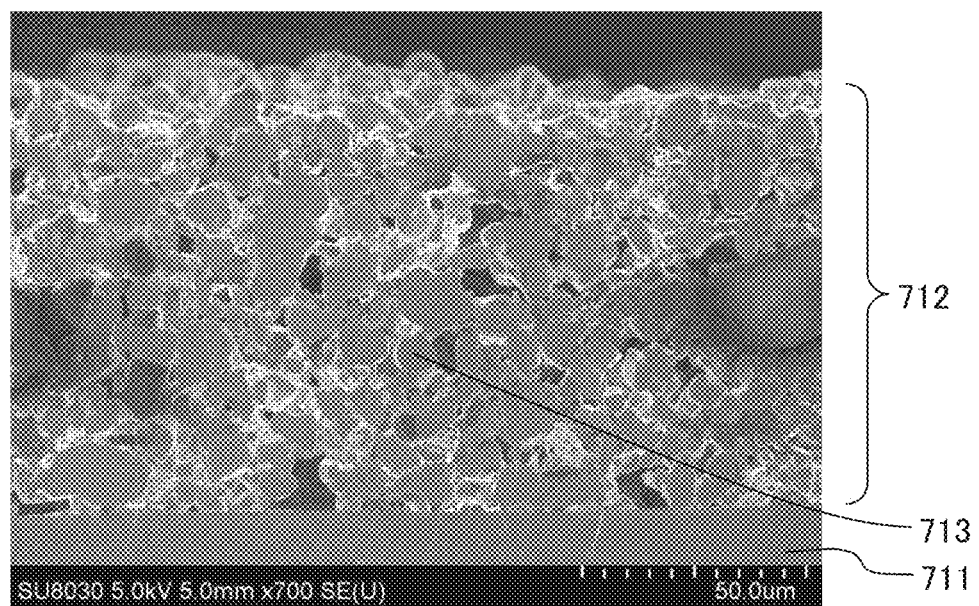
FIG. 36(B) shows a cross-sectional observation result of a positive electrode.

FIG. 36(A) is a cross-sectional SEM image of Electrode 1-2, and FIG. 36(B) is a cross-sectional SEM image of Electrode 1-1.

Figure 37A:
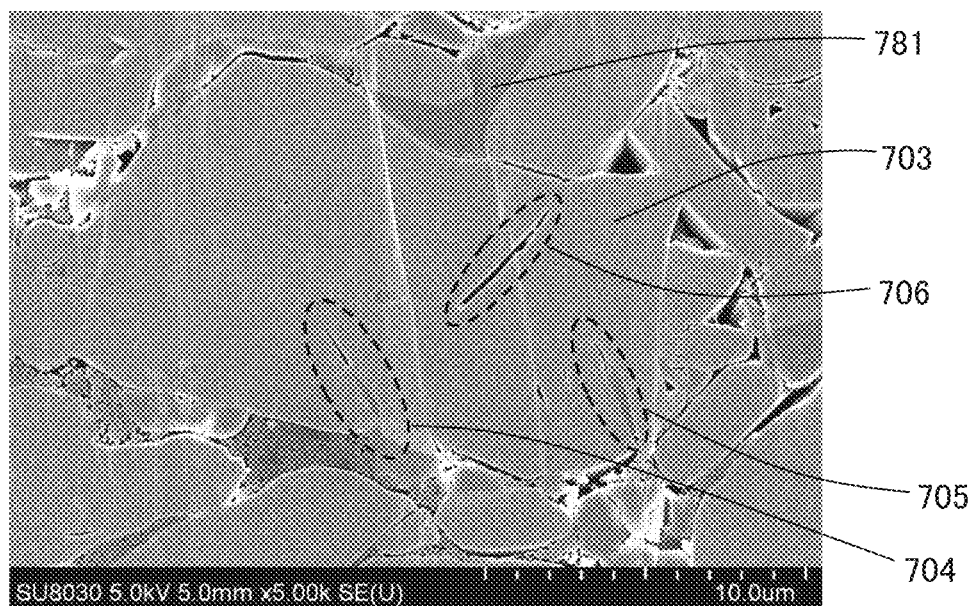
FIG. 37(A) shows a cross-sectional observation result of a positive electrode.

In the cross section of Electrode 1-2 shown in FIG. 36(A), a positive electrode active material layer 702 is observed over a current collector 701. FIG. 37(A) is an enlarged view of a positive electrode active material 703 included in the positive electrode active material layer 702 and its vicinity.

In FIG. 37(A), the positive electrode active material 703 includes a crack 704, a crack 705, and a crack 706. In the cross section of the positive electrode active material 703, it is suggested that the crack 704 and the crack 705 are partly in contact with the surface of the positive electrode active material 703 and that the crack 706 is positioned in an inner portion of the positive electrode active material 703.

Figure 37B:
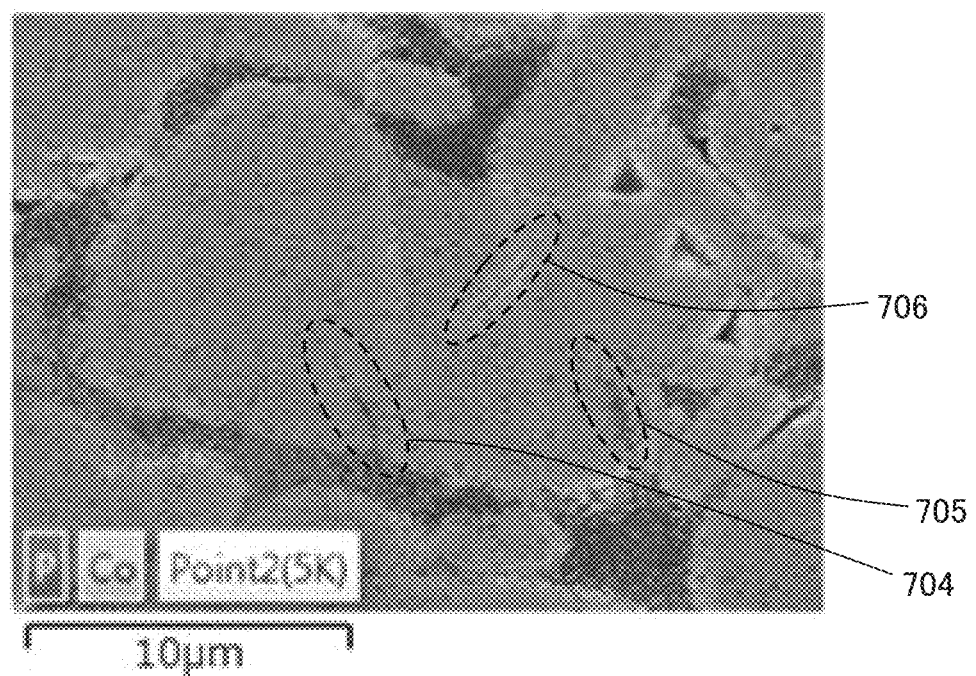
FIG. 37(B) shows a cross-sectional observation result of a positive electrode.

FIG. 37(B) is an EDX analysis mapping image of phosphorus and cobalt in the position corresponding to that in the cross-sectional SEM image in FIG. 37(A). In the positions corresponding to the crack 704 and the crack 705, the phosphorus concentration is high and significant detection of cobalt is not seen. It is suggested that a substance containing phosphorus exists inside the crack 704 and the crack 705. The substance is assumed to be a substance whose source material is lithium phosphate.

In contrast, significant detection of phosphorus is not seen in the crack 706.

Figure 38A:
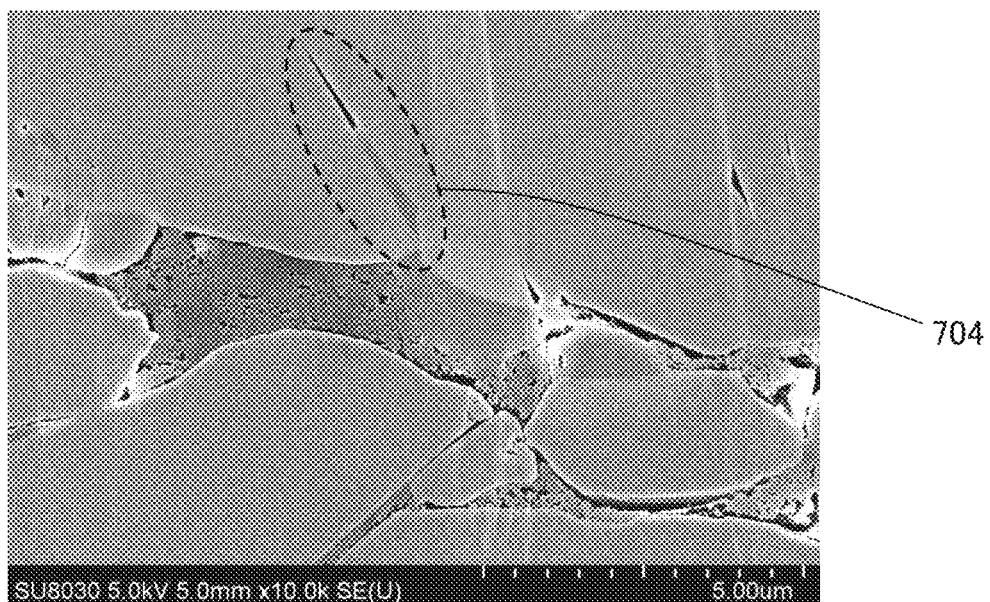
FIG. 38(A) shows a cross-sectional observation result of a positive electrode.
Figure 38B:
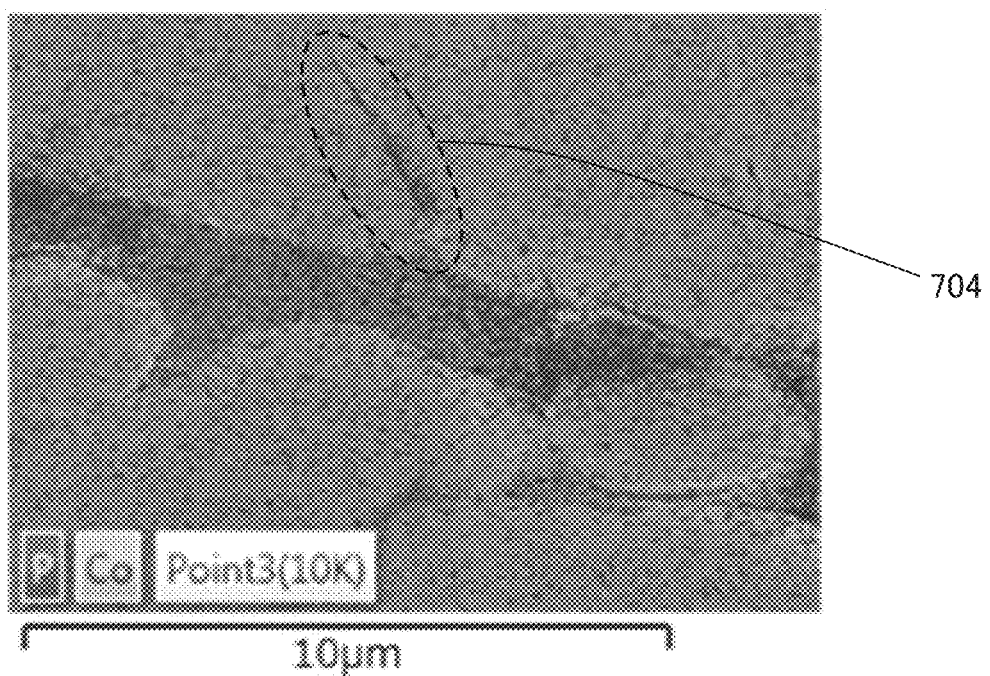
FIG. 38(B) shows a cross-sectional observation result of a positive electrode.

FIG. 38(A) is an enlarged view of the crack 704 and its vicinity in FIG. 37(A), and FIG. 38(B) is an enlarged view of the crack 704 and its vicinity in FIG. 37(B).

In FIG. 37(A), a substance 781 having a particle shape is observed. In FIG. 37(B), the phosphorus concentration is high and significant detection of cobalt is not seen in the position corresponding to the substance 781. Since containing phosphorus, the substance 781 is assumed to be a substance whose source material is lithium phosphate.

Figure 39A:
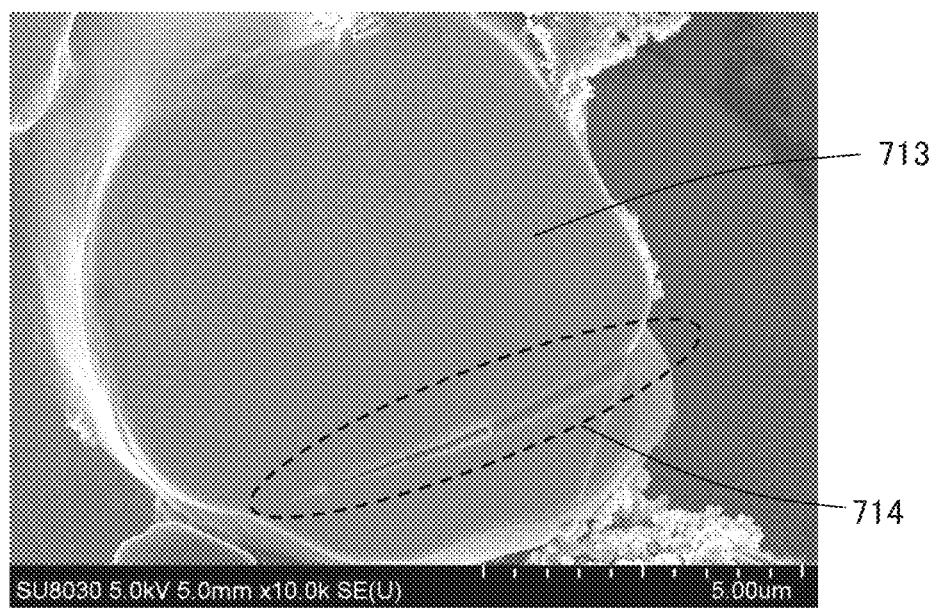
FIG. 39(A) shows a cross-sectional observation result of a positive electrode.

In the cross section of Electrode 1-1 shown in FIG. 36(B), a positive electrode active material layer 712 is observed over a current collector 711. FIG. 39(A) is an enlarged view of a positive electrode active material 713 contained in the positive electrode active material layer 712 and its vicinity.

In FIG. 39(A), the positive electrode active material 713 includes a crack 714. In the cross section of the positive electrode active material 713, it is suggested that the crack 714 is partly in contact with the surface of the positive electrode active material 713.

Figure 39B:
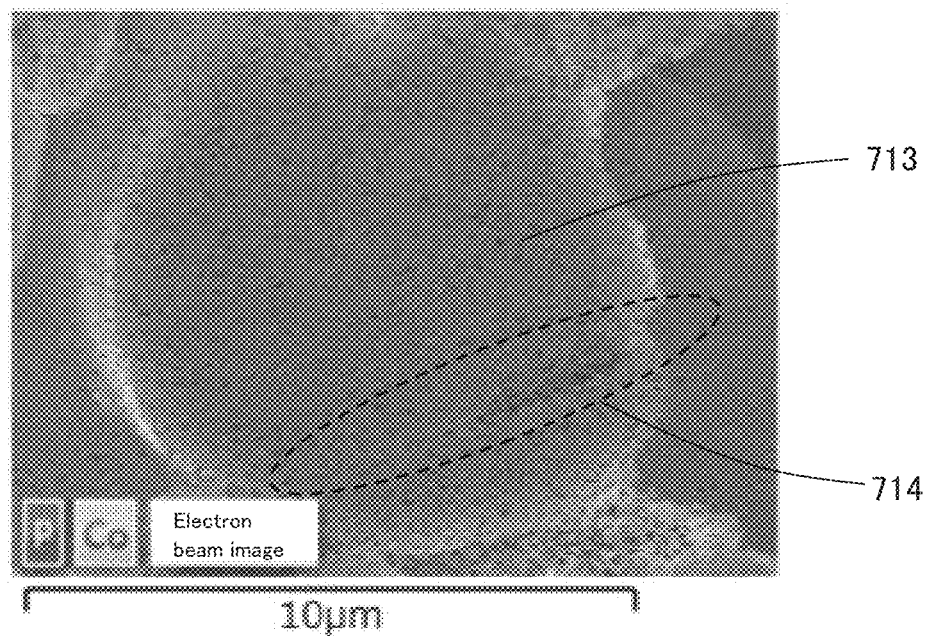
FIG. 39(B) shows a cross-sectional observation result of a positive electrode.

FIG. 39(B) is an EDX analysis mapping image of phosphorus and cobalt in the position corresponding to that in the cross-sectional SEM image in FIG. 39(A). In the position corresponding to the crack 714, the phosphorus concentration is high and significant detection of cobalt is not seen. It is suggested that a substance containing phosphorus exists inside the crack 714. The substance is assumed to be a substance whose source material is lithium phosphate.

Figure 40A:
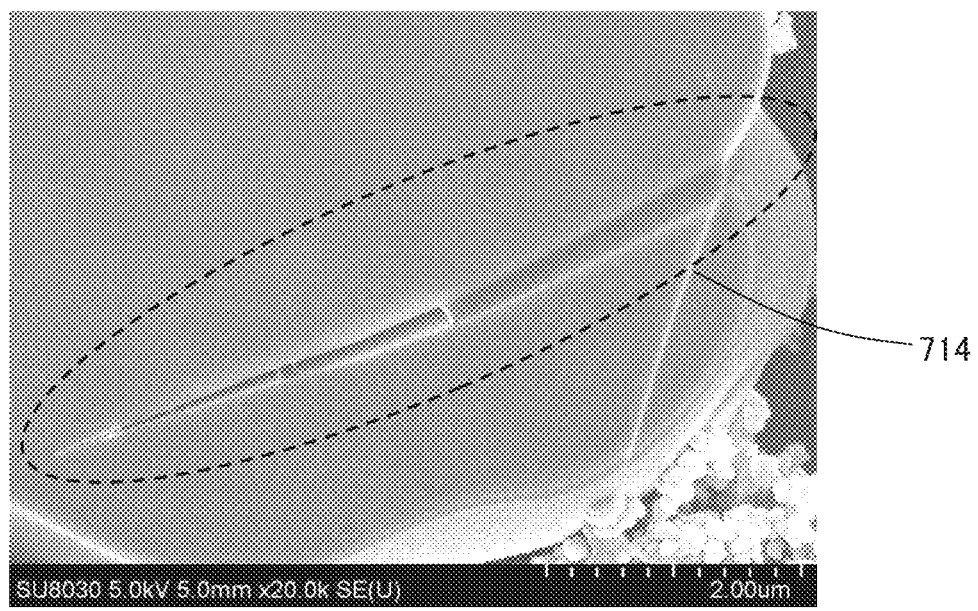
FIG. 40(A) shows a cross-sectional observation result of a positive electrode.
Figure 40B:
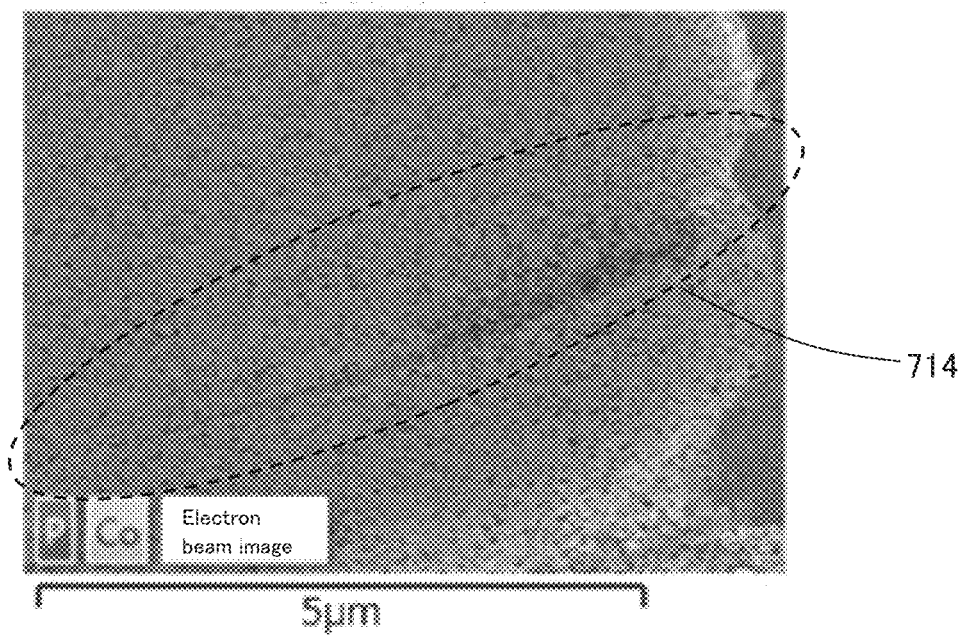
FIG. 40(B) shows a cross-sectional observation result of a positive electrode.

FIG. 40(A) is an enlarged view of the crack 714 and its vicinity in FIG. 39(A), and FIG. 40(B) is an enlarged view of the crack 714 and its vicinity in FIG. 39(B).

[EELS, FFT]

Next, obtained Sample 1 was thinned by an FIB method, and then STEM observation and measurement by EELS were performed.

Figure 41:
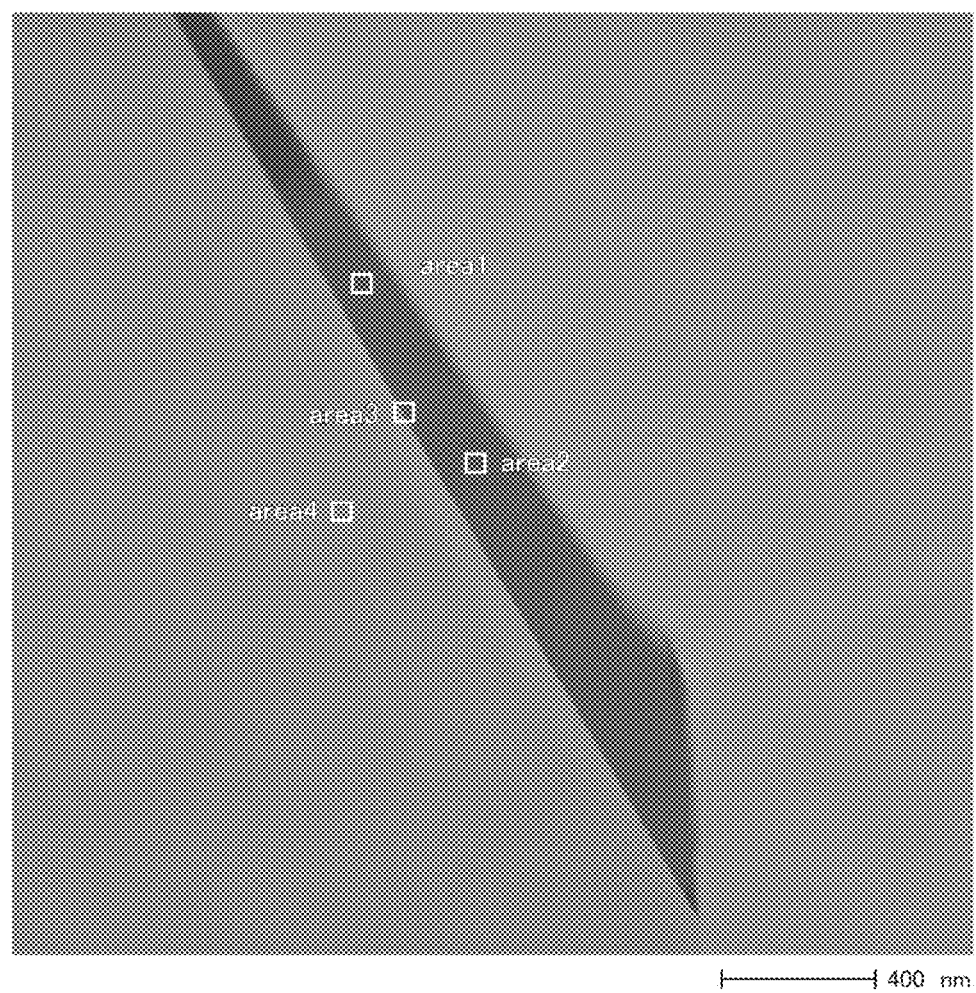
FIG. 41 shows a cross-sectional observation result of a positive electrode.
Figure 42:
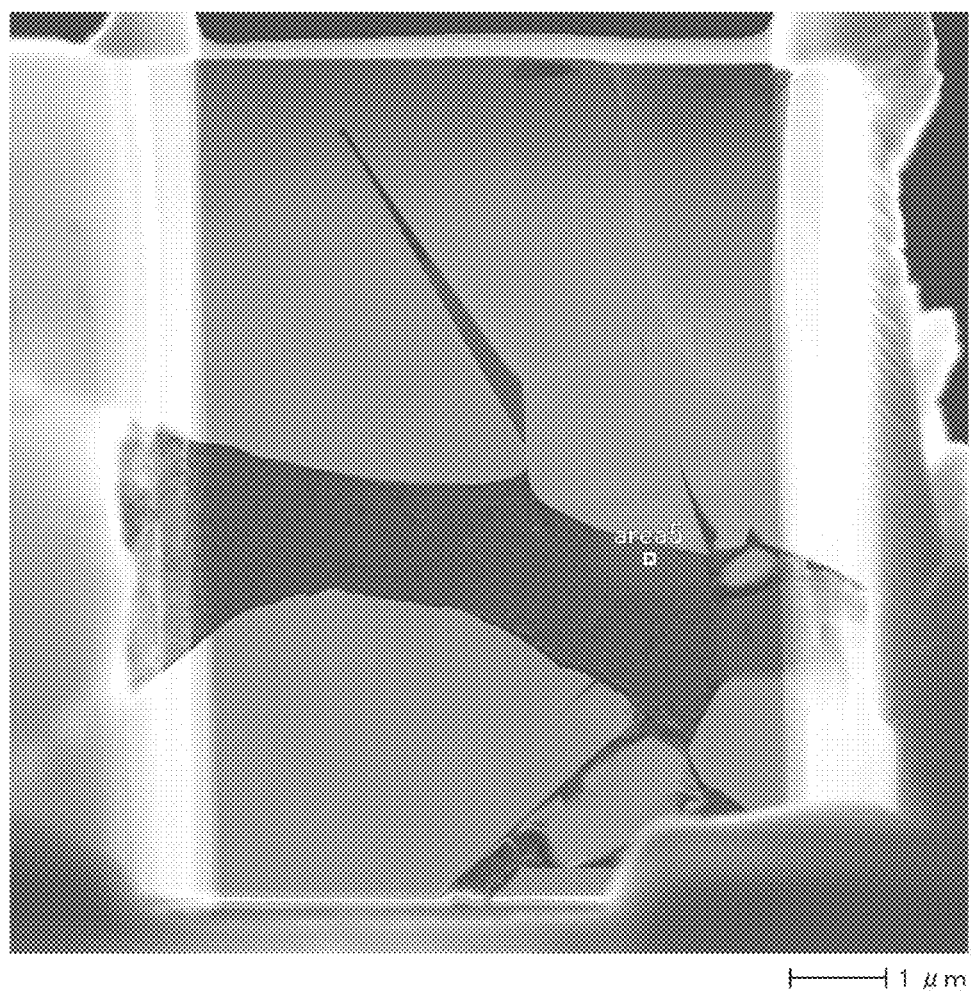
FIG. 42 shows a cross-sectional observation result of a positive electrode.

FIG. 41 shows a HAADF-STEM observation result of the crack and its vicinity in Sample 1, and FIG. 42 shows that of a region having contrast different from that of its peripheral region. The observation in FIG. 41 was performed at a magnification of 64000 times, and the observation in FIG. 42 was performed at a magnification of 16000 times. The inventors assume that in FIG. 42, the peripheral region of the observed region is a region containing lithium cobalt oxide, and that the observed region having contrast different from that of its peripheral region is a region whose main source material is lithium phosphate.

Figure 43A:
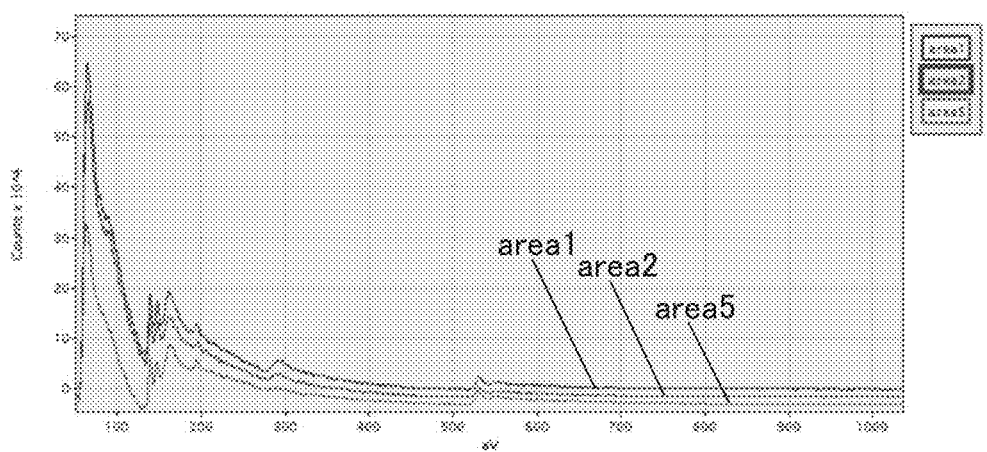
FIG. 43(A) shows an EELS analysis result of a positive electrode.

In FIG. 41, an area 1 to an area 4 that are portions subjected to the EELS measurement are indicated by squares. In FIG. 42, an area 5 that is a portion subjected to the EELS measurement is indicated by a square. FIG. 43(A) shows the measurement results of the area 1, the area 2, and the area 5, and FIG. 43(B) shows the measurement results of the area 3 and the area 4.

Figure 44A:
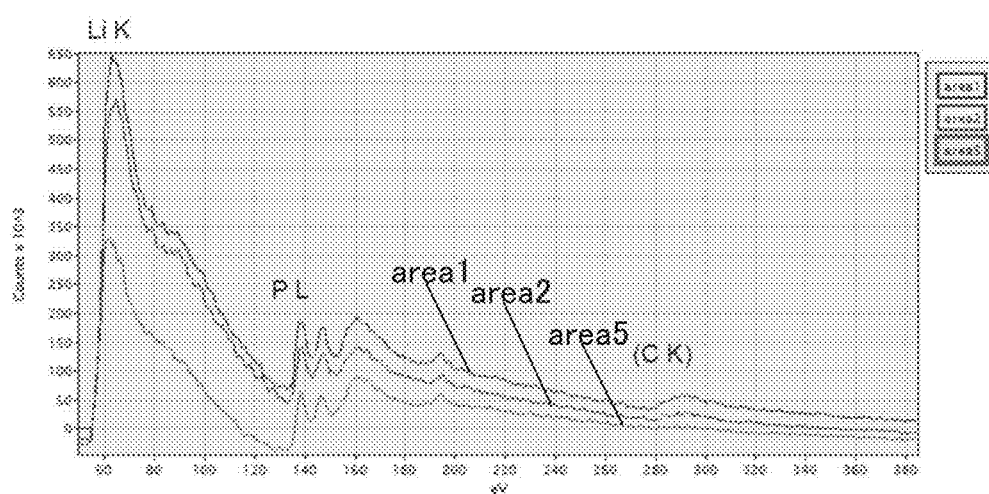
FIG. 44(A) shows an EELS analysis result of a positive electrode.
Figure 44B:
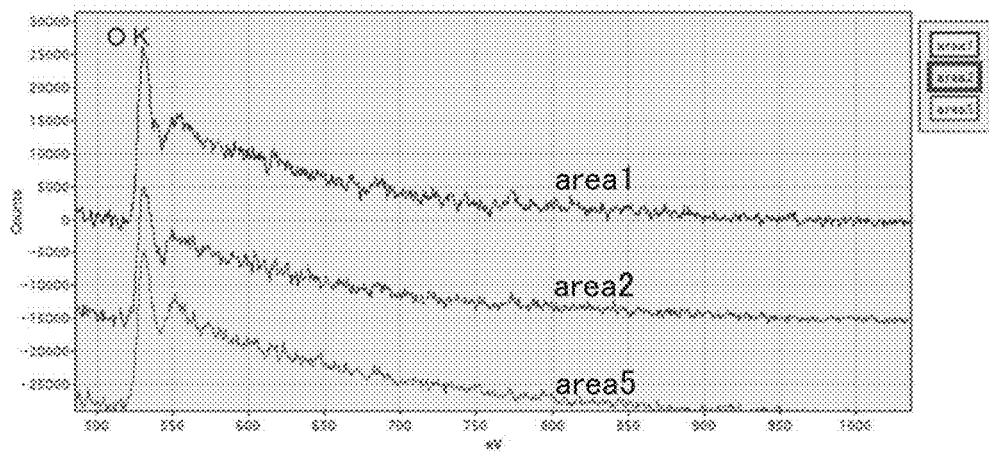
FIG. 44(B) shows an EELS analysis result of a positive electrode.

FIG. 44(A) is an enlarged view of a portion in FIG. 43(A), which focuses on the Li—K edge and the P-L edge, and FIG. 44(B) is an enlarged view of a portion in FIG. 43(A), which focuses on the O—K edge.

Figure 43B:
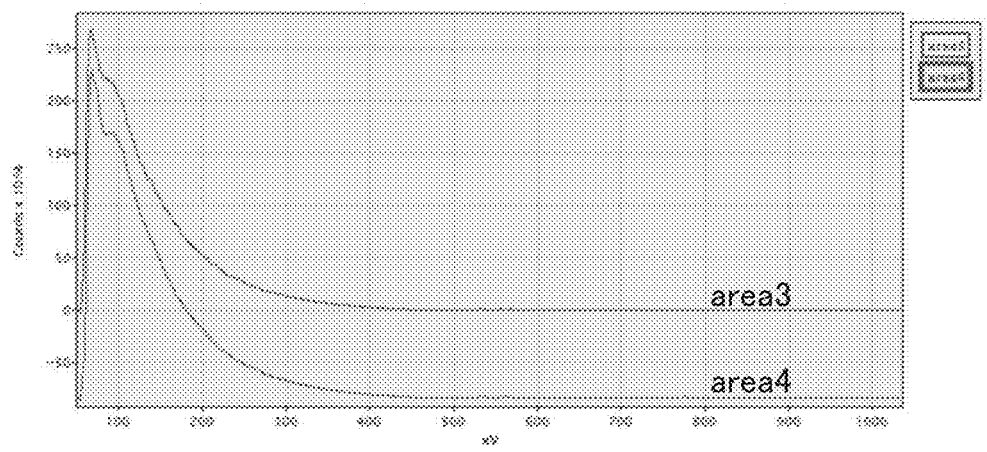
FIG. 43(B) shows an EELS analysis result of a positive electrode.
Figure 45A:
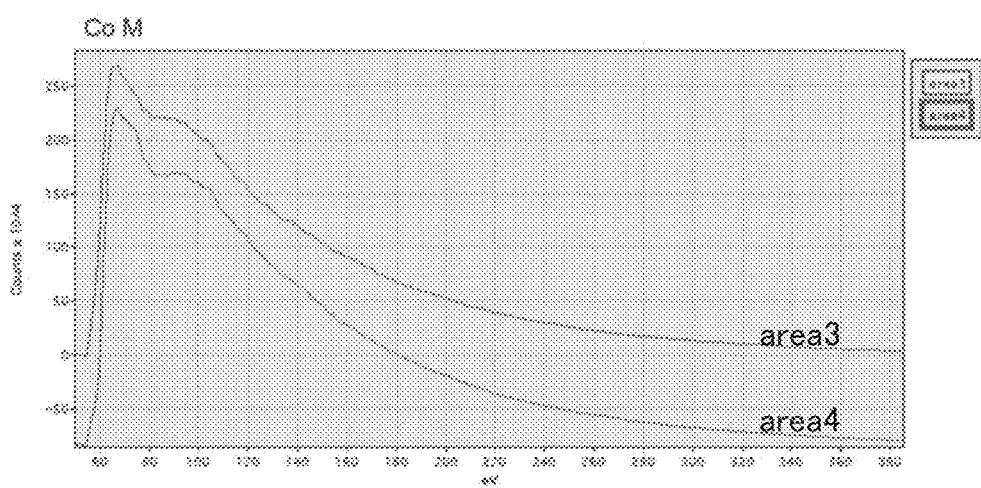
FIG. 45(A) shows an EELS analysis result of a positive electrode.
Figure 45B:
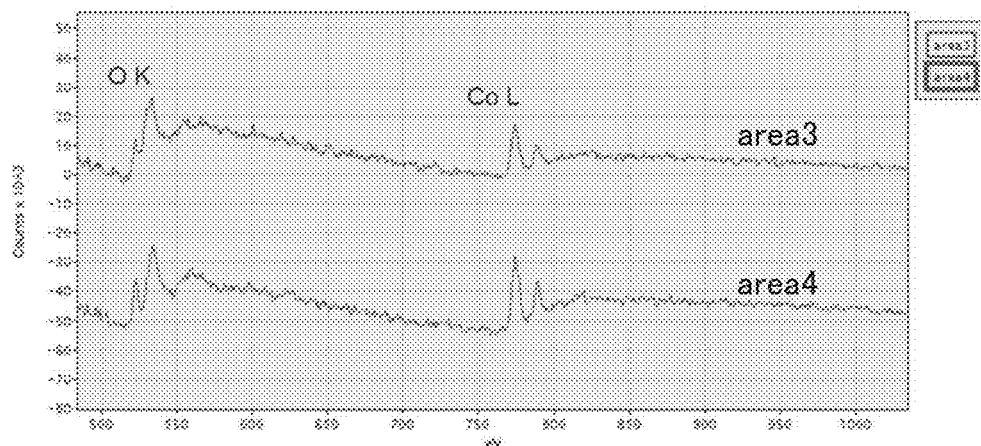
FIG. 45(B) shows an EELS analysis result of a positive electrode.

FIG. 45(A) is an enlarged view of a portion in FIG. 43(B), which focuses on the Co-M edge, and FIG. 45(B) is an enlarged view of a portion in FIG. 43(B), which focuses on the O—K edge and the Co-L edged.

In the area 1 and the area 2 corresponding to the inside of the crack, phosphorus was observed significantly. Moreover, the existence of lithium was suggested. In contrast, cobalt was not observed significantly.

Cobalt was observed significantly in the peripheral region of the crack, that is, in the area 4 which is suggested to correspond to the first substance 101 in the positive electrode active material 100.

Phosphorus was observed significantly in the area 5 that is a region having contrast different from that of the peripheral region in FIG. 42.

Figure 46:
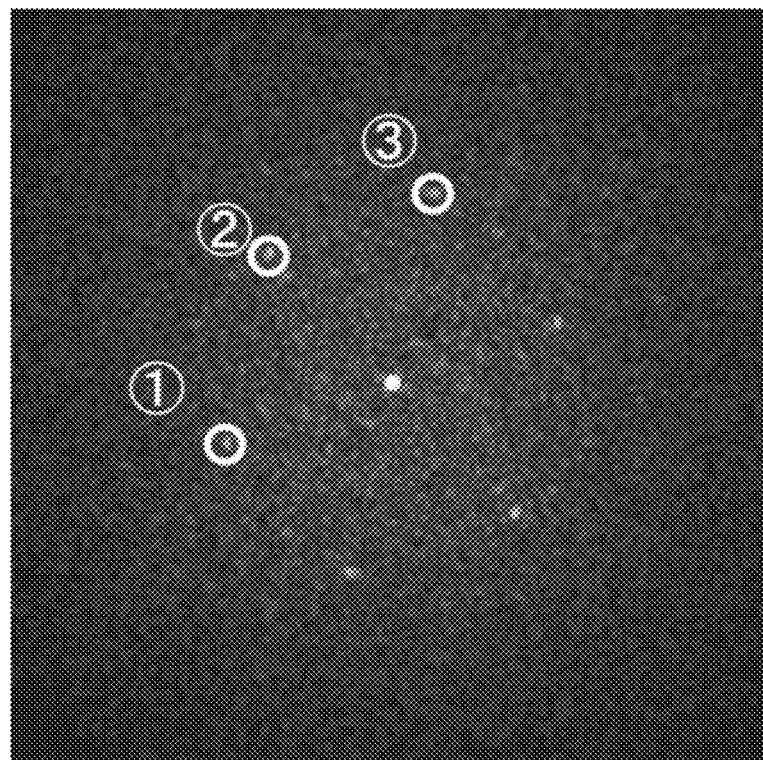
FIG. 46 shows an FFT analysis result.

Next, FIG. 46 shows the Fast Fourier transformation pattern (FFT pattern) of the region in the vicinity of the area 2. In addition, the actually measured values regarding the positional relations (distance, angle) of spots in the obtained FFT pattern, and the distances and the angles corresponding to No. 04-006-8566 of JCPDS cards are shown. The incident direction is [212]. As shown in FIG. 46, the obtained FFT pattern had a good correspondence with Li$_3$PO$_4$ having an orthorhombic crystal structure of No. 04-006-8566 of JCPDS cards.

The above suggests that the substance positioned inside the crack in Sample 1 is probably lithium phosphate.

Example 2

In this example, a positive electrode and a secondary battery of embodiments of the present invention were fabricated and evaluated.

<Sample 2>

Sample 2 was fabricated not through Step S11 to Step S14 in which LiF and $MgF_2$ were mixed to lithium cobalt oxide and heat treatment and the like are performed but through Step S46 to Step S48 in which lithium cobalt oxide and lithium phosphate were mixed and heat treatment and the like were performed. In Sample 2, the positive electrode active material 100 was formed by the formation method shown in FIG. 5. In Step S45 to Step S48 and Step S25, the conditions used for Sample 1 in Example 1 were used.

<Sample 3>

In Sample 3, after performing Step S11 to Step S14 in which LiF and $MgF_2$ were mixed to lithium cobalt oxide and heat treatment and the like were performed, Step S46 to Step S48 were not performed in which the obtained substance was mixed with lithium phosphate and heat treatment and the like were performed. That is, the first substance 101 obtained in Example 1 was Sample 3.

<Sample 4>

Lithium cobalt oxide synthesized in advance was used as Sample 4. As lithium cobalt oxide synthesized in advance, CELLSEED C-10N manufactured by NIPPON CHEMICAL INDUSTRIAL CO., LTD. was used.

[Fabrication of Positive Electrode]

Positive electrodes were fabricated using Sample 2, Sample 3, and Sample 4 as an active material. The positive electrodes that were fabricated in such a manner that a current collector was coated with slurry in which the active material, AB, and PVDF were mixed at the active material: AB:PVDF=95:3:2 (weight ratio) were used. As a solvent of the slurry, NMP was used.

After coating the current collector with the slurry, the solvent was volatilized. After that, a pressure of 210 kN/m was applied, and a pressure of 1467 kN/m was further applied; thus, the positive electrodes were obtained. The positive electrode using Sample 2 as the active material is Electrode 2, the positive electrode using Sample 3 as the active material is Electrode 3-2, and the positive electrode using Sample 4 as the active material is Electrode 4. Electrode 2 had a carried amount of approximately 20 $mg/cm^2$ and an electrode density of approximately 3.7 $g/cm^3$. Electrode 3-2 had a carried amount of approximately 20 $mg/cm^2$ and an electrode density of approximately 3.9 $g/cm^3$. Electrode 4-2 had a carried amount of approximately 20 $mg/cm^2$ and an electrode density of approximately 3.9 $g/cm^3$. Note that Electrode 3-1 is a positive electrode using Sample 3 as the active material and not being pressed after coating the current collector with the slurry and volatizing the solvent. Electrode 4-1 is a positive electrode using Sample 4 as the active material and also not being pressed.

[Fabrication of Secondary Battery]

CR2032 coin-type secondary batteries (with a diameter of 20 mm and a height of 3.2 mm) were fabricated using fabricated Electrode 1-2, Electrode 2, Electrode 3-2, and Electrode 4-2 as positive electrodes.

A lithium metal was used for a counter electrode.

As an electrolyte contained in an electrolyte solution, 1 mol/L lithium hexafluorophosphate ($LiPF_6$) was used, and as the electrolyte solution, an electrolyte solution in which ethylene carbonate (EC) and diethyl carbonate (DEC) at EC:DEC=3:7 (volume ratio) and vinylene carbonate (VC) at 2 wt % were mixed was used.

As a separator, 25-μm-thick polypropylene was used.

A positive electrode can and a negative electrode can formed of stainless steel (SUS) were used as a positive electrode can and a negative electrode can.

[Cycle Performance]

Figure 47A:
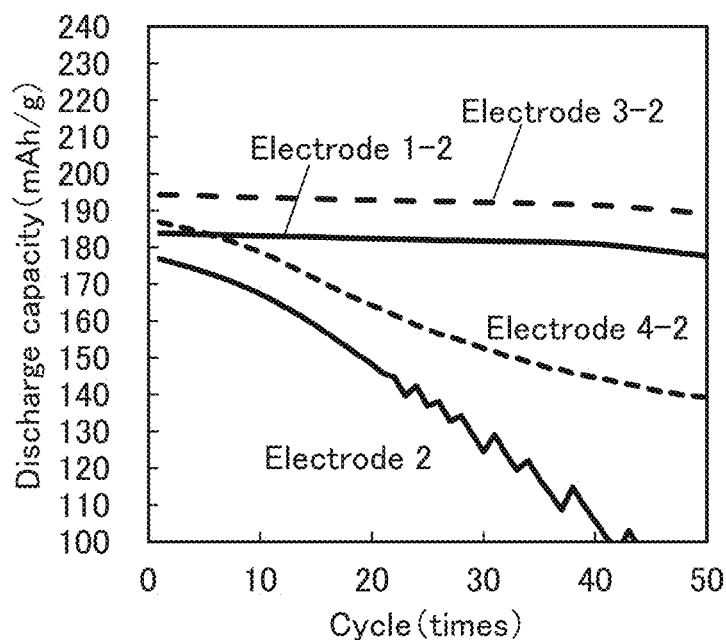
FIG. 47(A) shows charge and discharge cycle performance.
Figure 47B:
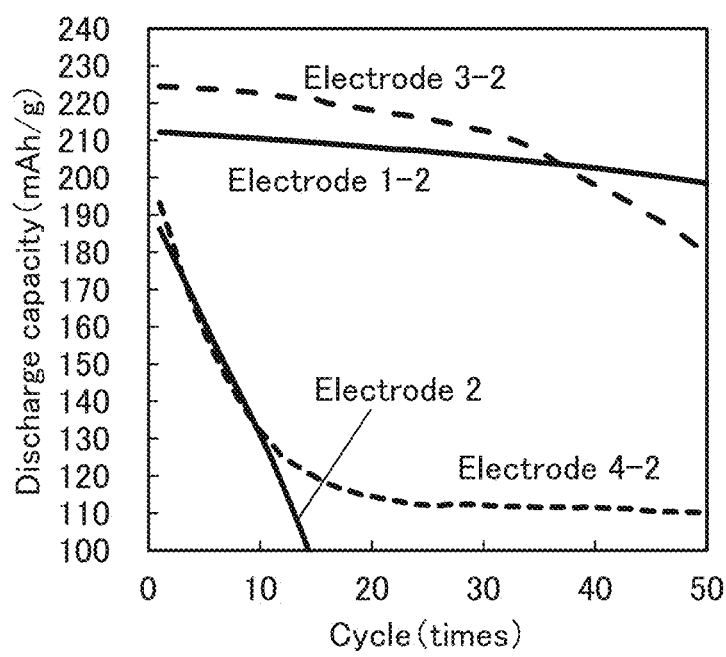
FIG. 47(B) shows charge and discharge cycle performance.

Changes in the discharge capacity when CCCV charging (0.2 C, a termination current of 0.02 C) and CC discharging (0.2 C, a lower limit voltage of 2.5 V) were performed as the charge and discharge cycles at 25° C. are shown. FIG. 47(A) shows the results when the upper limit voltage in charging was 4.5 V, and FIG. 47(B) shows the results when the upper limit voltage in charging was 4.6 V. Note that 1 C was set to 200 mA/g, which was a current value per weight of the positive electrode active material. The vertical axis represents the discharge capacity, and the horizontal axis represents the cycle number.

As for the cycle performance, Electrode 1-2 had the best result, and Electrode 3-2 also had a favorable result. In Electrode 2 and Electrode 4-2, the capacity decreased significantly in accordance with the cycles. Favorable cycle performance was obtained under the condition where materials containing halogen, magnesium, lithium, and the like were used in the formation process of the positive electrode active material.

[Charge Tolerance Test]

The fabricated secondary batteries were measured at 25° C. for two cycles while CCCV charging (0.05 C, 4.5 V or 4.6 V, a termination current of 0.005 C) and CC discharging (0.05 C, 2.5 V) were performed.

After that, CCCV charging (0.05 C) was performed at 60° C. The upper limit voltage was set to 4.55 V or 4.65 V, and the time from when the voltage of the secondary battery reached the upper limit voltage to when the voltage of the secondary battery became below the value obtained by subtracting 0.01 V from the upper limit voltage (4.54 V when the upper limit voltage was 4.55 V) was measured (hereinafter, referred to as a charging retention time). In the case where the voltage of the secondary battery was lower than the upper limit voltage, phenomena such as short-circuit might have occurred. Note that 1 C was set to 200 mA/g.

Figure 48:
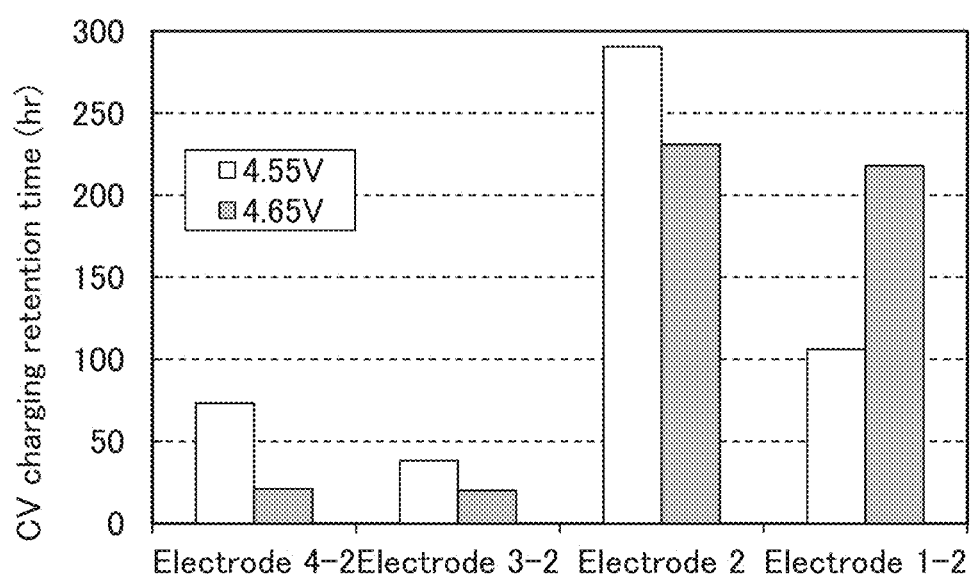
FIG. 48 shows a result of the charge tolerance test.

FIG. 48 shows the results when the upper limit voltage was 4.55 V and the results when the upper limit voltage was 4.65 V. As for the charge tolerance, Electrode 1-2 and Electrode 2 had excellent results, and by comparison, Electrode 3-2 and Electrode 4-2 had the results of low charge tolerance. The results of higher charge tolerance were obtained under the condition where a material containing phosphorus was used in the formation process of the positive electrode active material.

Example 3

In this example, a secondary battery was fabricated using a positive electrode of one embodiment of the present invention and evaluated.

<Sample 5 to Sample 10>

Sample 5 to Sample 10, which were positive electrode active materials, were formed by the formation method of Sample 1 in Example 1. Note that in Step S47, the annealing was performed at 850° C. for two hours instead of at 750° C. for 20 hours. In addition, the amount of lithium phosphate mixed in Step S46 was an amount corresponding to 0.005 mol in Sample 6, 0.02 mol in Sample 7, 0.04 mol in Sample 8, 0.06 ol in Sample 9, and 0.10 mol in Sample 10 when the first substance 101 was 1 mol.

[Fabrication of Secondary Battery]

Positive electrodes were fabricated using Sample 3, Sample 4, and Sample 5 to Sample 10 by the method described in Example 2, and secondary batteries were fabricated using the fabricated positive electrodes by the method described in Example 2.

[Cycle Performance]

Figure 49:
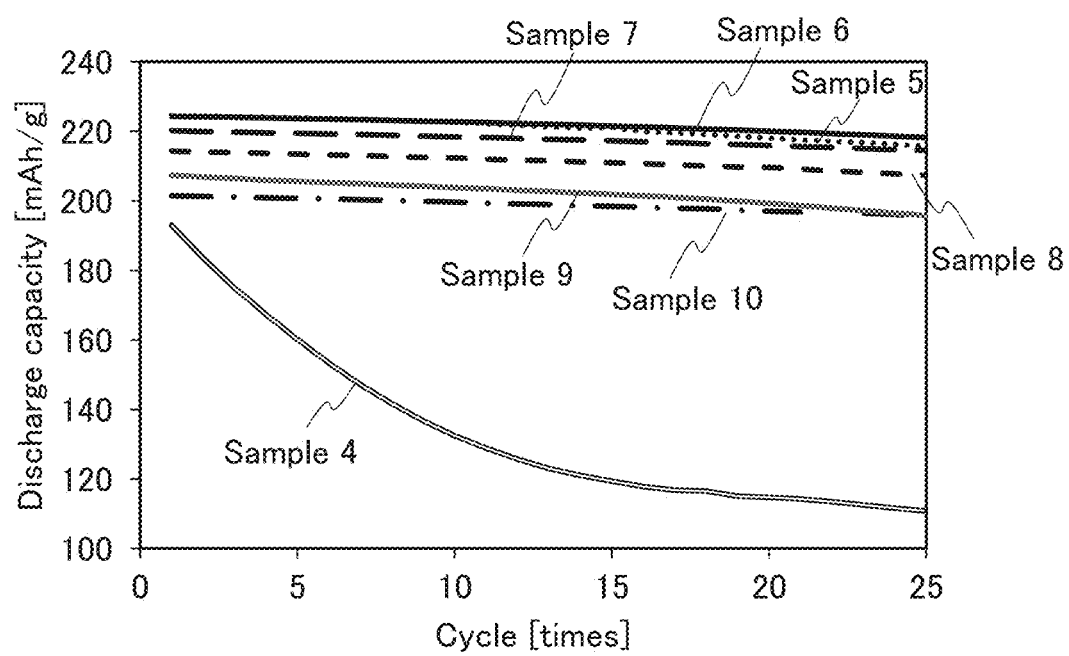
FIG. 49 shows charge and discharge cycle performance.

FIG. 49 shows changes in the discharge capacity when CCCV charging (0.2 C, an upper limit voltage of 4.6 V, a termination current of 0.02 C) and CC discharging (0.2 C, a lower limit voltage of 2.5 V) were performed as the charge and discharge cycle at 25° C. Note that 1 C was set to 200 mA/g, which was a current value per weight of the positive electrode active material. The vertical axis represents the discharge capacity, and the horizontal axis represents the cycle number.

Favorable cycle performance was obtained under the condition where materials containing halogen, magnesium, lithium, and the like were used in the formation process of the positive electrode active material.

Excellent cycle performance was obtained under any condition where lithium phosphate was mixed in the formation process. In contrast, the discharge capacity was decreased in accordance with an increase in the amount of added lithium phosphate. This can be because the proportion of the first substance 101 in the positive electrode active material was reduced.

[Charge Tolerance Test]

The fabricated secondary batteries were measured at 25° C. for two cycles while CCCV charging (0.05 C, 4.5 V or 4.6 V, a termination current of 0.005 C) and CC discharging (0.5 C, 2.5 V) were performed.

After that, CCCV charging (0.05 C) was performed at 60° C. The upper limit voltage was set to 4.55 V or 4.65 V, and the time from when the voltage of the secondary battery reached the upper limit voltage to when the voltage of the secondary battery became below the value obtained by subtracting 0.01 V from the upper limit voltage (4.54 V when the upper limit voltage was 4.55 V) was measured (hereinafter, referred to as a charging retention time). In the case where the voltage of the secondary battery was lower than the upper limit voltage, phenomena such as short-circuit might have occurred. Note that 1 C was set to 200 mA/g.

Figure 50A:
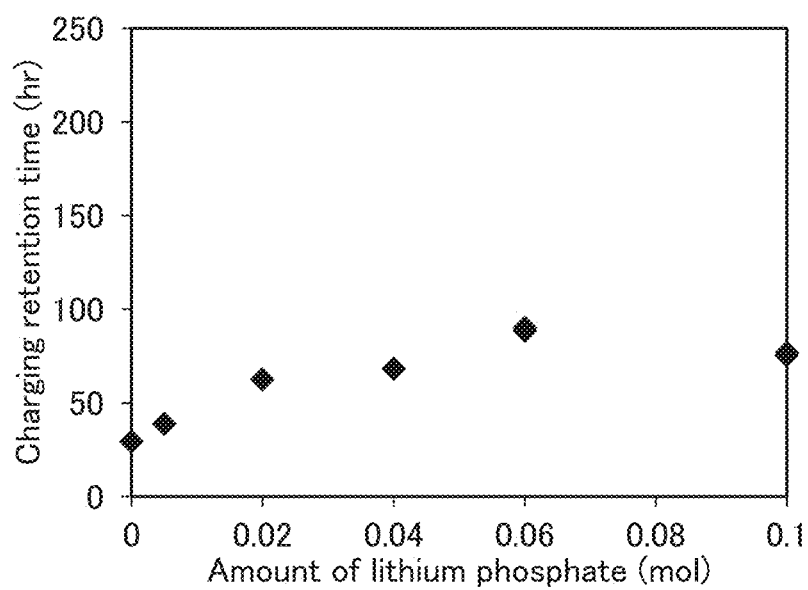
FIG. 50(A) shows a result of the charge tolerance test.
Figure 50B:
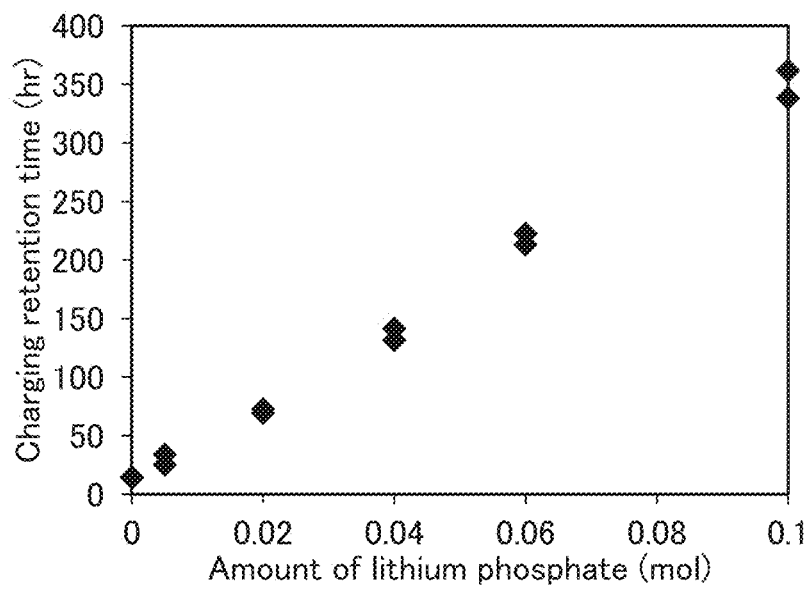
FIG. 50(B) shows a result of the charge tolerance test.

FIG. 50(A) shows the results when the upper limit voltage was 4.55 V and FIG. 50(B) shows the results when the upper limit voltage was 4.65 V. The horizontal axis represents the amount of lithium phosphate mixed in Step S46 (the amount with respect to 1 mol of the first substance 101).

It is found from FIGS. 50(A) and 50(B) that the increased amount of added lithium phosphate can prolong the charging retention time. In contrast, it is found from FIG. 49 that the increased amount of added lithium phosphate decreases the discharge capacity. In order to provide a secondary battery with high level of safety and high capacity, lithium phosphate should be added at an amount sufficient for securing the safety of the secondary battery, and there is no need to add lithium phosphate at an excessive amount.

Figure 51A:
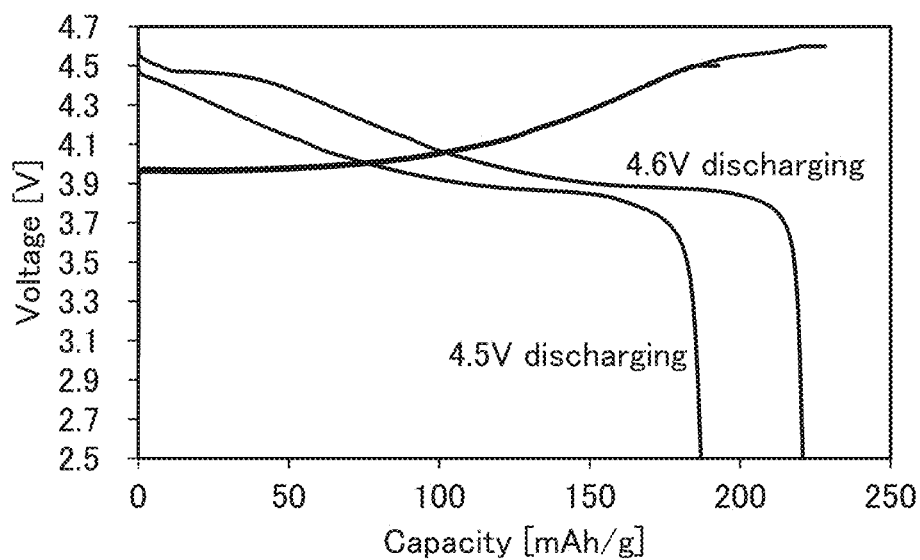
FIG. 51(A) shows charge and discharge curves.
Figure 51B:
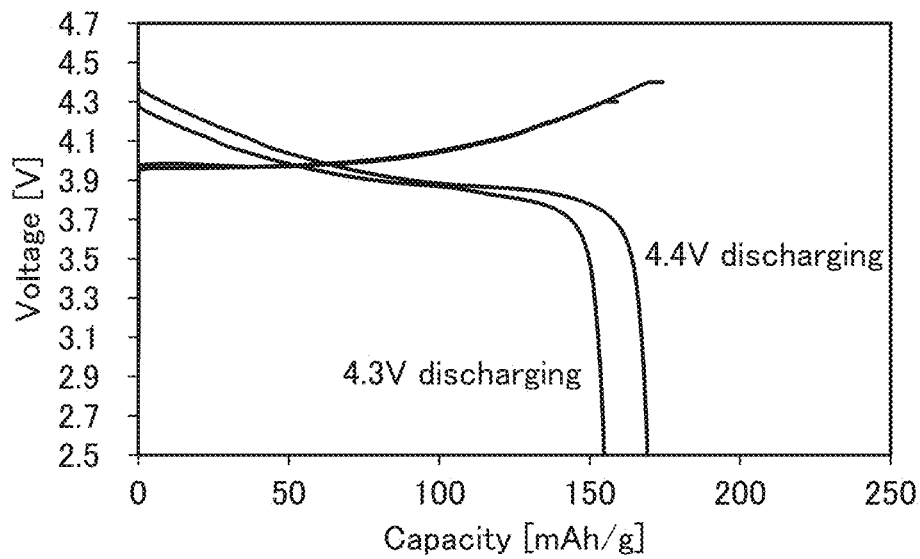
FIG. 51(B) shows charge and discharge curves.

The capacity of a secondary battery is increased with an increase in the upper limit voltage in charging. FIG. 51 shows charge curves and discharge curves of Sample 4 when the upper limit voltage in charging was changed to 4.3 V, 4.4 V, 4.5 V, and 4.6V. FIG. 51(A) shows the charge curves and the discharge curves when the upper limit voltage in charging was 4.6 V and 4.5 V, and FIG. 51(B) shows the charge curves and the discharge curves when the upper limit voltage in charging was 4.4 V and 4.3 V. The discharge capacity was 154.8 mAh/g with an upper limit charging voltage of 4.3 V, 169.2 mAh/g with 4.4 V, 186.9 mAh/g with 4.5 V, and 220.8 mAh/g with 4.6 V.

When the upper limit voltage is set to 4.6 V, a high capacity can be obtained. In order to achieve both an increase in the capacity and an increase in safety of a secondary battery, for example, the condition for obtaining a significantly high capacity as compared to the case where the upper limit voltage is 4.5 V is estimated that the amount of added lithium phosphate with respect to 1 mol of the first substance 101 is approximately 0.10 mol, and the condition for obtaining a much higher capacity is estimated that the amount of lithium phosphate is approximately 0.06 mol. The amount of added lithium phosphate with respect to 1 mol of the first substance 101 is, for example, greater than or equal to 0.01 mol and less than or equal to 0.12 mol, or greater than or equal to 0.02 mol and less than or equal to 0.08 mol.

Example 4

In this example, a secondary battery was fabricated using a positive electrode active material of one embodiment of the present invention and a crack in a particle included in the positive electrode active material was observed.

[Fabrication of Positive Electrode]

Four kinds of positive electrode were prepared: Electrode 1-1 (not subjected to pressing) and Electrode 1-2 (subjected to pressing) that were positive electrodes each using Sample 1 (the substance obtained in such a manner that a mixture of LiF, $MgF_2$, and lithium cobalt oxide was formed, heat treatment was performed, lithium phosphate was mixed, and then heat treatment was performed) formed in Example 1, and Electrode 3-1 (not subjected to pressing) and Electrode 3-2 (subjected to pressing) that were electrodes each using Sample 3 (the substance obtained in such a manner that a mixture of LiF, $MgF_2$, and lithium cobalt oxide was formed and heat treatment was performed) formed in Example 2.

[Fabrication of Secondary Battery]

Next, CR2032 coin-type secondary batteries (with a diameter of 20 mm and a height of 3.2 mm) were fabricated with the use of the prepared four kinds of positive electrode.

A lithium metal was used for a counter electrode.

As an electrolyte contained in an electrolyte solution, 1 mol/L lithium hexafluorophosphate ($LiPF_6$) was used, and as the electrolyte solution, an electrolyte solution in which ethylene carbonate (EC) and diethyl carbonate (DEC) at EC:DEC=3:7 (volume ratio) and vinylene carbonate (VC) at 2 wt % were mixed was used.

As a separator, 25-μm-thick polypropylene was used.

A positive electrode can and a negative electrode can formed of stainless steel (SUS) were used as a positive electrode can and a negative electrode can.

[Cycle Performance]

Figure 52:
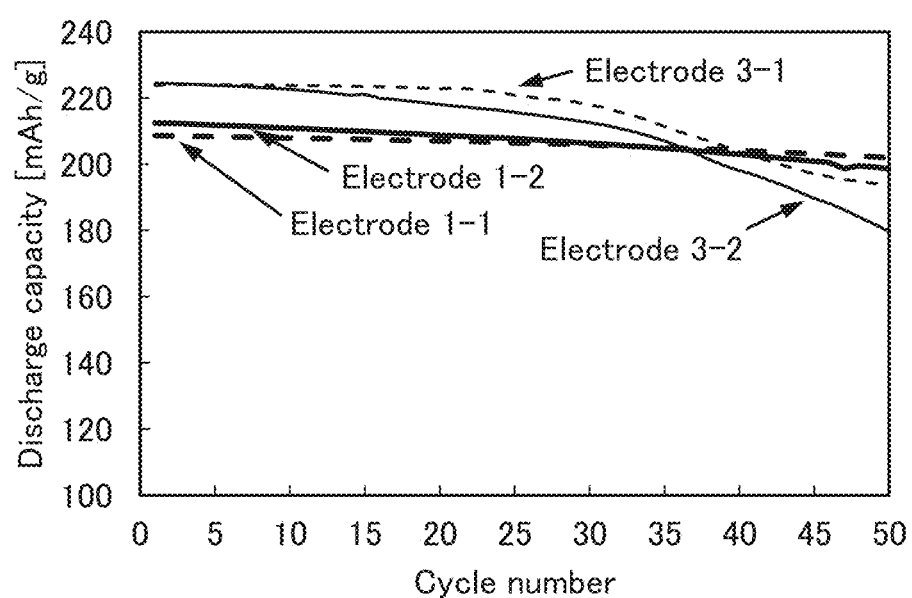
FIG. 52 shows cycle performance of secondary batteries.

FIG. 52 shows changes in the discharge capacity when CCCV charging (0.2 C, an upper limit voltage of 4.6 V, a termination current of 0.02 C) and CC discharging (0.2 C, a lower limit voltage of 2.5 V) were performed as the charge and discharge cycle at 25° C. Note that 1 C was set to 200 mA/g, which was a current value per weight of the positive electrode active material. The vertical axis represents the discharge capacity, and the horizontal axis represents the cycle number.

As for the cycle performance, Electrode 1-2 and Electrode 1-1 both using Sample 1 as the positive electrode active material had excellent results. In Electrode 3-1 and Electrode 3-2 both using Sample 3 as the positive electrode active material, Electrode 3-2 in which the positive electrode was subjected to pressing tended to more significantly deteriorate.

[Cross-Sectional Observation]

For evaluation of a crack in the positive electrode active material included in the positive electrode, a cross section of each positive electrode was observed by the cross-sectional observation method described in Example 1 or the like and the generation probability of cracks was calculated. The generation probability of cracks is the value obtained by dividing the number of cracks observed in cross-sectional observation by the number of particles observed in the cross-sectional observation and multiplying the result by 100, and its unit is %.

Figure 53:
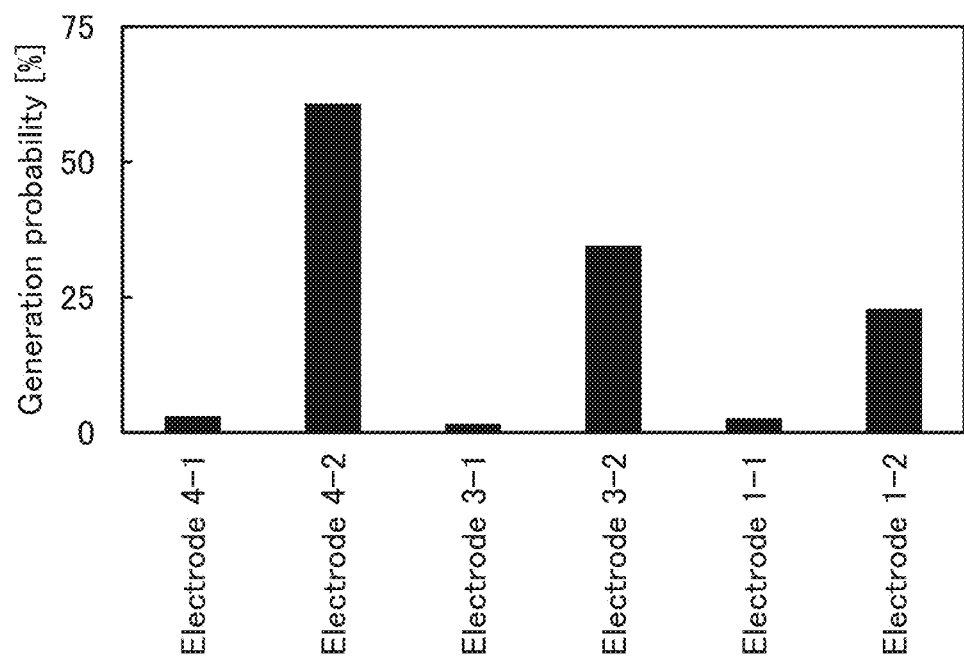
FIG. 53 shows the generation probability of a crack.

FIG. 53 shows the numbers of cracks in Electrode 1-1, Electrode 1-2, Electrode 3-1, and Electrode 3-2 before being assembled into secondary batteries. In addition to these four kinds of positive electrode, the number of cracks in Electrode 4-1 and Electrode 4-2 fabricated in Example 2 are also shown. An increase in the number of cracks due to pressing was observed in the positive electrodes using any of the positive electrode active materials. Moreover, the number of cracks after pressing was the smallest in the positive electrode using Sample 1, the second smallest in the positive electrode using Sample 3, and the third smallest in the positive electrode using Sample 4. This suggests that a phosphate compound contained in the positive electrode probably greatly contributes to a reduction in the number of cracks and that magnesium, fluorine, or the like contained in the positive electrode active material probably contributes to a reduction in the number of cracks.

[Plan-View Observation]

In order to evaluate a change in cracks or the like in accordance with charge and discharge cycles, plan-view observation of the positive electrodes included in the secondary batteries was performed. Specifically, charge and discharge cycles were repeated a certain number of times, the secondary batteries were disassembled, the positive electrodes of the secondary batteries were subjected to plan-view observation, the secondary batteries were reassembled, and charge and discharge cycles were performed again: this series of operations was repeated several times.

Figure 54A:
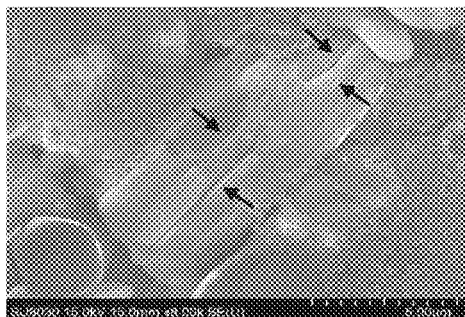
FIG. 54(A) shows a TEM observation result of a positive electrode.
Figure 54B:
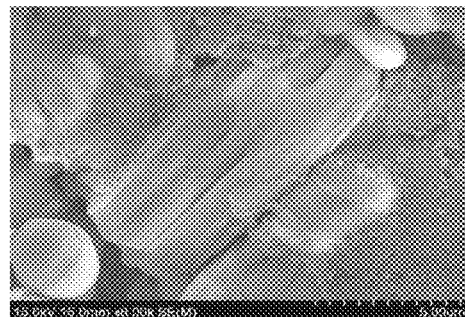
FIG. 54(B) shows a TEM observation result of a positive electrode.
Figure 54C:
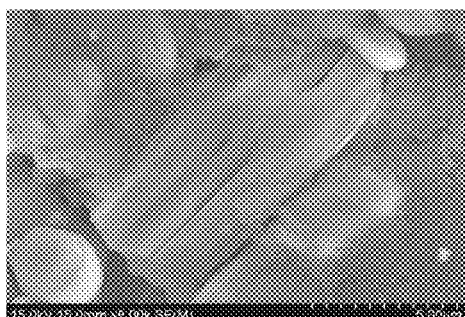
FIG. 54(C) shows a TEM observation result of a positive electrode.
Figure 54D:
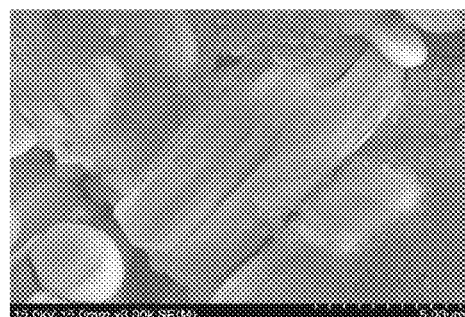
FIG. 54(D) shows a TEM observation result of a positive electrode.
Figure 54E:
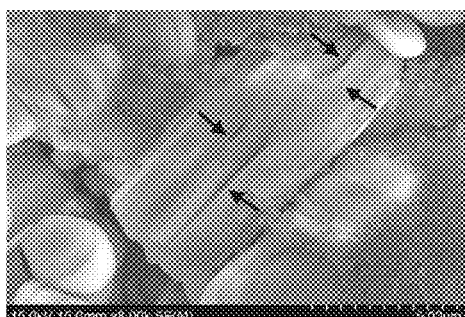
FIG. 54(E) shows a TEM observation result of a positive electrode.

FIGS. 54(A), 54(B), 54(C), 54(D), and 54(E) show plan-view observation results of the positive electrode in the secondary battery including Electrode 1-2 before charge and discharge cycle, after 10 cycles, after 30 cycles, after 40 cycles, and after 50 cycles. In FIG. 54(A), some observed cracks are indicated by arrows. In FIG. 54(E), cracks that seem to correspond to the cracks indicated in FIG. 54(A) are indicated by arrows.

Figure 55A:
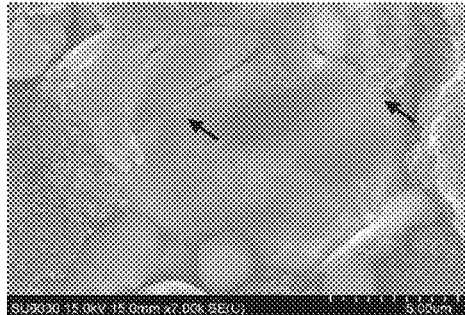
FIG. 55(A) shows a TEM observation result of a positive electrode.
Figure 55B:
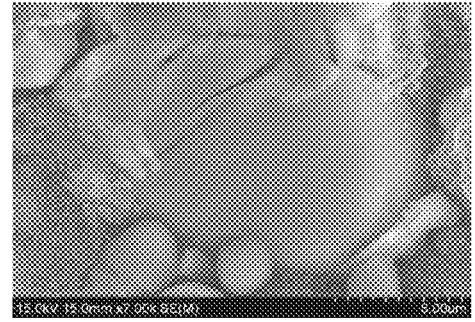
FIG. 55(B) shows a TEM observation result of a positive electrode.
Figure 55C:
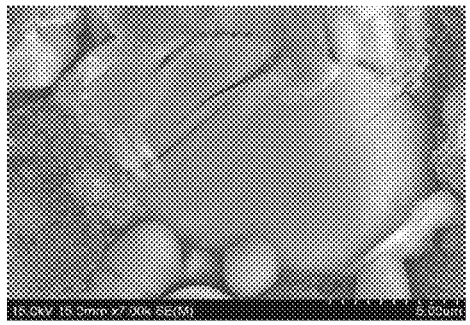
FIG. 55(C) shows a TEM observation result of a positive electrode.
Figure 55D:
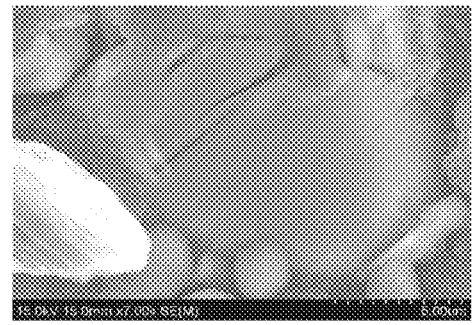
FIG. 55(D) shows a TEM observation result of a positive electrode.
Figure 55E:
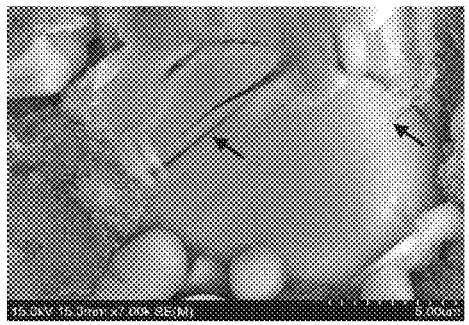
FIG. 55(E) shows a TEM observation result of a positive electrode.

FIGS. 55(A), 55(B), 55(C), 55(D), and 55(E) show plan-view observation results of the positive electrode in the secondary battery including Electrode 3-2 before charge and discharge cycle, after 10 cycles, after 30 cycles, after 40 cycles, and after 50 cycles. In FIG. 55(A), some observed cracks are indicated by arrows. In FIG. 55(E), cracks that seem to correspond to the cracks indicated in FIG. 55(A) are indicated by arrows.

The observation results in FIG. 54 and FIG. 55 suggest that development of cracks in accordance with charge and discharge cycles is inhibited in Electrode 1-2 in which phosphoric acid was added in the formation of the positive electrode active material, as compared to Electrode 3-2 in which phosphoric acid was not added.

Example 5

In this example, a secondary battery using graphite for a negative electrode was fabricated and the cycle performance was evaluated.

[Fabrication of Secondary Battery]

Positive electrodes were fabricated using Sample 1, Sample 3, and Sample 4, which were formed in the above examples, as a positive electrode active material. The positive electrodes that were fabricated in such a manner that a current collector was coated with slurry in which the positive electrode active material, AB, and PVDF were mixed at the positive electrode active material:AB:PVDF=95:3:2 (weight ratio) were used. As a solvent of the slurry, NMP was used.

The current collector was coated with the slurry, the solvent was volatilized, a pressure of 178 kN/m was applied, and a pressure of 1248 kN/m was further applied; thus, the positive electrodes including the respective positive electrode active materials were obtained. Each of the positive electrode active materials had a carried amount of greater than or equal to 9 mg/cm$^2$ and less than or equal to 11 mg/cm$^2$.

A negative electrode manufactured by applying slurry in which graphite was used as an active material, VGCF (registered trademark), CMC-Na, and SBR were mixed at the active material:VGCF (registered trademark):CMC-Na:SBR=96:1:1:2 (weight ratio), and viscosity was adjusted with pure water to one side of a current collector, and drying the slurry to volatilize pure water was used as a negative electrode. As the current collector, 18-µm-thick copper foil was used. Each of the negative electrodes had a carried amount of greater than or equal to 6 mg/cm$^2$ and less than or equal to 8 mg/cm$^2$.

As an electrolyte contained in the electrolyte solution, 1 mol/L lithium hexafluorophosphate (LiPF$_6$) was used, and as the electrolyte solution, an electrolyte solution in which ethylene carbonate (EC) and diethyl carbonate (DEC) were mixed at EC:DEC=3:7 (volume ratio) was used.

As a separator, 25-µm-thick polypropylene was used. One positive electrode and one negative electrode were placed such that respective active material layers face each other, and the separator was placed therebetween.

For the purpose of aging, the fabricated secondary battery was charged by a capacity corresponding to 15 mAh/g at 0.01 C, part of the exterior body was cut and opened, and degasification was performed with a roller. After that, the cut portion of the exterior body was sealed. Then, the secondary battery was charged by a capacity corresponding to 105 mAh/g at 0.1 C and held for 24 hours at 40° C., part of the exterior body was cut and opened, and degasification was performed with a roller. After CCCV charging (0.1 C, 4.4 V, and a termination current of 0.01 C) and CC discharging (0.2 C, 2.5 V) were performed, CCCV charging (0.2 C, 4.4 V, and a termination current of 0.02 C) and CC discharge (0.2 C, 2.5 V) were performed twice.

Figure 56A:
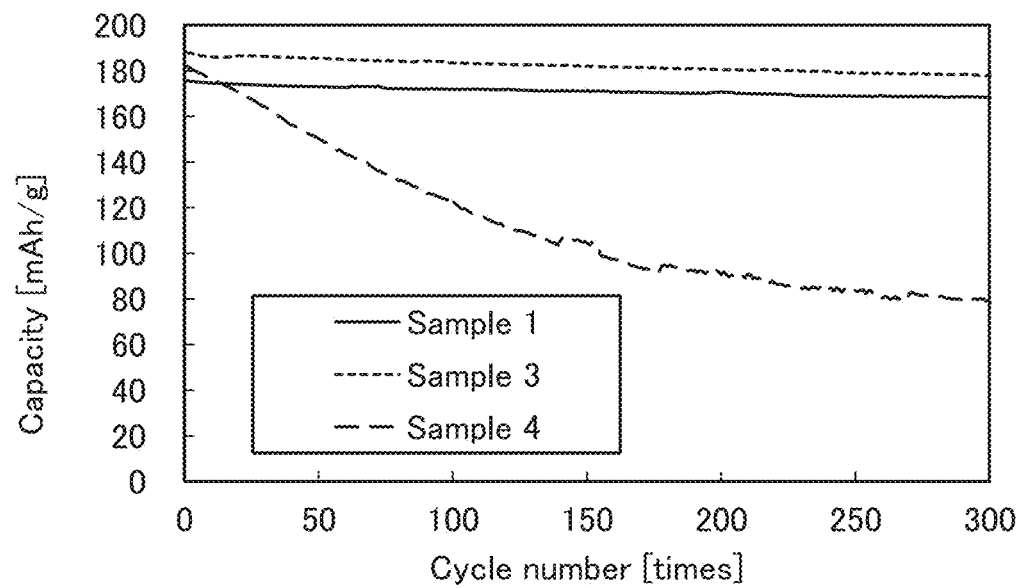
FIG. 56(A) shows cycle performance of secondary batteries.
Figure 56B:
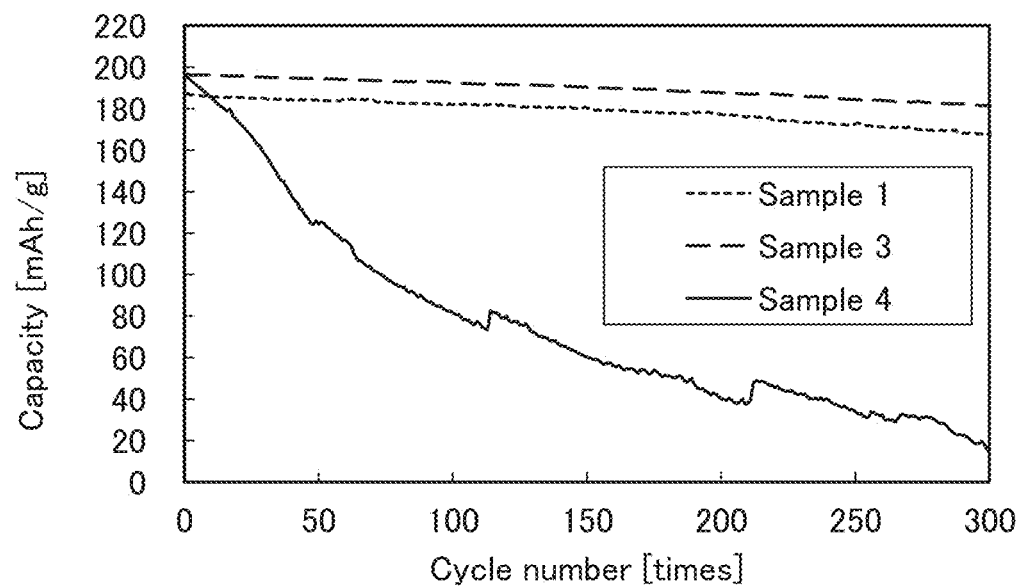
FIG. 56(B) shows cycle performance of secondary batteries.

Next, charge and discharge cycle performance was evaluated when CCCV charging (0.2 C, 4.4 V or 4.45 V, a termination current of 0.02 C) and CC discharging (0.2 C, 2.5V) were performed. FIG. 56 shows the results. FIG. 56(A) shows the results when the upper limit voltage in charging was 4.4 V, and FIG. 56(B) shows the results when the upper limit voltage in charging was 4.45 V. Sample 3 in which magnesium and fluorine were used in the formation of the positive electrode active material and Sample 1 in which magnesium, fluorine, and phosphoric acid were used in the formation of the positive electrode active material both showed excellent cycle performance.

REFERENCE NUMERALS

100: positive electrode active material, 100*a*: positive electrode active material, 100*b*: positive electrode active material, 100c: positive electrode active material, 100d: positive electrode active material, 101: first substance, 101c: first substance, 102: second substance, 102c: second substance, 103: third substance, 105: crack, and 106: crack.

The invention claimed is:

1. A method for manufacturing a positive electrode, comprising:
- a first step of mixing a first material comprising one or more of cobalt, manganese, and nickel, a second material comprising magnesium, and a third material comprising fluorine to form a first mixture;
- a second step of heating the first mixture;
- a third step of mixing the first mixture heated in the second step and a fourth material comprising phosphorus to form a second mixture; and
- a fourth step of heating the second mixture,
- wherein the first material has a layered rock-salt crystal structure, and
  - wherein the fourth material comprises a phosphate compound.

2. The method for manufacturing a positive electrode, according to claim 1,
- wherein the number of phosphorus atoms contained in the fourth material is Mp,
- wherein a sum of the numbers of cobalt atoms, manganese atoms, and nickel atoms contained in the first material is Mm, and
- wherein Mp is greater than or equal to 0.01 times and less than or equal to 0.12 times Mm.

3. A method for manufacturing a positive electrode, comprising:
- a first step of mixing a first material comprising one or more of cobalt, manganese, and nickel, a second material comprising magnesium, and a third material comprising fluorine to form a first mixture;
- a second step of heating the first mixture;
- a third step of mixing the first mixture heated in the second step and a fourth material comprising phosphorus to form a second mixture; and
- a fourth step of heating the second mixture,
- wherein the first material has a layered rock-salt crystal structure,
- wherein the fourth material comprises a phosphate compound, and
- wherein the heating in the fourth step is performed at a temperature higher than or equal to 550°C. and lower than or equal to 950°C.

* * * * *